(12) United States Patent
Miyamoto et al.

(10) Patent No.: US 12,375,456 B2
(45) Date of Patent: Jul. 29, 2025

(54) INFORMATION PROCESSING APPARATUS, MOBILE APPARATUS, AND COMMUNICATION SYSTEM

(71) Applicant: Sony Semiconductor Solutions Corporation, Kanagawa (JP)

(72) Inventors: Takashi Miyamoto, Kanagawa (JP); Hiroo Takahashi, Kanagawa (JP); Toru Akishita, Tokyo (JP); Yoshitomo Osawa, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 295 days.

(21) Appl. No.: 17/919,903

(22) PCT Filed: Aug. 19, 2021

(86) PCT No.: PCT/JP2021/030286
§ 371 (c)(1),
(2) Date: Oct. 19, 2022

(87) PCT Pub. No.: WO2022/050057
PCT Pub. Date: Mar. 10, 2022

(65) Prior Publication Data
US 2023/0164123 A1     May 25, 2023

(30) Foreign Application Priority Data

Sep. 1, 2020    (JP) ................................. 2020-147113

(51) Int. Cl.
*H04L 9/40* (2022.01)
*G06F 21/60* (2013.01)
(Continued)

(52) U.S. Cl.
CPC ........ *H04L 63/0428* (2013.01); *G06F 21/606* (2013.01); *H04L 9/32* (2013.01);
(Continued)

(58) Field of Classification Search
CPC ....... G06F 21/60; G06F 21/606; H04L 65/70; H04L 63/04; H04L 63/0428; H04L 63/12;
(Continued)

(56) References Cited

U.S. PATENT DOCUMENTS

2017/0149748 A1* 5/2017 Lindteigen ............ H04L 9/0891
2017/0372083 A1* 12/2017 Leleu ..................... G06F 21/606
(Continued)

FOREIGN PATENT DOCUMENTS

| JP | 2014523192 A | 9/2014 |
|----|--------------|--------|
| WO | 2018225449 A1 | 12/2018 |
| WO | 2020129685 A1 | 6/2020 |

OTHER PUBLICATIONS

International Search Report (PCT/ISA/210), International Application No. PCT/JP2021/030286, dated Nov. 16, 2021.

*Primary Examiner* — Shaqueal D Wade-Wright
(74) *Attorney, Agent, or Firm* — Michael Best & Friedrich LLP

(57) ABSTRACT

Information processing apparatus, mobile apparatus, and communication systems are disclosed. In one example, an information processing apparatus performs high-speed data transmission of data of a frame including image data, transmits an extended packet including an extended packet header and packet data to a different information processing apparatus. First protected data of the packet data is generated with use of a session key, and a nonce value for the session key is updated every time the first protected data is generated. Further, the image data is stored in the packet data, the high-speed data transmission includes transmission of part or a whole of the nonce value, and the part or the whole of the nonce value is stored outside the extended packet header and transmitted. As an example, the information processing can be applied to communication systems compliant with the MIPI standard.

19 Claims, 118 Drawing Sheets

(51) Int. Cl.
    *H04L 9/32*      (2006.01)
    *H04L 65/70*     (2022.01)
    *H04L 67/146*    (2022.01)
    *H04W 12/106*    (2021.01)
    *H04L 65/1069*   (2022.01)

(52) U.S. Cl.
    CPC ............ *H04L 65/70* (2022.05); *H04L 67/146* (2013.01); *H04W 12/106* (2021.01); *H04L 65/1069* (2013.01)

(58) Field of Classification Search
    CPC ........ H04L 63/123; H04L 9/32; H04W 12/10; H04W 12/106; H04W 12/03
    See application file for complete search history.

(56) References Cited

U.S. PATENT DOCUMENTS

| | | | |
|---|---|---|---|
| 2018/0109696 A1* | 4/2018 | Thanigasalam | G06F 21/602 |
| 2019/0149751 A1* | 5/2019 | Wise | H04N 7/08 |
| | | | 348/222.1 |
| 2020/0068166 A1* | 2/2020 | Davidson | G06F 21/78 |
| 2022/0386117 A1* | 12/2022 | Henry | H04W 12/06 |
| 2024/0305987 A1* | 9/2024 | Patil | H04L 69/22 |

\* cited by examiner

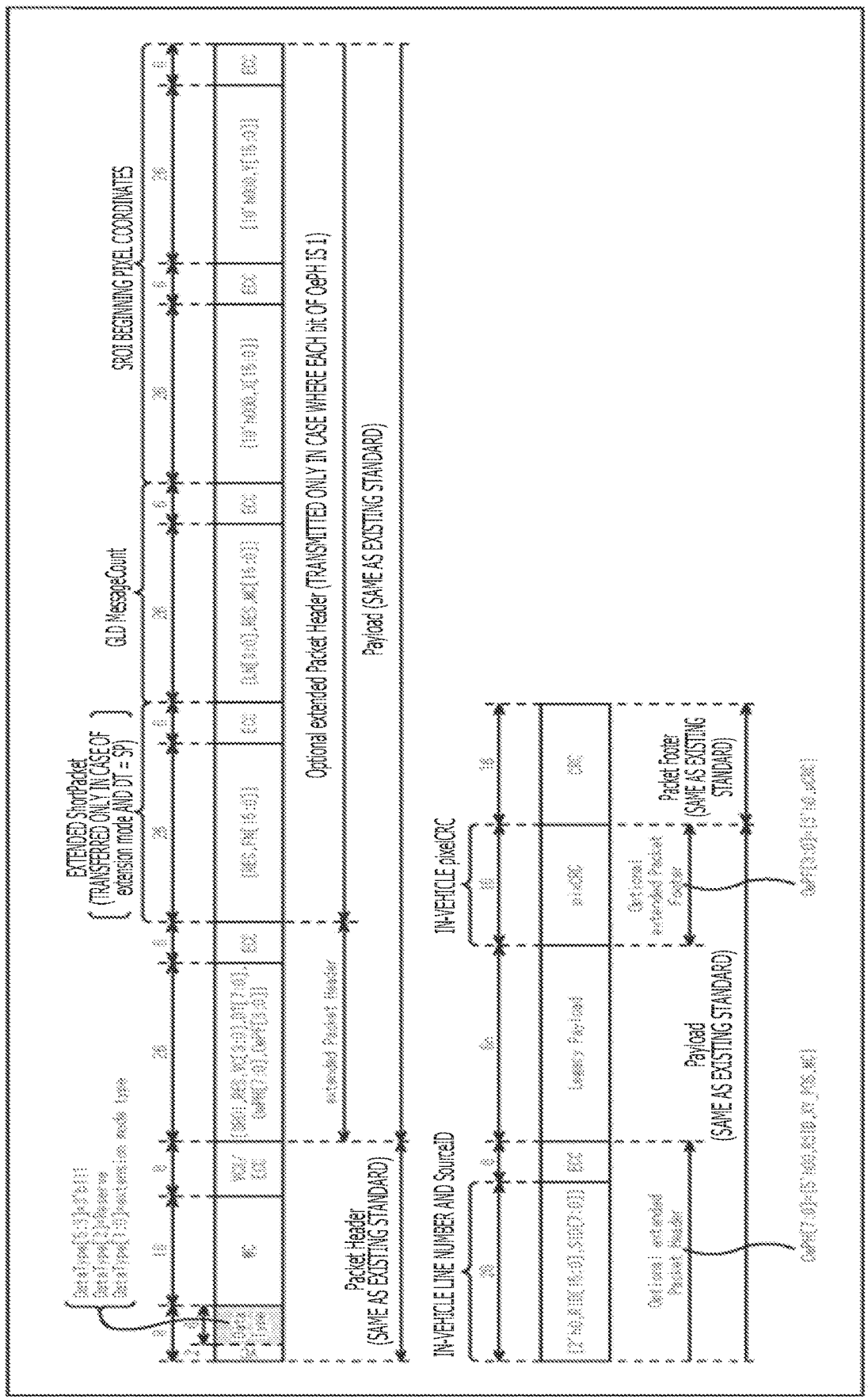
F I G . 3

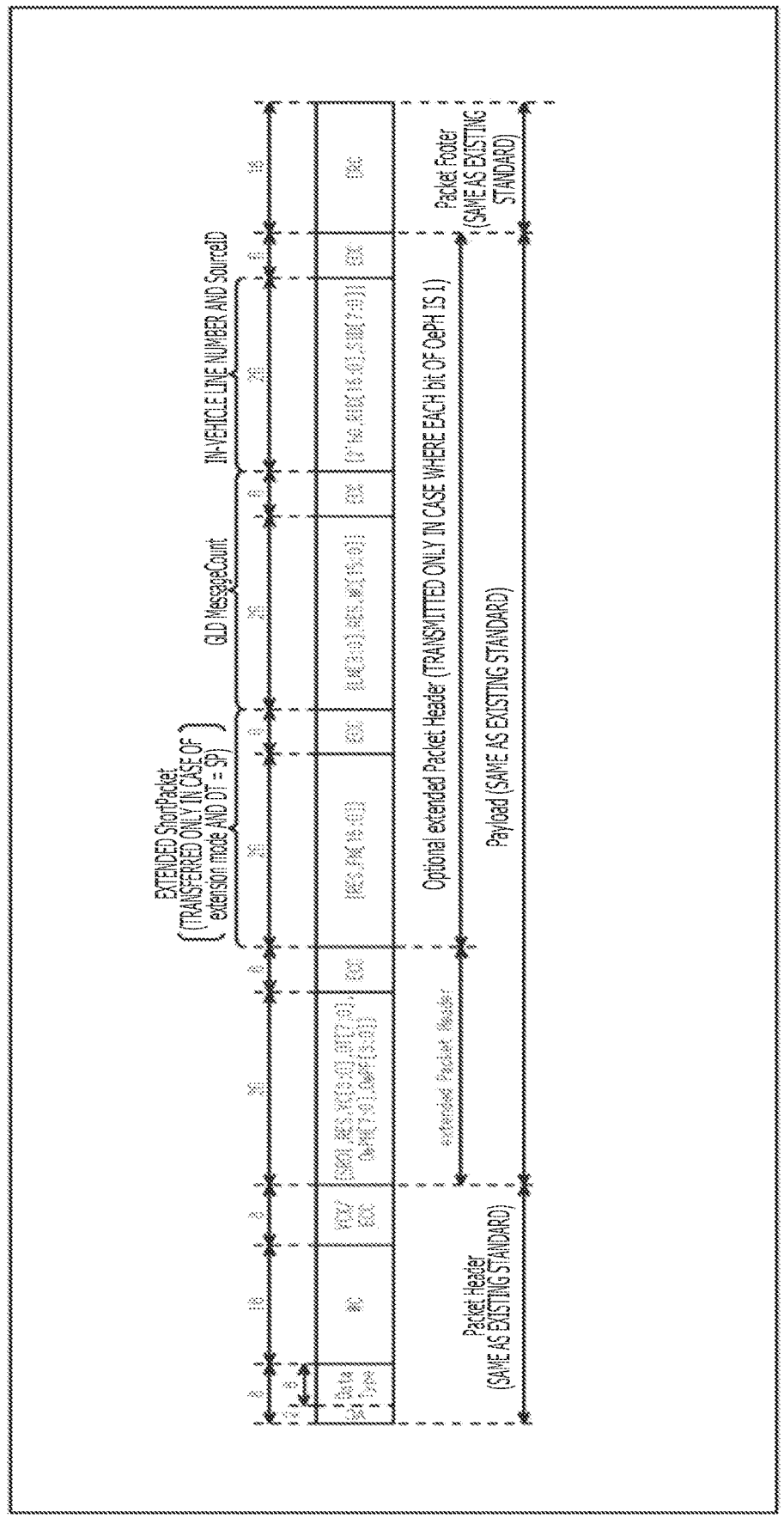
F I G . 4

F I G. 21
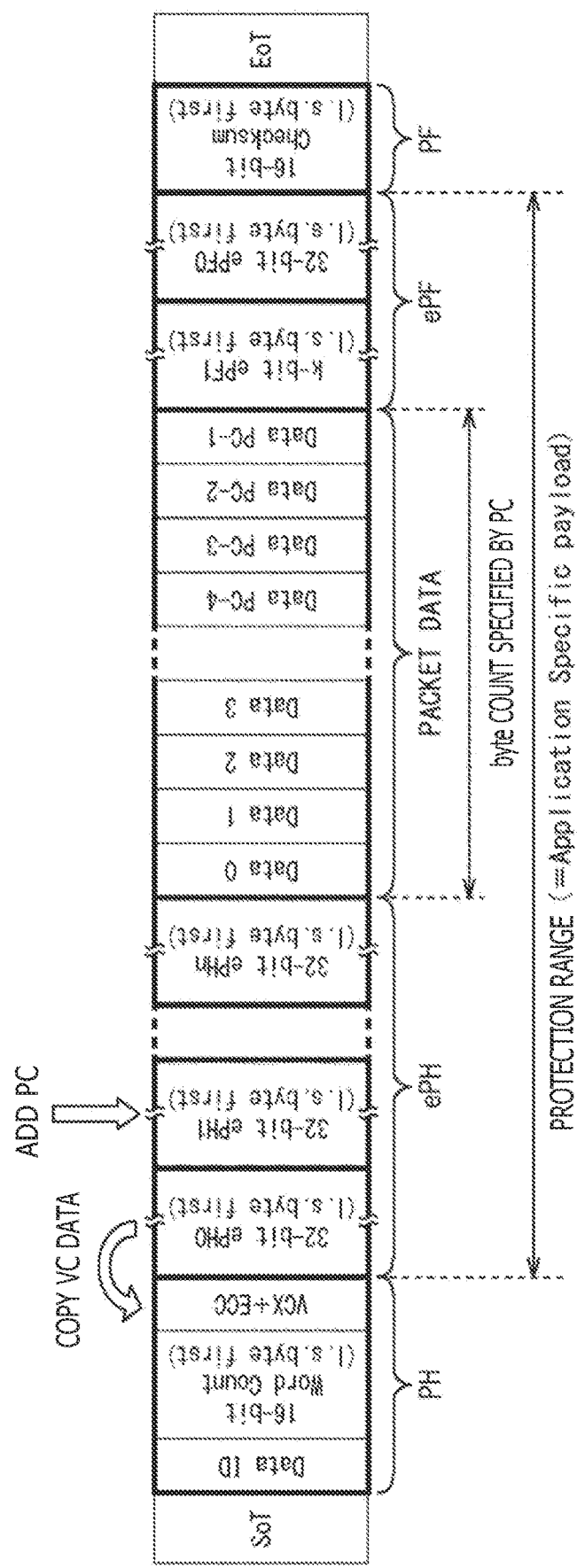

F I G. 2 2
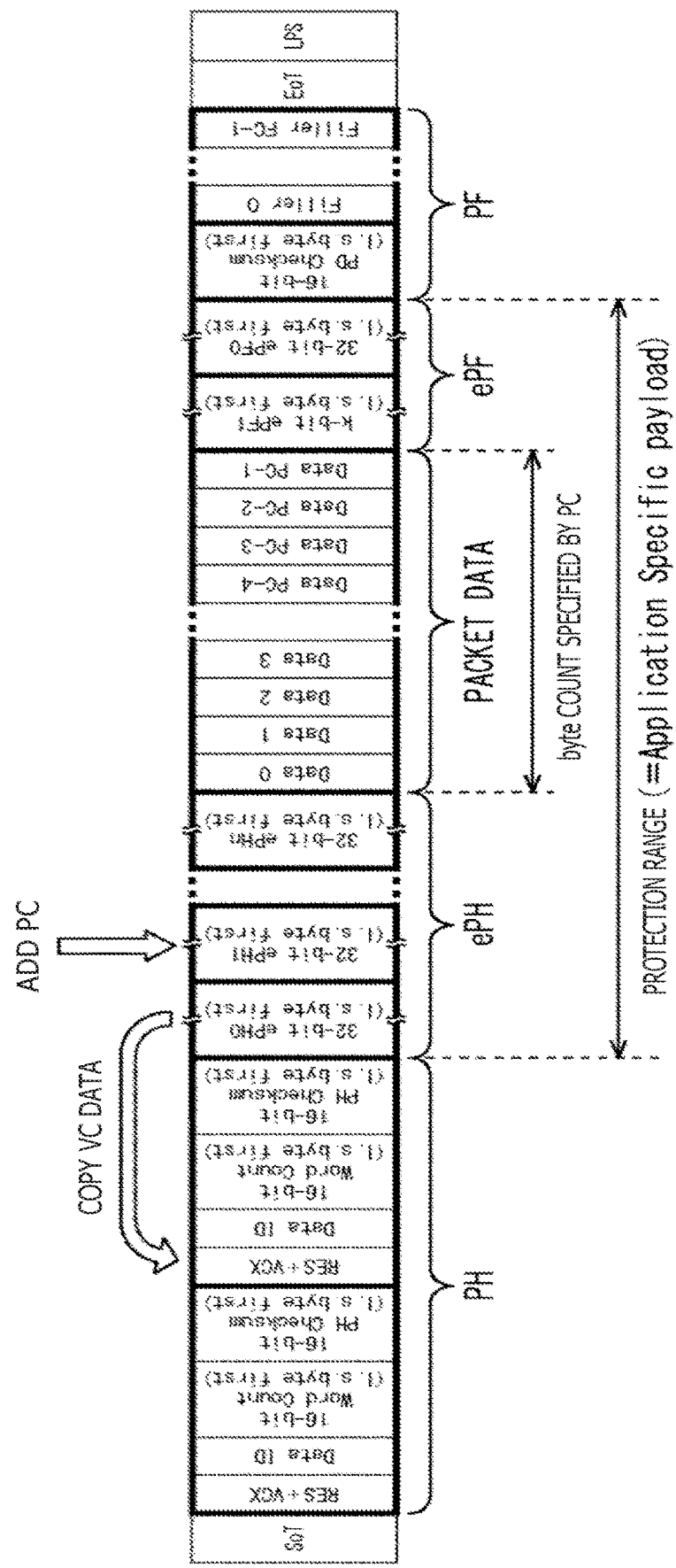

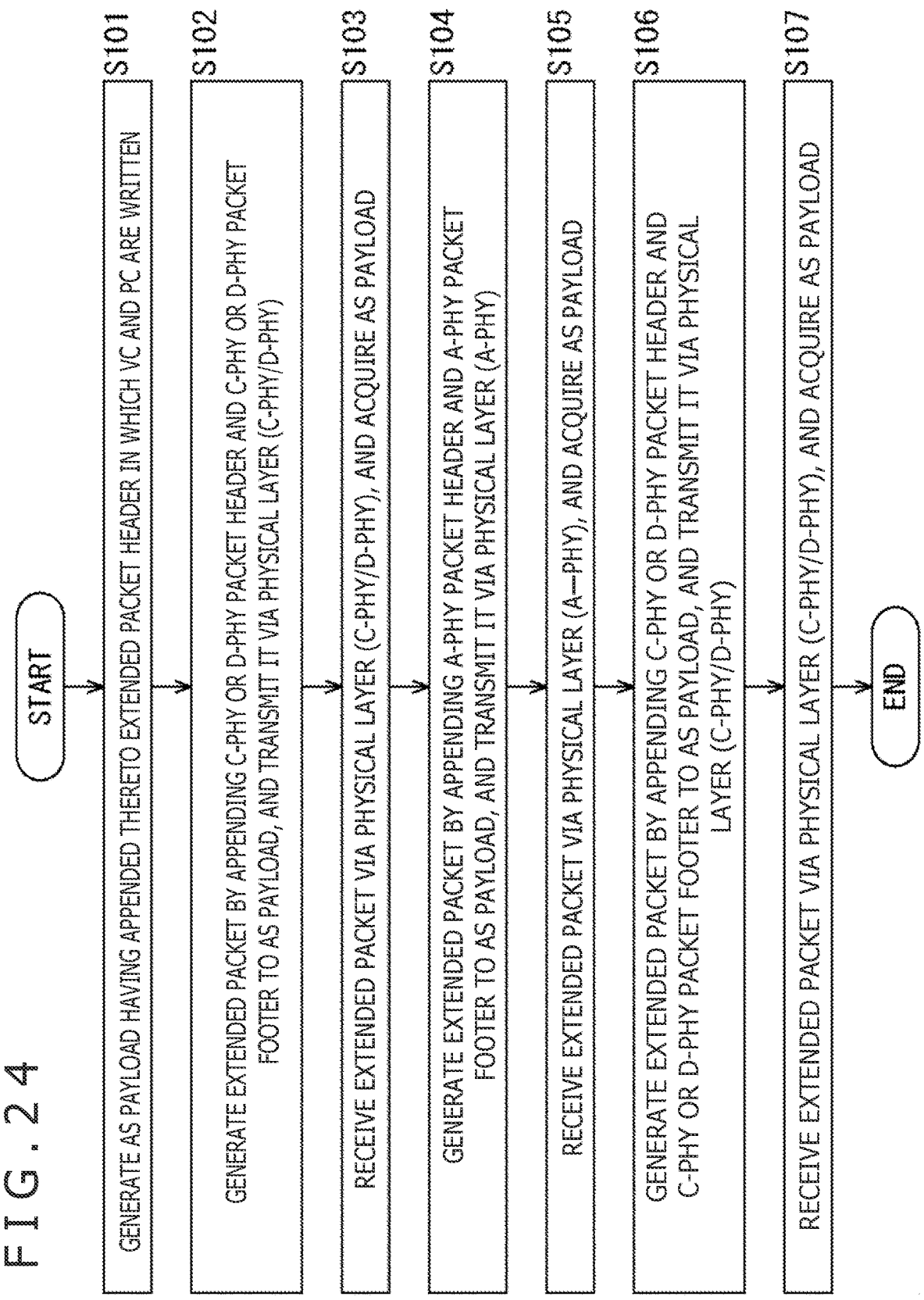

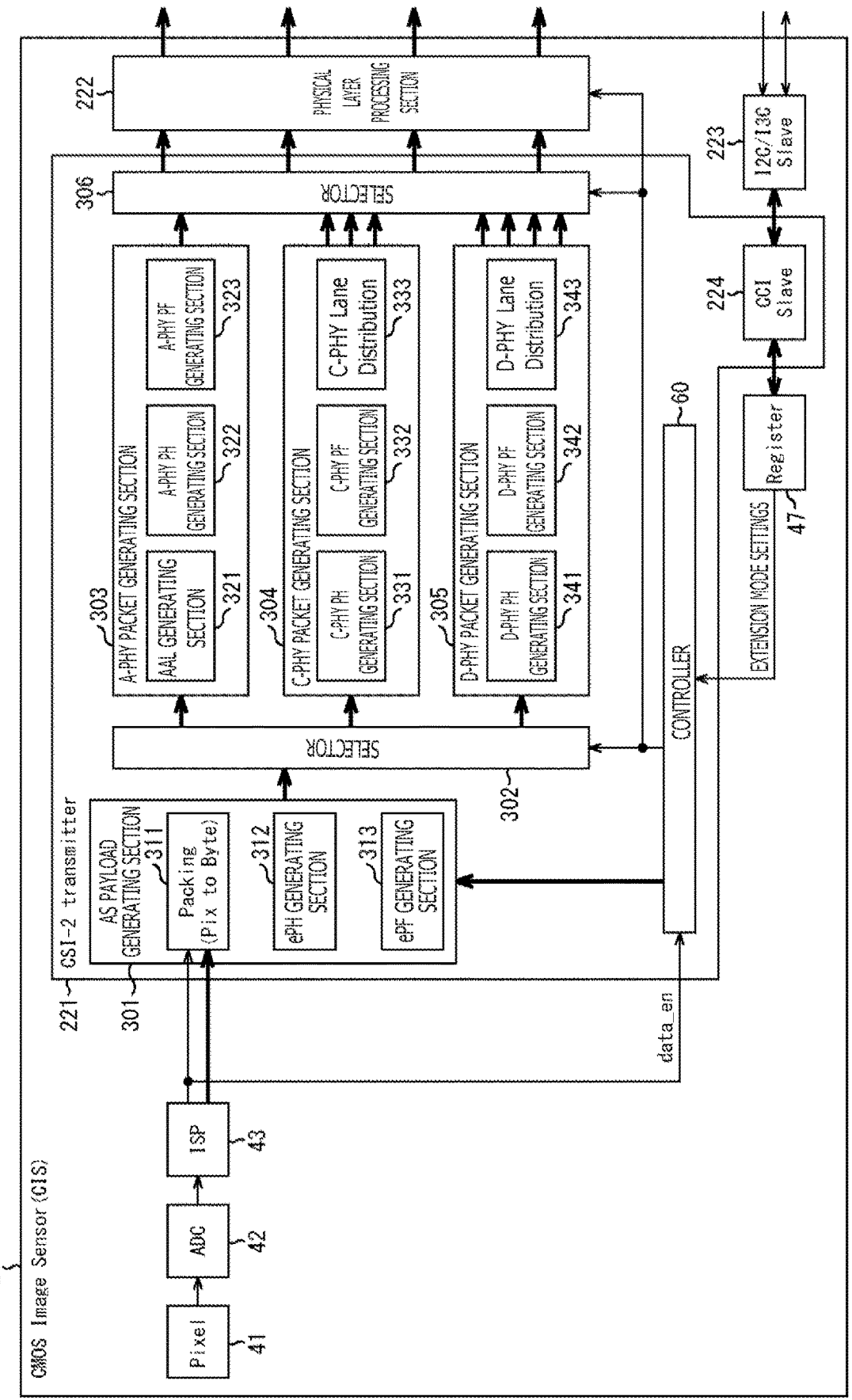
F I G. 2 5

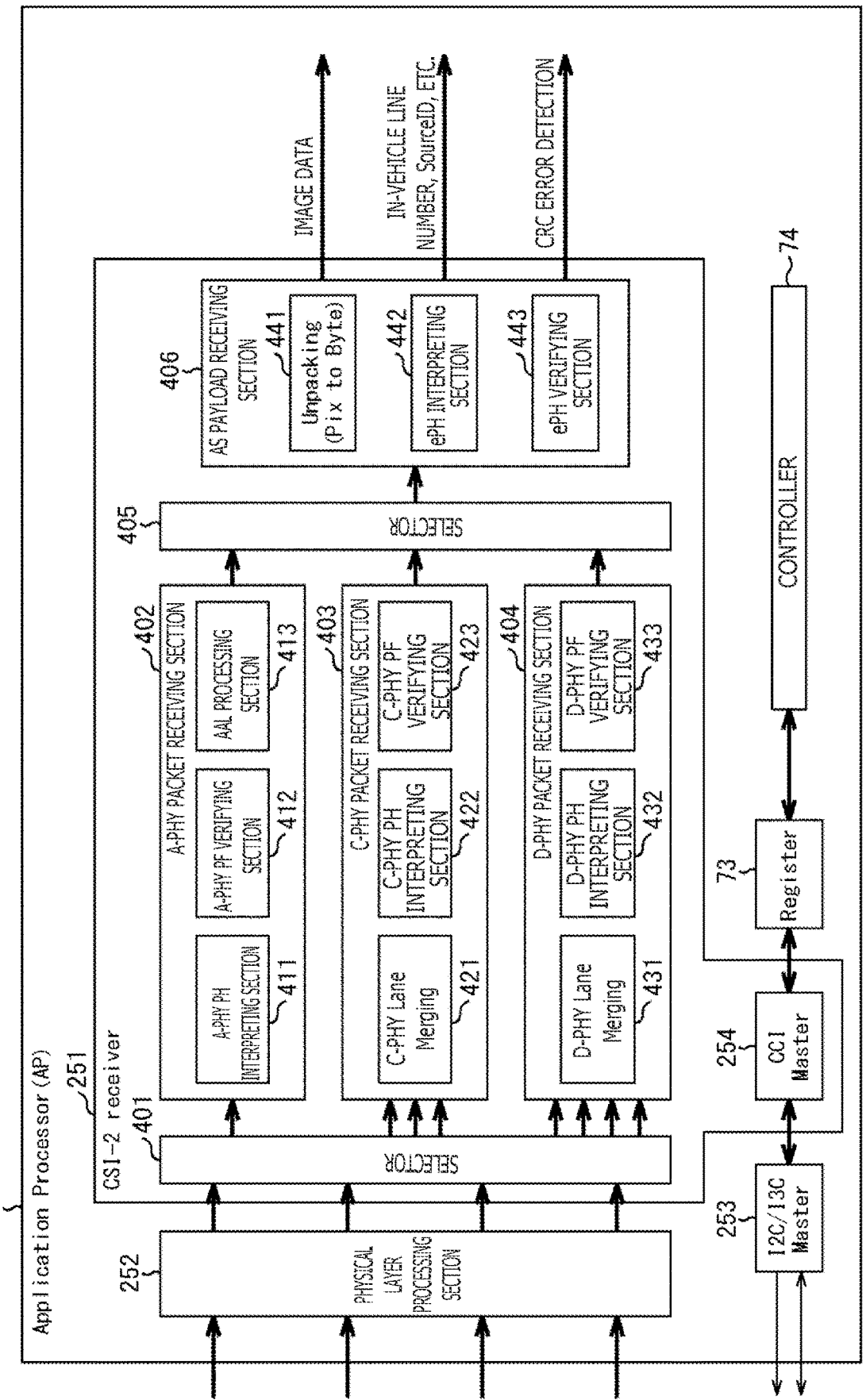

F I G . 2 8
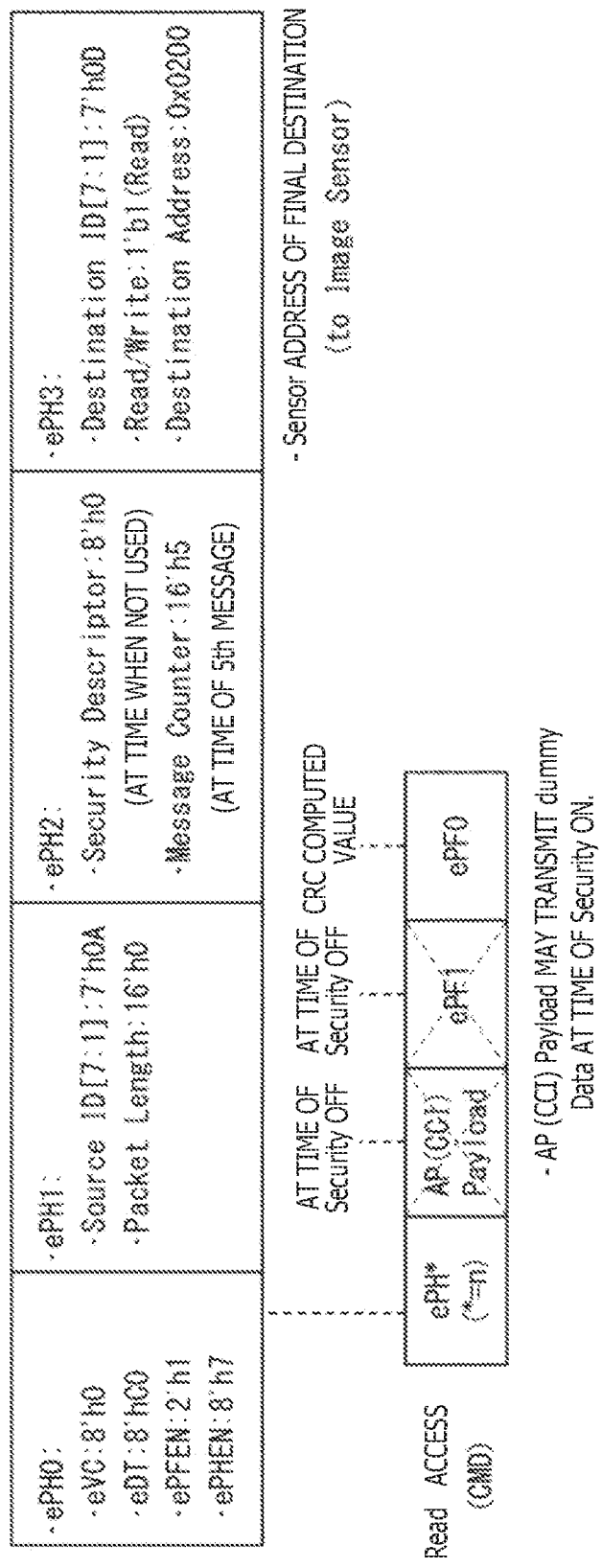

F I G. 33
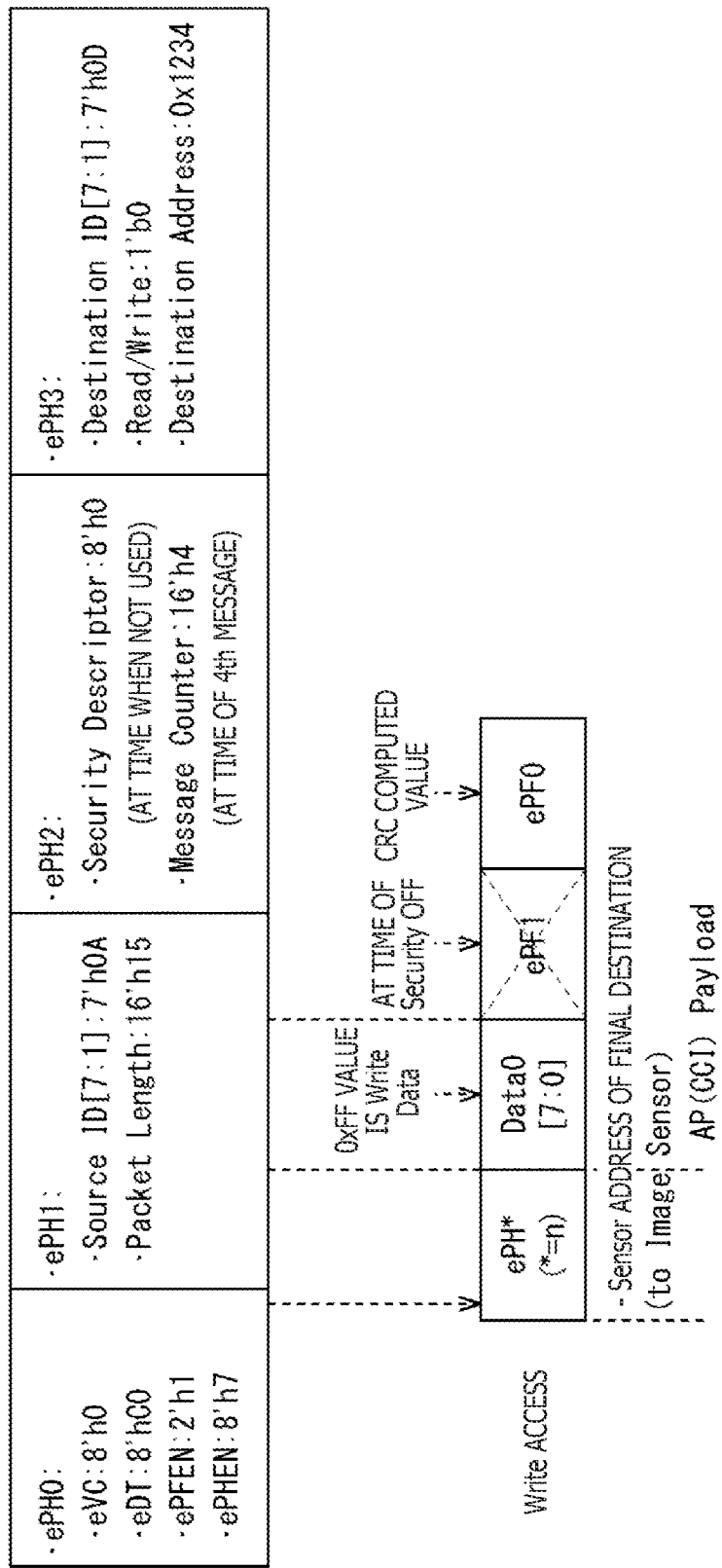

FIG. 42

Read ACCESS (CMD)

Slave Address[7:1] = 7'h0F

| S | Slave Address+W 8-bit | Register Address [15:8] | Register Address [7:0] | ePH* (*=n) | ePF1 | ePF0 | P |

- CONNECTION-DESTINATION Sensor ADDRESS (to Deserializer)

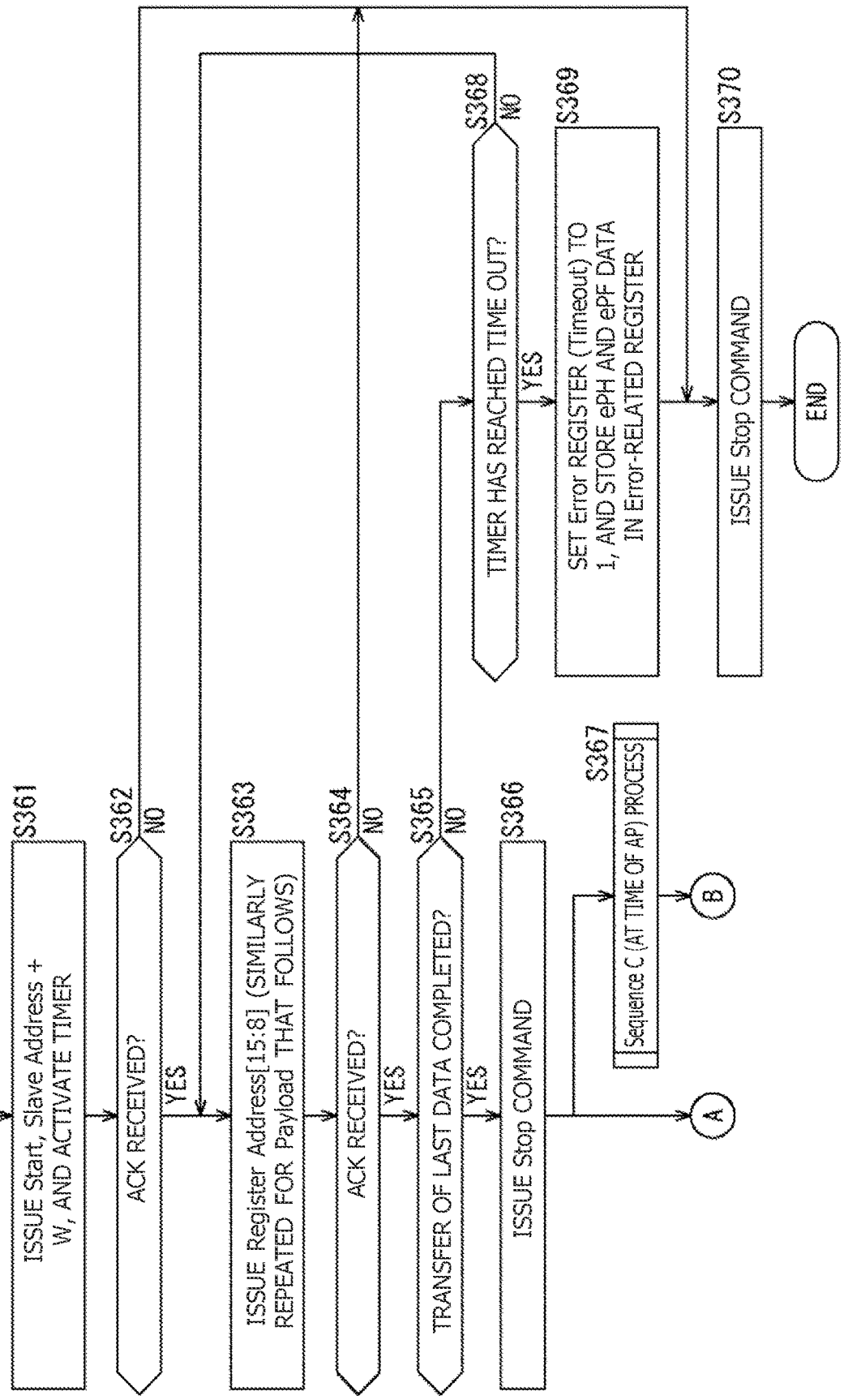

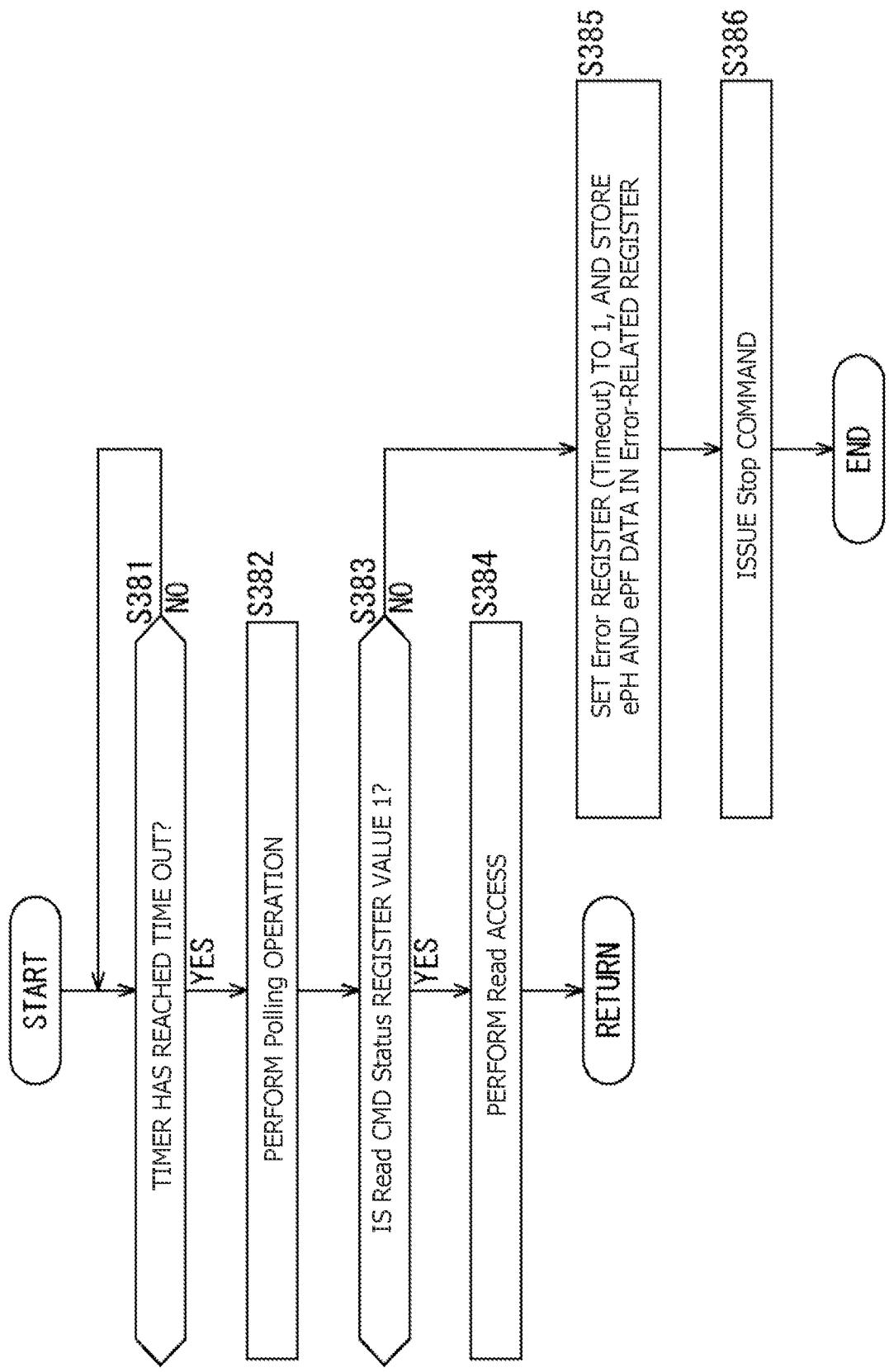
F I G. 5 5

FIG. 58

| bit assign | Name | Description | Remarks |
|---|---|---|---|
| ePH0[31:24] | eVC | extended Virtual Channel | - eVC IN C-PHY AND D-PHY EXTENDED HEADERS<br>- UNUSED IN CCI-FS (FIXED AT 0) |
| ePH0[23:16] | eDT | extended Data Type | CCI-FS(I2C, I3C)を追加 |
| ePH0[15] | eCCI | Control Code Indicator | 1'b0: NORMAL DATA TRANSFER<br>1'b1: REPRESENTS CONTROL CODE OF I2C, I3C<br>- AT TIME OF I2C: REPRESENTS S/Sr/ACK/NACK/P, ETC.<br>- USED AT TIME OF Clock Stretch |
| ePH0[14:10] | Reserved | Reserved for future definition | Reserved |
| ePH0[9:8] | ePFEN | extended Packet Footer (ePF) Enable bitmap | 32b OR 64b, field FOR Footer EXTENSION |
| ePH0[7:0] | ePHEN | extended Packet Header (ePH) Enable bitmap | field FOR EXTENSION OF extended Packet Header |

| bit assign | Name | Description | Remarks |
|---|---|---|---|
| ePH1[31:16] | Source ID | Source ID, Device ID in which the packet is generated | |
| ePH1[15:0] | Packet Length | Length of Packet Data(unit:Byte) | DATA PACKET LENGTH |

| bit assign | Name | Description | Remarks |
|---|---|---|---|
| ePH2[31:24] | Security Descriptor | Security Descriptor | APPENDED AT TIME WHEN Security IS USED<br>default: SET TO 0 |
| ePH2[23:16] | Reserved | Reserved for future definition | Reserved |
| ePH2[15:0] | Message Counter | Message Counter | - 16-bit ROUNDING COUNTER. INCREMENTED FOR EACH PACKET HAVING First extended Packet Header, AND INITIAL VALUE IS 0.<br>- INDEPENDENT Message COUNTER IS USED FOR COMMUNICATION IN C/D-PHY HAVING VC. |

F I G . 5 9

| bit assign | Name | Description | Remarks |
|---|---|---|---|
| ePH3[31:25] | Destination ID | Destination ID. Device ID in which the packet is received finally | Destination ID ADDED (CCI-FS) CORRESPONDS TO Slave Address (ADDRESSED TO FINAL DESTINATION) |
| ePH3[24] | Read/Write flag | Read/Write flag in which the packet is received finally | REPRESENTS Read: 1, Write: 0 (CCI-FS) |
| ePH3[23:8] | Destination Address | Destination Address is to access register address finally. | STORE REGISTER ADDRESS VALUE OF FINAL DESTINATION |

FIG. 60

| eDT | Description |
|---|---|
| 0x00 to 0x07 | synchronization Short Packet Data Types |
| 0x08 to 0x0F | Generic Short Packet Data Types |
| 0x10 to 0x17 | Generic Long Packet Data Types |
| 0x18 to 0x1F | YUV Data |
| 0x20 to 0x26 | RGB Data |
| 0x27 to 0x2F | RAW Data |
| 0x30 to 0x37 | User Defined Byte-based Data |
| 0x38 | USL Command |
| 0x39 to 0x3D | Reserved for future use |
| 0x3E | Extended Packet mode(Use in PH only. Do not use in ePH) |
| 0x3F | For CSI-2 over C-PHY:Reserved for future use<br>For CSI-2 over D-PHY:Reserved for future use |
| 0x40 to 0xBF | Reserved for future use |
| 0xC0 to 0xCF | User Defined Byte-based Data<br>0xC0:For I2C<br>0xC1:For I3C |

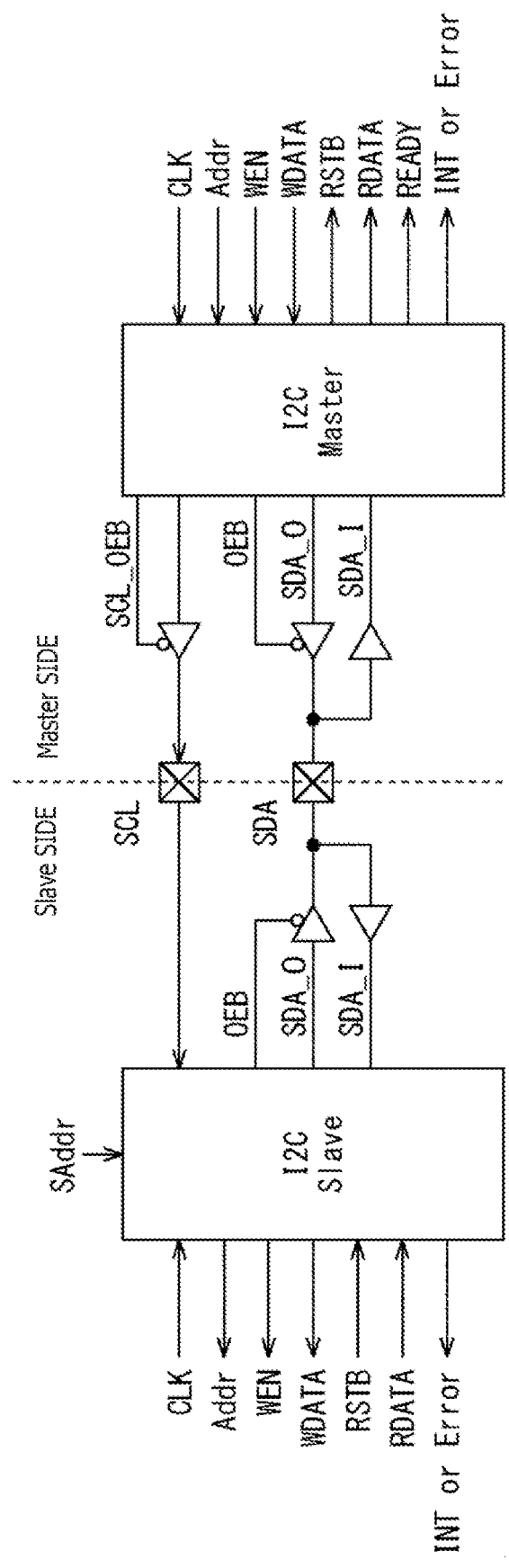
F I G. 6 1

FIG. 63
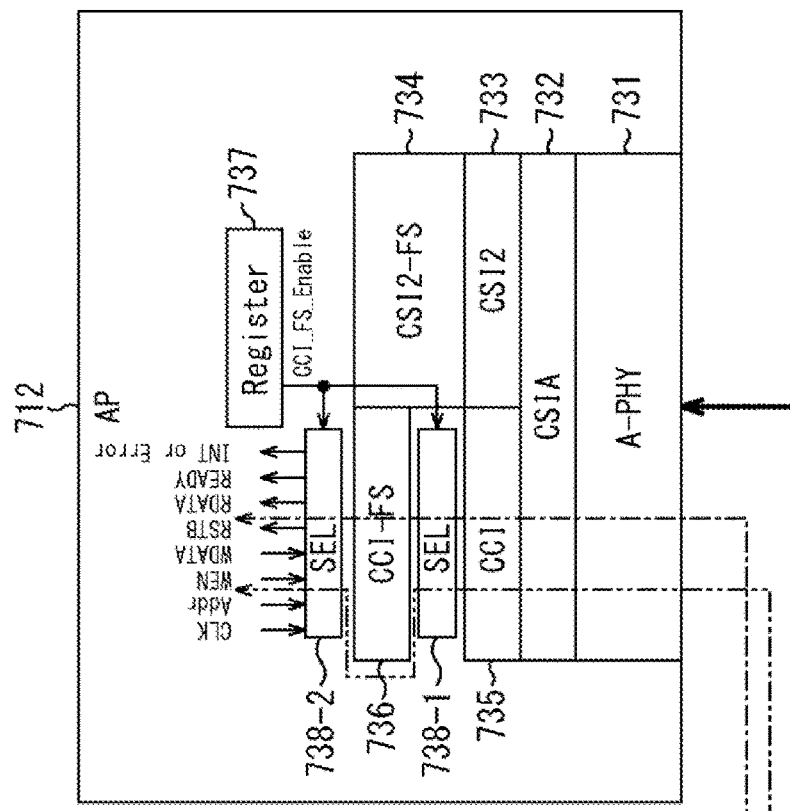
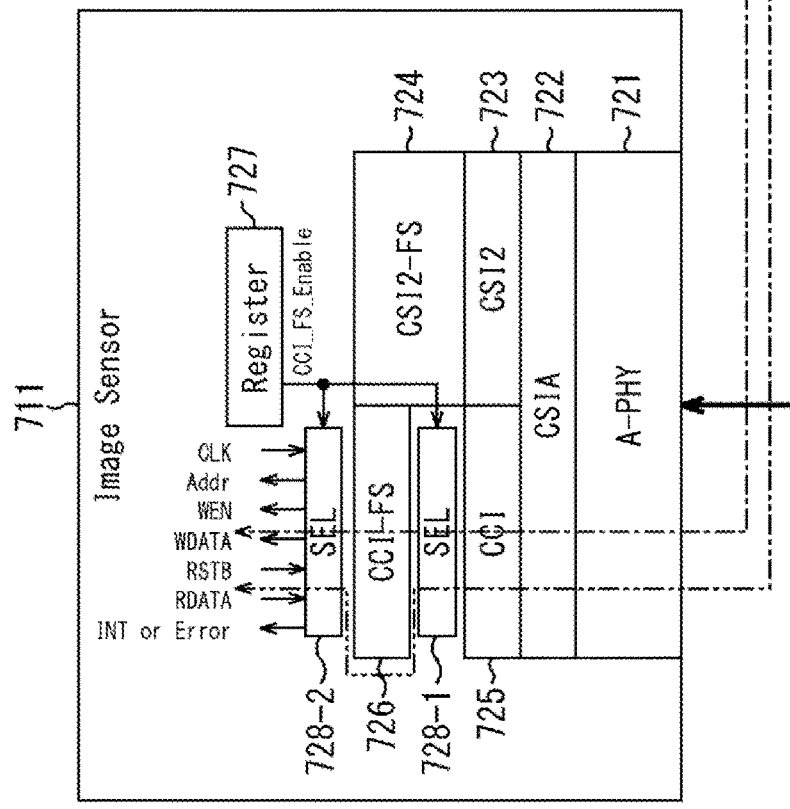

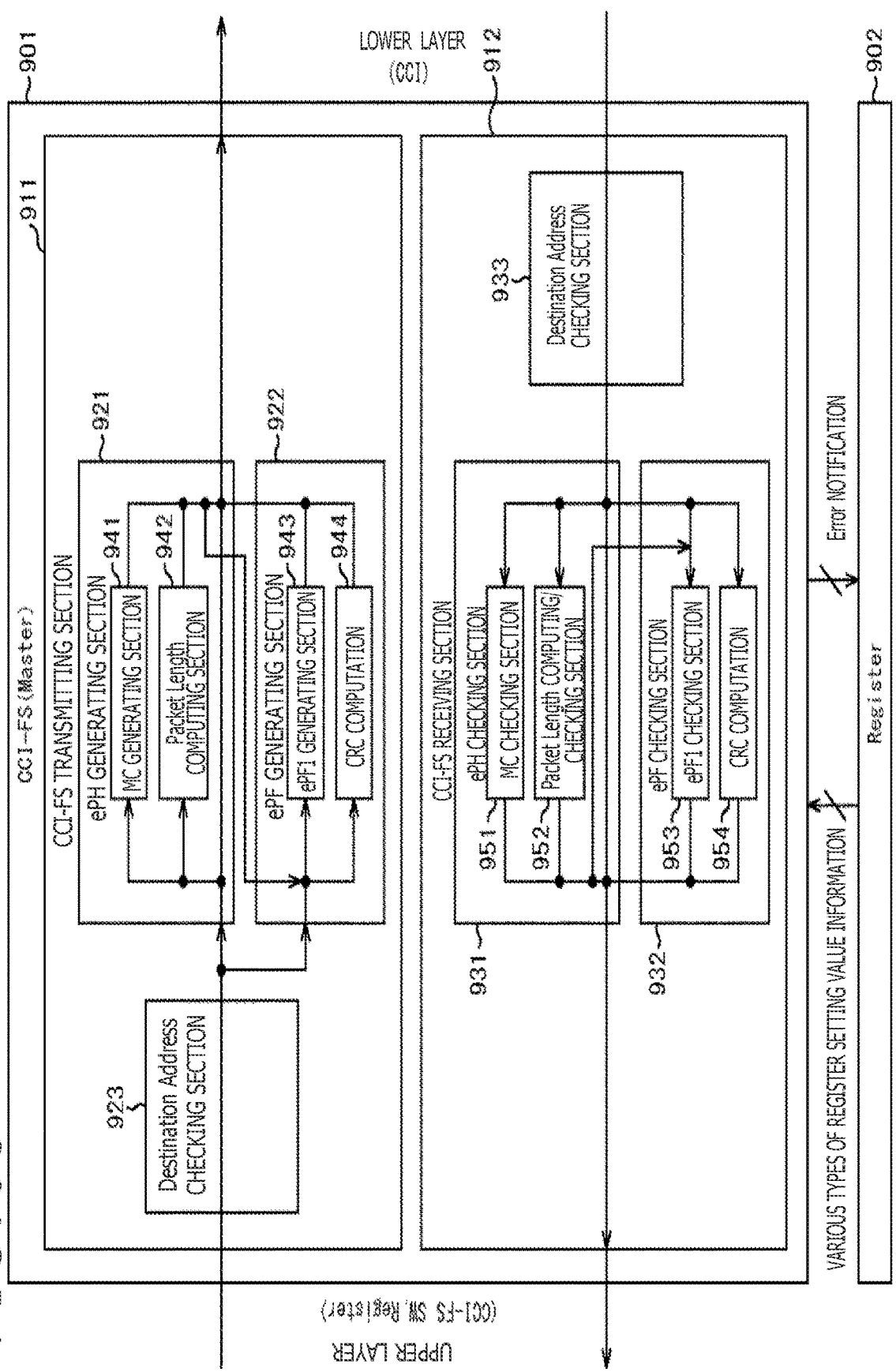
F I G. 6 5

F I G. 6 6

| Addr | bit assign | Initial Value | Setting Data | Attribute | Detail | Remarks |
|---|---|---|---|---|---|---|
| 0x000 | [0] | 1'b1 | CCI-FS Capability Register | RO | 1'b0: WITHOUT CCI-FS FUNCTIONALITY<br>1'b1: WITH CCI-FS FUNCTIONALITY | |
| 0x001 | [7:0] | 8'h00 | CCI-FS Version | RO | Ver 1.0 | |
| 0x002 | [0] | 1'b0 | CCI-FS Enable | RW | CCI-FS FUNCTIONALITY ON/OFF SWITCHING | - CAN BE USED BY SWITCHING IN A-PHY DIRECT-LINK CONFIGURATION<br>- SHOULD BE SET TO 1'b1 IN ADVANCE WHEN USED IN A-PHY SerDes CONFIGURATION |
| 0x010 | [7:0] | 8'h00 | eVC | RW | ePH0 INFORMATION | |
| 0x011 | [7:0] | 8'h00 | eDT | RW | | |
| 0x012 | [1:0] | 2'b0 | ePFEN | RW | | |
| 0x013 | [7:0] | 8'h00 | ePHEM | RW | | |
| 0x020 | [7:1] | 7'h00 | Source ID | RO | ePH1 INFORMATION | REPRESENTS ID OF Device ITSELF<br>- AT TIME OF RO: UNIQUE VALUE IS REGISTERED AT TIME OF IMPLEMENTATION<br>- AT TIME OF RW: REGARDED AS BEING ADDRESSED TO ITSELF WHEN SET TO 7'h0. SETTING AT AP, Image Sensor PERFORMS SETTING FROM AP SIDE. |
| 0x030 | [0] | 1'b0 | Read/Write Source | RW | ePH1 INFORMATION | Reserved |
| 0x030 | [7:1] | 7'h00 | Destination ID | RW | ePH3 INFORMATION | |
| 0x031 | [0] | 1'b0 | Read/Write Dest | RW | ePH3 INFORMATION | |
| 0x032 | [7:0] | 8'h00 | Destination Address[7:0] | RW | ePH3 INFORMATION | |
| 0x033 | [7:0] | 8'h00 | Destination Address[15:8] | RW | ePH3 INFORMATION | |
| 0x034 | [7:0] | 8'h00 | payload Length[7:0] | RW | ePH3 INFORMATION | |
| 0x035 | [15:8] | 8'h00 | payload Length[15:8] | RW | ePH4 INFORMATION | (BASICALLY, RESTRICTIONS WITHIN RANGE OF Payload OF A-PHY ARE PROVIDED) |
| 0x102 | [7:0] | 8'h00 | Read Data Length[7:0] | RW | | |
| 0x103 | [7:0] | 8'h00 | Read Data Length[15:8] | RW | | |
| 0x104 | [0] | 1'b0 | CMD Exec | RW | AFTER COMPLETION OF EXECUTION, AUTOMATICALLY CLEARED | 1'b1: Read not Ready<br>1'b0: Read ready |
| 0x105 | [0] | 1'b0 | Read CMD Status | RO | | 1'b1: Read Ready<br>1'b0: Read not ready |
| 0x106 | [7:0] | 8'h00 | Read Data[7:0] | RO | | EXTENDABLE CONFIGURATION |
| 0x107 | [7:0] | 8'h00 | Read Data[15:8] | RO | | EXTENDABLE CONFIGURATION |
| 0x108 | [7:0] | 8'h00 | Read Data[23:16] | RO | | EXTENDABLE CONFIGURATION |
| 0x109 | [7:0] | 8'h00 | Read Data[31:24] | RO | | EXTENDABLE CONFIGURATION |

F I G. 67

| Addr | bit assign | initial Value | Setting Data Attribute | Detail | | Remarks |
|---|---|---|---|---|---|---|
| AT TIME OF Bridge CONFIGURATION: (MAY BE REGISTER CONFIGURATION Compatible WITH CONVENTIONAL CCI BY SERDES CONFIGURATION, ETC.) | | | | | | |
| 0x110 | [7:1] | 7'h0 | Destination SID (CONNECTION DESTINATION) | | R/W | #1 LOWER DEVICE -> FOR ONE WITHOUT Destination REGISTRATION, DISCARD, ERROR DETECTION (n.b. NOT USED IN CASE OF End DEVICE, BECAUSE Source_ID IS REDIRECTED AND TRANSFERRED) |
| | [0] | 1'h0 | Read/Write | | | 1=Write IS DISABLED AT TIME WHEN CCI-FS IS Enabled |
| 0x111 | [7:0] | 8'h0 | Address Register[15:8] (CONNECTION DESTINATION) | P2P CONNECTION INFORMATION | R/W | |
| 0x112 | [7:0] | 8'h0 | Address Register[7:0] (CONNECTION DESTINATION) | P2P CONNECTION INFORMATION | R/W | |
| 0x113 | [7:0] | 8'h0 | Attribution (CONNECTION DESTINATION) | P2P CONNECTION INFORMATION | R/W | 0: I2C<br>1: I3C<br>2: A-PHY<br>OTHERS: Reserved |
| 0x114 | [7:0] | 8'h0 | Timeout_No1[15:8] | | R/W | TIME SETTING OF ACCESS TIMER-OUT |
| 0x115 | [7:0] | 8'h10 | Timeout_No1[7:0] | | R/W | ↑ |
| 0x120 | [7:1] | 8'h0 | Destination ID (CONNECTION DESTINATION) | P2P CONNECTION INFORMATION | R/W | #2 LOWER DEVICE |
| | [0] | 1'h0 | Read/Write | | | |
| 0x121 | [7:0] | 8'h0 | Address Register[15:8] (CONNECTION DESTINATION) | P2P CONNECTION INFORMATION | R/W | |
| 0x122 | [7:0] | 8'h0 | Address Register[7:0] (CONNECTION DESTINATION) | P2P CONNECTION INFORMATION | R/W | |
| 0x123 | [7:0] | 8'h0 | Attribution (CONNECTION DESTINATION) | P2P CONNECTION INFORMATION | R/W | 0: I2C<br>1: I3C<br>2: A-PHY<br>OTHERS: Reserved |
| 0x124 | [7:0] | 8'h00 | Timeout_No2[15:8] | | R/W | TIME SETTING OF ACCESS TIMER-OUT |
| 0x125 | [7:0] | 8'h10 | Timeout_No2[7:0] | | R/W | ↑ |
| | | | | | | #3 LOWER DEVICE ... |

F I G. 6 8

| Addr | bit assign | Initial Value | Setting Data | Attribute | Detail | Remarks |
|---|---|---|---|---|---|---|
| Error-RELATED REGISTER | | | | | | |
| 0x200 | [0] | 1'h0 | Error Register[0] (CRC) | RW1C | | |
| | [1] | 1'h0 | Error Register[1] (Security) | RW1C | | |
| | [2] | 1'h0 | Error Register[2] (Routing) | RW1C | | |
| | [3] | 1'h0 | Error Register[3] (Timeout) | RW1C | | WHEN Timeout CONFIGURATION IS INSERTED. (MAY BE USED IN COMBINATION OR OMITTED WHEN CHECKING IS PERFORMED BY Polling) |
| | [4] | 1'h0 | Error Register[4] (MC) | RW1C | | |
| | [5] | 1'h0 | T.B.D. | RW1C | | |
| Error-RELATED REGISTER (debug) | | | | | | |
| 0x300 | | | | RO | STORAGE OF ERROR HEADER-RELATED INFORMATION (first Error) | Footer IS ALSO INSERTED (ONLY ePH, ePF, AND Payload MAY BE OMITTED) VALUE IS INITIALIZED AT TIME OF 1-Write CLEAR OF Error Register |
| 0x400 | | | | RO | STORAGE OF ERROR HEADER-RELATED INFORMATION (Last Error) | Footer IS ALSO INSERTED (ONLY ePH, ePF, AND Payload MAY BE OMITTED) VALUE IS INITIALIZED AT TIME OF 1-Write CLEAR OF Error Register |
| Error-Injection-RELATED REGISTER (debug) | | | | | | |
| 0x800 | | | Error Injection Enable [0] (ePH0:3) | RW | Enable Error INJECTION TO ePH0 | |
| | | | Error Injection Enable [0] (ePH0:2) | RW | | |
| | | | Error Injection Enable [0] (ePH0:1) | RW | | |
| | | | Error Injection Enable [0] (ePH0:0) | RW | | |

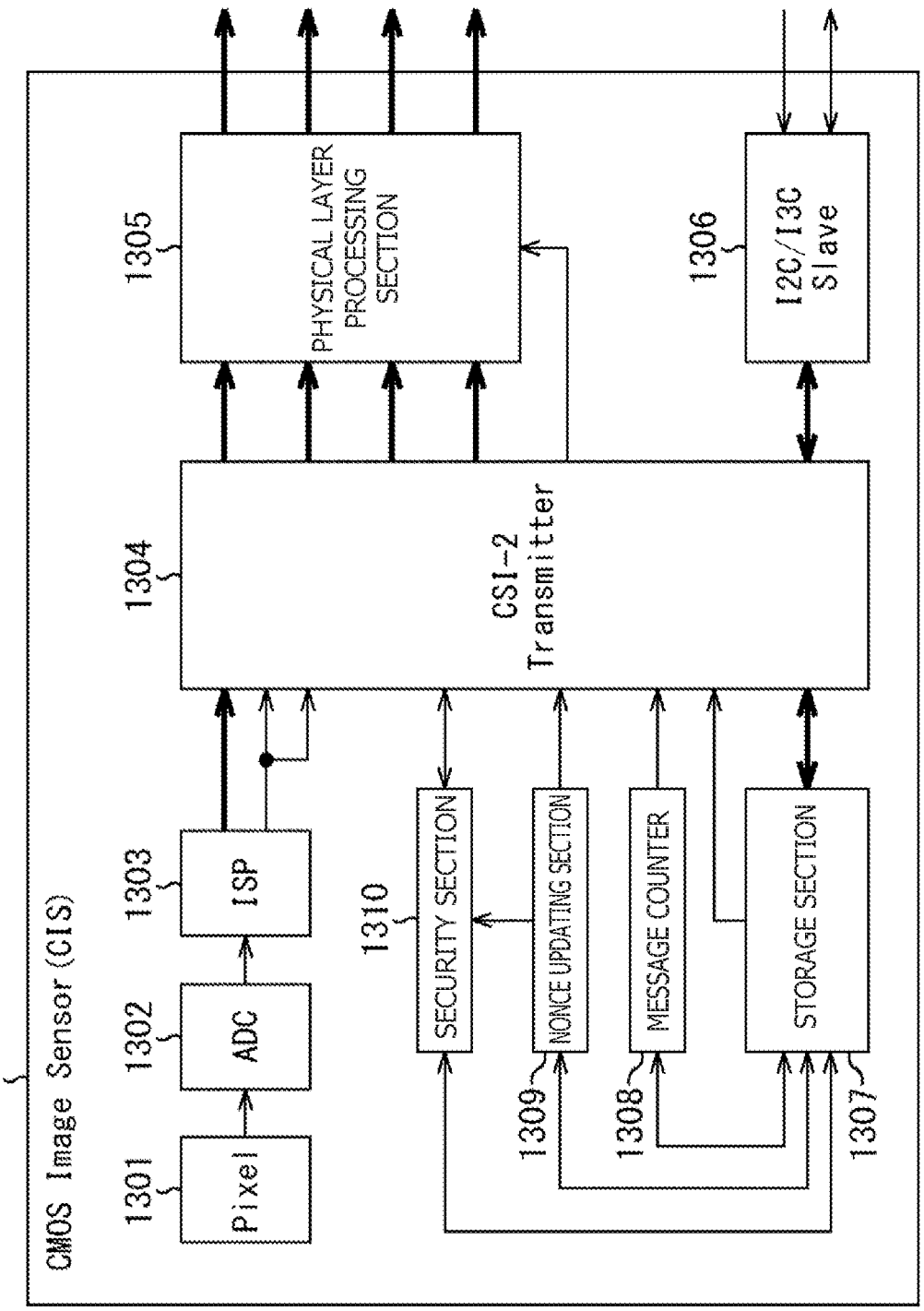
F I G. 7 6

F I G . 8 4
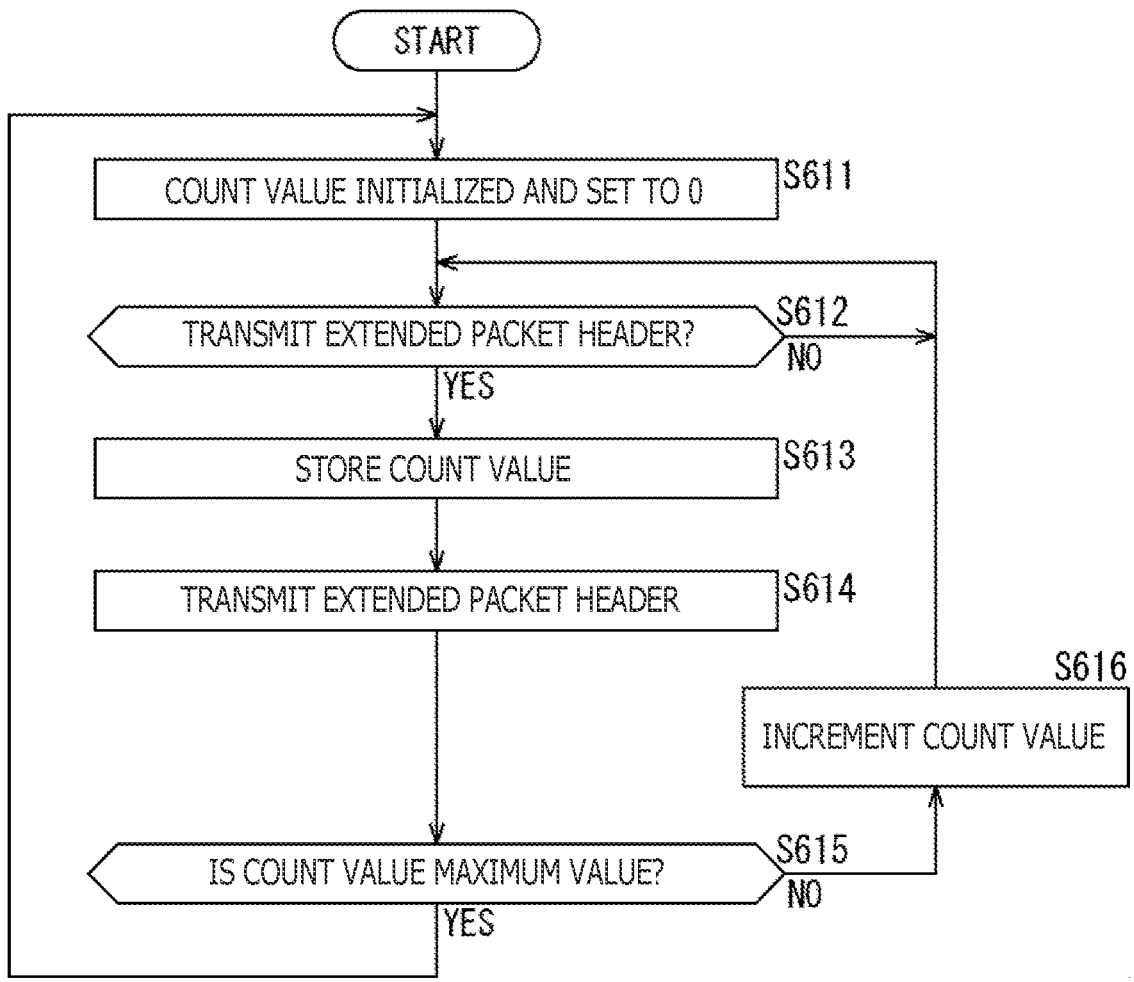

A

B

| Embedded Data Format Code | Description |
|---|---|
| 0x00 | - |
| 0x07 | - |
| 0x0A | - |
| 0x0B | - |
| 0x0C | - |
| 0x0D | - |
| 0x0E-0x1F | Reserved for future use |
| 0x20-0x2F | Vendor specific |
| 0x30-0xFE | Reserved for future use |
| 0xFF | - |

FIG. 107

96 bits Initialization Vector (IV) example for AES-GCM/GMAC

| eVC 6 bits | Source ID 16 bits | Final destination ID 16 bits | Additional frame number 24 bits | Frame number 16 bits | Message counter 16 bits |

2 bits

FIG.111

| Security MAC | Description |
|---|---|
| 0x00 | Reserved for future use |
| 0x01 | Line-MAC |
| 0x02 | Frame-MAC |
| 0x03 | Reserved for future use |

| MESSAGE COUNTER | ROLLOVER CYCLES AT 60 fps/ WITH PIXEL 2160 LINES |
|---|---|
| 16+16 bits | $2^{32} \div 60 \div 2163 \fallingdotseq 9$ HOURS |
| 20+16 bits | $2^{36} \div 60 \div 2163 \fallingdotseq 6$ DAYS |
| 24+16 bits | $2^{40} \div 60 \div 2163 \fallingdotseq 98$ DAYS |
| 28+16 bits | $2^{44} \div 60 \div 2163 \fallingdotseq 4$ YEARS |
| 32+16 bits | $2^{48} \div 60 \div 2163 \fallingdotseq 69$ YEARS |

B

| FRAME COUNTER | ROLLOVER CYCLES AT 60 fps/ WITH INCREMENTS BY 1 |
|---|---|
| 4+16 bits | $(2^{20}-1) \div 60 \fallingdotseq 5$ HOURS |
| 8+16 bits | $(2^{24}-1) \div 60 \fallingdotseq 78$ HOURS |
| 12+16 bits | $(2^{28}-1) \div 60 \fallingdotseq 52$ DAYS |
| 16+16 bits | $(2^{32}-1) \div 60 \fallingdotseq 828$ DAYS |
| 20+16 bits | $(2^{36}-1) \div 60 \fallingdotseq 36$ YEARS |
| 24+16 bits | $(2^{40}-1) \div 60 \fallingdotseq 581$ YEARS |

FIG. 113

| | | | | |
|---|---|---|---|---|
| A | Salt 32 bits | Res 2 bits / eVC 6 bits | Additional message counter 40 bits | Message counter 16 bits |

| | | | | | |
|---|---|---|---|---|---|
| B | Salt 16 bits | Res 2 bits / eVC 6 bits | Source ID 16 bits | Final destination ID 16 bits | Additional frame number 24 bits | Frame number 16 bits |

| | | | | | |
|---|---|---|---|---|---|
| C | Salt 32 bits | Res 2 bits / eVC 6 bits | Session ID 8 bits | XDR Source ID & Final destination ID 16 bits | Additional message counter 16 bits | Message counter 16 bits |

| | | | | |
|---|---|---|---|---|
| D | eVC 6 bits / Res 2 bits | ReqSessionID 16 bits | RspSessionID 16 bits | Additional message counter 40 bits | Message counter 16 bits |

| | | | | | | |
|---|---|---|---|---|---|---|
| E | SPDM/HDCP | eVC 6 bits / Res 2 bits | eDT 8 bits | Session ID 8 bits | Source ID 16 bits | Final destination ID 16 bits | Additional message counter 24 bits | Message counter 16 bits |

FIG.116

| Security protocol | Description |
|---|---|
| 0x00 | Reserved for future use |
| 0x01 | SPDM |
| 0x02 | HDCP |
| 0x03 | Reserved for future use |

INFORMATION PROCESSING APPARATUS, MOBILE APPARATUS, AND COMMUNICATION SYSTEM

TECHNICAL FIELD

The present disclosure relates to an information processing apparatus, a mobile apparatus, and a communication system, and in particular relates to an information processing apparatus, a mobile apparatus, and a communication system that are configured to be capable of further enhancing safety.

BACKGROUND ART

There are two types of definition regarding CSI (Camera Serial Interface)-2 ver 4.0 that is currently being standardized, and those two types of definition are related to a packet structure that uses C-PHY as the physical layer and a packet structure that uses D-PHY as the physical layer.

In addition, in recent years, the CSI-2 standard is used not only for mobile equipment, but widely for various uses such as those for in-vehicle equipment or IoT (Internet of Things) equipment; as a result, existing packet structures are assumed to be unable to support those uses. In view of this, MIPI (Mobile Industry Processor Interface) Alliance is examining extended packets with extended packet structures of existing packet headers, packet footers, and the like, in order to make the packets capable of supporting diverse uses.

For example, the disclosure of PTL 1 proposes a communication system that uses extended packet headers, separately from conventional packet headers.

CITATION LIST

Patent Literature

[PTL 1]
PCT Patent Publication No. WO2020/129685

SUMMARY

Technical Problem

Meanwhile, a message count value for a functional safety use stored in an extended packet being examined as mentioned above can be repurposed as a nonce value for a security use. However, for example, applying a 16-bit message count value as a nonce value with no changes being made thereto is not suitable because roll-over of the nonce value for the same session key is prohibited as a counterattack measure. In view of this, there is a demand for a technology that makes it possible to use a nonce value specifically with more enhanced safety.

The present disclosure has been made in view of such a situation, and makes it possible to further enhance safety.

Solution to Problem

An information processing apparatus according to an aspect of the present disclosure includes a communication section that performs communication with a different information processing apparatus, and, when performing high-speed data transmission of data of a frame including image data, transmits an extended packet including an extended packet header and packet data to the different information processing apparatus, a first protecting section that derives a session key and generates first protected data of the packet data by using the session key, and a nonce updating section that updates a nonce value for the session key every time the first protected data is generated, in which the image data is stored in the packet data, the high-speed data transmission includes transmission of part or a whole of the nonce value, and the part or the whole of the nonce value is stored outside the extended packet header and transmitted.

A mobile apparatus according to an aspect of the present disclosure includes an information processing apparatus including a pixel that outputs image data a communication section that performs communication with a different information processing apparatus, and, when performing high-speed data transmission of data of a frame including the image data, transmits an extended packet including an extended packet header and packet data to the different information processing apparatus, a first protecting section that derives a session key and generates first protected data of the packet data by using the session key, and a nonce updating section that updates a nonce value for the session key every time the first protected data is generated, in which the image data is stored an the packet data, the high-speed data transmission includes transmission of part or a whole of the nonce value, and the part or the whole of the nonce value is stored outside the extended packet header and transmitted.

A communication system according to an aspect of the present disclosure includes an information processing apparatus including a communication section that performs communication with a different information processing apparatus, and, when performing high-speed data transmission of data of a frame including image data, transmits an extended packet including an extended packet header and packet data to the different information processing apparatus, a first protecting section that derives a session key and generates first protected data of the packet data by using the session key, and a nonce updating section that updates a nonce value for the session key every time the first protected data is generated, in which the image data is stored in the packet data, the high-speed data transmission includes transmission of part or a whole of the nonce value, and the part or the whole of the nonce value is stored outside the extended packet header and transmitted.

In an aspect of the present disclosure, communication is performed with a different information processing apparatus, when performing high-speed data transmission of data of a frame including image data, an extended packet including an extended packet header and packet data is transmitted to the different information processing apparatus, a session key is derived, first protected data of the packet data is generated with use of the session key, and a nonce value for the session key is updated every time the first protected data is generated. Further, the image data is stored in the packet data, the high-speed data transmission includes transmission of part or a whole of the nonce value, and the part or the whole of the nonce value is stored outside the extended packet header and transmitted.

BRIEF DESCRIPTION OF DRAWINGS

FIG. 3 is a figure depicting a first structure example of an overall packet structure of a D-PHY extended packet.

FIG. 4 is a figure depicting a first structure example of a packet structure of a D-PHY extended short packet.

FIG. 21 is a figure depicting a structure example of a C-PHY extended packet to cope with a packet-modification prohibition rule.

FIG. 22 is a figure depicting a structure example of a C-PHY extended packet to cope with the packet-modification prohibition rule.

FIG. 24 is a flowchart for explaining a packet transmission/reception process adapted to the packet-modification prohibition rule.

FIG. 25 is a block diagram depicting a configuration example of an image sensor adapted to the packet-modification prohibition rule.

FIG. 26 is a block diagram depicting a configuration example of an application processor adapted to the packet-modification prohibition rule.

FIG. 28 is a figure depicting an example of a packet configuration of a read command generated on an application-processor side.

FIG. 33 is a figure depicting an example of a packet configuration of write data generated on the application-processor side.

FIG. 42 is a figure depicting an example of a packet configuration of a read command output in I2C/I3C.

FIG. 54 is a flowchart for explaining a Sequence A_Read_CMD (at a time of AP) process.

FIG. 55 is a flowchart for explaining a Sequence C (at a time of AP) process.

FIG. 58 is a figure depicting details of an extended packet header ePH0, an extended packet header ePH1, and an extended packet header ePH2.

FIG. 59 is a figure depicting details of an extended packet header ePH3.

FIG. 60 is a figure depicting details of an extended DT of an extended packet header ePH.

FIG. 61 is a block diagram depicting a configuration example in conventional I2C hardware.

FIG. 63 is a block diagram depicting a CCI-related configuration example of a communication system with A-PHY direct-link configuration.

FIG. 65 is a block diagram depicting an example of circuit configuration of a CCI-FS processing section.

FIG. 66 is a figure depicting a register configuration example.

FIG. 67 is a figure depicting a register configuration example at a time of Bridge configuration.

FIG. 68 is a figure depicting a register configuration example of an Error-related register.

FIG. 76 is a block diagram depicting a detailed configuration example of an image sensor.

FIG. 84 is a flowchart for explaining a message count value transmission process.

FIG. 107 is a figure depicting an example of an initialization vector.

FIG. 111 is a figure depicting an example of security MAC information.

FIG. 112 illustrates figures depicting examples of rollover cycles of a message count value and a frame count value.

FIG. 113 illustrates figures for explaining a configuration of an initialization vector.

FIG. 116 is a figure depicting an example of a security protocol.

DESCRIPTION OF EMBODIMENTS

Specific embodiments to which the present technology is applied are explained in detail below with reference to the figures.

Configuration Example of Communication System

Figure 1:
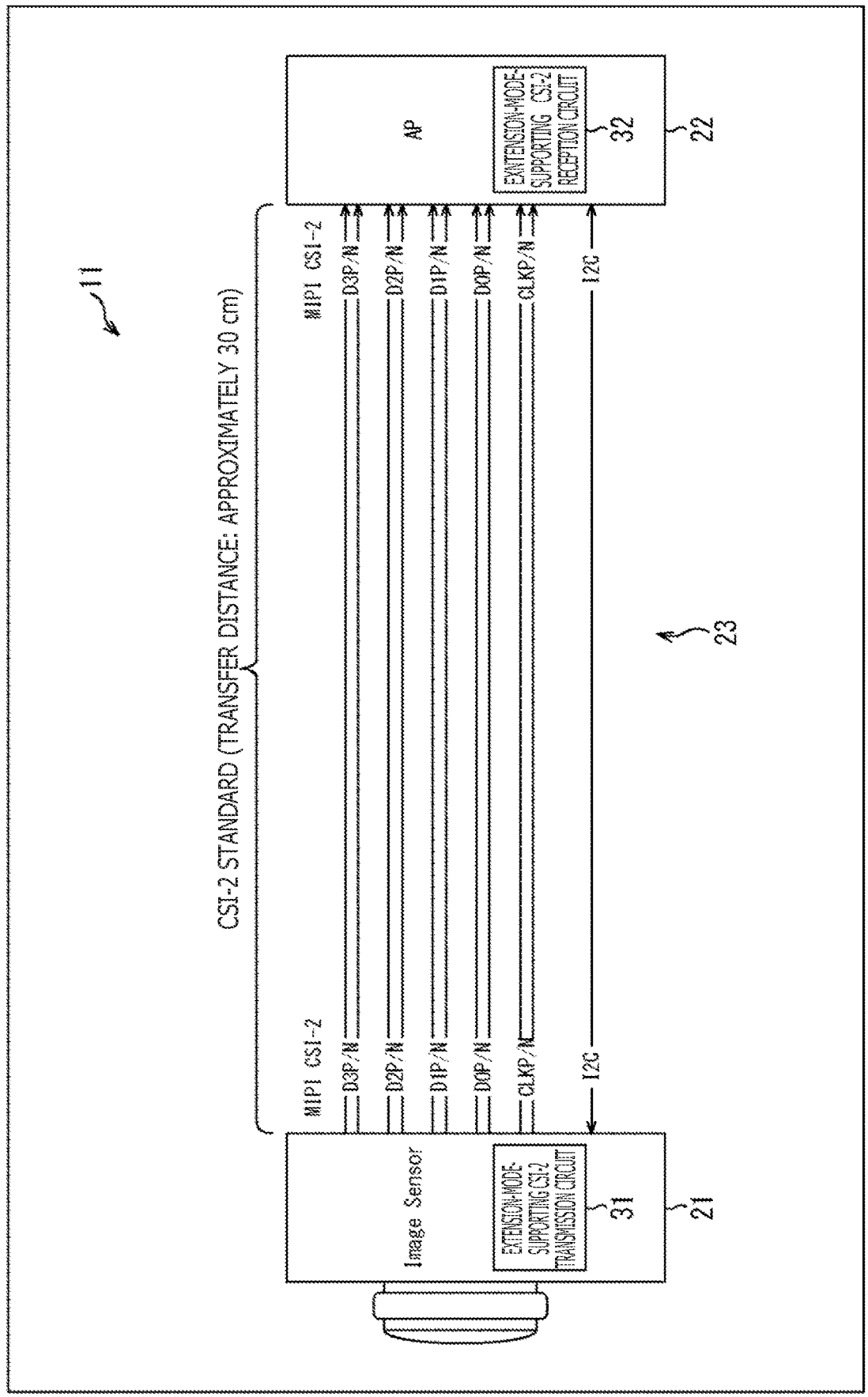
FIG. 1 is a block diagram depicting a configuration example of a communication system according to a first embodiment to which the present technology is applied.

FIG. 1 is a block diagram depicting a configuration example of a communication system according to a first embodiment to which the present technology is applied.

As depicted in FIG. 1, a communication system 11 includes an image sensor 21 and an application processor 22 that are connected via a bus 23. For example, the communication system 11 is used for CSI-2 connection inside existing mobile equipment such as what is generally called a smartphone.

For example, the image sensor 21 includes an extension-mode-supporting CSI-2 transmission circuit 31 incorporated therein along with a lens and an image capturing element (both of which are not depicted) and the like. For example, by using the extension-mode-supporting CSI-2 transmission circuit 31, the image sensor 21 transmits, to the application processor 22, image data of an image acquired by the image capturing element performing image-capturing.

The application processor 22 includes an extension-mode-supporting CSI-2 reception circuit 32 incorporated therein along with LSI (Large Scale Integration) that performs processes according to various types of applications executed by the mobile equipment including the communication system 11. For example, by using the extension-mode-supporting CSI-2 reception circuit 32, the application processor 22 can receive image data transmitted from the image sensor 21, and perform a process according to an application on the image data by using the LSI.

The bus 23 is a communication path for transferring signals compliant with the CSI-2 standard, and, for example, the transfer distance over which the bus 23 can transfer signals is approximately 30 cm. In addition, as depicted in the figure, the bus 23 connects the image sensor 21 and the application processor 22 by using multiple signal lines (I2C, CLKP/N, D0P/N, D1P/N, D2P/N, D3P/N).

The extension-mode-supporting CSI-2 transmission circuit 31 and the extension-mode-supporting CSI-2 reception circuit 32 support communication in an extension mode of the CSI-2 standard, and can transmit and receive signals to and from each other. Note that detailed configurations of the extension-mode-supporting CSI-2 transmission circuit 31 and the extension-mode-supporting CSI-2 reception circuit 32 are described later with reference to FIGS. 9 and 10.

Figure 2:
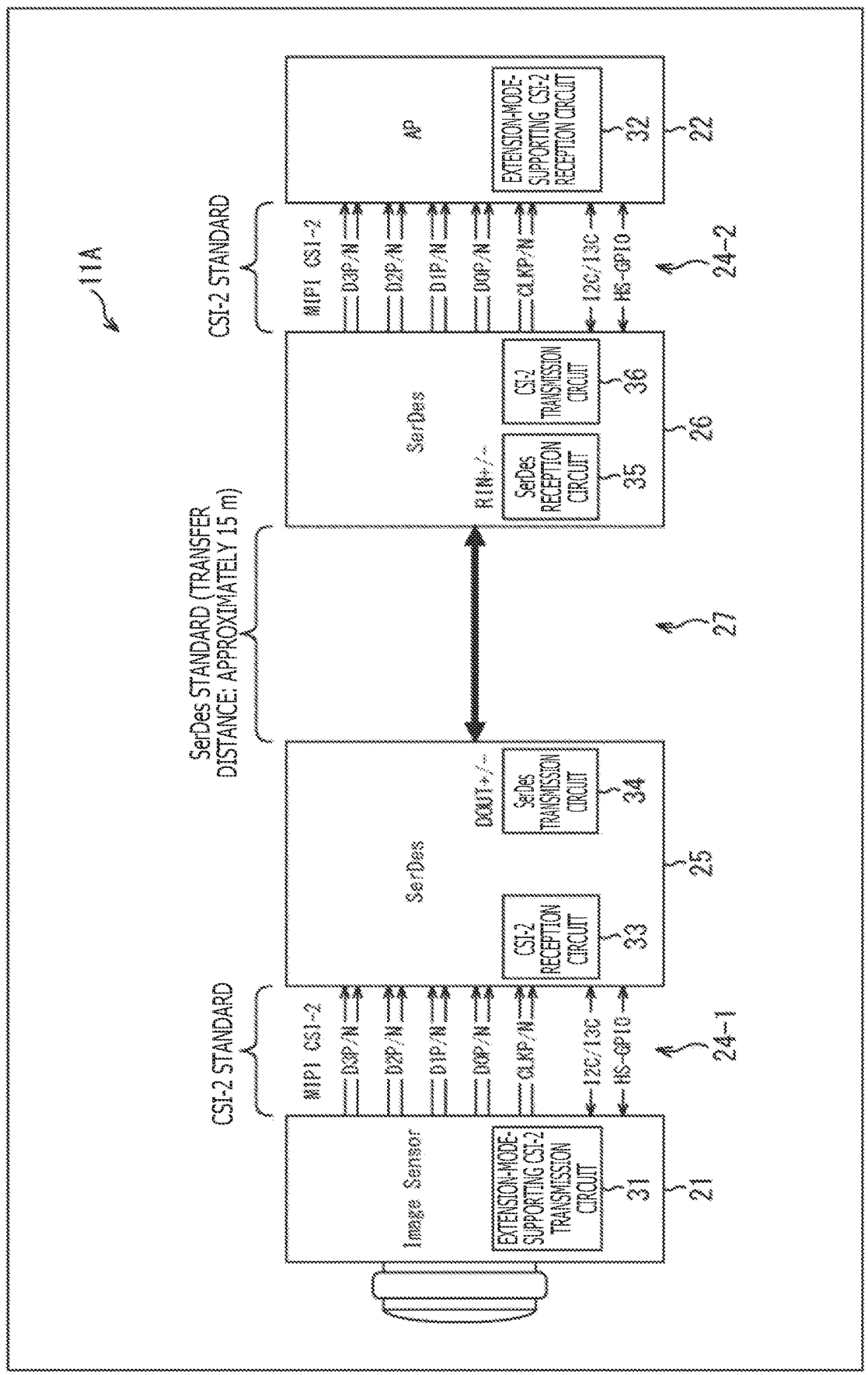
FIG. 2 is a block diagram depicting a configuration example of according to a first embodiment a communication system according to a second embodiment to which the present technology is applied.

FIG. 2 is a block diagram depicting a configuration example of a communication system according to a second embodiment to which the present technology is applied.

As depicted in FIG. 2, a communication system 11A includes the image sensor 21 and a SerDes apparatus 25 that are connected via a bus 24-1, and also the application processor 22 and a SerDes apparatus 26 that are connected via a bus 24-2. The SerDes apparatus 25 and the SerDes apparatus 26 are connected via a bus 27. For example, the communication system 11A is used for connection in an existing in-vehicle camera.

Here, the image sensor 21 and the application processor 22 are configured similarly to the image sensor 21 and the application processor 22 in FIG. 1, and detailed explanations thereof are omitted.

Similarly to the bus 23 in FIG. 1, the buses 24-1 and 24-2 are communication paths for transferring signals compliant with the CSI-2 standard, and include multiple signal lines (HS-GPIO, I2C/I3C, CLKP/N, D0P/N, D1P/N, D2P/N, D3P/N) as depicted in the figure.

The SerDes apparatus 25 includes a CSI-2 reception circuit 33 and a SerDes (Serializer Deserializer) transmission circuit 34. For example, by the CSI-2 reception circuit 33 performing communication compliant with the typical CSI-2 standard with the extension-mode-supporting CSI-2 transmission circuit 31, the SerDes apparatus 25 acquires a bit parallel signal transmitted from the image sensor 21. Then, the SerDes apparatus 25 converts the acquired signal into a bit serial signal, and transmits the signal to the SerDes apparatus 26 by the SerDes transmission circuit 34 performing communication through one lane with a SerDes reception circuit 35.

The SerDes apparatus 26 includes the SerDes reception circuit 35 and a CSI-2 transmission circuit 36. For example, the SerDes apparatus 26 acquires a bit serial signal transmitted by the SerDes reception circuit 35 performing communication through one lane with the SerDes transmission circuit 34. Then, the SerDes apparatus 26 converts the acquired signal into a bit parallel signal, and transmits the bit parallel signal to the application processor 22 by the CSI-2 transmission circuit 36 performing communication compliant with the typical CSI-2 standard with the extension-mode-supporting CSI-2 reception circuit 32.

The bus 27 is a communication path for transferring signals compliant with a standard such as A-PHY or FPD (Flat Panel Display)-LINK III, and, for example, the transfer distance over which the bus 27 can transfer signals is as long as approximately 15 m.

These physical layer interfaces that are capable of long-distance transfer make it possible for the automobile industry to use advanced driver-assistance systems (ADAS), automated driving systems (ADS), and other surrounding sensor applications including cameras and in-vehicle infotainment (IVI) displays. MIPI A-PHY has an asymmetric data link layer (asymmetric upper layer) having a point-to-point topology, enables sharing of the same physical wire among high speed data transfer, control data, and electric power, functions as an end-to-end system infrastructure designed to simplify integration of cameras, sensors, and displays, and also simultaneously enables incorporation of functional safety and security.

By using the extension-mode-supporting CSI-2 transmission circuit 31 and the extension-mode-supporting CSI-2 reception circuit 32, the thus-configured communication systems 11 and 11A can transmit and receive data in packets with extended packet structures as described later. As a result, more diverse uses, for example, RAW24, SmartROI (Region of Interest), GLD (Graceful Link Degradation), and the like described later can be supported.

First Structure Example of Packet Structure

First structure examples of packet structures of packets used for communication between the extension-mode-supporting CSI-2 transmission circuit 31 and the extension-mode-supporting CSI-2 reception circuit 32 are explained with reference to FIG. 3 to FIG. 8.

FIG. 3 depicts an overall packet structure of a packet used in a CSI-2 extension mode in a case where a physical layer is D-PHY (hereinafter, referred to as a D-PHY extended packet).

As depicted in FIG. 3, the D-PHY extended packet has a packet structure having a packet header and a packet footer that are the same as those in the existing CSI-2 standard. For example, the packet header stores a VC (VirtualChannel) representing the number of lines of virtual channels; a data type (DataType) representing a data type; a WC (Word Count) representing the data length of a payload; and a VCX/ECC. In addition, the packet footer stores a CRC (Cyclic Redundancy Check).

Here, in the existing CSI-2 standard, as the data type to be transmitted in the packet header, 0x38 to 0x3F are defined as reserve. In view of this, in the D-PHY extended packet, the data type defined as reserve in the existing standard is used to newly define setting information for identifying an extension mode on the receiver side.

For example, definitions of the data type are
DataType[5:3]=extension mode in a case of 3'b111
DataType[2]=Reserve (RES: reserved for future extension)
DataType[1:0]=extension mode type (four extension modes are prepared)

That is, in 0x38 to 0x3F as the data type defined as reserve in the existing CSI-2 standard, for example, DataType[5:3] is defined as extension mode setting information, and DataType[1:0] is defined as extension type setting information. The extension mode setting information represents whether or not the mode is an extension mode, and, for example, in a case where DataType[5:3] is 3'b111, this represents that the mode is an extension mode. In addition, when four types, i.e., an extension mode 0, an extension mode 1, an extension mode 2, and an extension mode 3, are prepared as types of extension mode, the extension type setting information represents which one in those types the mode is. For example, in a case where DataType[1:0] is 2'b00, this represents that the type of the extension mode is the extension mode 0.

Then, in the extension mode 0 (DataType[1:0]=2'b00), for example, a packet structure in which a payload is separated into four is defined. That is, as depicted in FIG. 3, the payload in the extension mode 0 is separated into an extended packet header (ePH: extended Packet Header), an optional extended packet header (OePH: Optional extended Packet Header), a legacy payload (Legacy Payload), and an optional extended packet footer (OePF: Optional extended Packet Footer). Note that the extended packet header may be transmitted repeatedly.

The extended packet header is arranged at the beginning which corresponds to a payload in the existing CSI-2 standard, and needs to be transmitted without fail in the extension mode. For example, as depicted in the figure, the extended packet header includes such setting information as an SROI identification flag, an extended VC (VirtualChannel), an extended DataType, an OePH selection flag, or an OePF selection flag. Here, by the extended VC, a VC which has been represented by four bits in the existing CSI-2 standard is extended to eight bits, and by the extended DataType, DataType which has been represented by four bits in the existing CSI-2 standard is extended to eight bits.

For example, a VC of an existing packet header is already present in four bits in a D-PHY packet, and by the extended VC of the extended packet header being defined as being represented by four bits, it can be represented by eight bits in total. Specifically, it can be defined as OePH[7:0]={5'h00, RSID, XY_POS, MC}, and OePF[3:0]={3'h0, pCRC}, and ON/OFF of packet transmission necessary for respective uses can be controlled.

The optional extended packet header and the optional extended packet footer are transferred selectively depending on uses.

The legacy payload corresponds to the same payload in the existing CSI-2 standard.

Setting the extended packet header, the optional extended packet header, and the optional extended packet footer as necessary in such a manner makes it possible to transmit data corresponding to various uses. In addition, data transferred in the extended packet header, the optional extended packet header and the optional extended packet footer is a 26-bit+6-bit ECC (Error Correction Code). Thus, it is possible to reduce an increase of the circuit scale by repurposing a circuit for an existing packet header, and to seek enhancement of the error tolerance.

Figure 5:
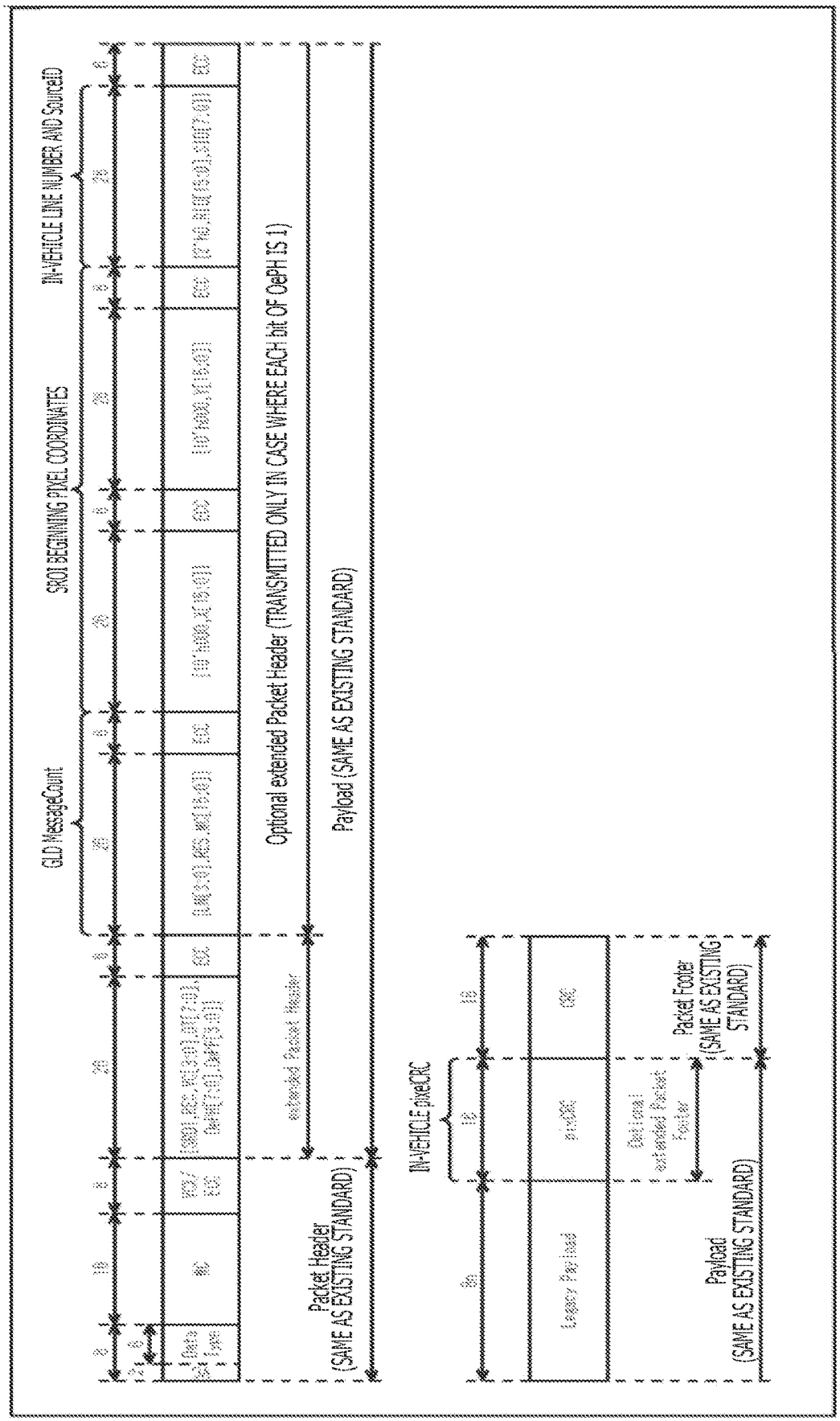
FIG. 5 is a figure depicting a first structure example of a packet structure of a D-PHY extended long packet.

As a specific application example of such a D-PHY extended packet, FIG. 4 depicts a packet structure of a short packet used in the CSI-2 extension mode in a case where the physical layer is D-PHY (hereinafter, referred to as a D-PHY extended short packet). Similarly, FIG. 5 depicts a packet structure of a long packet used in the CSI-2 extension mode in a case where the physical layer is D-PHY (hereinafter, referred to as a D-PHY extended long packet).

Extension type setting information of a data type stored in the packet header in a D-PHY extended short packet as the one depicted in FIG. 4 represents that the type of the extension mode is the extension mode 0 (DT[5:0]=0x1C (5'b111_0_0)). In addition, short packet setting information of a data type stored in the extended packet header represents that the packet is a short packet (DT[7:0]=0x00 (Frame Start Code (Short Packet))).

In a case where the mode is the extension mode and the data type stored in the extended packet header is DT[7:0]=0x00 to 0x0F in such a manner, the packet is determined as an extended short packet, and data including Short Packet Data Field of the extended short packet is transferred without fail in the optional extended packet header. This Short Packet Data Field is the same as the one defined in the existing CSI-2 standard.

Note that at a time of transmission of the extended short packet, an MC (GLD MessageCount) and an RSID (in-vehicle line number and SourceID) in the optional extended packet header are allowed to be transmitted, but a legacy payload and a pCRC are unnecessary and are hence prohibited from being transmitted. If they are transmitted by mistake, they are neglected on the receiver side.

Further, as compared with an extended short packet according to the existing CSI-2 standard, the extended short packet with a packet structure as the one depicted in FIG. 4 can have extended bit widths of a data type and a virtual channel, and can support various uses defined by the optional extended packet header. In addition, in a case where these functionalities are not necessary, an extended short packet according to the existing CSI-2 standard may be transmitted together with an extended long packet.

Extension type setting information of a data type stored in the packet header in a D-PHY extended long packet as the one depicted in FIG. 5 represents that the type of the extension mode is the extension mode 0 (DT[5:0]=0x1C (5'b111_0_0)). In addition, short packet setting information of a data type, stored in the extended packet header represents that the packet is not a short packet (DT[7:0] is not 0x00 to 0x0F (=extended LongPackt)). Accordingly, in the extended long packet, data including Short Packet Data Field is not transmitted.

In addition, in accordance with settings of the extended packet header, an optional extended packet header, a legacy payload, and an optional extended packet footer are stored in a payload in the existing CSI-2 standard and transferred. Because they are stored in the existing payload and transferred in such a manner, they are recognized by the existing SerDes transmission circuit 34 and SerDes reception circuit 35 (FIG. 2) similarly to the image data transferred in an existing payload, and are transferred to the downstream side with no changes being made thereto.

Further, the application processor 22, which is located at the most downstream portion, can determine that the mode is an extension mode from the data type DT[5:0] in the packet header. Accordingly, the application processor 22 can interpret the content of the payload in order from the extended packet header, and take out data of a desired extension mode.

Figure 6:
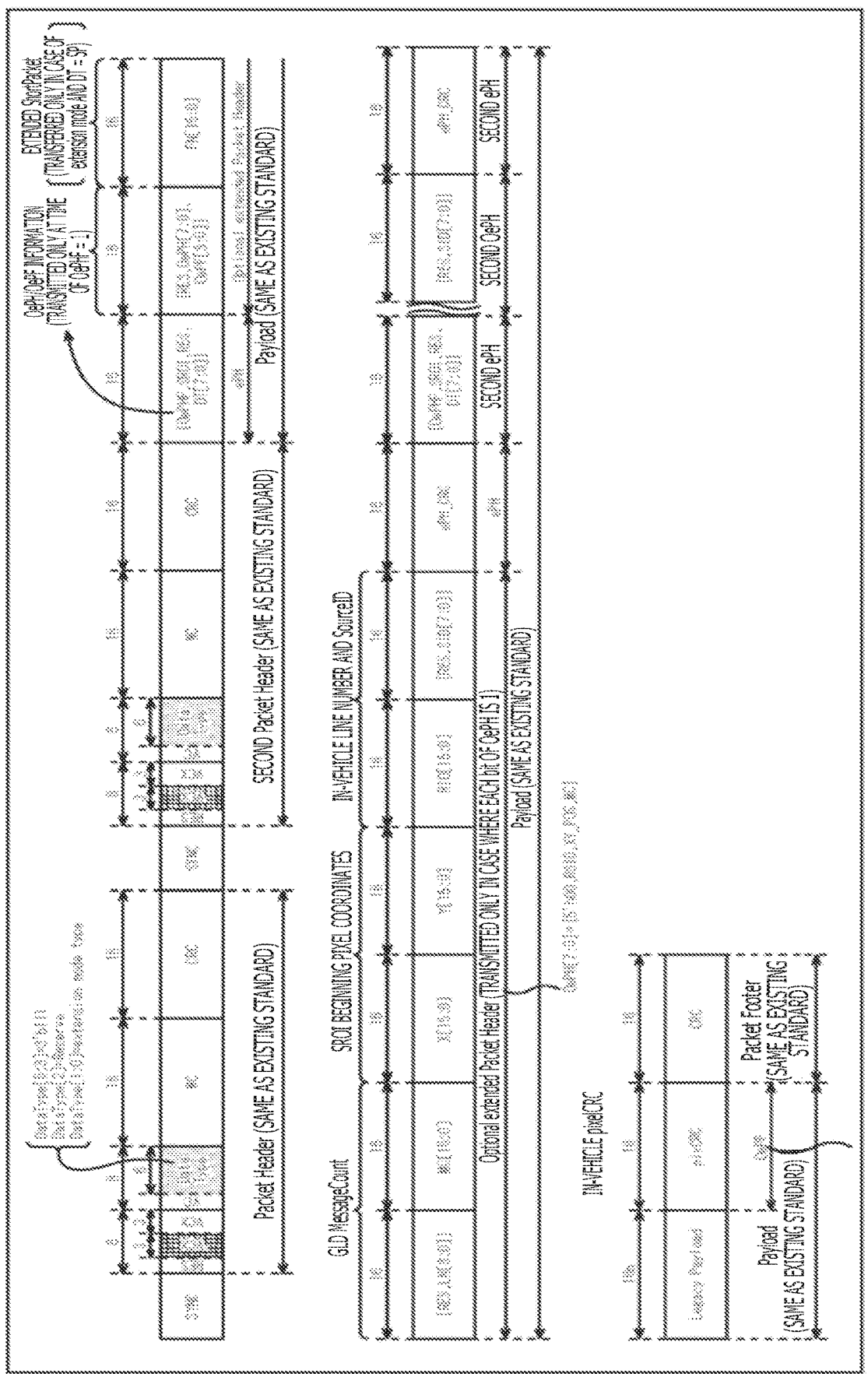
FIG. 6 is a figure depicting a first structure example of an overall packet structure of a C-PHY extended packet.

FIG. 6 depicts an overall packet structure of a packet used in a CSI-2 extension mode in a case where a physical layer is C-PHY (hereinafter, referred to as a C-PHY extended packet). Note that explanations of configurations in the C-PHY extended packet depicted in FIG. 6 that have counterparts in the D-PHY extended packet in FIG. 3 are omitted, and different configurations are explained.

For example, as in the D-PHY extended packet in FIG. 3, in the C-PHY extended packet, the mode is identified as an extension mode from the data type, and entire data according to each application executed by the application processor 22 is embedded in the payload and transferred.

As depicted in FIG. 6, the C-PHY extended packet transfers two packet headers similarly to the C-PHY packet according to the existing CSI-2 standard, and data is arranged in units of 16 bits for such a reason that C-PHY converts 16 bits into 7symbol. In addition, an extended packet header is arranged at the beginning of the payload, but, regarding virtual channels, the beginning of the existing packet header has been. Reserve for that reason in a case of C-PHY, so that a virtual channel is not stored in the extended packet header. Of course, as an the D-PHY extended packet, a virtual channel may be stored in the extended packet header.

In addition, bit counts of an optional extended packet header and an optional extended packet footer are large, so that a flag OePHF is prepared, and, in a case where the flag is 1, OePH/OePF information is transferred next. Further, following the ePH information and the OePH information, CRC is transferred as an extended packet header, and two packet headers that are configured in a similar manner are transferred repeatedly. In such a manner, adopting the same mechanism and structure by which two existing packet headers are transferred makes it possible to pursue both circuit reusability and error tolerance.

Figure 7:
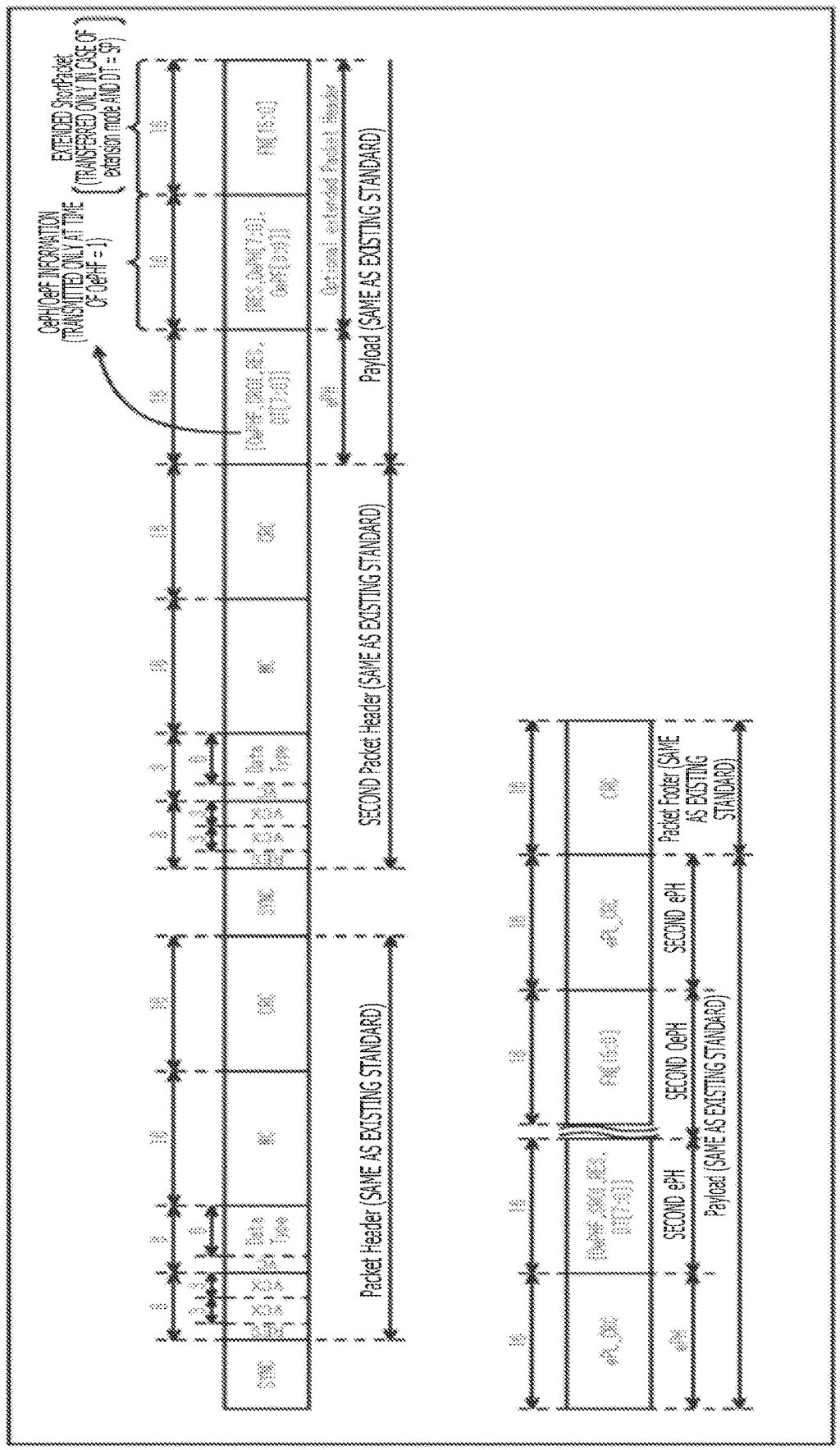
FIG. 7 is a figure depicting a first structure example of a packet structure of a C-PHY extended short packet.

As a specific application example of such a C-PHY extended packet, FIG. 7 depicts a packet structure of a short packet used in the CSI-2 extension mode in a case where the physical layer is C-PHY (hereinafter, referred to as a C-PHY extended short packet). Similarly, FIG. 8 depicts a packet structure of a long packet used in the CSI-2 extension mode in a case where the physical layer is C-PHY (hereinafter, referred to as a C-PHY extended long packet).

Figure 8:
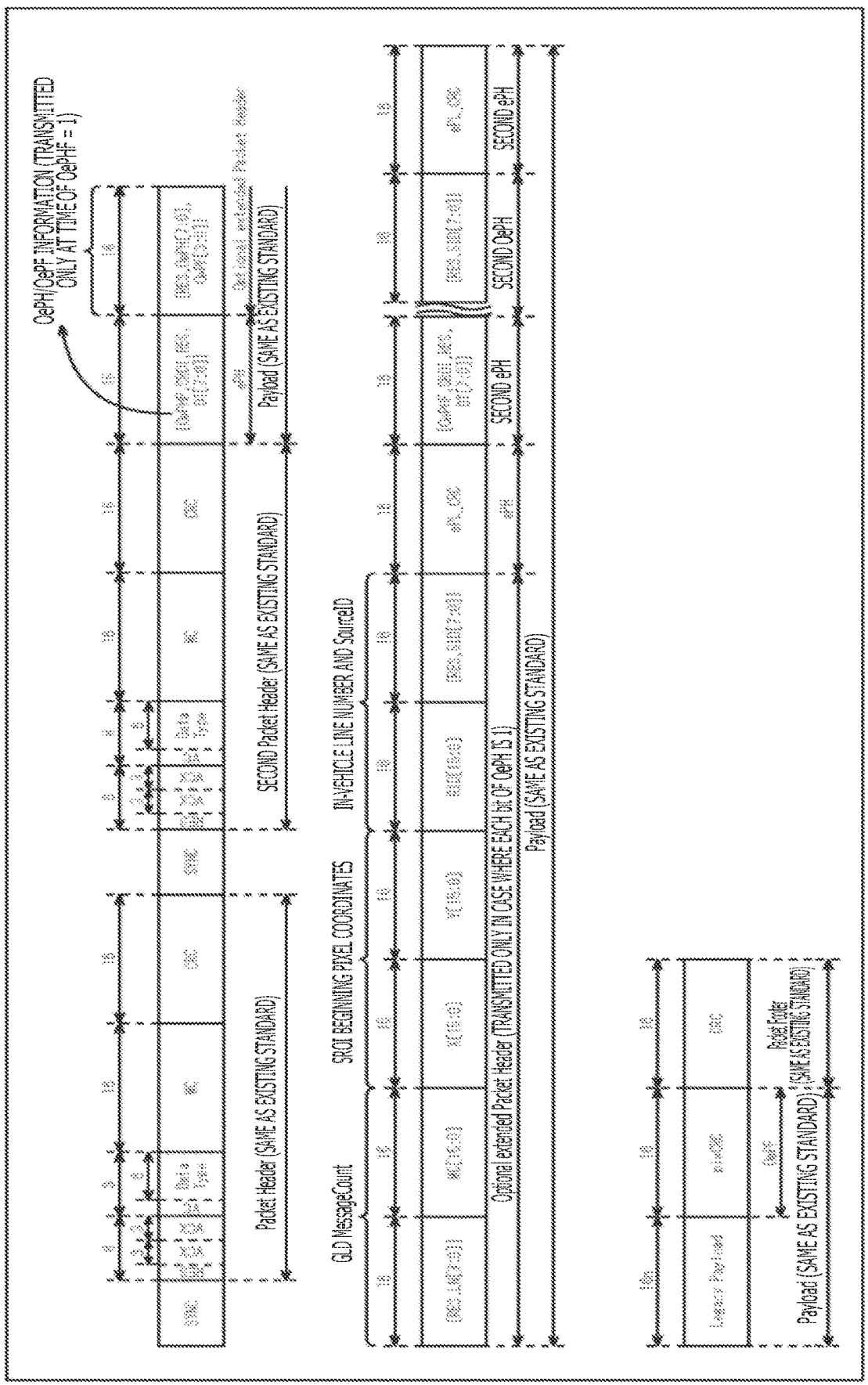
FIG. 8 is a figure depicting a first structure example of a packet structure of a C-PHY extended long packet.

Note that the C-PHY extended short packet depicted in FIG. 7 is not so different from the D-PHY extended short packet depicted in FIG. 4 in terms of packet structure and that the C-PHY extended long packet depicted in FIG. 8 is not so different from the D-PHY extended long packet depicted in FIG. 5 in terms of packet structure.

Configuration Example of Image Sensor and Application Processor

Figure 9:
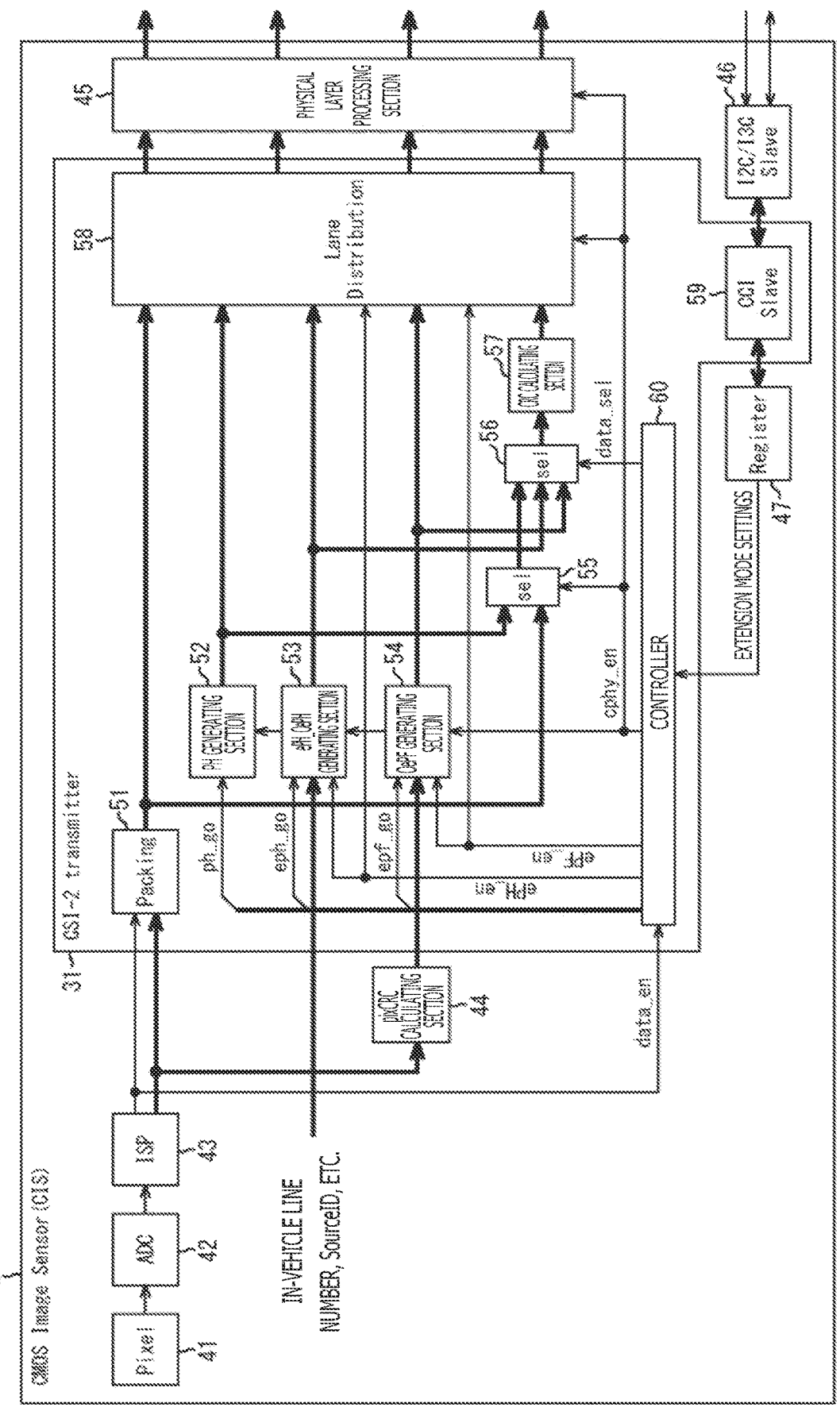
FIG. 9 is a block diagram depicting a configuration example of an image sensor.

FIG. 9 is a block diagram depicting a configuration example of the image sensor 21 including the extension-mode-supporting CSI-2 transmission circuit 31.

As depicted in FIG. 9, in addition to the extension-mode-supporting CSI-2 transmission circuit 31, the image sensor 21 includes a pixel 41, an AD converter 42, an image processing section 43, a pixel CRC calculating section 44, a physical layer processing section 45, an I2C/I3C slave 46, and a register 47. In addition, the extension-mode-supporting CSI-2 transmission circuit 31 includes a packing section 51, a packet header generating section 52, an extended packet header generating section 53, an extended packet footer generating section 54, selecting sections 55 and 56, a CRC calculating section 57, a lane distribution section 58, a CCI slave 59, and a controller 60.

The pixel 41 outputs an analog pixel signal according to the light amount of a received beam, and the AD converter (ADC: Analog-to-Digital Converter) 42 digital-converts the pixel signal output from the pixel 41, and supplies the pixel signal obtained by the conversion to the image processing section 43. The image processing section (ISP: image Signal Processor) 43 supplies, to the pixel CRC calculating section 44 and the packing section 51, image data obtained by implementation of various types of image processing on an image based on a pixel signal. In addition, the image processing section 43 supplies, to the packing section 51 and the controller 60, a data enable signal data_en representing whether or not image data is enabled.

The pixel CRC calculating section 44 determines, by calculation, a CRC for each pixel in the image data supplied from the image processing section 43, and supplies the CRC to the extended packet footer generating section 54.

The physical layer processing section 45 can execute physical layer processing of both C-PHY and D-PHY. For example, the physical layer processing section 45 executes physical layer processing of C-PHY in a case where a C layer enable signal cphy_en supplied from the controller 60 is asserted, and executes physical layer processing of D-PHY in a case where the C layer enable signal cphy_en is negated. Further, the physical layer processing section 45 transmits, to the application processor 22, packets split into four lanes by the lane distribution section 58.

According to the I2C (Inter-Integrated Circuit) or I3C (Improved Inter Integrated Circuits) standard, the I2C/I3C slave 46 performs communication on the initiative of an I2C/I3C master 72 (FIG. 10) of the application processor 22.

Various types of settings transmitted from the application processor 22 are written into the register 47 via the I2C/I3C slave 46 and the CCI slave 59. Here, for example, settings written into the register 47 include communication settings according to the CSI-2 standard, extension mode settings representing whether or not an extension mode is used, fixed communication settings that are required for communication in an extension mode, and the like.

The packing section 51 performs a packing process of storing, in a payload of a packet, image data supplied from the image processing section 43, and supplies the payload to the selecting section 55 and the lane distribution section 58.

When an instruction for generation of a packet header is given according to a packet header generation instruction signal ph_go supplied from the controller 60, the packet header generating section 52 generates the packet header, and supplies the packet header to the selecting section 55 and the lane distribution section 58.

That is, according to the existing CSI-2 standard, the packet header generating section 52 generates setting information representing conditions set for data transferred in a packet, for example, a packet header storing a data type representing the type of data. In addition, in an unused area that is defined as not being used in the existing CSI-2 standard in a data type which is setting information representing the type of data transferred in the packet, the packet header generating section 52 stores extension mode setting information representing whether or not the mode is an extension mode using an extended header. Furthermore, in the unused area, the packet header generating section 52 stores extension type setting information representing which type in multiple types of extension modes prepared as extension modes the mode is.

According to an extended packet header generation instruction signal eph_go and an extended packet header enable signal ePH_en supplied from the controller 60, the extended packet header generating section 53 generates each of an extended packet header and an optional extended packet header, and supplies the extended packet header and the optional extended packet header to the selecting section 56 and the lane distribution section 58. In addition, the extended packet header generating section 53 is supplied with an in-vehicle line number, a source ID (identification), and the like, according to a use of the image sensor 21, and stores them in the extended packet header or the optional extended packet, header as necessary.

That is, separately from the packet header generated by the packet header generating section 52, the extended packet header generating section 53 generates an extended packet header storing setting information as the one depicted in FIG. 3, for example. Further, in a case where an optional extended packet header is transmitted, the extended packet header generating section 53 stores, in the extended packet header, optional extended packet header setting information representing that the optional extended packet header is to be transmitted, as optional extended packet header setting information (OePH[7:0]) representing whether or not an optional extended packet header is to be transmitted, and generates the optional extended packet header subsequently to the extended packet header.

According to an extended packet footer generation instruction signal epf_go and an extended packet header enable signal ePF_en supplied from the controller 60, the extended packet footer generating section 54 generates an optional extended packet footer, and supplies the optional extended packet footer to the selecting section 56 and the lane distribution section 58.

That is, in a case where a packet transferred in an extension mode is an extended long packet storing data transferred as a payload in the existing CSI-2 standard, the extended packet footer generating section 54 generates an optional extended packet footer that is to be arranged subsequently to a legacy payload storing data.

In addition, the packet header generating section 52, the extended packet header generating section 53 and the extended packet footer generating section 54 are supplied with the C layer enable signal cphy_en from the controller 60. Further, in a case where the C layer enable signal cphy_en is asserted, the packet header generating section 52 generates a C-PHY packet header, the extended packet header generating section 53 generates a C-PHY extended packet header and an optional extended packet header, and the extended packet footer generating section 54 generates a C-PHY optional extended packet footer. On the other hand, in a case where the C layer enable signal cphy_en is negated, the packet header generating section 52 generates a D-PHY packet header, the extended packet header generating section 53 generates a D-PHY extended packet header and a D-PHY optional extended packet header, and the extended packet footer generating section 54 generates a D-PHY optional extended packet footer.

According to the C layer enable signal cphy_en supplied from the controller 60, in a case where the C layer enable signal cphy_en is asserted, the selecting section 55 selects a packet header supplied from the packet header generating section 52, and supplies the packet header to the selecting section 56. On the other hand, in a case where the C layer enable signal cphy_en is negated, the selecting section 55 selects a payload supplied from the packing section 51, and supplies the payload to the selecting section 56.

According to a data selection signal data_sel supplied from the controller 60, the selecting section 56 selects any one(s) of the packet header or the payload supplied selectively via the selecting section 55, the extended packet header and the optional extended packet header supplied from the extended packet header generating section 53, and the optional extended packet footer supplied from the extended packet footer generating section 54, and supplies the selected one(s) to the CRC calculating section 57.

The CRC calculating section 57 determines, by calculation, a CRC of the packet header, the payload, the extended packet header, the optional extended packet header, or the optional extended packet footer selectively supplied via the selecting section 56, and supplies the CRC to the lane distribution section 58.

Under the control by the controller 60, the lane distribution section 58 distributes, to four lanes according to the CSI-2 standard, the payload supplied from the packing section 51, the packet header supplied from the packet header generating section 52, the extended packet header and the optional extended packet header supplied from the extended packet header generating section 53, the optional extended packet footer supplied from the extended packet footer generating section 54, and the CRC supplied from the CRC calculating section 57, and supplies them to the physical layer processing section 45.

According to the CSI-2 standard, the CCI (Camera Control Interface) slave 59 performs communication on the initiative of a CCI master 88 (FIG. 10) of the application processor 22.

The controller 60 reads out various types of settings stored in the register 47, and performs control of each block included in the extension-mode-supporting CSI-2 transmission circuit 31 according to the settings. For example, according to the content of to-be-transmitted data, the controller 60 controls switching between transmission of a packet with a packet structure according to the existing CSI-2 standard and transmission of a packet with a packet structure at a time of an extension mode.

The image sensor 21 is configured in such a manner, and can generate extended packets with packet structures as the ones explained with reference to FIG. 3 to FIG. 8, and transmit the packets to the application processor 22.

Figure 10:
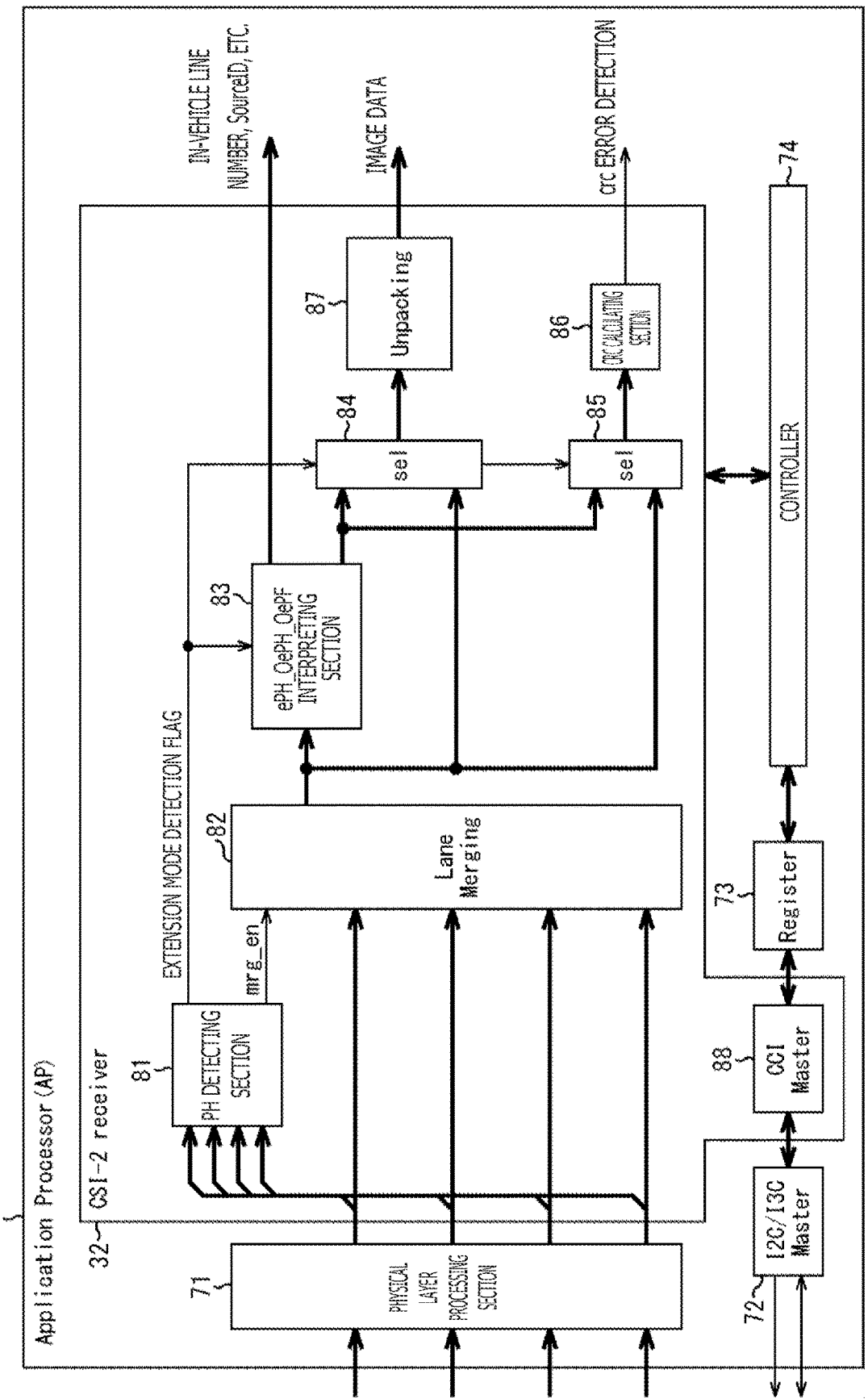
FIG. 10 is a block diagram depicting a configuration example of an application processor.

FIG. 10 is a block diagram depicting a configuration example of the application processor 22 including the extension-mode-supporting CSI-2 reception circuit 32.

As depicted in FIG. 10, in addition to the extension-mode-supporting CSI-2 reception circuit 32, the application processor 22 includes a physical layer processing section 71, the I2C/I3C master 72, a register 73, and a controller 74. In addition, the extension-mode-supporting CSI-2 reception circuit 32 includes a packet header detecting section 81, a lane merging section 82, an interpreting section 83, selecting sections 84 and 85, a CRC calculating section 86, an unpacking section 87, and the CCI master 88.

The physical layer processing section 71 can execute physical layer processing of both C-PHY and D-PHY. As described above, the physical layer processing section 45 of the image sensor 21 performs physical layer processing of either one of C-PHY and D-PHY, and the physical layer processing section 71 executes physical layer processing of the same one of C-PHY and D-PHY for which the physical layer processing section 45 has executed the physical layer processing.

According to the I2C or I3C standard, the I2C/I3C master 72 performs communication with the I2C/I3C slave 46 (FIG. 9) of the image sensor 21 on its initiative.

In the register 73, the controller 74 records various types of settings that should be written into the register 47 of the image sensor 21.

The controller 74 performs control of each block included in the application processor 22.

The packet header detecting section 81 detects a packet header from a packet supplied from the physical layer processing section 71, and checks the data type stored in the packet header. Further, in a case where the extension mode setting information in the data type of the packet header represents that the mode is an extension mode (DataType [5:3]=3'b111), the packet header detecting section 81 supplies an extension mode detection flag representing the extension mode to the interpreting section 83, the selecting section 84, and the selecting section 85. In addition, according to the packet header, the packet header detecting section 81 supplies, to the lane merging section 82, a merge enable signal mrg_en representing whether or not merging of four split lanes is enabled.

That is, according to the existing CSI-2 standard, the packet header detecting section 81 detects a packet header in which setting information (a data type, etc.) representing conditions set for data transferred in the packet is stored. At this time, according to the extension mode setting information that is stored in an unused area defined as not being used in the existing CSI-2 standard in a data type which is setting information representing the type of data to be transferred in the packet and that represents whether or not the mode is an extension mode using an extended header, the packet header detecting section 81 outputs the extension mode detection flag to thereby perform switching between reception of a packet with a packet structure according to the existing CSI-2 standard and reception of a packet with a packet structure at a time of an extension mode. In addition, according to the extension mode type information stored in an unused area in a data type defined as not being used in the existing CSI-2 standard, the packet header detecting section 81 recognizes which type of extension modes in multiple types of extension mode prepared as extension modes the mode is.

In a case where the merge enable signal mrg_en supplied from the packet header detecting section 81 is asserted, the lane merging section 82 merges a packet split into four lanes that is supplied from the physical layer processing section 71. Further, the lane merging section 82 supplies the packet in one lane to the interpreting section 83, the selecting section 84, and the selecting section 85.

In a case where the extension mode detection flag supplied from the packet header detecting section 81 represents that the mode is an extension mode, the interpreting section 83 reads out an extended packet header, an optional extended packet header, and an optional extended packet footer from the packet supplied from the lane merging section 82, according to the packet structure of the extension mode. Further, the interpreting section 83 interprets setting information stored in the extended packet header, the optional extended packet header, and the optional extended packet footer.

That is, as an extended header, the interpreting section 83 receives the extended packet header arranged at the beginning of a payload according to the existing CSI-2 standard, and interprets the setting information stored in the extended packet header. In addition, in a case where the optional extended packet header setting information stored in the extended packet header represents that an optional extended packet header transferred selectively according to a use is to be transmitted, the interpreting section 83 receives the optional extended packet header subsequently to the extended packet header, and interprets setting information stored in the optional extended packet header. Further, in a case where a packet transferred in an extension mode is an extended long packet storing data transferred as a payload in the existing CSI-2 standard, the interpreting section 83 receives an optional extended packet footer arranged subsequently to a legacy payload storing data, and interprets the optional extended packet footer.

Further, for example, the interpreting section 83 reads out an in-vehicle line number, a source ID, and the like stored in the optional extended packet header, and outputs them to LSI (not depicted) on the downstream side.

Note that, in a case where the extension mode detection flag supplied from the packet header detecting section 81 does not represent that the mode is an extension mode, that is, in a case where a packet with an existing packet structure is supplied, the interpreting section 83 does not perform such processes as the ones mentioned above and stops its operation.

According to the extension mode detection flag supplied from the packet header detecting section 81, the selecting section 84 supplies data to the unpacking section 87 selectively according to the packet structure of the existing packet or the packet structure of the extended packet.

According to the extension mode detection flag supplied from the packet header detecting section 81, the selecting section 85 supplies data to the CRC calculating section 86 selectively according to the packet structure of the existing packet or the packet structure of the extended packet.

The CRC calculating section 86 calculates a CRC of the packet header, payload, the extended packet header, the optional extended packet header, or the optional extended packet footer selectively supplied via the selecting section 85. Further, in a case where a CRC error is detected, the CRC calculating section 86 outputs, to the LSI (not depicted) on the downstream side, a crc error detection signal representing an indication to that effect.

The unpacking section 87 performs an unpacking process of taking out image data stored in a payload supplied selectively via the selecting section 84, and outputs the acquired image data to the LSI (not depicted) on the downstream side.

According to the CSI-2 standard, the CCI master 68 performs communication with the CCI slave 59 (FIG. 9) of the image sensor 21 on its initiative.

The application processor 22 is configured in such a manner, and can receive an extended packet transmitted from the image sensor 21, interpret setting information stored in an extended packet header, an optional extended packet header, and an optional extended packet footer, and acquire image data.

<Communication Process>

Communication processes performed at the image sensor 21 and the application processor 22 are explained with reference to FIG. 11 to FIG. 14.

Figure 11:
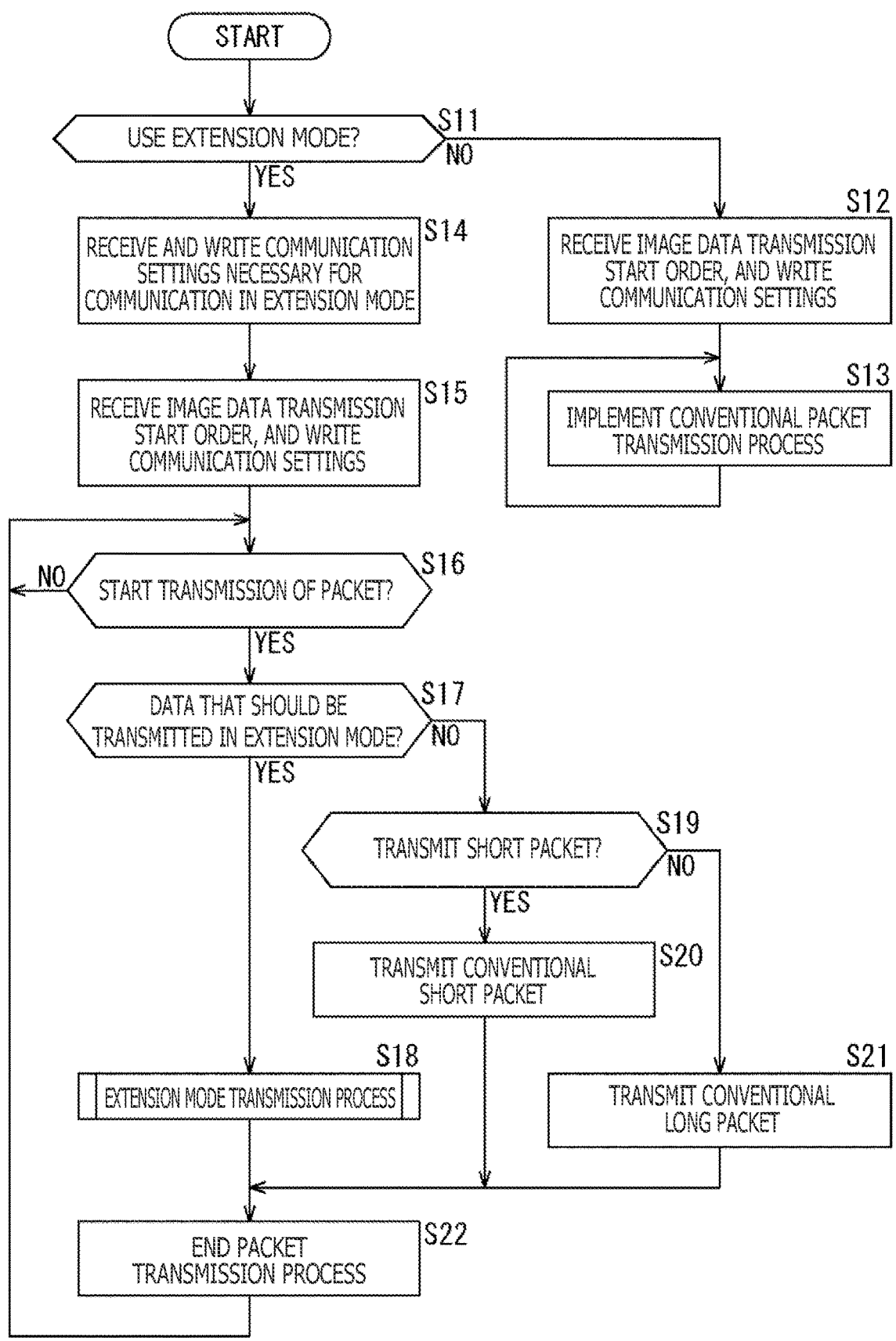
FIG. 11 is a flowchart for explaining a process performed by the image sensor to transmit a packet.

FIG. 11 is a flowchart for explaining a process performed by the image sensor 21 to transmit a packet.

For example, the process is started when the image sensor 21 is connected to the application processor 22 via the bus 23. In Step S11, when starting communication with the application processor 22, the controller 60 determines whether or not to use an extension mode. For example, the controller 60 checks the extension mode settings stored in the register 47, and determines to use the extension mode in a case where the extension mode settings representing that an extension mode is to be used are written by the application processor 22.

In a case where, in Step S11, the controller 60 determines not to use an extension mode, the process proceeds to Step S12.

In Step S12, the I2C/I3C slave 46 receives a transmission start order for image data transmitted from the application processor 22 (in Step S54 in FIG. 13 described later). Further, the I2C/I3C slave 46 receives communication settings according to the CSI-2 standard transmitted along with the transmission start order, and writes the communication settings is the register 47 via the CCI slave 59.

In Step S13, according to the communication settings stored in the register 47, the image sensor 21 executes a conventional packet transmission process in which the packet with a packet structure according to the existing CSI-2 standard is transmitted to the application processor 22.

On the other hand, in a case where, in Step S11, the controller 60 determines that the extension mode is to be used, the process proceeds to Step S14.

In Step S14, the I2C/I3C slave 46 receives fixed communication settings (e.g., a copy of each PH/PF lane at a time of GLD, etc.) that are required for communication in the extension mode, and writes the fixed communication settings in the register 47 via the CCI slave 59.

In Step S15, the I2C/I3C slave 46 receives a transmission start order for image data transmitted from the application processor 22 (in Step S57 in FIG. 13 described later). Further, the I2C/I3C slave 46 receives communication settings according to the CSI-2 standard transmitted along with the transmission start order, and writes the communication settings in the register 47 via the CCI slave 59.

In Step S16, the controller 60 determines whether or not to start transmission of the packet, and pauses the process until transmission of the packet is determined to be started.

Then, in a case where, in Step S16, transmission of the packet is determined to be started, the process proceeds to Step S17, and the controller 60 determines whether or not the data is one that should be transmitted in the extension mode. Here, in a case where the data is such data that is transmitted in a use case of an application example, for example, as the ones described later according to the content of the to-be-transmitted data, the controller 60 determines that the data is one that should be transmitted in the extension mode.

In a case where, in Step S17, the controller 60 determines that the data is one that should be transmitted in the extension mode, the process proceeds to Step S18, and an extension mode transmission process of transmitting an extended packet supporting the extension mode (see FIG. 12) is performed.

On the other hand, in a case where, in Step S17, the controller 60 determines that the data is not one that should be transmitted in the extension mode, the process proceeds to Step S19.

In Step S19, the controller 60 determines whether or not to transmit a short packet. For example, the controller 60 determines to transmit a short packet at a time of a frame start and at a time of a frame end.

In a case where, in Step S19, the controller 60 determines to transmit a short packet, the process proceeds to Step S20. In Step S20, the packet header generating section 52 generates a packet header, and transmits a short packet with the conventional packet structure to the application processor 22.

On the other hand, in a case where, in Step S19, the controller 60 determines not to transmit a short packet (i.e., determines to transmit a long packet), the process proceeds to Step S21. In Step S21, the packing section 51 stores the image data in a payload, and the CRC calculating section 57 obtains a CRC. As a result, a long packet with the conventional packet structure is generated and transmitted to the application processor 22.

After the process in Step S18, Step S20, or Step S21, the process proceeds to Step S22, and the controller 60 ends the packet transmission process. Thereafter, the process returns to Step S16, and then the process of transmitting a packet is similarly performed repeatedly on the next packet as a to-be-transmitted packet.

Figure 12:
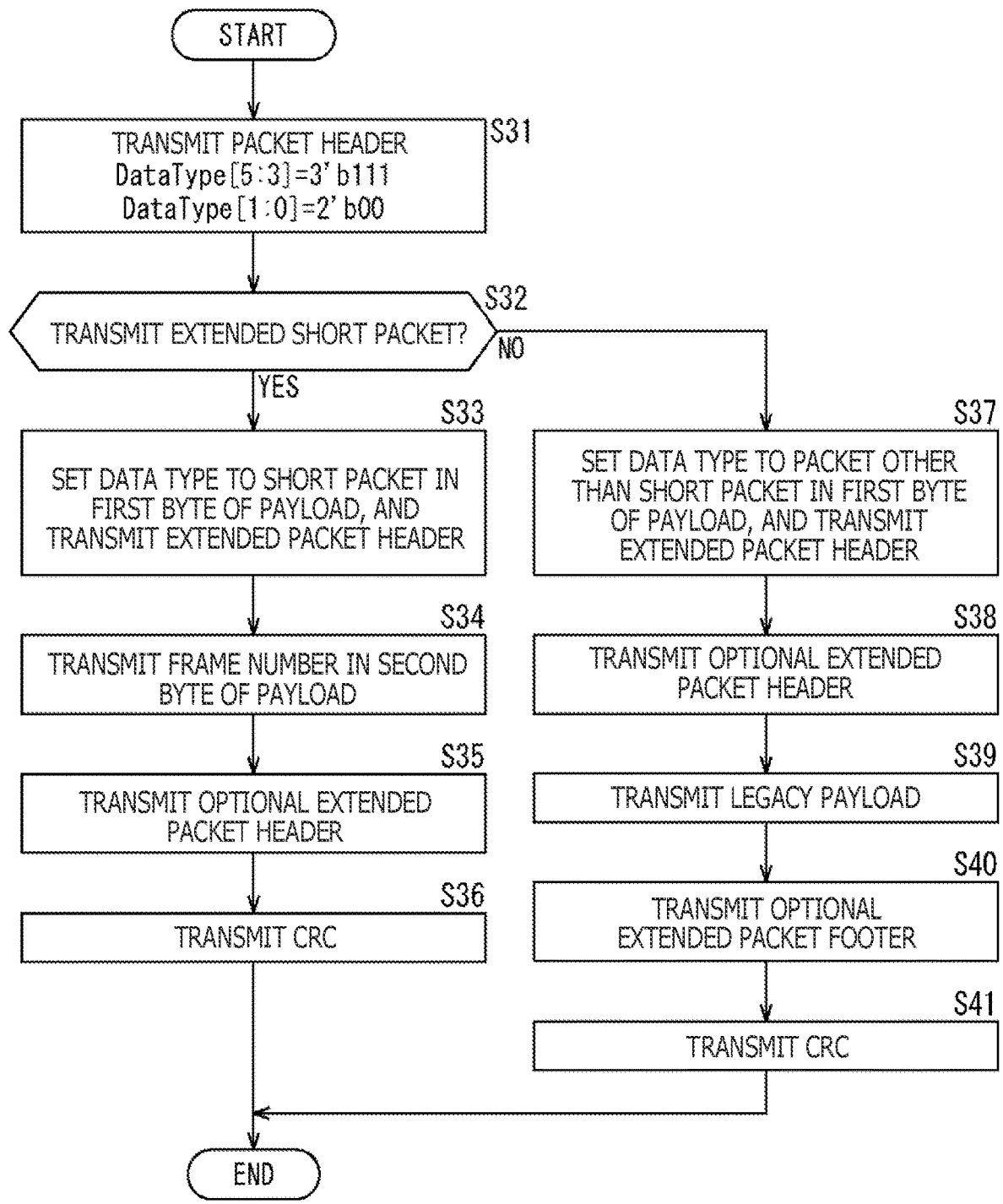
FIG. 12 is a flowchart for explaining an extension mode transmission process.

FIG. 12 is a flowchart for explaining the extension mode transmission process performed in the process in Step S18 in FIG. 11.

In Step S31, the packet header generating section 52 generates a packet header storing a VC, a data type, a WC, and the like, and transmits the packet header to the application processor 22. At this time, the packet header generating section 52 writes, in the data type of the packet header, extension mode setting information (DataType[5:3]=3'b111) representing that the mode is the extension mode, and extension type setting information (DataType[1:0]=2'b00) identifying that the mode setting of the extension mode represents the extension mode 0.

In Step S32, the application processor 22 determines whether or not to transmit an extended short packet. For example, the controller 60 determines to transmit an extended short packet at a time of a frame start and at a time of a frame end.

In a case where, in Step S32, the application processor 22 determines to transmit an extended short packet, the process proceeds to Step S33.

In Step S33, the extended packet header generating section 53 transmits an extended packet header in which the data type (DataType[7:0]) is set as a short packet, in the first byte of a payload. At this time, the extended packet header generating section 53 performs various types of settings stored in the extended packet header (e.g., OePH[7:0], OePF[3:0], etc.).

In Step S34, the extended packet header generating section 53 stores and transmits a frame number (FN: FrameNumber), in the second byte of the payload.

In Step S35, according to the setting (OePH[7:0]) performed in Step S33, the extended packet header generating section 53 generates and transmits an optional extended packet header as the one depicted in FIG. 4.

In Step S36, the CRC calculating section 57 obtains a CRC, and transmits the CRC as a packet footer.

On the other hand, in a case where, in Step S32, the application processor 22 determines not to transmit an extended short packet (i.e., determines to transmit a long packet), the process proceeds to Step S37.

In Step S37, the extended packet header generating section 53 transmits an extended packet header in which the data type (DataType[7:0]) is set as a packet other than a short packet, in the first byte of the payload. At this time, the extended packet header generating section 53 performs various types of settings stored in the extended packet header (e.g., OePH[7:0], OePF[3:0], etc.).

In Step S38, according to the setting (OePH[7:0]) performed in Step S37, the extended packet header generating section 53 generates and transmits an optional extended packet header as the one depicted in FIG. 5.

In Step S39, the packing section 51 packs image data supplied from the image processing section 43, and generates and transmits a legacy payload.

In Step S40, according to the setting (OePF[3:0]) performed in Step S37, the extended packet footer generating section 54 generates and transmits an optional extended packet footer as the one depicted in FIG. 4.

In Step S41, the CRC calculating section 57 obtains a CRC, and transmits the CRC as a packet footer.

Then, after the process in Step S36 or S41, the extension mode transmission process is ended.

As described above, the image sensor 21 can generate and transmit an extended short packet or an extended long packet.

Figure 13:
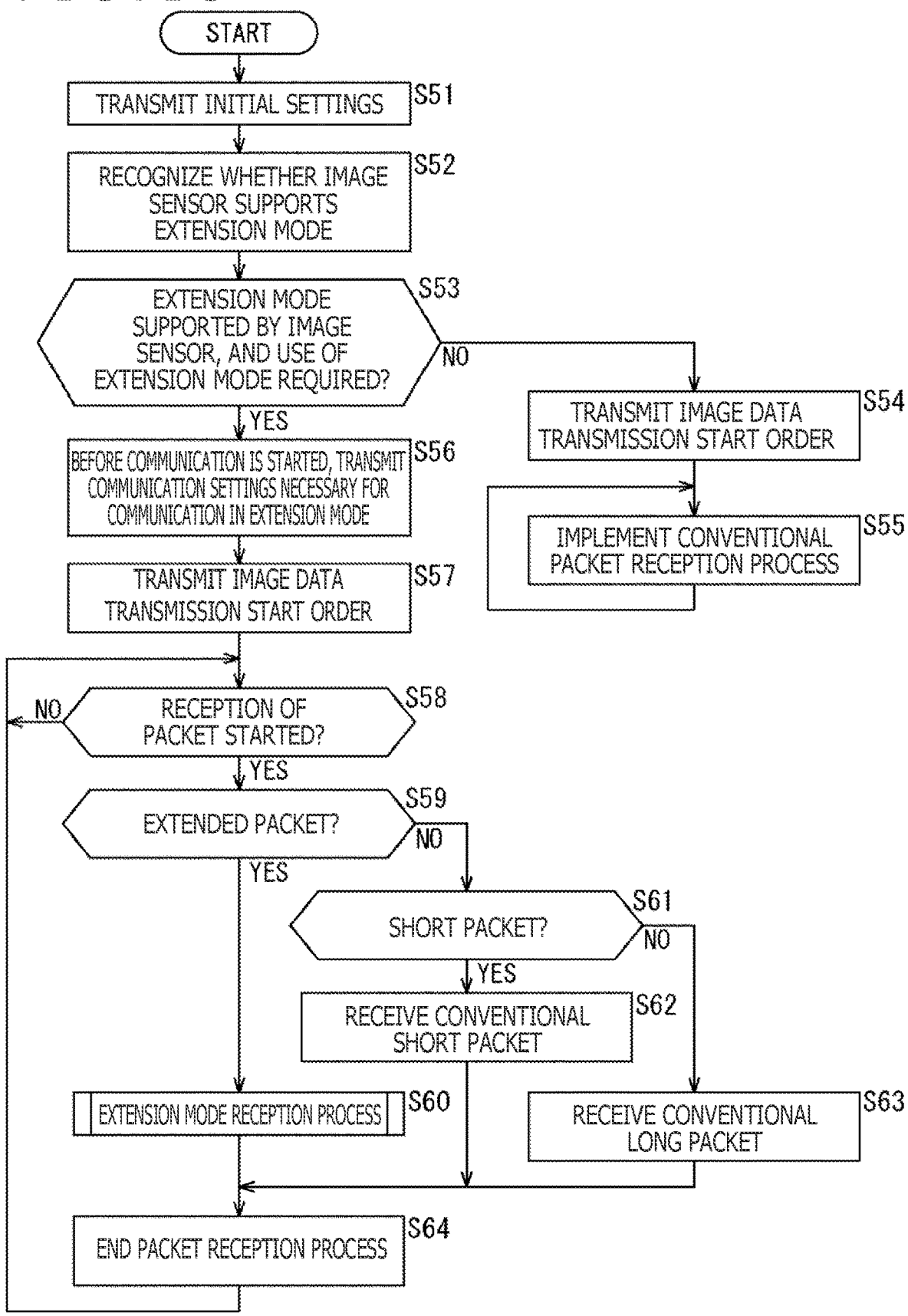
FIG. 13 is a flowchart for explaining a process performed by the application processor to receive a packet.

FIG. 13 is a flowchart for explaining a process performed by the application processor 22 to receive a packet.

For example, the process is started when the image sensor 21 is connected to the application processor 22 via the bus 23. In Step S51, the controller 74 writes, in the register 73, initial settings of the image sensor 21 (e.g., whether to use C-PHY or D-PHY as the physical layer, etc.), and transmits the initial settings to the image sensor 21 by using the I2C/I3C master 72 via the CCI master 88. As a result, the initial settings are written into the register 47 of the image sensor 21.

In Step S52, the controller 74 recognizes whether or not the image sensor 21 supports an extension mode. For example, by using the I2C/I3C master 72 and acquiring a setting value (e.g., an extended PH/PF support capability) stored in the register 47 of the image sensor 21, the controller 74 can recognize whether or not the image sensor 21 supports the extension mode. Alternatively, for example, according to manual input or the like, the controller 74 can recognize in advance whether or not the image sensor 21 supports the extension mode.

In Step S53, the controller 74 determines whether or not the image sensor 21 supports the extension mode and an application executed by the application processor 22 is asking for use of the extension mode.

In a case where, in Step S53, the controller 74 determines that the image sensor 21 does not support the extension mode or the application is not asking for use of the extension mode, the process proceeds to Step S54.

In Step S54, the controller 74 transmits, to the image sensor 21, an image data transmission start order by using the I2C/I3C master 72. At this time, the controller 74 also causes communication settings according to the CSI-2 standard to be transmitted.

In Step S55, according to the communication settings transmitted in Step S54, the application processor 22 performs a conventional packet reception process of receiving a packet with a packet structure according to the existing CSI-2 standard.

On the other hand, in a case where, in Step S53, the controller 74 determines that the image sensor 21 supports the extension mode and the application executed by the application processor 22 is asking for use of the extension mode, the process proceeds to Step S56.

In Step S56, before communication in the extension mode is started, the I2C/I3C master 72 transmits fixed communication settings that are required for the communication in the extension mode. As a result, the fixed communication settings are written into the register 47 of the image sensor 21 (Step S14 in FIG. 11).

In Step S57, the controller 74 transmits, to the image sensor 21, an image data transmission start order by using the I2C/I3C master 72. At this time, the controller 74 also causes communication settings according to the CSI-2 standard to be transmitted.

In Step S58, the packet header detecting section 81 determines whether or not reception of a packet has been started, by checking data supplied from the physical layer processing section 71, and pauses the process until it is determined that reception of a packet has been started. For example, in a case where a packet header is detected in the data supplied from the physical layer processing section 71, the packet header detecting section 81 determines that reception of a packet has been started.

In a case where, in Step S58, the packet header detecting section 81 determines that reception of a packet has been started, the process proceeds to Step S59.

In Step S59, the packet header detecting section 81 checks the data type of the packet header detected in Step S58, and determines whether or not the packet having started to be received is an extended packet supporting the extension mode. For example, in a case where the extension mode setting information in the data type of the packet header represents that the mode is the extension mode (DataType [5:3]=3'b111), the packet header detecting section 81 determines that the packet having started to be received is an extended packet.

In a case where, in Step S59, the packet header detecting section 81 determines that the packet having started to be received is an extended packet, the process proceeds to Step S60, and an extension mode reception process (see FIG. 14) of receiving the extended packet is performed.

On the other hand, in a case where, in Step S59, the packet header detecting section 81 determines that the packet having started to be received is not an extended packet, the process proceeds to Step S61.

In Step S61, the packet header detecting section 81 checks the data type (DataType[5:0]) of the packet header detected in Step S58, and determines whether or not the packet having started to be received is a short packet.

In a case where, in Step S61, the packet header detecting section 81 determines that the packet having started to be received is a short packet, the process proceeds to Step S62. In Step S62, the packet header detecting section 81 receives the short packet with the conventional packet structure transmitted from the image sensor 21.

On the other hand, in a case where, in Step S61, the packet header detecting section 81 determines that the packet having started to be received is not a short packet (i.e., reception of a long packet has been started), the process proceeds to Step S63. In Step S63, the unpacking section 87 receives a payload of the long packet with the conventional packet structure transmitted from the image sensor 21, and takes out image data, and the CRC calculating section 86 receives, as a CRC, the first byte after a WC transmitted subsequently to the packet header.

After the process in Step S60, Step S62, or Step S63, the process proceeds to Step S64, and the controller 74 ends the packet reception process. Thereafter, the process returns to Step S58, and then the process of receiving a packet is similarly performed repeatedly on the next packet as a to-be-received packet.

Figure 14:
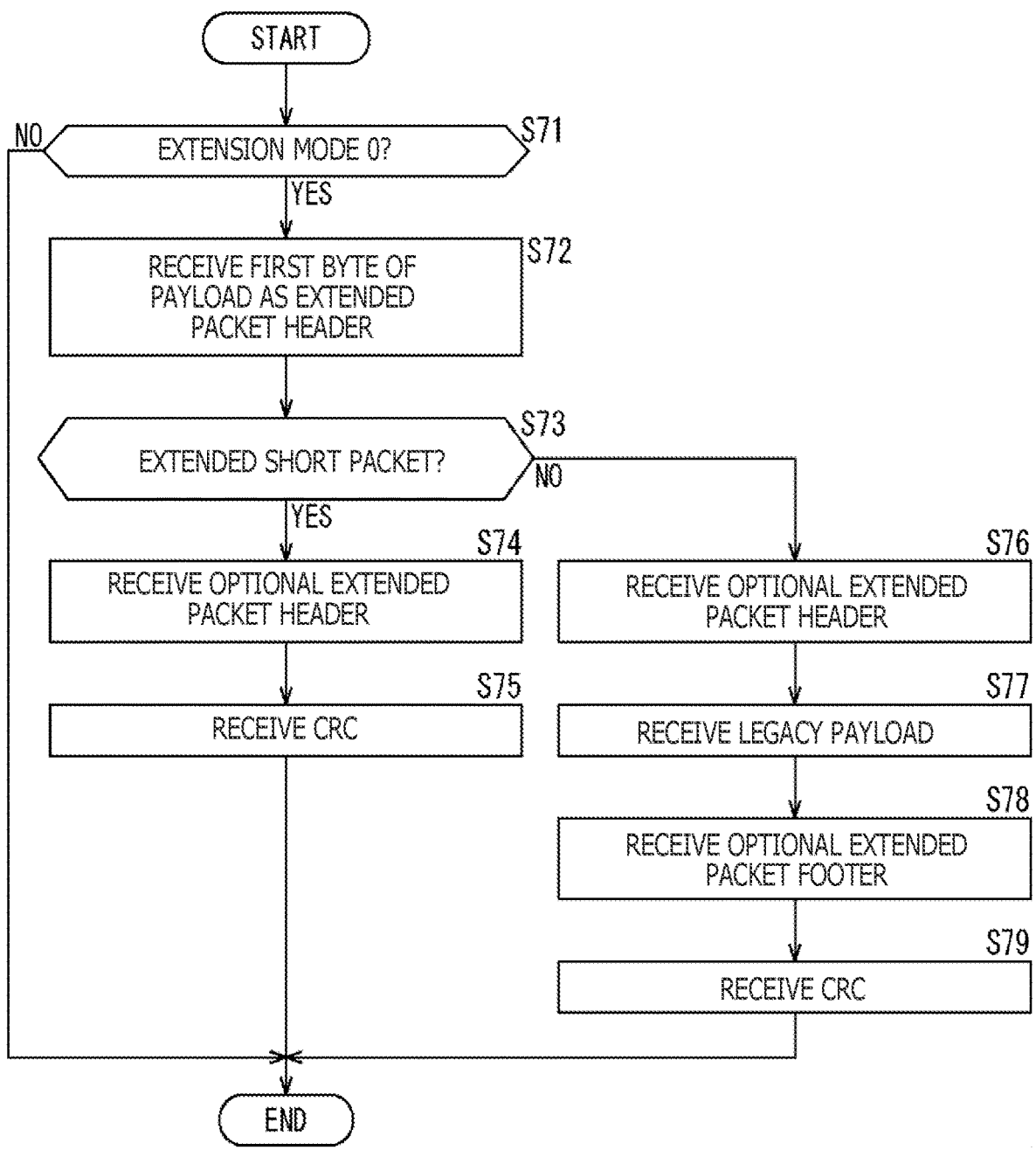
FIG. 14 is a flowchart for explaining an extension mode reception process.

FIG. 14 is a flowchart for explaining the extension mode reception process performed in the process in Step S60 in FIG. 13.

In Step S71, the packet header detecting section 81 determines whether or not the mode setting of the extension mode represents the extension mode 0. For example, in a case where the extension type setting information in the data type of the packet header represents that the mode is the extension mode 0 (DataType[1:0]=2'b00), the packet header detecting section 81 determines that the mode setting of the extension mode represents the extension mode 0.

In a case where, in Step S71, the packet header detecting section 81 determines that the mode setting of the extension mode represents the extension mode 0, the process proceeds to Step S72. In Step S72, the interpreting section 83 receives the first byte of the payload as the extended packet header.

In Step S73, the interpreting section 83 checks the data type (DataType[7:0]) of the extended packet header received in Step S72, and determines whether or not the packet having started to be received is an extended short packet.

In a case where, in Step S73, the interpreting section 83 determines that the packet is an extended short packet, the process proceeds to Step S74. In Step S74, according to a setting (OePH[7:0]) stored in the extended packet header received in Step S72, the interpreting section 83 receives an optional extended packet header.

In Step S75, the CRC calculating section 86 receives, as a CRC, the first byte after a WC transmitted subsequently to the optional extended packet header.

On the other hand, in a case where, in Step S73, the interpreting section 83 determines that the packet is not an extended short packet (i.e., reception of an extended long packet has been started), the process proceeds to Step S76. In Step S76, according to a setting (OePH[7:0]) stored in the extended packet header received in Step S72, the interpreting section 83 receives an optional extended packet header.

In Step S77, the unpacking section 87 receives a legacy payload of the extended long packet transmitted from the image sensor 21, and takes out image data.

In Step S78, according to a setting (OePF[3:0]) stored in the extended packet header received in Step S72, the interpreting section 83 receives an optional extended packet footer.

In Step S79, the CRC calculating section 86 receives, as a CRC, the first byte after a WC transmitted subsequently to the optional extended packet footer.

Then, in a case where it is determined in Step S71 that the mode setting of the extension mode does not represent the extension mode 0, the extension mode reception process is ended after the process in Step S75 or after the process in Step S79.

As described above, the application, processor 22 can receive an extended short packet or an extended long packet and acquire data.

Second Structure Example of Packet Structure

Second structure examples of packet structures of packets used for communication between the extension-mode-supporting CSI-2 transmission circuit 31 and the extension-mode-supporting CSI-2 reception circuit 32 are explained with reference to FIG. 15 to FIG. 18.

In the first structure examples depicted in FIG. 3 to FIG. 8 mentioned above, emphasis is placed on maintaining the interoperability of the existing CSI-2 standard, and extension of the packet structures is sought with use of an extended packet header, an optional extended packet header, and an optional extended packet footer, while the packet structures of a packet header and a packet footer are made the same as the corresponding packet structures in the existing CSI-2 standard. In contrast, in the second structure examples explained below, extension of the packet structures is sought with use of an extended packet header and an extended packet footer, while the packet header and the packet footer are made different from those in the existing CSI-2 standard.

Figure 15:
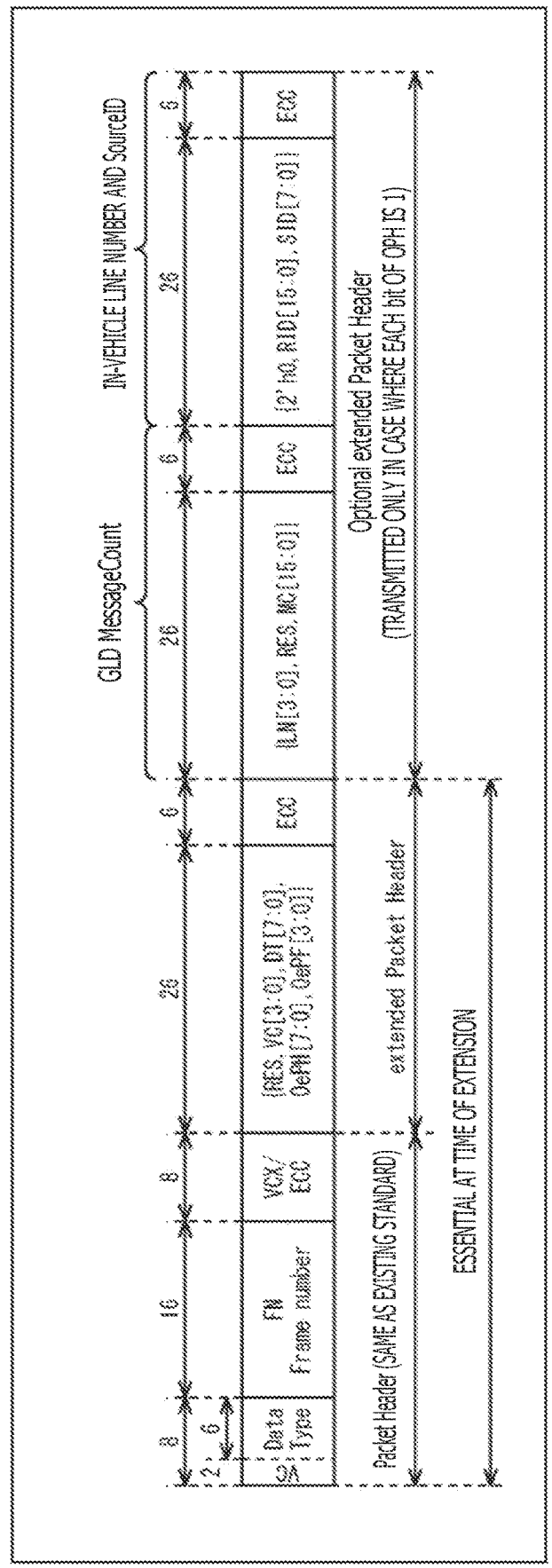
FIG. 15 is a figure depicting a second structure example of an overall packet structure of a D-PHY extended packet.

FIG. 15 depicts a packet structure of a short packet used in the CSI-2 extension mode in a case where the physical layer is D-PHY (hereinafter, a D-PHY extended short packet).

As in the D-PHY extended short packet in the first structure example depicted in FIG. 4, in the D-PHY extended short packet depicted in FIG. 15, the extension mode is identified by the data type stored in a packet header that is the same as that in the existing CSI-2 standard.

On the other hand, as in a short packet according to the existing CSI-2 standard, in the D-PHY extended short packet depicted in FIG. 15, a frame number is stored in a short packet data field in 16 bits next to the data type of the packet header. Then, subsequently to the packet header, an extended packet header configured similarly to the extended packet header depicted in FIG. 4 is transmitted.

Accordingly, the application processor 22, which is on the receiver side, interprets the data type stored in the extended packet header, and, in a case where the packet is an extended short packet, can assess that a frame number is stored in the data field of the packet header.

Note that the optional extended packet header in the D-PHY extended short packet depicted in FIG. 15 is configured similarly to the optional extended packet header in the D-PHY extended short packet in the first structure example depicted in FIG. 4. However, the optional extended packet header has a packet structure not embedded in the payload, and hence does not require a CRC given at the end.

Figure 16:
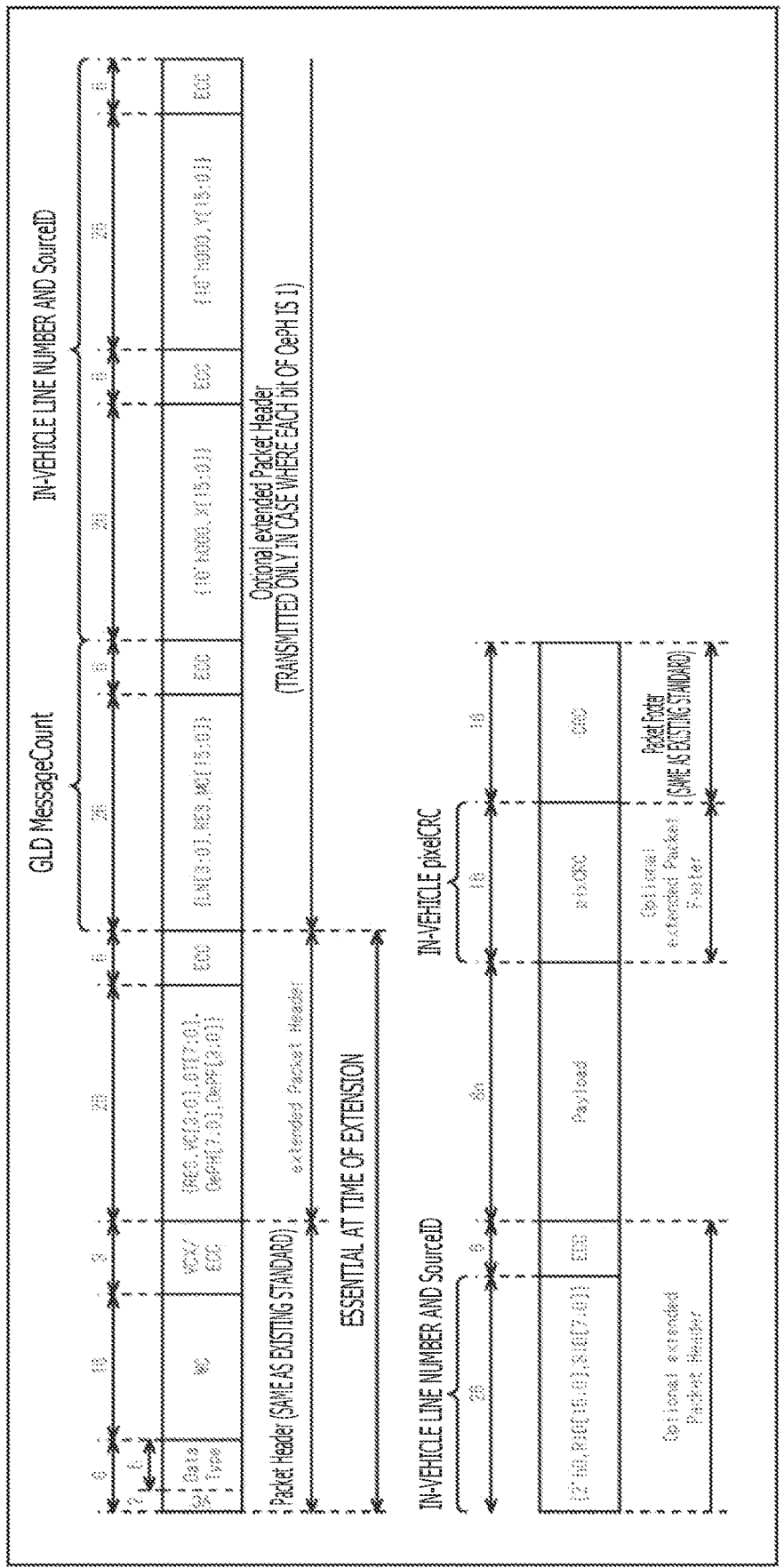
FIG. 16 is a figure depicting a second structure example of a packet structure of a D-PHY extended long packet.

FIG. 16 depicts a packet structure of a long packet used in the CSI-2 extension mode in a case where the physical layer is D-PHY (hereinafter, a D-PHY extended long packet).

In the D-PHY extended long packet depicted in FIG. 16, extended data is not embedded in the payload, but transferred as part of the packet header or packet footer. Accordingly, as in the existing standard, a WC of the packet header at the beginning merely represents the byte length of the payload.

Figure 17:
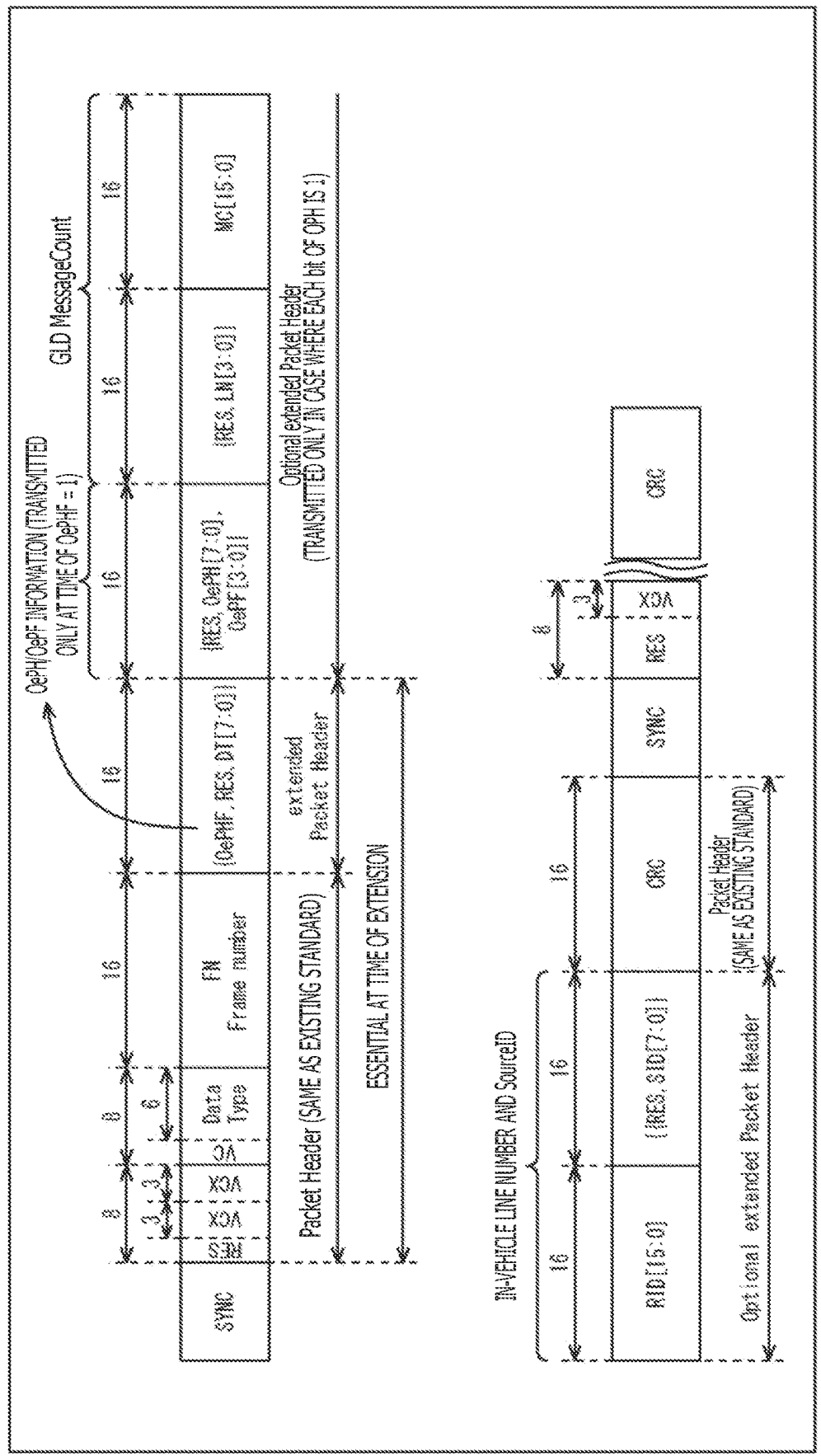
FIG. 17 is a figure depicting a second structure example of a packet structure of a C-PHY extended short packet.

FIG. 17 depicts a packet structure of a short packet used in the CSI-2 extension mode in a case where the physical layer is C-PHY (hereinafter, a C-PHY extended short packet).

An extended portion of the C-PHY extended short packet depicted in FIG. 17 is merely transferred as an extension of a packet header according to the existing CSI-2 standard, so that the extended portion such as an extended packet header is inserted after the frame number. Further, as in the existing CSI-2 standard, the packet header ends with a CRC. Furthermore, the packet structure in which these are transferred twice with a SYNC being interposed therebetween is similar to that of a short packet according to the existing CSI-2 standard.

Figure 18:
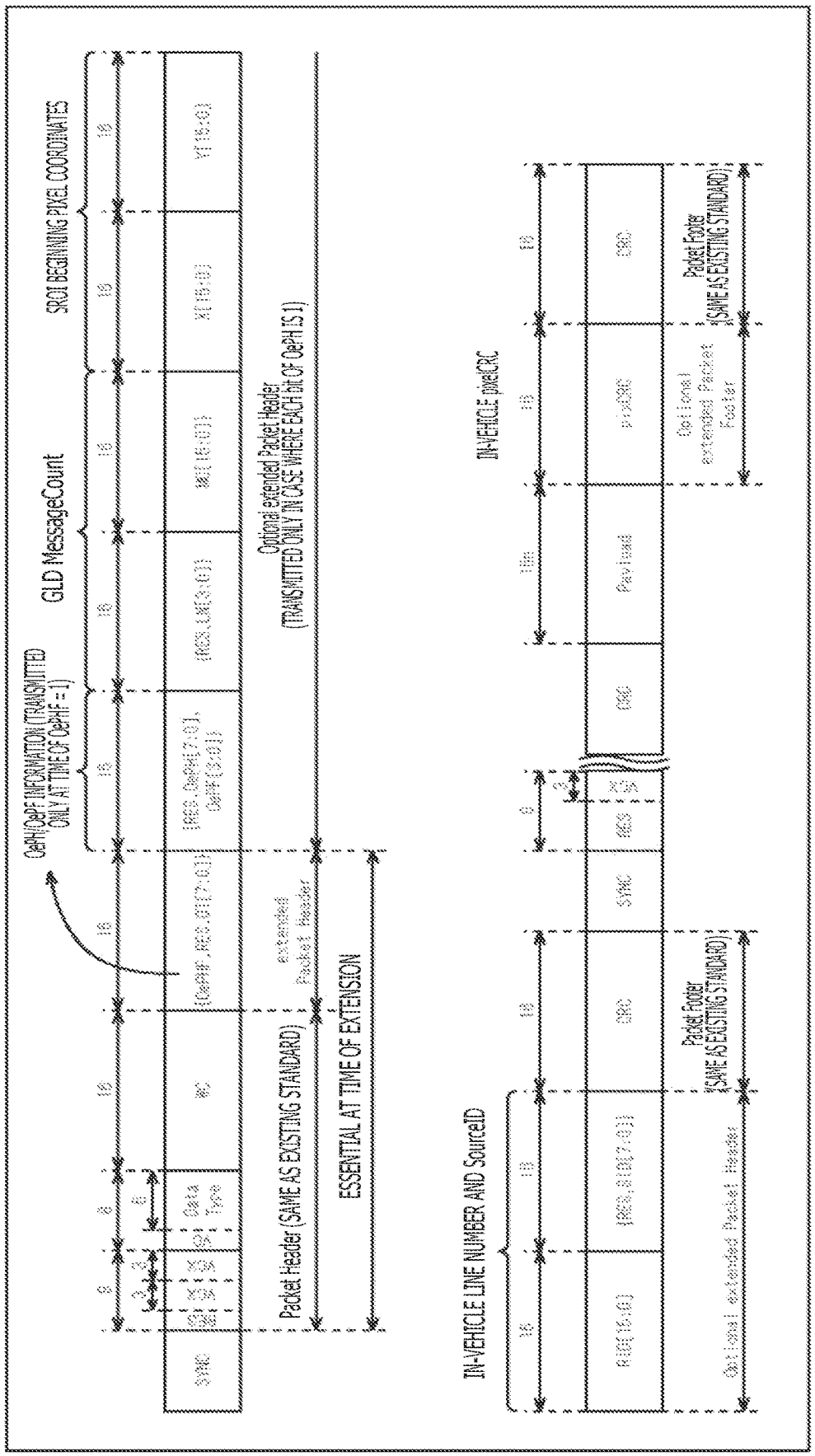
FIG. 18 is a figure depicting a second structure example of a packet structure of a C-PHY extended long packet.

FIG. 18 depicts a packet structure of a long packet used in the CSI-2 extension mode in a case where the physical layer is C-PHY (hereinafter, a C-PHY extended long packet).

As in the existing standard, as described above, the C-PHY extended long packet depicted in FIG. 18 is different from the C-PHY extended long packet in the first structure example depicted in FIG. 8 in that a WC of the packet header at the beginning merely represents the byte length of a payload.

As described above, similarly to the packet structure of the extended packet in the first structure example (FIG. 3 to FIG. 8), the packet structure of the extended packets in the second structure examples depicted in FIG. 15 to FIG. 18 makes it possible to support more diverse uses than in conventional technologies.

It should be noted that the extended packets in the second structure examples have packet structures in which extended data is not embedded in an existing payload, and an existing packet header and an existing packet footer are extended. Because of this, in a case where the packet structures of the extended packets in the second structure examples are adopted, it is not possible to minimize such influence that a change needs to be made to a conventionally-used communication system, as compared with the case where the packet structures of the extended packets in the first structure examples are adopted. That is, for example, a change needs to be made to the existing SerDes transmission circuit 34 and SerDes reception circuit 35 (FIG. 2).

As described above, adopting the extended packets in the first structure examples makes it possible to support a variety of uses such as those for in-vehicle equipment and to construct an in-vehicle system while such influence that a change needs to be made to a conventionally-used communication system is minimized.

In addition, adopting the extended packets in the second structure examples makes it possible to support a variety of uses such as those for in-vehicle equipment, although a change needs to be made to a conventionally-used communication system.

Modification Examples of Image Sensor and Application Processor

Modification examples of an image sensor and an application processor are explained with reference to FIG. 19.

Each block included in the image sensor 21 in FIG. 9 mentioned above and the application processor 22 in FIG. 10 mentioned above is configured to be capable of performing a process supporting both D-PHY and C-PHY packets. In contrast, for example, both a block that performs processes dedicated to a D-PHY packet and a block that performs processes dedicated to a C-PHY packet may be included, and either block may be selected to perform the corresponding processes.

Figure 19:
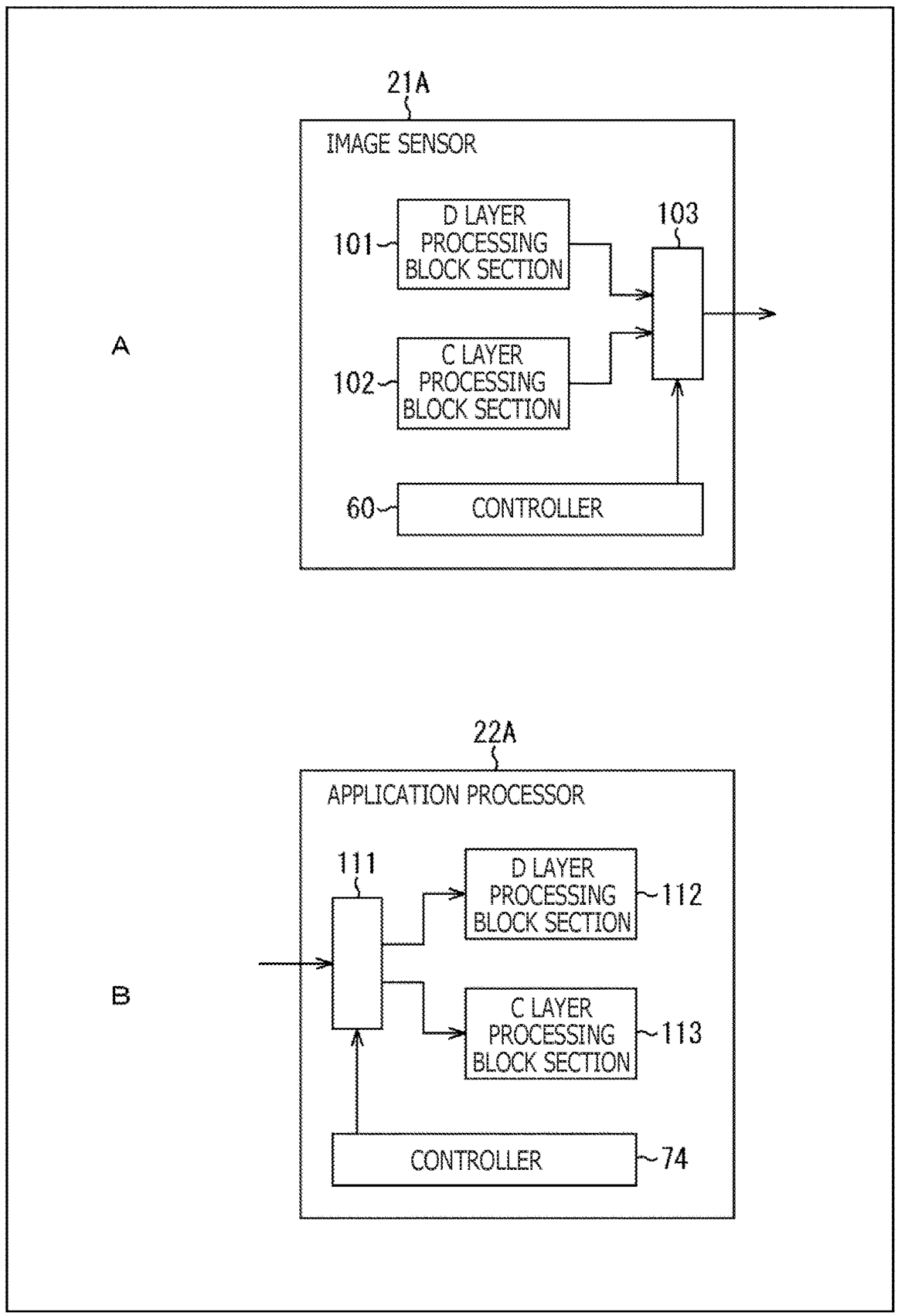
FIG. 19 illustrates block diagrams depicting modification examples of a configuration for performing switching between D-PHY and C-PHY.

An image sensor 21A depicted in A of FIG. 19 includes a D layer processing block section 101, a C layer processing block section 102, a switching section 103, and the controller 60.

The D layer processing block section 101 has blocks that perform processes dedicated to a D-PHY packet in the blocks included in the image sensor 21 in FIG. 9. The C layer processing block section 102 has blocks that perform processes dedicated to a C-PHY packet in the blocks included in the image sensor 21 in FIG. 9. Under the control by the controller 60, the switching section 103 performs switching such that a D-PHY packet generated at the D layer processing block section 101 is output in a case where D-PHY is used as the physical layer and a C-PHY packet generated at the C layer processing block section 102 is output in a case where C-PHY is used as the physical layer.

An application processor 22A depicted in B of FIG. 19 includes a switching section 111, a D layer processing block section 112, a C layer processing block section 113, and the controller 74.

Under the control by the controller 74, the switching section 111 performs switching such that a packet transmitted from the image sensor 21A is supplied to one of the D layer processing block section 112 and the C layer processing block section 113. The D layer processing block section 112 has blocks that perform processes dedicated to a D-PHY packet in the blocks included in the application processor 22 in FIG. 10. The C layer processing block section 113 has blocks that perform processes dedicated to a C-PHY packet in the blocks included in the application processor 22 in FIG. 10.

In the thus-configured image sensor 21A and application processor 22A, a physical layer to be used can be set between the controller 60 and the controller 74 before communication is started. Further, for example, in a case where D-PHY is used as the physical layer, a D-PHY packet generated at the D layer processing block section 101 is transmitted via the switching section 103, is supplied to the D layer processing block section 112 via the switching section 111, and is processed at the D layer processing block section 112. In addition, for example, in a case where C-PHY is used as the physical layer, a C-PHY packet generated at the C layer processing block section 102 is transmitted via the switching section 103, is supplied to the C layer processing block section 113 via the switching section 111, and is processed at the C layer processing block section 113.

Application Examples of Extended Packets

Application of the extended packets described above to use cases as the ones mentioned below is examined, for example.

For example, application of the extended packets to use cases in which images with higher resolution (RAW24) are transferred is examined.

For example, RAW6, RAW7, RAW8, RAW10, RAW12, RAW14, RAW16 and RAW20 are defined as data types that are stored in a packet header according to the existing CSI-2 standard when image data is transmitted in the RAW format. In contrast, in recent years, there are expectations for transfer of images with higher resolution in order to support automated driving using in-vehicle cameras. In view of this, applying an extended packet and extending the bit count of a data type, for example make it possible to define higher-resolution RAW24 as the data type of the extended packet header.

In addition, application of the extended packets to SmartROI, which is a technology of transferring only image-of-interest regions on a screen, is examined.

For example, currently, a number of cameras are installed at stadiums, airports, and the like. In a case where all images captured by the cameras are transferred from the cameras to a cloud server through a network such as the Internet, it is assumed that a deficiency of bandwidth of the Internet, an increase of the computation amount or amount of data on the cloud side, or the like occurs. Accordingly, taking out only image-of-interest regions on edges (on the camera side, and transferring the image-of-interest regions are expected to reduce a deficiency of bandwidth of the Internet, an increase of the computation amount or amount of data on the cloud side, or the like.

In a case where such data of SROI is transferred, it is necessary to transfer together upper left coordinates of rectangular regions (ROI) in order to inform the receiver side which portions on the overall screen the image-of-interest regions correspond to. In addition, it is necessary to send data regarding the entire captured screen at a predetermined timing in accordance with an order from the receiver side. Accordingly, for example, data of SROI images and the entire image (existing packet header) are mixedly present in units of frames.

In view of this, applying an extended packet, for example, makes it possible to transfer coordinate data of 16 bits or more with regard to each of an X coordinate and a Y coordinate.

Further, use cases in which the extended packets are applied to GLD in which communication is continued by reduction of the bandwidth or the number of lanes even in a case where there is a channel degradation is examined. Note that GLD is a proposal examined with respect to CSI-2 ver3.0.

For example, in automated driving, even if some of cables linked to cameras are disconnected at a time of a collision, it is required that communication be continued with use of cables that are not disconnected and that the vehicle be stopped automatically alter being pulled over to a safe zone. Accordingly, an in-vehicle camera interface needs to have at least a disconnection detection functionality, and such information as a line number (16 bits) representing the position on the screen of a line that the information corresponds to, SourceID (8 bits) representing from which camera the information has been sent from, or a message counter (16 bits) representing a transfer number is necessary. Furthermore, in a case where SROI as the one mentioned above is used in combination, it is considered that these pieces of information are transferred in units of frames.

In view of this, applying the extended packets makes it possible to transfer these pieces of information.

First Configuration Example Adapted to E2E Protection

A configuration example adapted to a rule to prohibit packet modification or the like on a transfer path is explained with reference to FIG. 20 to FIG. 26.

For example, in a case of a configuration in which different interfaces are used for the image sensor 21 and the application processor 22 in the communication system 11A with the configuration as the one explained with reference to FIG. 2 mentioned above, it is required to convert a packet on a transfer path. That is, in a case of a configuration in which the physical layer of the image sensor 21 is D-PHY and the physical layer of the application processor 22 is C-PHY, for example, it is required to convert a D-PHY packet into a C-PHY packet at the SerDes apparatus 26.

For example, a configuration in which packet conversion is undesirably performed at the SerDes apparatus 26 in such a manner violates a rule specified in ISO26262 (Functional Safety), that is, a rule to prohibit packet modification or the like on a transfer path (hereinafter, referred to as E2E (End-toEnd) protection).

Figure 20:
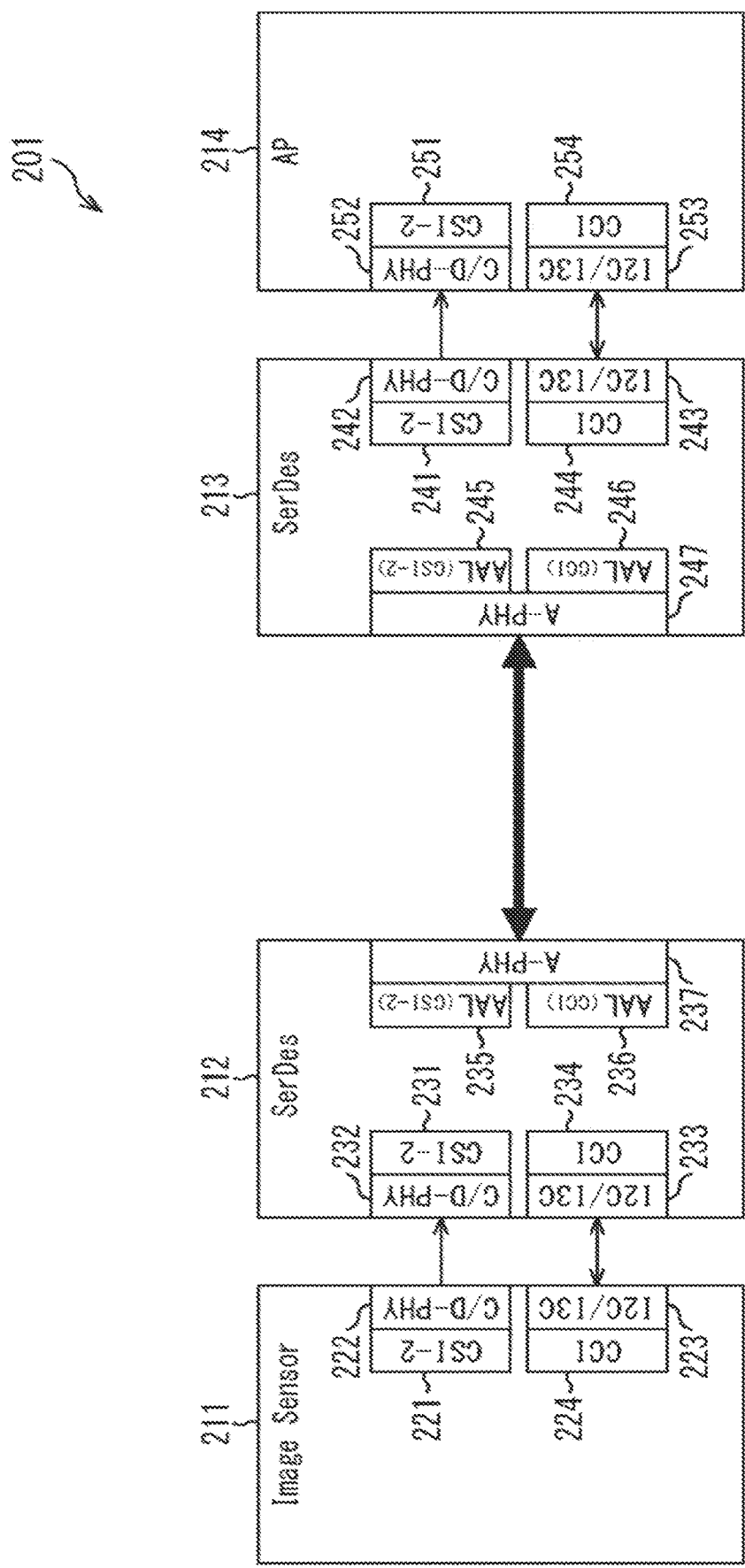
FIG. 20 is a block diagram depicting a configuration example of a communication system according to a third embodiment to which the present technology is applied.

FIG. 20 is a block diagram depicting a configuration example cit a communication system 201 adapted to E2E protection as the communication system according to a third embodiment to which the present technology is applied.

As depicted in FIG. 20, the communication system 201 includes an image sensor 211, a SerDes apparatus 212, a SerDes apparatus 213, and an application processor 214 that are connected with each other. Note that whereas SERDES is A-PHY in the case depicted as an example in FIG. 20, the same applies also to cases where connection is established with use of other SERDES standards such as FPD-LINIK3. Other than this, in the SERDES standards, communication may be performed according to the SERDES standards while the CSI-2 format (at least Application Specific payload) is maintained. In addition, in SERDES, physical layer processing sections 237 and 247 may include multiple physical layer processing sections compliant with other SERDES standards other than A-PHY, and physical layer processing sections can be switched depending on applications.

The image sensor 211 has at least an extension-mode-supporting CSI-2 transmission circuit 221, a physical layer processing section (hereinafter, referred to as a C/D-PHY physical layer processing section) 222 supporting C-PHY and/or D-PHY, a slave (hereinafter, referred to as an I2C/I3C slave) 223 supporting I2C and/or I3C, and a CCI slave 224.

The SerDes apparatus 212 has at least a CSI-2 reception circuit 231, a C/D-PHY physical layer processing section 232, an I2C/I3C master 233, a CCI master 234, a CSI-2 A-PHY packet generating section 235, a CCI A-PHY packet transmitting/receiving section 236, and the physical layer processing section 237 supporting A-PHY. For example, at the SerDes apparatus 212, a C-PHY or D-PHY packet is converted into an A-PHY packet, and this conversion is determined according to register settings or the like.

The SerDes apparatus 213 has at least a CSI-2 transmission circuit 241, a C/D-PHY physical layer processing section 242, an I2C/I3C slave 243, a CCI slave 244, a CSI-2 A-PHY packet receiving section 245, a CCI A-PHY packet transmitting/receiving section 246, and a physical layer processing section 247 supporting A-PHY. For example, at the SerDes apparatus 213, an A-PHY packet is converted into a C-PHY or D-PHY packet, and this conversion is determined according to register settings or the like.

The application processor 214 has at least an extension-mode-supporting CSI-2 reception circuit 251, a C/D-PHY physical layer processing section 252, an I2C/I3C master 253, and a CCI master 254.

The communication system 201 is configured in such a manner, and an extended packet with a structure as the one mentioned above is transmitted from the image sensor 211, and received at the application processor 214. Here, it is required that E2E protection not be violated even if the communication system 201 is configured such that the physical layer processing section 222 of the image sensor 211 supports D-PHY and the physical layer processing section 252 of the application processor 22 supports C-PHY.

In view of this, the communication system 201 limits the E2E-protection protection range to an Application Specific payload (hereinafter, referred to as an AS payload) which is a payload unique to an application, such that the communication system 201 can be adapted to E2E protection. That is, the AS payload is prohibited to be changed at a time of conversion from an A-PHY packet to a C-PHY or D-PHY packet or at a time of conversion from a C-PHY or D-PHY packet to an A-PHY packet.

FIG. 21 depicts a structure example of a D-PHY extended packet extended to support E2E protection.

As depicted in the figure, in the D-PHY extended packet, the E2E-protection protection range is limited to an AS payload including an extended packet header (ePH), packet data, and an extended packet footer (ePF).

Further, predetermined information that becomes necessary in a case where the E2E-protection protection range is limited to the AS payload is written in the extended packet header. For example, as the predetermined information written in the extended packet header, a packet count PC (Packet Count) representing the data length of data stored in the AS payload is added to enable identification of the data length of the packet data. That is, the packet data has a byte count specified by the packet count PC. In addition, a virtual channel VC (Virtual Channel) representing the number of lines of virtual channels is copied to an existing packet header as the predetermined information written in the extended packet header.

FIG. 22 depicts a structure example of a C-PHY extended packet extended to support E2E protection.

As depicted in the figure, as in the D-PHY extended packet, in the C-PHY extended packet, the E2E-protection protection range is limited to an AS payload including an extended packet header (ePH), packet data, and an extended packet footer (ePF). Then, as with the D-PHY extended packet, a packet count PC and a virtual channel VC are written in the extended packet header as predetermined information that becomes necessary in a case where the E2E-protection protection range is limited to the AS payload.

Figure 23:
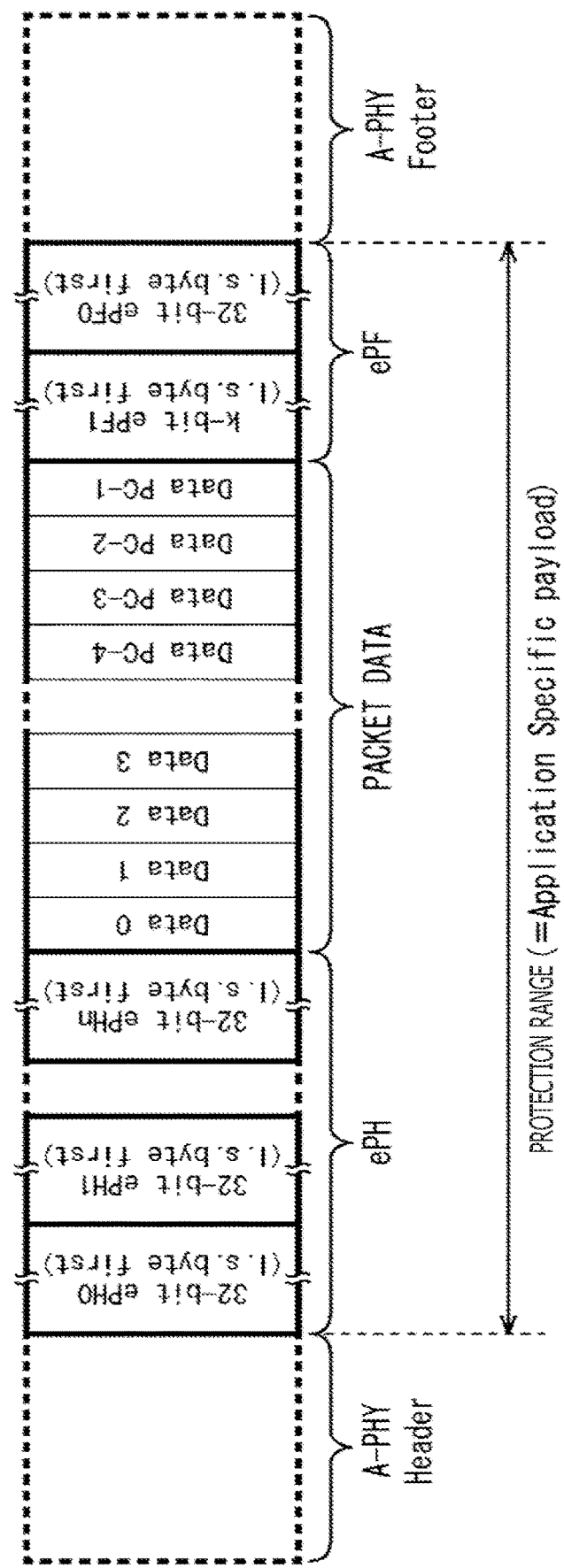
FIG. 23 is a figure depicting a structure example of an A-PHY extended packet to cope with the packet-modification prohibition rule.

FIG. 23 depicts a structure example of an A-PHY extended packet extended to support E2E protection.

As depicted in the figure, also in the A-PHY extended packet, the E2E-protection protection range is limited to an AS payload including an extended packet header (ePH), packet data, and an extended packet footer (ePF).

Here, as explained with reference to FIG. 20, in the communication system 201, an A-PHY extended packet is generated from a D-PHY or C-PHY extended packet transmitted from the image sensor 211 to the SerDes apparatus 212. Accordingly, in the extended packet header of the A-PHY extended packet, a packet count PC and a virtual channel VC are already written.

Adopting such a packet structure makes it possible for the communication system 201 to avoid modification of the AS payload on a transfer path and be compliant with E2E protection. Note that the packet structures depicted in FIG. 21 to FIG. 23 can partially replace corresponding packets having packet structures as the ones depicted in FIG. 3 to FIG. 8 and FIG. 15 to FIG. 18, and part of packet generation is replaced.

FIG. 24 is a flowchart for explaining a packet transmission/reception process adapted to E2E protection.

For example, the process is started when data (e.g., image data, etc.) to be stored in packet data is supplied to the extension-mode-supporting CSI-2 transmission circuit 221. Then, in Step S101, in the image sensor 211, the extension-mode-supporting CSI-2 transmission circuit 221 stores the supplied data in the packet data. Further, the extension-mode-supporting CSI-2 transmission circuit 221 generates an extended packet header in which a virtual channel VC and a packet count PC are written as depicted in FIG. 21 or FIG. 22 mentioned above. Then, the extension-mode-supporting CSI-2 transmission circuit 221 generates an AS payload by appending the extended packet header and also an extended packet footer to the packet data.

In Step S102, the extension-mode-supporting CSI-2 transmission circuit 221 generates a C-PHY or D-PHY extended packet by appending a C-PHY or D-PHY packet header and a C-PHY or D-PHY packet footer to the AS payload generated in Step S101. Then, the extension-mode-supporting CSI-2 transmission circuit 221 transmits the C-PHY or D-PHY extended packet to the SerDes apparatus 212 via the C/D-PHY physical layer processing section 222.

In Step S103, in the SerDes apparatus 212, the CSI-2 reception circuit 231 receives the C-PHY or D-PHY extended packet transmitted from the image sensor 211 in Step S102, via the C/D-PHY physical layer processing section 232. Then, the CSI-2 reception circuit 231 acquires the AS payload formed by excluding the packet header and the packet footer from the received extended packet, and supplies the AS payload to the CSI-2 A-PHY packet generating section 235 with no changes being made thereto.

In Step S104, in the SerDes apparatus 212, the CSI-2 A-PHY packet generating section 235 generates an A-PHY extended packet by appending an A-PHY packet header and an A-PHY packet footer to the AS payload supplied from the CSI-2 reception circuit 231. Then, the CSI-2 A-PHY packet generating section 235 transmits, to the SerDes apparatus 213, the A-PHY extended packet via the physical layer processing section 237 supporting A-PHY.

In Step S105, in the SerDes apparatus 213, the CSI-2 A-PHY packet receiving section 245 receives the A-PHY extended packet transmitted from the SerDes apparatus 212 in Step S104, via the physical layer processing section 247 supporting A-PHY. Then, the CSI-2 A-PHY packet receiving section 245 acquires the AS payload formed by exclusion of the packet header and the packet footer from the received extended packet, and supplies the AS payload to the CSI-2 transmission circuit 241 with no changes being made thereto.

In Step S106, the CSI-2 transmission circuit 241 generates a C-PHY or D-PHY extended packet by appending a C-PHY or D-PHY packet header and a C-PHY or D-PHY packet footer to the AS payload supplied from the CSI-2 A-PHY packet receiving section 245 in Step S105. Then, the CSI-2 transmission circuit 241 transmits the C-PHY or D-PHY extended packet to the application processor 214 via the C/D-PHY physical layer processing section 242.

In Step S107, in the application processor 214, the extension-mode-supporting CSI-2 reception circuit 251 receives the C-PHY or D-PHY extended packet transmitted from the SerDes apparatus 213 in Step S106, via the C/D-PHY physical layer processing section 252. Then, the extension-mode-supporting CSI-2 reception circuit 251 acquires the AS payload formed by exclusion of the packet header and the packet footer from the received extended packet, and outputs, to LSI (not depicted) on the downstream side, various types of data stored in the packet data of the AS payload. Thereafter, the packet transmission/reception process adapted to E2E protection is ended, and a similar process is performed repeatedly on the next extended packet as a to-be-transmitted/received packet.

As described above, by executing the packet transmission/reception process adapted to E2E protection, the communication system 201 can transmit and receive an extended packet without modifying the AS payload on a transfer path. At this time, for example, even in a case where the physical layer of the image sensor 211 is D-PHY and the physical layer of the application processor 214 is C-PHY, that is, even in a case where the interfaces are different, the communication system can be compliant with E2E protection.

FIG. 25 is a block diagram depicting a detailed configuration example of the image sensor 211. Note that configurations in the image sensor 211 depicted in FIG. 25 that have counterparts in the image sensor 21 in FIG. 9 are given identical reference signs, and detailed explanations thereof are omitted.

That is, similarly to the image sensor 21 in FIG. 9, the image sensor 211 includes the pixel 41, the AD converter 42, the image processing section 43, the register 47, and the controller 60. In addition, the I2C/I3C slave 223 and the CCI slave 224 included in the image sensor 211 correspond to the I2C/I3C slave 46 and the CCI slave 59 in FIG. 9.

Further, the image sensor 211 includes the extension-mode-supporting CSI-2 transmission circuit 221 and the physical layer processing section 222, and the physical layer processing section 222 supports A-PHY, C-PHY, and D-PHY.

In addition to the controller 60 and the CCI slave 224, the extension-mode-supporting CSI-2 transmission circuit 221 includes an AS payload generating section 301, a selector 302, an A-PHY packet generating section 303, a C-PHY packet generating section 304, a D-PHY packet generating section 305, and a selector 306.

The AS payload generating section 301 generates an AS payload to which the E2E-protection protection range is limited, and outputs the AS payload to the selector 302. For example, the AS payload generating section 301 has a packing section 311, an extended packet header generating section 312, and an extended packet footer generating section 313.

The packing section 311 packs image data supplied from the image processing section 43 as to-be-transmitted data, and generates packet data having a byte count specified by the packet count PC. For example, the controller 60 can control the byte count of the packet data generated by the packing section 311, according to a setting value (e.g., an image size, etc.) stored in the register 47.

For example, as explained with reference to FIG. 21 to FIG. 23, the extended packet header generating section 312 generates an extended packet header in which a packet count PC and a virtual channel VC are written, and appends the extended packet header to the packet data. The extended packet footer generating section 313 generates an extended packet footer, and appends the extended packet footer to the packet data.

Under the control by the controller 60, as the output destination of the AS payload supplied from the AS payload generating section 301, the selector 302 selects one of the A-PHY packet generating section 303, the C-PHY packet generating section 304, and the D-PHY packet generating section 305 that are provided in parallel.

The A-PHY packet generating section 303 generates an A-PHY extended packet from the AS payload supplied via the selector 302, and outputs the A-PHY extended packet to the selector 306. For example, the A-PHY packet generating section 303 has an AAL generating section 321, an A-PHY packet header generating section 322, and an A-PHY packet footer generating section 323.

For example, the AAL (A-PHY Adaptation Layer) generating section 321 splits the AS payload generated at the AS payload generating section 301 into sets of 380 bytes on a layer referred to as Adaptation Layer. Then, the A-PHY packet header generating section 322 appends an A-PHY packet header to the AS payload that has been subjected to splitting, and the A-PHY packet footer generating section 323 appends an A-PHY packet footer to the AS payload that has been subjected to splitting.

The C-PHY packet generating section 304 generates a C-PHY extended packet from the AS payload supplied via the selector 302, and outputs the C-PHY extended packet to the selector 306. For example, the C-PHY packet generating section 304 has a C-PHY packet header generating section 331, a C-PHY packet footer generating section 332 and a C-PHY lane distribution section 333.

For example, the C-PHY packet header generating section 331 appends a C-PHY packet header to the AS payload generated at the AS payload generating section 301, and the C-PHY packet footer generating section 332 appends a C-PHY packet footer to the AS payload generated at the AS payload generating section 301. Further, the C-PHY lane distribution section 333 distributes the C-PHY extended packet to three lanes according to the CSI-2 standard.

The D-PHY packet generating section 305 generates a D-PHY extended packet from the AS payload supplied via the selector 302, and outputs the D-PHY extended packet to the selector 306. For example, the D-PHY packet generating section 305 has a D-PHY packet header generating section 341, a D-PHY packet footer generating section 342, and a D-PHY lane distribution section 343.

For example, the D-PHY packet header generating section 341 appends a D-PHY packet header to the AS payload generated at the AS payload generating section 301, and the D-PHY packet footer generating section 342 appends a D-PHY packet footer to the AS payload generated at the AS payload generating section 301. Further, the D-PHY lane distribution section 343 distributes the D-PHY extended packet to four lanes according to the CSI-2 standard.

Under the control by the controller 60, as the output source of the extended packet supplied to the physical layer processing section 222, the selector 306 selects one of the A-PHY packet generating section 303, the C-PHY packet generating section 304, and the D-PHY packet generating section 305 that are provided in parallel.

Further, in a case where the A-PHY extended packet is supplied from the A-PHY packet generating section 303, the physical layer processing section 222 transmits the A-PHY extended packet through one lane. In addition, in a case where the C-PHY extended packet is supplied from the C-PHY packet generating section 304, the physical layer processing section 222 transmits the C-PHY extended packet through three lanes. Further, in a case where the D-PHY extended packet is supplied from the D-PHY packet generating section 305, the physical layer processing section 222 transmits the D-PHY extended packet through four lanes.

In the thus-configured image sensor 211, the extension-mode-supporting CSI-2 transmission circuit 221 is configured such that the AS payload generating section 301 is connected to the A-PHY packet generating section 303, the C-PHY packet generating section 304 and the D-PHY packet generating section 305 via the selector 302. As a result, in the image sensor 211, the one AS payload generating section 301 can generate an AS payload which is common to an A-PHY extended packet, a C-PHY extended packet, and a D-PHY extended packet. That is, the A-PHY packet generating section 303, the C-PHY packet generating section 304, and the D-PHY packet generating section 305 can share the AS payload generating section 301, thereby making it possible to seek reduced circuit scale. Accordingly, a size reduction of the image sensor 211 can be realized.

FIG. 26 is a block diagram depicting a detailed configuration example of the application processor 214. Note that configurations in the application processor 214 depicted in FIG. 26 that have counterparts in the application processor 22 in FIG. 10 are given identical reference signs, and detailed explanations thereof are omitted.

That is, similarly to the application processor 22 in FIG. 10, the application processor 214 includes the register 73 and the controller 74. Note that the controller 74 may be realize by software. In addition, the I2C/I3C master 253 and CCI master 254 included in the application processor 214 correspond to the I2C/I3C master 72 and CCI master 88 in FIG. 10, respectively.

Further, the application processor 214 includes the extension-mode-supporting CSI-2 reception circuit 251 and the physical layer processing section 252, and the physical layer processing section 252 supports A-PHY, C-PHY, and D-PHY.

In addition to the CCI master 254, the extension-mode-supporting CSI-2 reception circuit 251 includes a selector 401, an A-PHY packet receiving section 402, a C-PHY packet receiving section 403, a D-PHY packet receiving section 404, a selector 405, and an AS payload receiving section 406.

As the output destination of an extended packet supplied from the physical layer processing section 252, the selector 401 selects one of the A-PHY packet receiving section 402, the C-PHY packet receiving section 403, and the D-PHY packet receiving section 404 that are provided in parallel.

The A-PHY packet receiving section 402 receives an A-PHY extended packet supplied via the selector 401, and outputs the A-PHY extended packet to the selector 405. For example, the A-PHY packet receiving section 402 has an A-PHY packet header interpreting section 411, an A-PHY packet footer verifying section 412, and an AAL processing section 413.

For example, the A-PHY packet header interpreting section 411 interprets the content written in the A-PHY packet header, and performs a process necessary for reception of the A-PHY extended packet, and the A-PHY packet footer verifying section 412 verifies whether or not there is an error by using the A-PHY packet footer. Further, the AAL processing section 413 performs a process of merging Adaptation Layer on which splitting has been performed at the AAL generating section 321 in FIG. 25.

The C-PHY packet receiving section 403 receives a C-PHY extended packet supplied via the selector 401, and outputs the C-PHY extended packet to the selector 405. For example, the C-PHY packet receiving section 403 has a C-PHY lane merging section 421, a C-PHY packet header interpreting section 422, and a C-PHY packet footer verifying section 423.

For example, the C-PHY lane merging section 421 merges C-PHY extended packets supplied via the physical layer processing section 252 after being distributed to three lanes according to the CSI-2 standard. Further, the C-PHY packet header interpreting section 422 interprets the content written in the C-PHY packet header, and performs a process necessary for reception of the C-PHY extended packet, and the C-PHY packet footer verifying section 423 verifies whether or not there is an error by using the C-PHY packet footer.

The D-PHY packet receiving section 404 receives a D-PHY extended packet supplied via the selector 401, and outputs the D-PHY extended packet to the selector 405. For example, the D-PHY packet receiving section 404 has a D-PHY lane merging section 431, a D-PHY packet header interpreting section 432, and a D-PHY packet footer verifying section 433.

For example, the D-PHY lane merging section 431 merges D-PHY extended packets supplied via the physical layer processing section 252 after being distributed to four lanes in accordance with the CSI-2 standard. Further, the D-PHY packet header interpreting section 432 interprets the content written in the D-PHY packet header, and performs a process necessary for reception of the D-PHY extended packet, and the D-PHY packet footer verifying section 433 verifies whether or not there is an error by using the D-PHY packet footer.

As the output source of an extended packet supplied to the AS payload receiving section. 406, the selector 405 selects one of the A-PHY packet receiving section 402, the C-PHY packet receiving section 403, and the D-PHY packet receiving section 404 that are provided in parallel.

Corresponding to the AS payload generating section 301 in FIG. 25, the AS payload receiving section 406 has an unpacking section 441, an extended packet header interpreting section 442, and an extended packet footer verifying section 443. The unpacking section 441 unpacks image data packed by the packing section 311. The extended packet header interpreting section 442 interprets an extended packet header generated at the extended packet header generating section 312, and reads out a packet count PC and a virtual channel VC, for example. The extended packet footer verifying section 443 verifies whether or not there is an error by using an extended packet footer appended by the extended packet footer generating section 313. Further, the AS payload receiving section 406 outputs, to LSI (not depicted) on the downstream side, various types of data stored in packet data supplied via the selector 405, for example image data, an in-vehicle line number, SourceID, and the like, as well as a CRC error and the like.

In the thus-configured application processor 214, the extension-mode-supporting CSI-2 reception circuit 251 is configured such that the AS payload receiving section 406 is connected to the A-PHY packet receiving section 402, the C-PHY packet receiving section 403, and the D-PHY packet receiving section 404 via the selector 405. As a result, in the application processor 214, the one AS payload receiving section 406 can receive an AS payload which is common to an A-PHY extended packet, a C-PHY extended packet, and a D-PHY extended packet. That is, the A-PHY packet receiving section 402, the C-PHY packet receiving section 403, and the D-PHY packet receiving section 404 can share the AS payload receiving section 406, thereby making it possible to seek reduced circuit scale. Accordingly, a size reduction of the application processor 214 can be realized.

Second Configuration Example Adapted to E2E Protection

A second configuration example adapted to E2E Protection is explained with reference to FIG. 27 to FIG. 74.

Configuration Example of A-PHY Direct-Link Configuration

A communication system 501 depicted in FIG. 27 has direct-link configuration in which an image sensor 511 and an application processor 512 are directly connected by A-PHY (not via a SerDes apparatus as the one explained with reference to FIG. 40 described later).

The image sensor 511 includes an A-PHY processing section 521, a CSIA processing section 522, a CSI2 processing section 523, a CSI2-FS processing section 524, a CCI processing section 525, a CCI-FS processing section 526, and a register 527.

The CCI processing section 525 is implemented as an upper layer of the A-PHY processing section 521, and the A-PHY processing section 521 is MIPI-A-PHY-connected with an A-PHY processing section 531 of the application processor 512, and transmits and receives data including an extended packet header ePH and an extended packet footer ePF.

For example, the CCI-FS processing section 526 compares a Destination ID included in the extended packet header ePH and an ID (Source ID) of the image sensor 511, and assesses whether or not it is access to the image sensor 511.

The application processor 512 includes the A-PHY processing section 531, a CSIA processing section 532, a CSI2 processing section 533, a CSI2-FS processing section 534, a CCI processing section 535, a CCI-FS processing section 536, a register 537, and a CCI-FS switch 538.

The CCI processing section 535 is implemented as an upper layer of the A-PHY processing section 531, and the A-PHY processing section 531 is MIPI-A-PHY-connected with the A-PHY processing section 521 of the image sensor 511, and transmits and receives data including an extended packet header ePH and an extended packet footer ePF.

For example, the CCI-FS processing section 536 compares a Destination ID included in the extended packet header ePH and an ID (Source ID) of the application processor 512, and assesses whether or not it is access to the application processor 512.

The CCI-FS switch 538 performs switching such that data is transmitted and received via the CCI-FS processing section 536 in a case where the CCI-FS processing section 536 is enabled and data is transmitted and received not via the CCI-FS processing section 536 in a case where the CCI-FS processing section 536 is disabled.

Transfer of a read command and read data in the communication system 501 is explained with reference to FIG. 28 to FIG. 32.

FIG. 28 depicts an example of a packet configuration of a read command generated at the CCI-FS processing section 536 of the application processor 512 at a time of read access.

As depicted in FIG. 28, the read command includes an extended packet header ePH* (*=n), an AP (CCI) payload, an extended packet footer ePF1, and an extended packet footer ePF0.

The extended packet header ePH* (*=n) includes extended packet headers ePH0 to ePH3 as depicted in the figure.

An extended VC, an extended DT, an extended PFEN, and an extended PHEN are stored in the extended packet header ePH0. For example, the extended DT is information representing the CCI protocol (I2C), and a routing process is performed with use of the extended DT.

A Source ID[7:1] and a Packet Length are stored in the extended packet header ePH1. For example, the Source ID is information representing the transmission source of the CCI protocol (I2C), and a response process is performed according to the Source ID. The Packet Length is information representing a data length.

A Security Descriptor and a Message Counter are stored in the extended packet header ePH2. The Security Descriptor represents whether or not security is to be used, and represents "8'h0" in a case where security is not to be used. The Message Counter is information representing a bucket order, represents a message count value, and represents "16'h5" when the message is the fifth message.

A Destination ID[7:1], a Read/Write, and a Destination Address are stored in the extended packet header ePH3. The Destination ID[7:1] represents a slave address of the CCI processing section 525 of the image sensor 511, and is "7'h0D" in the example depicted in the figure. For example, the Destination ID is information representing a transmission destination of the CCI protocol (I2C), routing is performed according to the Destination ID, and also reference to a communication path is performed. The Read/Write represents data read or write, and represents "1'b1" in a case of read. The Destination Address represents an address of the register 527 of the image sensor 511 which is the final destination, and is "0x0200" in the example depicted in the figure.

For example, various types of data (Data0[7:0]) are stored in the AP (CCI) payload. The AP (CCI) payload may not be transmitted when security is turned off, and may be transmitted with dummy data being stored therein when security is turned on.

The extended packet footer ePF1 is not transmitted when security is turned off.

A CRC computed value is stored in the extended packet footer ePF0.

In the application processor 512, a read command with such a packet structure is generated at the CCI-FS processing section 536, and supplied to the A-PHY processing section 531.

Figure 29:
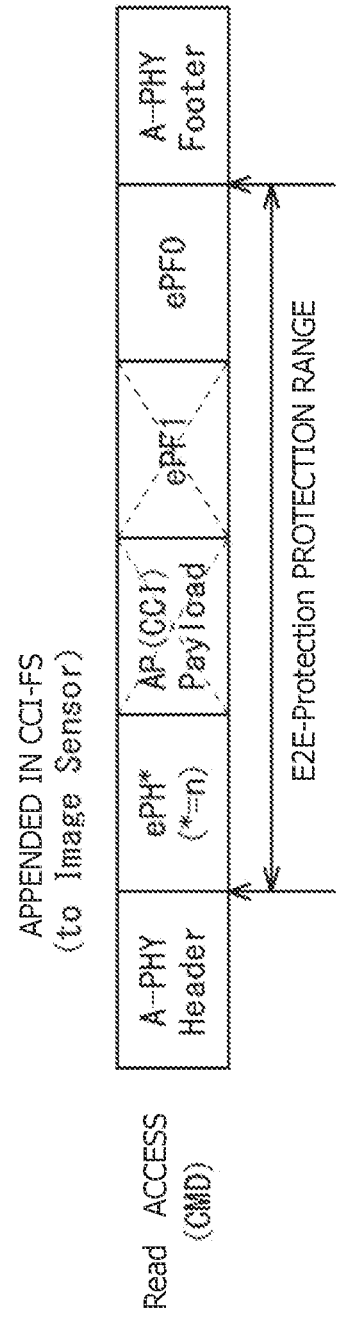
FIG. 29 is a figure depicting an example of a packet configuration of a read command to be A-PHY-transferred.

FIG. 29 depicts an example of a packet configuration of a read command output from the A-PHY processing section 531 of the application processor 512 at a time of read access.

As depicted in FIG. 29, the A-PHY processing section 531 appends an A-PHY header and an A-PHY footer by treating a read command supplied from the CCI-FS processing section 536, as falling within the E2E-Protection protection range.

A read command with such a packet structure is A-PHY-transferred by the A-PHY processing section 531 of the application processor 512. Further, in the image sensor 511, the A-PHY processing section 521 removes the A-PHY header and the A-PHY footer from the read command. Thereafter, the read command is supplied to the CCI-FS processing section 526 via the CCI processing section 525 at the slave address "7'h0D" represented by the Destination ID.

Figure 30:
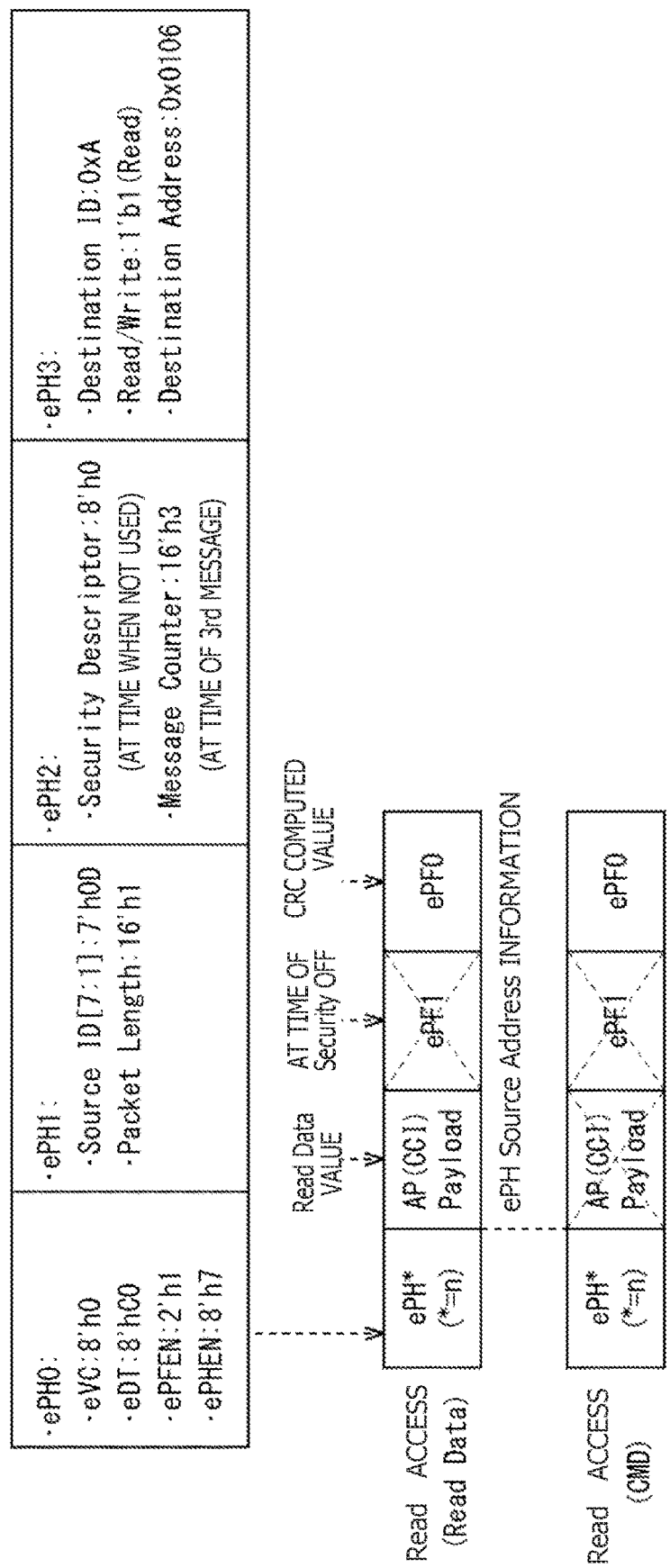
FIG. 30 is a figure depicting an example of a packet configuration of an image-sensor-side read command and read data.

FIG. 30 depicts an example of packet structures of a read command supplied to the CCI-FS processing section 526 and read data generated at the CCI-FS processing section 526, at a time of read access.

As depicted in FIG. 30, a read command whose packet structure is kept unchanged from the packet structure depicted in FIG. 28, that is, a read command treated as falling within the E2E-Protection protection range in A-PHY transfer, is supplied to the CCI-FS processing section 526.

As depicted in the figure, the read data includes an extended packet header ePH* (*=n), an AP (CCI) payload, an extended packet footer ePF1 and an extended packet footer ePF0. Further, a read data value read out from the address "0x0200" of the register 527 represented by source address information (Destination Address) of the extended packet header ePH of the read command is stored in the AP (CCI) payload.

In the image sensor 511, read data with such a packet structure is generated at the CCI-FS processing section 526, and supplied to the A-PHY processing section 521.

Figure 31:
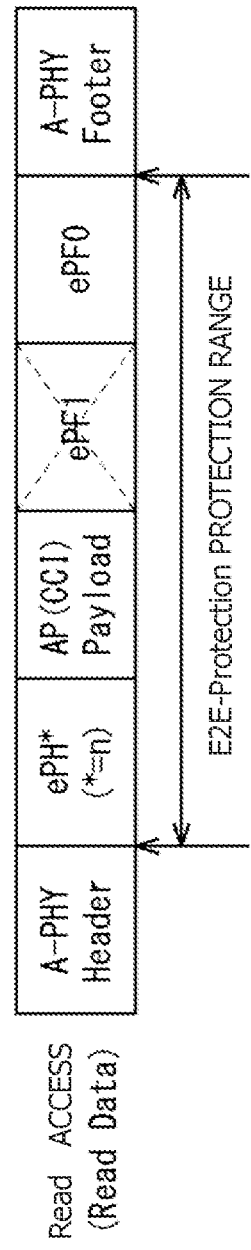
FIG. 31 is a figure depicting an example of a packet configuration of read data to be A-PHY-transferred.

FIG. 31 depicts an example of a packet configuration of read data output from the A-PHY processing section 521 of the image sensor 511 at a time of read access.

As depicted in FIG. 31, the A-PHY processing section 521 appends an A-PHY header and an A-PHY footer by treating read data supplied from the CCI-FS processing section 526, as failing within the E2E-Protection protection range.

Read data with such a packet structure is A-PHY-transferred by the A-PHY processing section 521 of the image sensor 511. Further, in the application processor 512, the A-PHY processing section 531 removes the A-PHY header and the A-PHY footer from the read data, and the read data is supplied to the CCI-FS processing section 536.

Figure 32:
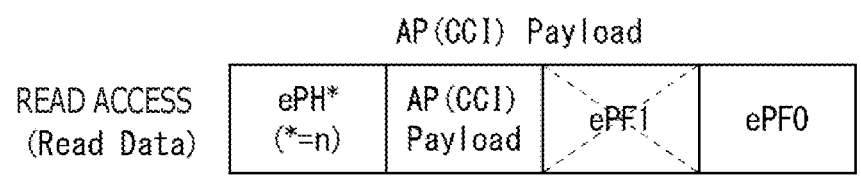
FIG. 32 is a figure depicting an example of a packet configuration of read data acquired on the application-processor side.

FIG. 32 depicts an example of a packet structure of read data supplied to the CCI-FS processing section 536 at a time of read access.

As depicted in FIG. 32, read data whose packet structure is kept unchanged from the packet structure depicted in FIG.

30, that is, read data treated as falling within the E2E-Protection protection range in A-PHY transfer, is supplied to the CCI-FS processing section 536.

Transfer of write data in the communication system 501 is explained with reference to FIG. 33 to FIG. 35. Note that it is supposed in the following explanation that access is performed in a state in which the CCI-FS processing section 526 on the image-sensor-511 side is enabled.

FIG. 33 depicts an example of a packet configuration of write data generated at the CCI-FS processing section 536 of the application processor 512 at a time of write access.

As depicted in FIG. 33, the write data includes an extended packet header ePH* (*=n), an AP (CCI) payload (write data), an extended packet footer ePF1, and an extended packet footer ePF0.

The extended packet header ePH* (*=n) includes extended packet headers ePH0 to ePH3 as depicted in the figure.

An extended VC, an extended DT, an extended PFEN, and an extended PHEN are stored in the extended packet header ePH0.

A Source ID[7:1] and a Packet Length are stored in the extended packet header ePH1.

A Security Descriptor and a Message Counter are stored in the extended packet header ePH2. The Security Descriptor represents whether or not security is to be used, and represents "8'h0" in a case where security is not to be used. The Message Counter represents a message count value, and represents "16'h4" when the message is the fourth message.

A Destination ID[7:1], a Read/Write, and a Destination Address are stored in the extended packet header ePH3. The Destination ID[7:1] represents a slave address of the CCI processing section 525 of the image sensor 511, and is "7'h0D" is the example depicted in the figure. The Read/Write represents data read or write, and represents "1'b0" in a case of write. The Destination Address represents an address of the register 527 of the image sensor 511 which is the final destination, and is "0x1234" in the example depicted in the figure.

Data (Data0[7:0]) to be written in the image sensor 511 is stored in the AP (CCI) payload, and a 0xFF value is write data.

The extended packet footer ePF1 is not transmitted when security is turned off.

A CRC computed value is stored in the extended packet footer ePF0.

In the application processor 512, write data with such a packet structure is generated at the CCI-FS processing section 536, and supplied to the A-PHY processing section 531.

Figure 34:
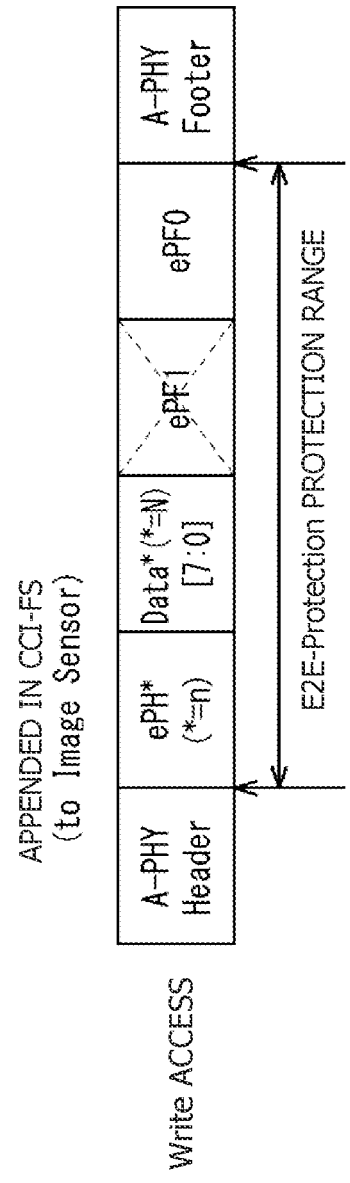
FIG. 34 is a figure depicting an example of a packet configuration of write data to be A-PHY-transferred.

FIG. 34 depicts an example of a packet configuration of write data output from the A-PHY processing section 531 of the application processor 512 at a time of write access.

As depicted in FIG. 34, the A-PHY processing section 531 appends an A-PHY header and an A-PHY footer by treating write data supplied from the CCI-FS processing section 536, as failing within the E2E-Protection protection range.

Write data with such a packet structure is A-PHY-transferred by the A-PHY processing section 531 of the application processor 512. Further, in the image sensor 511, the A-PHY processing section 521 removes the A-PHY header and the A-PHY footer from the write data. Thereafter, the write data is supplied to the CCI-FS processing section 526 via the CCI processing section 525 at the slave address "7'h0D" represented by the Destination ID.

Figure 35:
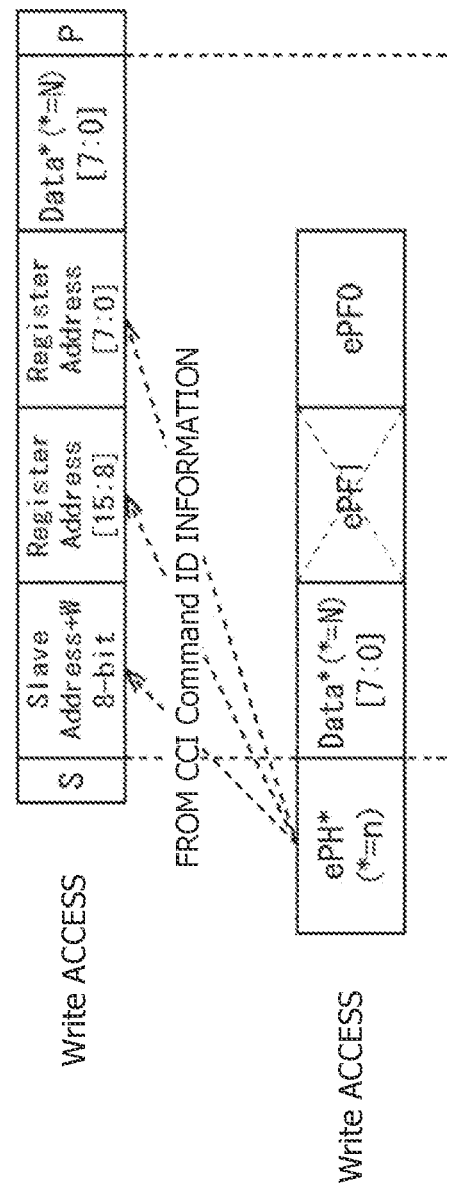
FIG. 35 is a figure depicting an example of a packet configuration of write data acquired on the image-sensor side.

FIG. 35 depicts an example of a packet structure of write data supplied to the CCI-FS processing section 526 at a time of write access.

As depicted in FIG. 35, write data whose packet structure is kept unchanged from the packet structure depicted in FIG. 33, that is, write data treated as falling within the E2E-Protection protection range in A-PHY transfer, is supplied to the CCI-FS processing section 526. Then, the CCI-FS processing section 526 writes data stored in an AP (CCI) payload, by using an address "0x1234" of the register 527 represented by CCI command ID information, that is, source address information (Destination Address) of the extended packet header ePH of a read command.

An overview of an extended packet, header ePH and an extended packet footer ePF is explained with reference to FIG. 36.

Figure 36:
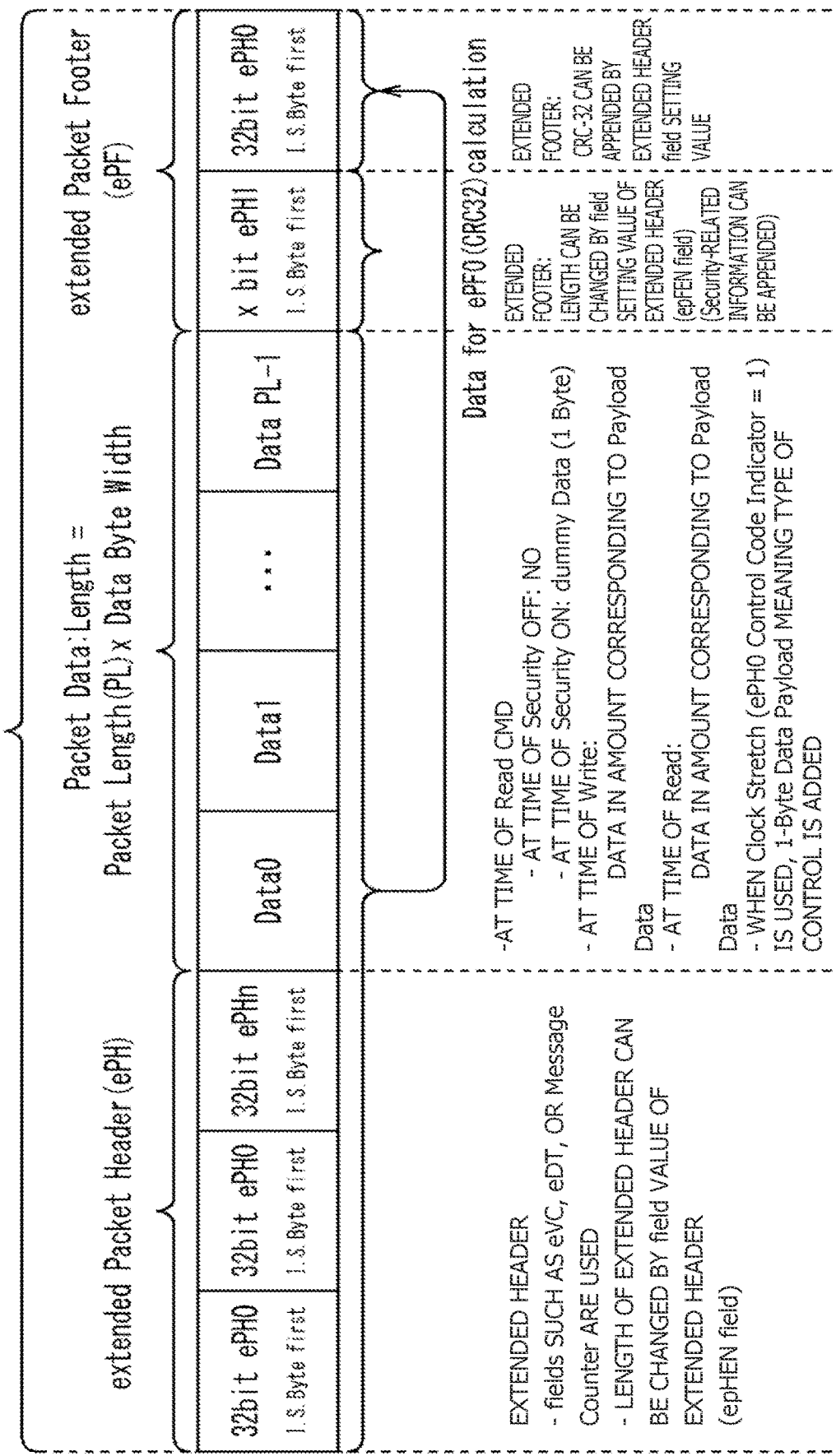
FIG. 36 is a figure for explaining an overview of an extended packet header ePH and an extended packet footer ePF.

As depicted in FIG. 36, a CCI-FS E2E packet includes an extended packet header ePH, packet data, and an extended packet footer ePF, and its packet length is Length=Byte Count×Data Byte width.

The extended packet header ePH uses such fields as an extended VC, an extended DT, or a Message Counter. The length of the extended packet header ePH can be changed by a field value (epFEN field) of the extended packet header ePH.

For example, the packet data includes PL pieces of data (Data 0 to Data PL−1), and its length is Length=Packet Length (PL)×Data Byte Width. In a case of a read command, in the packet data, data is not stored when security is turned off, and one-byte dummy data is stored when security is turned on. In a case of write access, in the packet data, write data is stored in an amount corresponding to the payload data. In a case of read access, in the packet data, read data is stored in an amount corresponding to the payload data. The packet data is given a one-byte data payload meaning the type of control, when Clock Stretch (ePH0 Control Code Indicator=1) is used.

The length of the extended packet footer ePF1 can be changed by a field setting value (epFEN field) of the extended packet header ePH. In addition, security-related information can be appended.

CRC-32 computed from the packet data can be appended to the extended packet footer ePF0 by using the field setting value of the extended packet header ePH.

Process Example of Communication Process

Figure 27:
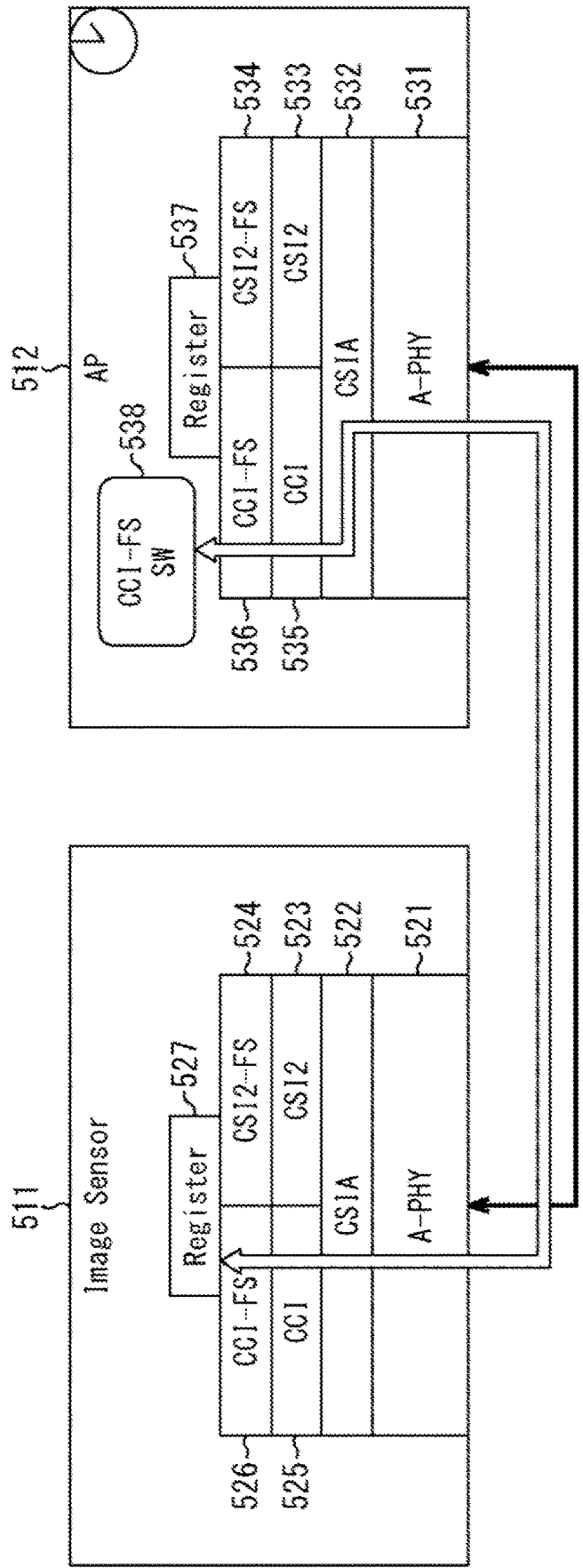
FIG. 27 is a block diagram depicting a configuration example of a communion system with direct-link configuration of an image sensor and an application processor.

A communication process using CCI-FS performed in the communication system 501 depicted in FIG. 27 is explained with reference to flowcharts in FIG. 37 to FIG. 39.

Figure 37:
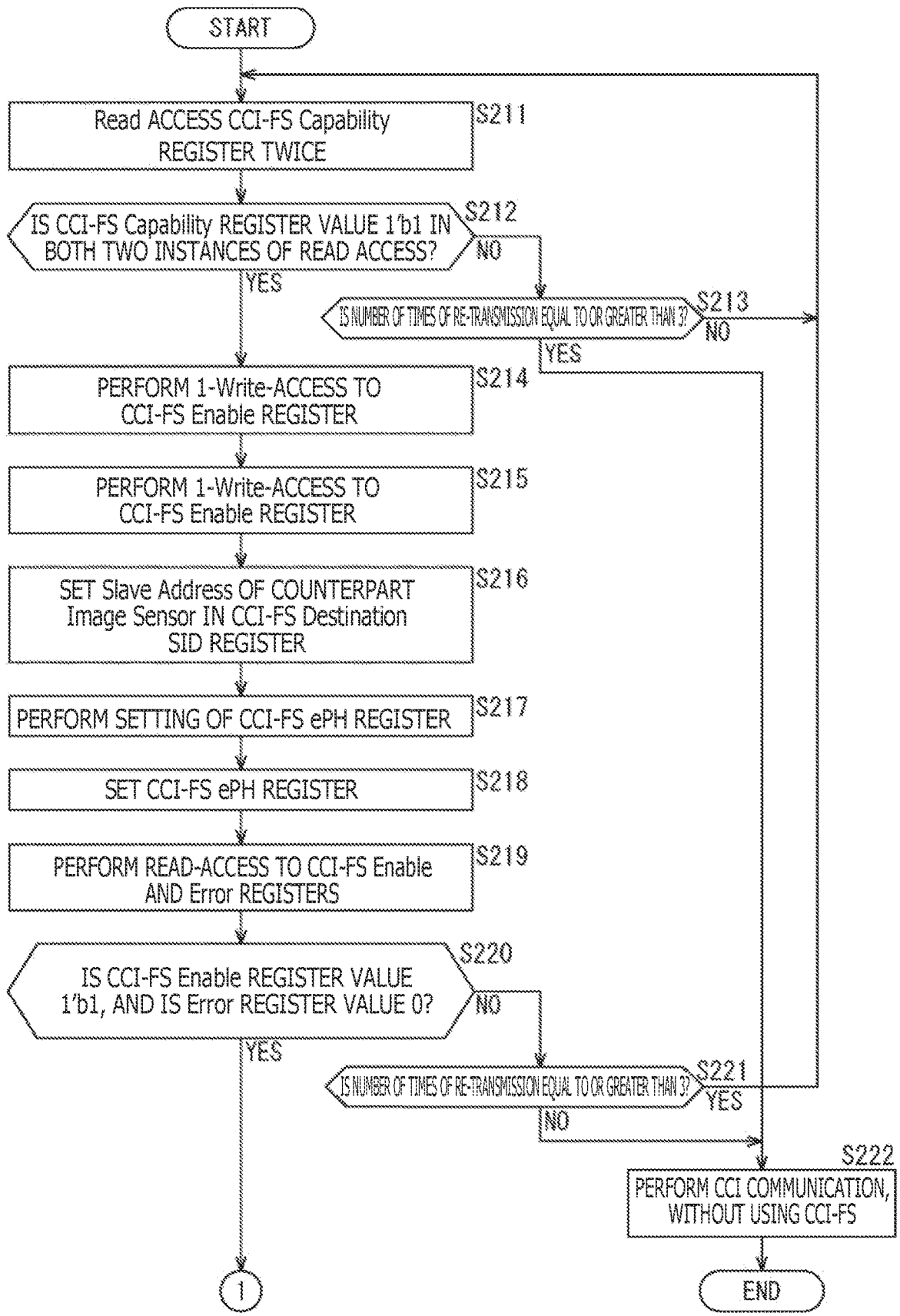
FIG. 37 is a flowchart for explaining an initial setting and a checking operation of a communication process using CCI-FS.

As depicted in FIG. 37, in Steps S211 to S222, initial setting and a checking operation are performed.

In Step S211, read access to a Capability register of the CCI-FS processing section 526 is performed twice from the application processor 512 to the image sensor 511. Note that the number of times of read access is not limited to two, and, for example, can be set to any number in terms of functional safety, and may be one or may be equal to or greater than three.

In Step S212, in the application processor 512, the CSI2-FS processing section 524 determines whether or not the Capability register value of the CCI-FS processing section 526 is 1'b1 as a result of both the two instances of the read access in Step S211. In a case where it is determined in Step S212 that the Capability register value of the CCI-FS processing section 526 is not 1'b1 as a result of both the two instances, the process proceeds to Step S213.

In Step S213, in the application processor 512, the CSI2-FS processing section 524 determines whether or not the number of times of re-transmission is equal to or greater than three. Note that the number of times of re-transmission is not limited to three, and can be set to any number. The same applies also to the number of times of re-transmission explained below. In a case where it is determined in Step S213 that the number of times of re-transmission is not equal to or greater than three (is one or two), the process returns to Step S211, and a similar process is performed repeatedly thereafter.

On the other hand, in a case where it is determined in Step S212 that the Capability register value of the CCI-FS processing section 526 is 1'b1 in both the two instances, the process proceeds to 214.

In Step S214, 1-write access to an Enable register of the CCI-FS processing section 526 is performed from the application processor 512 to the image sensor 511.

In Step S215, in the image sensor 511, the CCI-FS processing section 526 performs 1-write access to the Enable register of the CCI-FS processing section 536 of the application processor 512.

In Step S216, a slave address of the counterpart image sensor 511 is set in a Destination SID register of the CCI-FS processing section 536 of the application processor 512.

In Step S217, setting of an ePH register of the CCI-FS processing section 536 of the application processor 512 is performed.

In Step S218, setting of an ePH register of the CCI-FS processing section 526 is performed from the application processor 512 to the image sensor 511.

In Step S219, read access to the Enable register and an Error register of the CCI-FS processing section 526 is performed from the application processor 512 to the image sensor 511.

In Step S220, in the application processor 512, the CCI-FS processing section 536 determines whether or not the Enable register value of the CCI-FS processing section 526 is 1'b1 and the Error register value of the CCI-FS processing section 526 is 0 as a result of the read access in Step S219.

In a case where it is determined in Step S220 that the Enable register value of the CCI-FS processing section 526 is not 1'b1 or the Error register value of the CCI-FS processing section 526 is not 0, the process proceeds to Step S221.

In Step S221, in the application processor 512, the CSI2-FS processing section 524 determines whether or not the number of times of re-transmission is equal to or greater than three. In a case where it is determined in Step S221 that the number of times of re-transmission is equal to or greater than three, the process returns to Step S211, and a similar process is performed repeatedly thereafter.

On the other hand, in a case where it is determined in Step S213 that the number of times of re-transmission is equal to or greater than three or in a case where it is determined in Step S221 that the number of times of re-transmission is not equal to or greater than three (is one or two), the process proceeds to Step S222.

In Step S222, CCI communication is performed without using CCI-FS, and thereafter the communication process is ended.

On the other hand, in a case where it is determined in Step S220 that the Enable register value of the CCI-FS processing section 526 is 1'b1 and the Error register value of the CCI-FS processing section 526 is 0, the process proceeds to Step S223.

Figure 38:
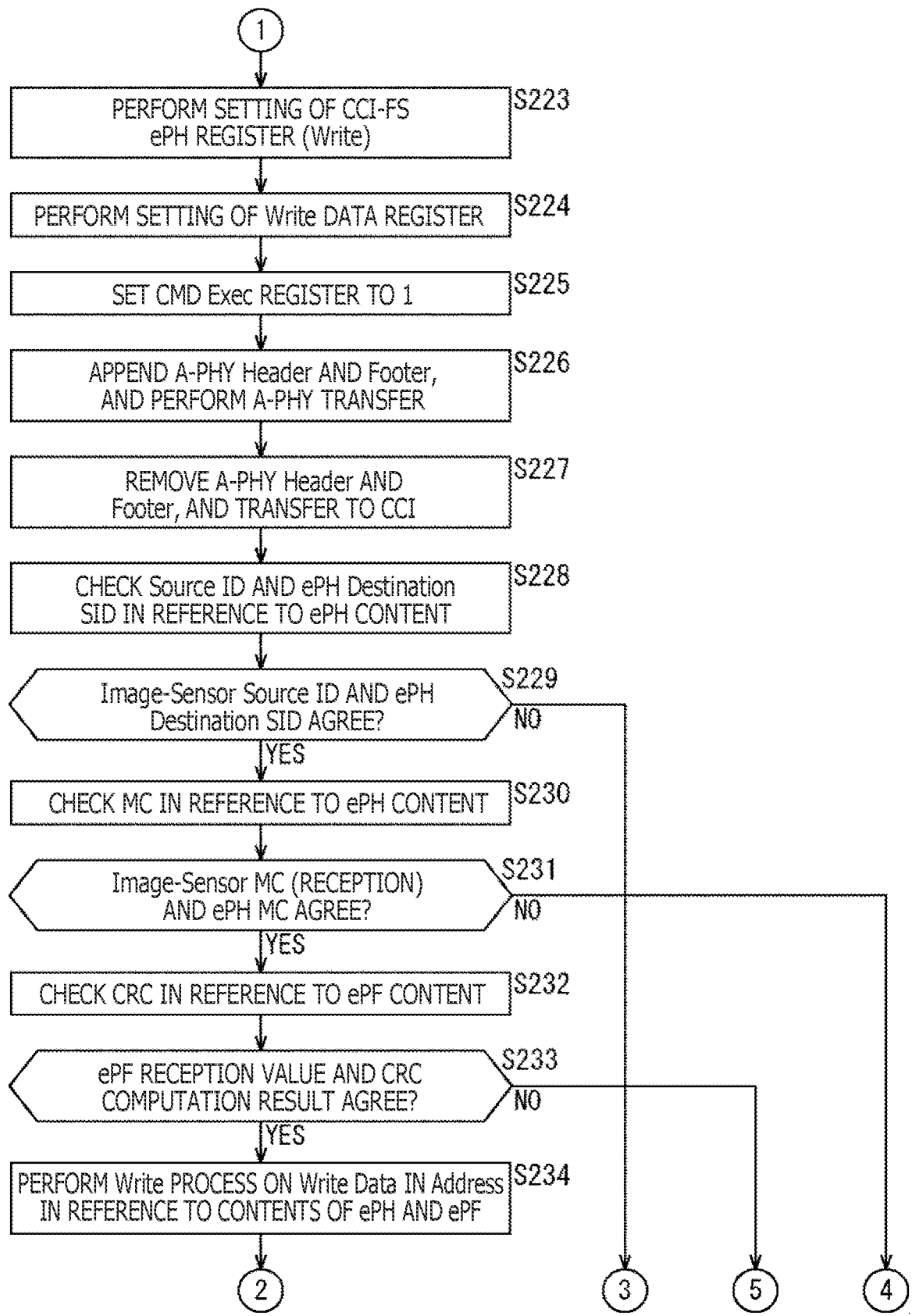
FIG. 38 is a flowchart for explaining a write operation using CCI-FS.

As depicted in FIG. 38, in Steps S223 to S234, a write operation using CCI-FS is performed.

In Step S223, the CCI-FS processing section 536 of the application processor 512 performs setting of the ePH register such that a write operation is performed.

In Step S224, the CCI-FS processing section 536 of the application processor 512 performs setting of a write data register.

In Step S225, the CCI-FS processing section 536 of the application processor 512 sets a command execution register to 1.

In Step S226, in the application processor 512, as depicted in FIG. 34 mentioned above, the A-PHY processing section 531 appends an A-PHY header and an A-PHY footer by treating write data generated by the CCI-FS processing section 536, as falling within the E2E-Protection protection range, and A-PHY-transfers them.

In Step S227, in the image sensor 511, the A-PHY processing section 521 removes the A-PHY header and the A-PHY footer from the write data, and supplies the E2E-Protection protection range to the CCI-FS processing section 526.

In Step S228, in the image sensor 511, the CCI-FS processing section 526 checks a Source ID of the image sensor 511 and a Destination SID of the extended packet header ePH in reference to the content of the extended packet header ePH.

In Step S229, in the image sensor 511, the CCI-FS processing section 526 determines whether or not the Source ID of the image sensor 511 and the Destination SID of the extended packet header ePH that are checked in Step S228 agree.

In a case where it is determined in Step S229 that the Source ID of the image sensor 511 and the Destination SID of the extended packet header ePH agree, the process proceeds to Step S230.

In Step S230, in the image sensor 511, the CCI-FS processing section 526 checks the Message Counter in reference to the content of the extended packet header ePH.

In Step S231, in the image sensor 511, the CCI-FS processing section 526 determines whether or not the Message Counter (reception) of the image sensor 511 and the Message Counter of the extended packet header ePH that are checked in Step S230 agree.

In a case where it is determined in Step S231 that the Message Counter (reception) of the image sensor 511 and the Message Counter of the extended packet header ePH agree, the process proceeds to Step S232.

In Step S232, in the image sensor 511, the CCI-FS processing section 526 checks a CRC in reference to the content of the extended packet footer ePF.

In Step S233, in the image sensor 511, the CCI-FS processing section 526 determines whether or not a reception value (ePF0) of the extended packet footer ePF checked in Step S232 and a CRC computation result computed at the CCI-FS processing section 526 agree.

In a case where it is determined is Step S233 that the reception value (ePF0) of the extended packet footer ePF and the CRC computation result agree, the process proceeds to Step S234.

In Step S234, in the image sensor 511, the CCI-FS processing section 526 performs a write process of writing write data in an address of the register 527 in reference to contents of the extended packet header ePH and the extended packet footer ePF. Thereafter, the process proceeds to Step S235.

Figure 39:
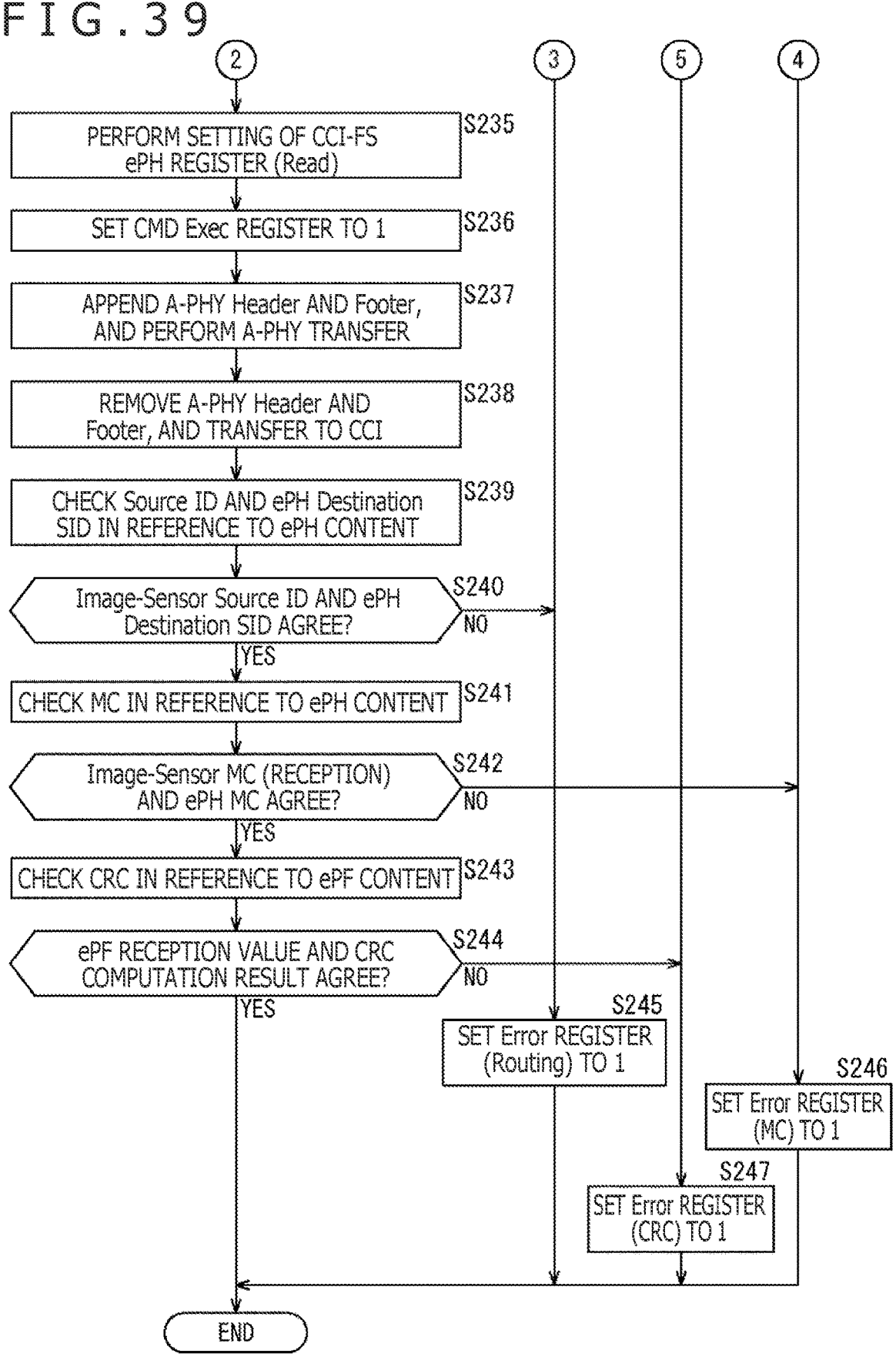
FIG. 39 is a flowchart for explaining a read operation using CCI-FS.

As depicted in FIG. 39, a read operation using CCI-FS is performed in Steps S235 to S247.

In Step S235, in the application processor 512, the CCI-FS processing section 536 performs setting of the ePH register such that a read operation is performed.

In Step S236, in the application processor 512, the CCI-FS processing section 536 sets a command execution register to 1.

In Step S237, in the application processor 512, as depicted in FIG. 29 mentioned above, the A-PHY processing section 531 appends an A-PHY header and an A-PHY footer by treating write data generated by the CCI-FS processing section 536, as falling within the E2E-Protection protection range, and A-PHY-transfers them.

In Step S238, in the image sensor 511, the A-PHY processing section 521 removes the A-PHY header and the A-PHY footer from the write data, and supplies the E2E-Protection protection range to the CCI-FS processing section 526.

In Step S239, in the image sensor 511, the CCI-FS processing section 526 checks a Source ID of the image sensor 511 and a Destination SID of the extended packet header ePH in reference to the content of the extended packet header ePH.

In Step S240, in the image sensor 511, the CCI-FS processing section 526 determines whether or not the Source ID of the image sensor 511 and the Destination SID of the extended packet header ePH that are checked in Step S239 agree.

In a case where it is determined in Step S240 that the Source ID of the image sensor 511 and the Destination SID of the extended packet header ePH agree, the process proceeds to Step S241.

In Step S241, in the image sensor 511, the CCI-FS processing section 526 checks the Message Counter is reference to the content of the extended packet header ePH.

In Step S242, in the image sensor 511, the CCI-FS processing section 526 determines whether or not the Message Counter (reception) of the image sensor 511 and the Message Counter of the extended packet header ePH that are checked in Step S241 agree.

In a case where it is determined in Step S242 that the Message Counter (reception) of the image sensor 511 and the Message Counter of the extended packet header ePH agree, the process proceeds to Step S243.

In Step S243, in the image sensor 511, the CCI-FS processing section 526 checks a CRC in reference to the content of the extended packet footer ePF.

In Step S244, in the image sensor 511, the CCI-FS processing section 526 determines whether or not a reception value (ePF0) of the extended packet footer ePF checked in Step S243 and a CRC computation result computed at the CCI-FS processing section 526 agree.

In a case where it is determined in Step S244 that the reception value (ePF0) of the extended packet footer ePF and the CRC computation result agree, the process is ended.

On the other hand, in a case where it is determined in Step S229 in FIG. 38 or Step S240 in FIG. 39 that the Source ID of the image sensor 511 and the Destination SID of the extended packet header ePH do not agree, the process proceeds to Step S245.

In Step S245, the Error register (Routing) on the image-sensor-511 side is set to 1, and thereafter the process is ended.

On the other hand, in a case where it is determined in Step S231 in FIG. 38 or Step S242 in FIG. 39 that the Message Counter (reception) of the image sensor 511 and the Message Counter of the extended packet header ePH do not agree, the process proceeds to Step S246.

In Step S246, the Error register (MC) on the image-sensor-511 side is set to 1, and thereafter the process is ended.

On the other hand, in a case where it is determined in Step S233 in FIG. 38 or Step S244 in FIG. 39 that the reception value (ePF0) of the extended packet footer ePF and the CRC computation result do not agree, the process proceeds to Step S247.

In Step S247, the Error register (CRC) on the image-sensor-511 side is set to 1, and thereafter the process is ended.

Configuration Example of SerDes Connection Configuration

Figure 40:
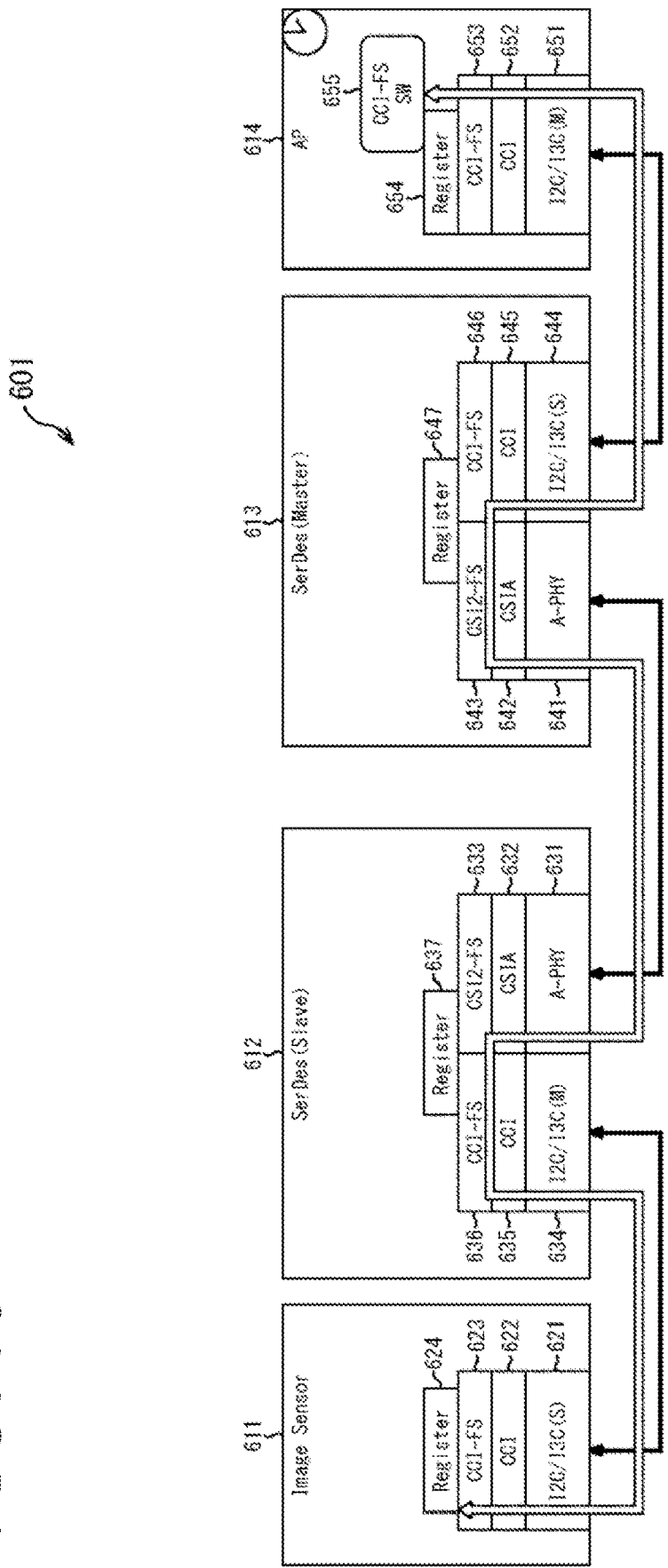
FIG. 40 is a block diagram depicting a configuration example of a communication system with SerDes connection configuration of an image sensor and an application processor.

A communication system 601 depicted in FIG. 40 has SerDes connection configuration in which an image sensor 611 and an application processor 614 are connected via a slave-side SerDes apparatus 612 and a master-side SerDes apparatus 613.

The image sensor 611 includes an I2C/I3C slave 621, a CCI processing section 622, a CSI2-FS processing section 623, and a register 624.

The slave-side SerDes apparatus 612 includes an A-PHY processing section 631, a CSIA processing section 632, a CSI2-FS processing section 633, an I2C/I3C master 634, a CCI processing section 635, a CCI-FS processing section 636, and a register 637.

The master-side SerDes apparatus 613 includes an A-PHY processing section 641, a CSIA processing section 642, a CSI2-FS processing section 643, an I2C/I3C slave 644, a CCI processing section 645, a CCI-FS processing section 646, and a register 647.

The application processor 614 includes an I2C/I3C master 651, a CCI processing section 652, a CCI-FS processing section 653, a register 654, and a CCI-FS switch 655.

Note that SerDes connection configuration as the one depicted in FIG. 40 may use another SerDes standard in a case where CCI configuration or CCI-FS configuration is implemented as an upper protocol. For example, implementing the configuration of an extended packet header ePH, an extended packet footer ePF1 and an extended packet footer ePF0 like the ones depicted in FIG. 41 for a Payload from Application Layer or an upper layer corresponding to an underlying layer thereof makes it possible to apply various types of SerDes-related technologies such as PCIE, USB, DisplayPort, HDMI (registered trademark), LVDS, or FPD-LINK.

Transfer of a read command and read data in the communication system 601 is explained with reference to FIG. 41 to FIG. 49.

Figure 41:
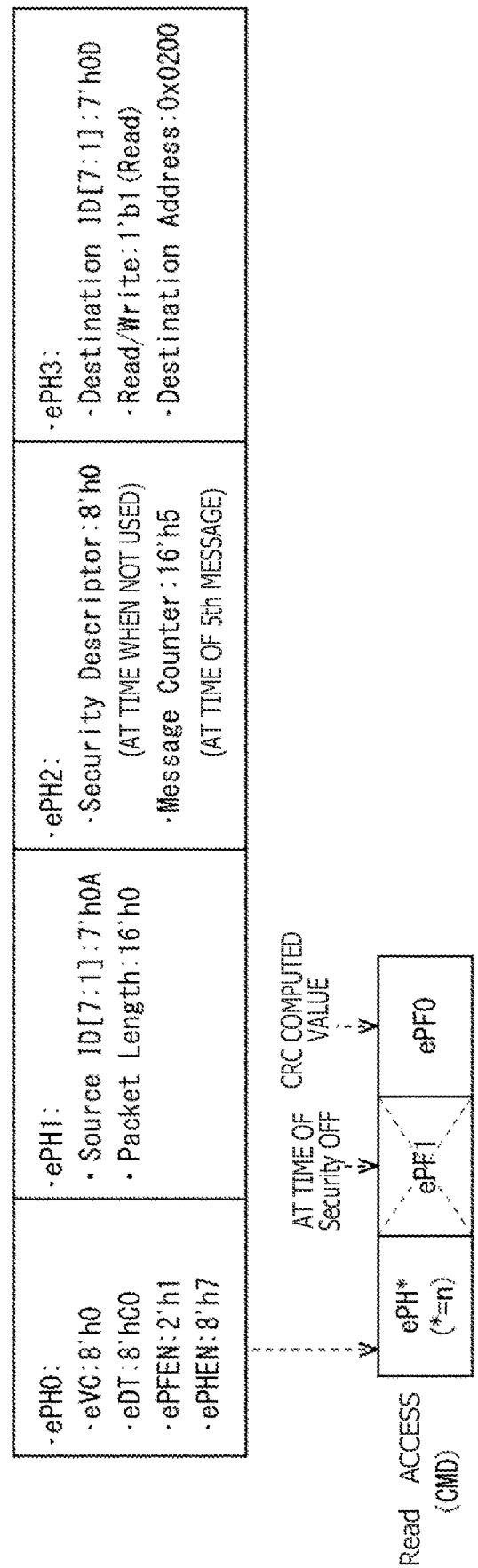
FIG. 41 is a figure depicting an example of a packet configuration of a read command generated on an application-processor side.

FIG. 41 depicts an example of a packet configuration of a read command generated at the CCI-FS processing section 653 of the application processor 614 at a time of read access.

As depicted in FIG. 41, the read command includes an extended packet header ePH* (*=n), an extended packet footer ePF1, and an extended packet footer ePF0. Note that details of these are similar to those of the read command explained with reference to FIG. 28 mentioned above.

In the application processor 614, a read command with such a packet structure is generated at the CCI-FS processing section 653, and supplied to the I2C/I3C master 651.

FIG. 42 depicts an example of a packet configuration of a read command output from the I2C/I3C master 651 of the application processor 614 at a time of read access.

As depicted in FIG. 42, subsequently to a start condition S, the I2C/I3C master 651 transmits a connection-destination sensor address, that is, an address (Slave Address+W 8-bit) of the CCI processing section 645 of the master-side SerDes apparatus 613 in the configuration depicted in FIG. 40. In the example depicted in FIG. 42, the address of the CCI processing section 645 is a Slave Address[7:1]=7'h0F. Subsequently to the address, register addresses (a Register Address [15:8] and a Register Address[7:0]) of the register 647 of the master-side SerDes apparatus 613 are transmitted. Subsequently to the extended packet header ePH* (*=n), the extended packet footer ePF1 and the extended packet footer ePF0, the I2C/I3C master 651 transmits a stop condition P last.

A read command with such a packet structure is transferred by I2C/I3C from the I2C/I3C master 651 of the application processor 614. In the master-side SerDes apparatus 613, the I2C/I3C slave 644 acquires the read command (the extended packet header ePH* (*=n), the extended packet footer ePF1, and the extended packet footer ePF0). The read command is supplied to the CCI processing section 645 with a Slave Address[7:1]=7'h0F, and is thereafter supplied to the A-PHY processing section 641 via the CCI-FS processing section 646, the CSI2-FS processing section 643, and the CSIA processing section 642.

Figure 43:
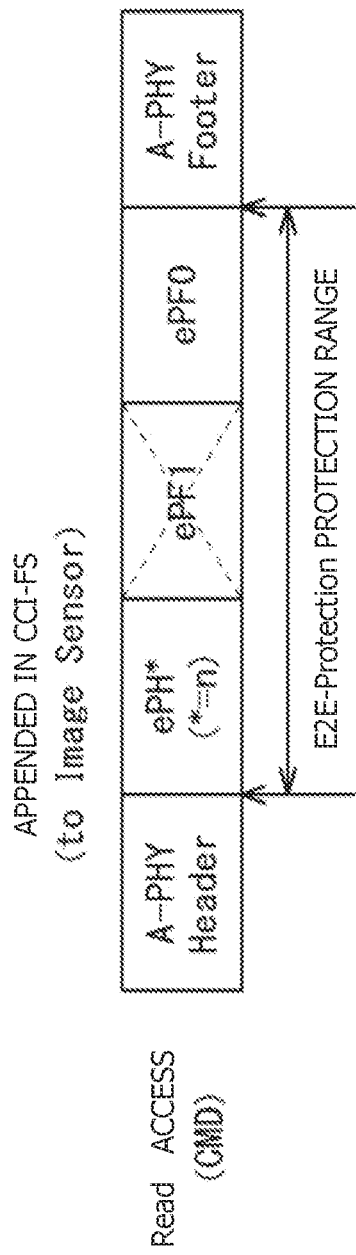
FIG. 43 is a figure depicting an example of a packet configuration of a read command to be A-PHY-transferred.

FIG. 43 depicts an example of a packet configuration of a read command output from the A-PHY processing section 641 of the master-side SerDes apparatus 613 at a time of read access.

As depicted in FIG. 43, the A-PHY processing section 641 appends an A-PHY header and an A-PHY footer by treating a read command acquired by the I2C/I3C slave 644 as falling within the E2E-Protection protection range. Note that the CSI2-FS processing section 643 appends an address of the CCI processing section 635 of the master-side SerDes apparatus 613, for example, a Slave Address[7:1]=7'h0E, to the extended packet header ePH* (*=n).

A read command with such a packet structure is A-PHY-transferred by the A-PHY processing section 641 of the master-side SerDes apparatus 613. In the slave-side SerDes apparatus 612, the A-PHY processing section 631 removes the A-PHY header and the A-PHY footer from the read command. The read command is supplied to the CCI processing section 635 with the slave address "7'h0E" represented by the Destination ID, via the CSIA processing section 632, the CSI2-FS processing section 633 and the CCI-FS processing section 636, and is thereafter supplied to the I2C/I3C master 634.

Figure 44:
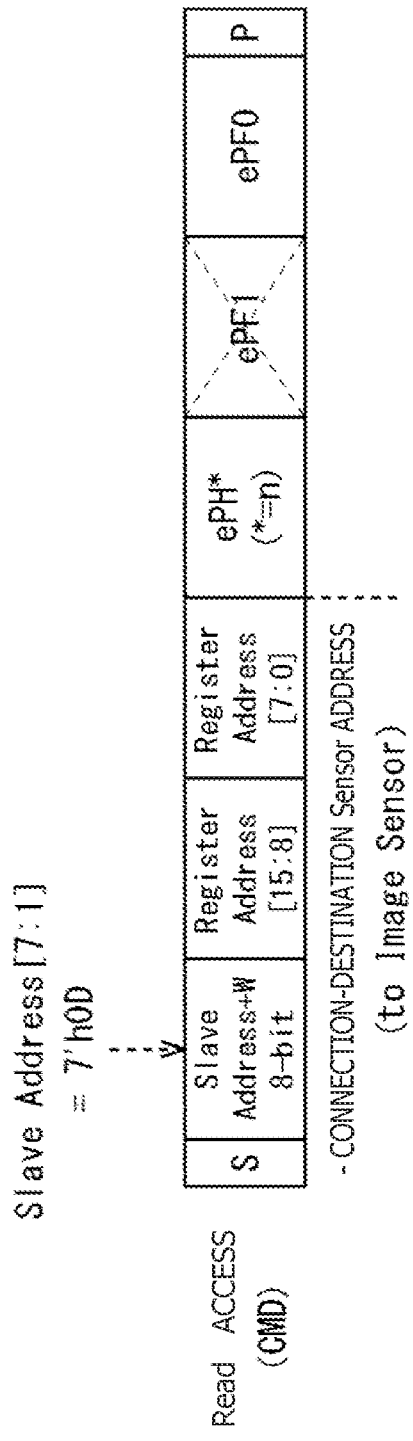
FIG. 44 is a figure depicting an example of a packet configuration of read data generated in a slave-side SerDes apparatus.

FIG. 44 depicts an example of a packet configuration of a read command output from the I2C/I3C master 634 at a time of read access.

As depicted in FIG. 44, subsequently to a start condition S, the I2C/I3C master 634 transmits a connection-destination sensor address, that is, an address (Slave Address+W 8-bit) of the CCI processing section 622 of the image sensor 611 in the configuration depicted in FIG. 40. In the example depicted in FIG. 44, the address of the CCI processing section 622 is a Slave Address[7:1]=7'h0D. Subsequently to the address, register addresses (a Register Address[15:8] and a Register Address[7:0]) of the register 624 of the image sensor 611 are transmitted. Subsequently to the extended packet header ePH* (*=n), the extended packet footer ePF1, and the extended packet footer ePF0, the I2C/I3C master 634 transmits a stop condition P last.

A read command with such a packet structure is transferred by I2C/I3C from the I2C/I3C master 634 of the slave-side SerDes apparatus 612. Further, in the image sensor 611, the I2C/I3C slave 621 acquires the read command (the extended packet header ePH* (*=n), the extended packet footer ePF1, and the extended packet footer ePF0). The read command is supplied to the CSI2-FS processing section 623 via the CCI processing section 622 with a Slave Address[7:1]=7'h0D.

Figure 45:
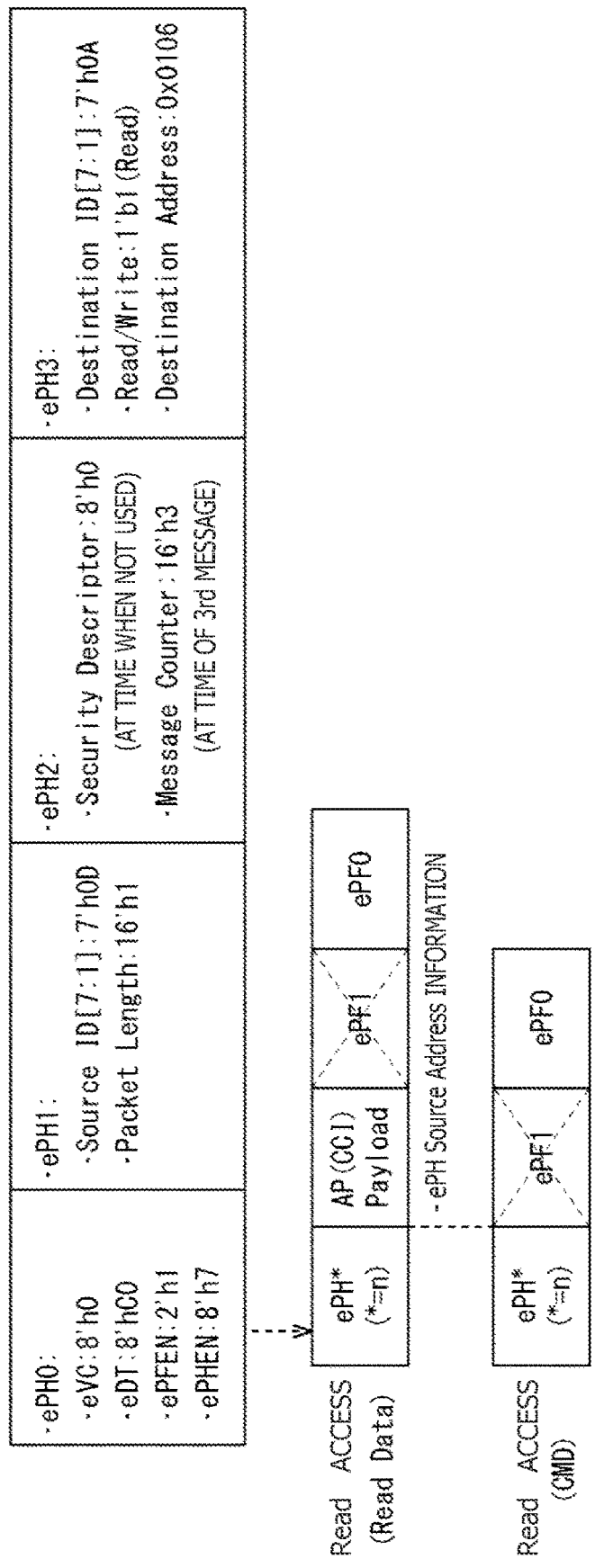
FIG. 45 is a figure depicting an example of a packet configuration of an image-sensor-side read command and read data.

FIG. 45 depicts an example of packet structures of a read command supplied to the CSI2-FS processing section 623 and read data generated at the CSI2-FS processing section 623, at a time of read access.

As depicted in FIG. 45, a read command whose packet structure is kept unchanged from the packet structure depicted in FIG. 41, that is, a read command treated as falling within the E2E-Protection protection range in A-PHY transfer, is supplied to the CSI2-FS processing section 623.

As depicted in the figure, the read data includes an extended packet header ePH* (*=n), an AP (CCI) payload, an extended packet footer ePF1 and an extended packet footer ePF0. Then, a read data value read out from the address "0x0200" of the register 624 represented by source address information (Destination Address) of the extended packet header ePH of the read command is stored in the AP (CCI) payload.

In the image sensor 611, read data with such a packet structure is generated at the CCI-FS processing section 623, and is supplied to the I2C/I3C slave 621 via the CCI processing section 622.

Figure 46:
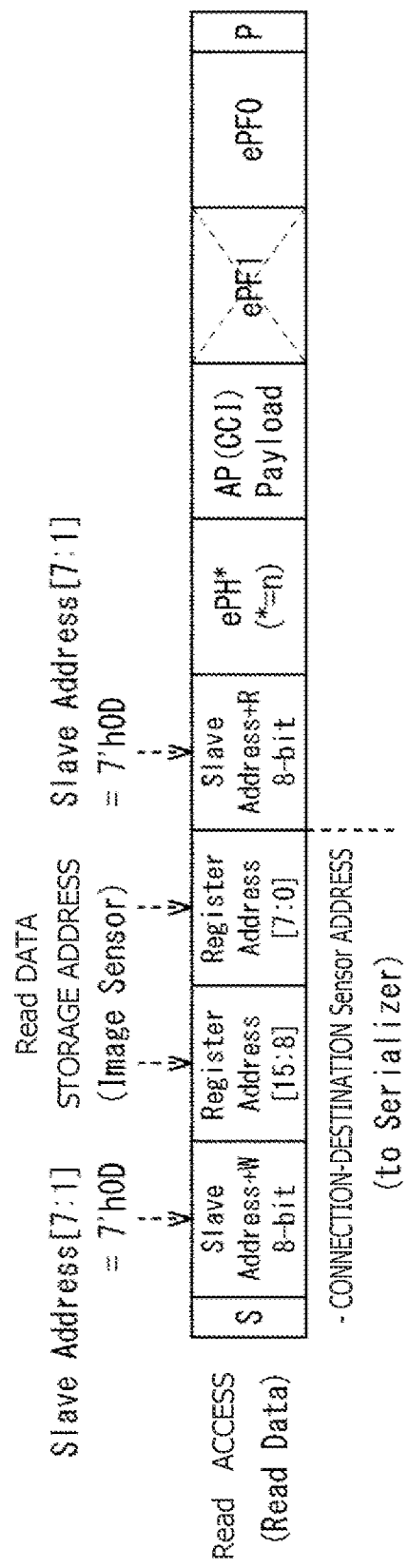
FIG. 46 is a figure depicting an example of a packet configuration of read data output in I2C/I3C.

FIG. 46 depicts an example of a packet configuration of read data output from the I2C/I3C slave 621 of the image sensor 611 at a time of read access.

As depicted in FIG. 46, subsequently to a start condition S, the I2C/I3C slave 621 transmits a connection-destination sensor address, that is, an address (Slave Address+W 8-bit) of the I2C/I3C master 634 of the slave-side SerDes apparatus 612 in the configuration depicted in FIG. 40. In the example depicted in FIG. 46, the address of the I2C/I3C master 634 is a Slave Address[7:1]=7'h0D. Subsequently to the address, a storage address of read data (an address of the register 624 of the image sensor 611) is transmitted, and an address (Slave Address+R 8-bit) of the I2C/I3C master 634 of the slave-side SerDes apparatus 612 is transmitted. The I2C/I3C slave 621 transmits an extended packet header ePH* (*=n), an AP (CCI) payload, an extended packet footer ePF1, and an extended packet footer ePF0, and thereafter transmits a stop condition P last.

A read command with such a packet structure is transferred by I2C/I3C from the I2C/I3C slave 621 of the image sensor 611. In the slave-side SerDes apparatus 612, the I2C/I3C master 634 acquires the read data (the extended packet header ePH* (*=n), the AP (CCI) payload, the extended packet footer ePF1, and the extended packet footer ePF0). The read data is supplied to the CCI processing section 635 with a Slave Address[7:1]=7'h0E, and thereafter is supplied to the A-PHY processing section 631 via the CCI-FS processing section 636, the CSI2-FS processing section 633, and the CSIA processing section 632.

Figure 47:
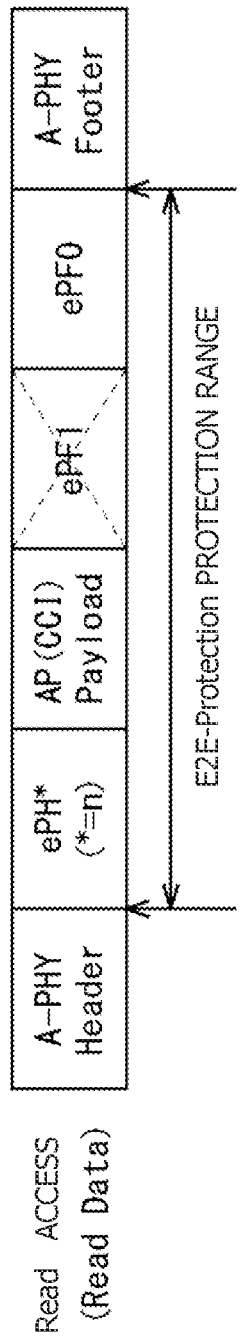
FIG. 47 is a figure depicting an example of a packet configuration of read data to be A-PHY-transferred.

FIG. 47 depicts an example of a packet configuration of read data output from the A-PHY processing section 631 of the slave-side SerDes apparatus 612 at a time of read access.

As depicted in FIG. 47, the A-PHY processing section 631 appends an A-PHY header and an A-PHY footer by treating read data acquired by the I2C/I3C master 634 as falling within the E2E-Protection protection range.

Read data with such a packet structure is A-PHY-transferred by the A-PHY processing section 631 of the slave-side SerDes apparatus 612. Further, in the master-side SerDes apparatus 613, the A-PHY processing section 641 removes the A-PHY header and the A-PHY footer from the read data. The read data is supplied to the I2C/I3C slave 644 via the CSIA processing section 642, the CSI2-FS processing section 643, the CCI-FS processing section 646, and the CCI processing section 635.

Figure 48:
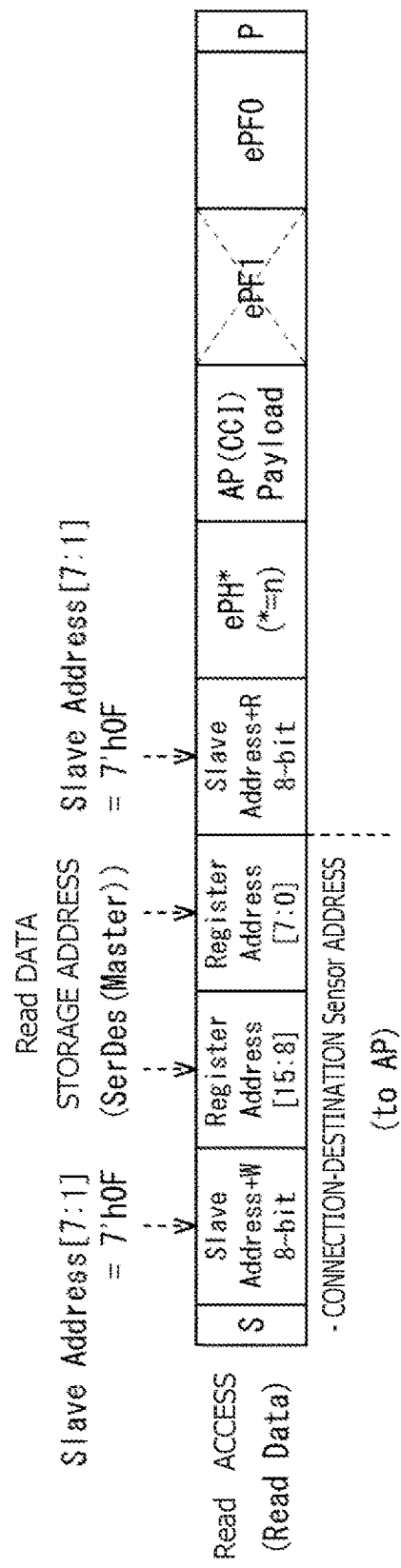
FIG. 48 is a figure depicting an example of a packet configuration of read data output in I2C/I3C.

FIG. 48 depicts an example of a packet configuration of read data output from the I2C/I3C slave 644 of the master-side SerDes apparatus 613 at a time of read access.

As depicted in FIG. 48, subsequently to a start condition S, the I2C/I3C slave 644 transmits a connection-destination sensor address, that is, an address (Slave Address+W 8-bit) of the CCI processing section 635 of the master-side SerDes apparatus 613 in the configuration depicted in FIG. 40. In the example depicted in FIG. 48, the address of the CCI processing section 635 is a Slave Address[7:1]=7'h0F. Subsequently to the address, register addresses (a Register Address[15:8] and a Register Address[7:0]) of the register 647 of the master-side SerDes apparatus 613 are transmitted, and an address (Slave Address+R 8-bit) of the CCI processing section 635 is transmitted. Next, the I2C/I3C slave 644 transmits an extended packet header ePH* (*=n), an AP (CCI) payload, an extended packet footer ePF1, and an extended packet footer ePF0, and thereafter transmits a stop condition P last.

Read data with such a packet structure is transferred by I2C/I3C from the I2C/I3C slave 644 of the master-side SerDes apparatus 613. Further, in the application processor 614, the I2C/I3C master 651 acquires the read command (the extended packet header ePH* (*=n), the extended packet footer ePF1, and the extended packet footer ePF0), and supplies the read command to the CCI-FS processing section 653.

Figure 49:
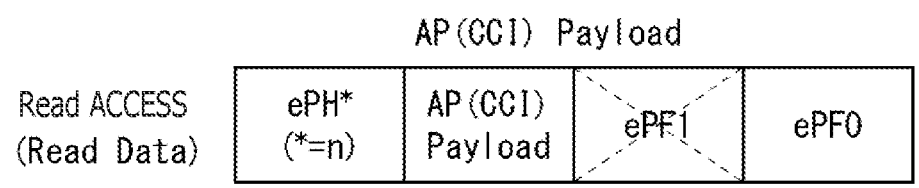
FIG. 49 is a figure depicting an example of a packet configuration of read data acquired on the application-processor side.

FIG. 49 depicts an example of a packet structure of read data supplied to the CCI-FS processing section 653 at a time of read access.

As depicted in FIG. 49, read data whose packet structure is kept unchanged from the packet structure depicted in FIG. 45, that is, read data treated as falling within the E2E-Protection protection range in A-PHY transfer, is supplied to the CCI-FS processing section 653.

Process Example of Communication Process

A communication process using CCI-FS performed in the communication system 601 depicted in FIG. 40 is explained with reference to flowcharts in FIG. 50 to FIG. 57.

Figure 50:
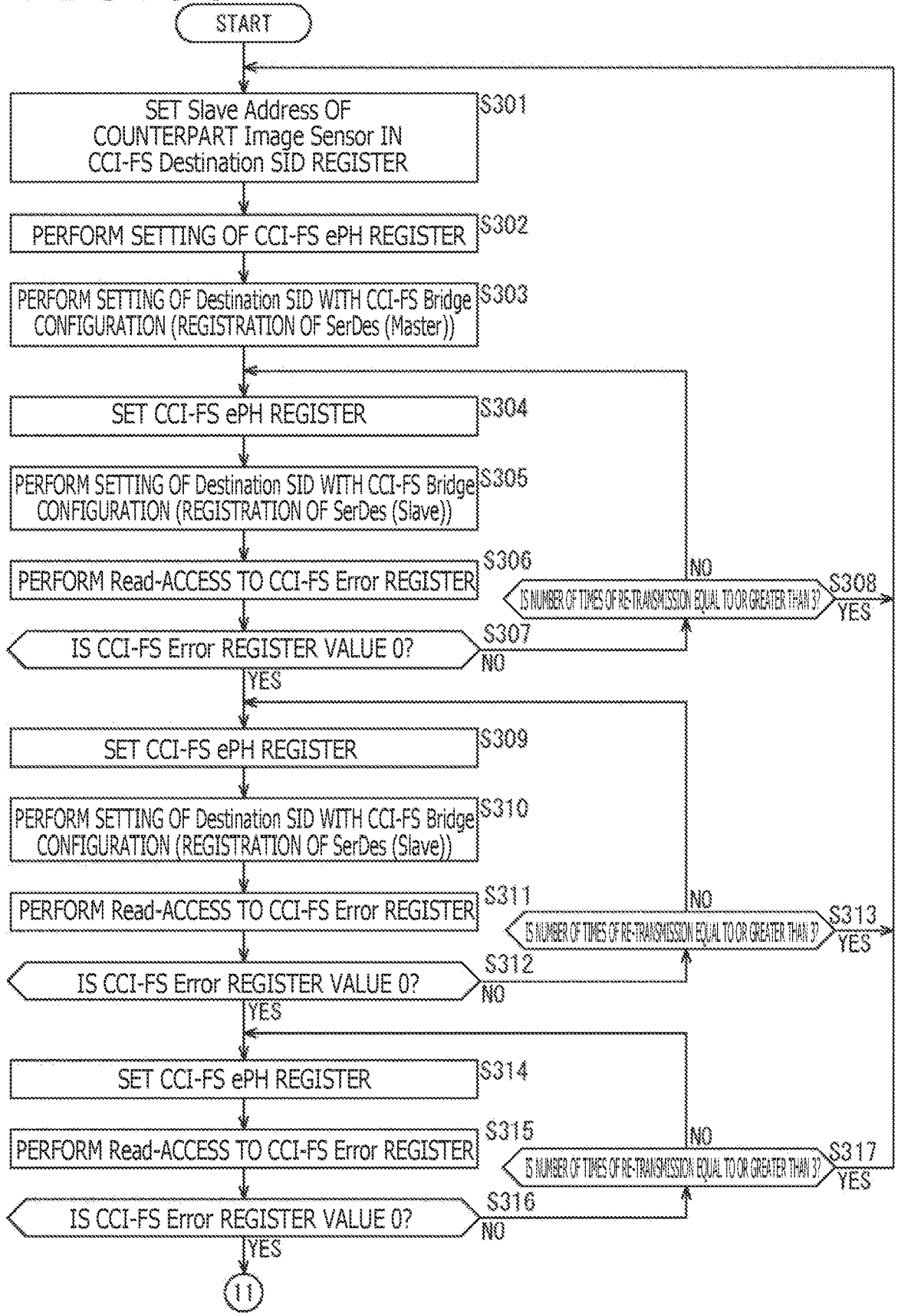
FIG. 50 is a flowchart for explaining an initial setting and a checking operation of a communication process using CCI-FS.

As depicted in FIG. 50, in Steps S301 to S317, initial setting and a checking operation are performed.

In Step S301, a slave address of the counterpart image sensor 611 is set in a Destination SID register of the CCI-FS processing section 653 of the application processor 614.

In Step S302, setting of an ePH register of the CCI-FS processing section 653 of the application processor 614 is performed.

In Step S303, setting of a Destination SID of Bridge configuration of the CCI-FS processing section 653 of the application processor 614 is performed, and the master-side SerDes apparatus 613 is registered. Here, similarly to this, setting of an Address, an attribution and a Timeout_no1 register is performed, and it is supposed hereinafter that the setting is similarly performed.

In Step S304, setting of an ePH register of a CCI-FS processing section 643 is performed from the application processor 614 to the master-side SerDes apparatus 613.

In Step S305, setting of a Destination SID of Bridge configuration of the CCI-FS processing section 643 is performed from the application processor 614 to the master-side SerDes apparatus 613, and the slave-side SerDes apparatus 612 is registered.

In Step S306, read access to an Error register of the CCI-FS processing section 643 is performed from the application processor 614 to the master-side SerDes apparatus 613.

In Step S307, in the application processor 614, the CCI-FS processing section 653 determines whether or not the register value of the Error register of the CCI-FS processing section 643 of the master-side SerDes apparatus 613 is 0 as a result of the read access in Step S306.

In a case where it is determined in Step S307 that the register value of the Error register of the CCI-FS processing section 643 of the master-side SerDes apparatus 613 is not 0 (a value other than 0), the process proceeds to Step S308.

In Step S308, in the application processor 614, the CCI-FS processing section 653 determines whether or not the number of times of re-transmission is equal to or greater than three. In a case where it is determined in Step S308 that the number of times of re-transmission is not equal to or greater than three (is one or two), the process returns to Step S304, and a similar process is performed repeatedly thereafter.

On the other hand, in a case where it is determined in Step S307 that the register value of the Error register of the CCI-FS processing section 643 of the master-side SerDes apparatus 613 is 0, the process proceeds to Step S309.

In Step S309, setting of an ePH register of the CCI-FS processing section 636 is performed from the application processor 614 to the slave-side SerDes apparatus 612.

In Step S310, setting of a Destination SID of Bridge configuration of the CCI-FS processing section 636 is performed from the application processor 614 to the slave-side SerDes apparatus 612, and the slave-side SerDes apparatus 612 is registered.

In Step S311, read access to an Error register of the CCI-FS processing section 636 is performed from the application processor 614 to the slave-side SerDes apparatus 612.

In Step S312, in the application processor 614, the CCI-FS processing section 653 determines whether or not the register value of the Error register of the CCI-FS processing section 636 of the slave-side SerDes apparatus 612 is 0 as a result of the read access in Step S311.

In a case where it is determined in Step S312 that the register value of the Error register of the CCI-FS processing section 636 of the slave-side SerDes apparatus 612 is not 0 (a value other than 0), the process proceeds to Step S313.

In Step S313, in the application processor 614, the CCI-FS processing section 653 determines whether or not the number of times of re-transmission is equal to or greater than three. In a case where it is determined that the number of times of re-transmission is not equal to or greater than three (is one or two), the process returns to Step S309, and a similar process is performed repeatedly thereafter.

On the other hand, in a case where it is determined in Step S312 that the register value of the Error register of the CCI-FS processing section 636 of the slave-side SerDes apparatus 612 is 0, the process proceeds to Step S314.

In Step S314, setting of an ePH register of the CCI-FS processing section 623 is performed from the application processor 614 to the image sensor 611.

In Step S315, read access to an Error register of the CCI-FS processing section 623 is performed from the application processor 614 to the image sensor 611.

In Step S316, in the application processor 614, the CCI-FS processing section 653 determines whether or not the register value of the Error register of the CCI-FS processing section 623 of the image sensor 611 is 0 as a result of the read access in Step S315.

In a case where it is determined in Step S316 that the register value of the Error register of the CCI-FS processing section 623 of the image sensor 611 is not 0 (a value other than 0), the process proceeds to Step S317.

In Step S317, in the application processor 614, the CCI-FS processing section 653 determines whether or not the number of times of re-transmission is equal to or greater than three. In a case where it is determined that the number of times of re-transmission is not equal to or greater than three (is one or two), the process returns to Step S314, and a similar process is performed repeatedly thereafter.

Here, in a case where it is determined in Step S308, Step S313, or Step S317 that the number of times of re-transmission is equal to or greater than three, the process returns to Step S301, and a similar process is performed repeatedly thereafter.

On the other hand, in a case where it is determined in Step S316 that the register value of the Error register of the CCI-FS processing section 623 of the image sensor 611 is 0, the process proceeds to Step S318.

Figure 51:
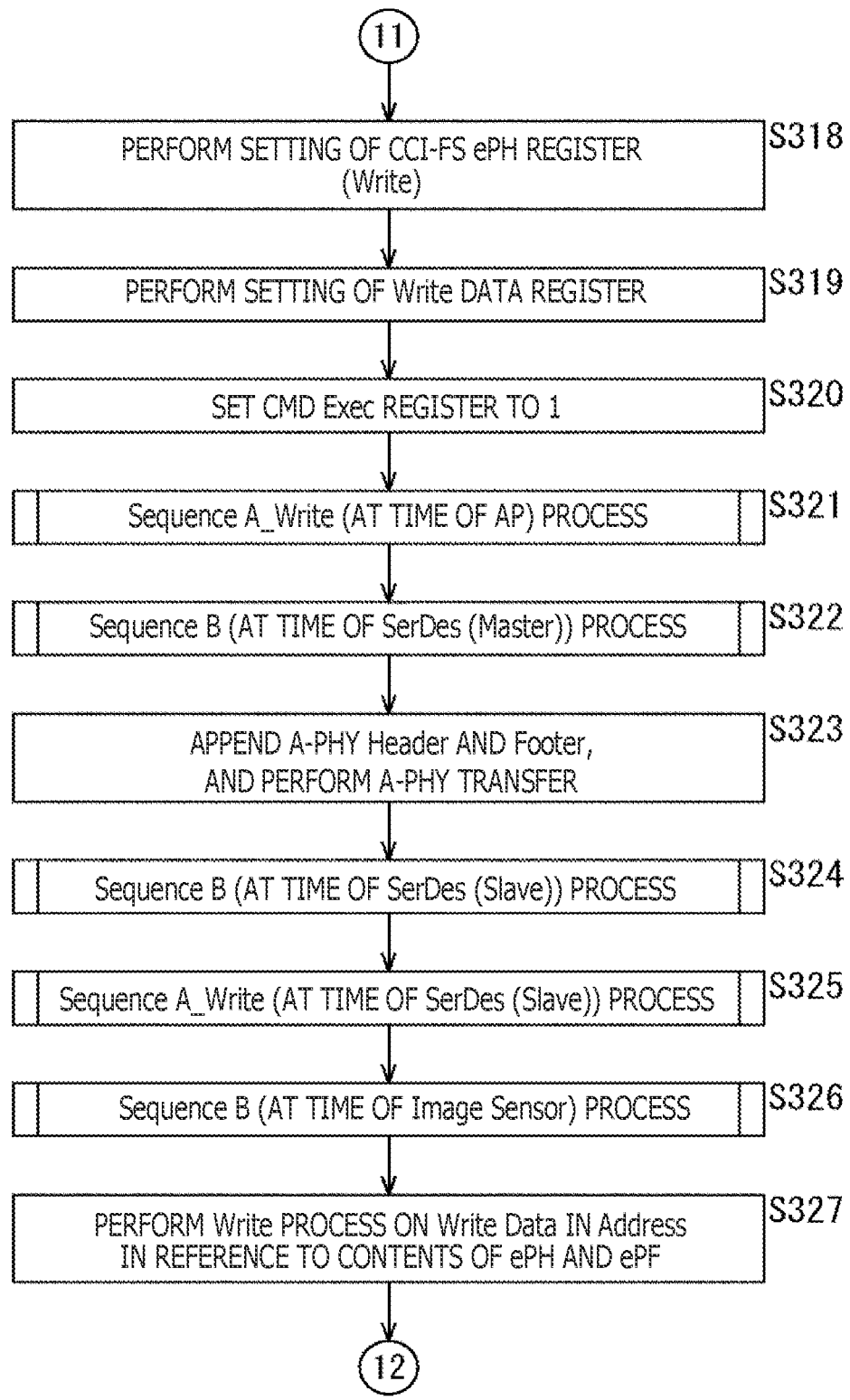
FIG. 51 is a flowchart for explaining a write operation using CCI-FS.

As depicted in FIG. 51, in Steps S318 to S327, a write operation using CCI-FS is performed.

In Step S318, the CCI-FS processing section 653 of the application processor 614 performs setting of the ePH register such that a write operation is performed.

In Step S319, the CCI-FS processing section 653 of the application processor 614 performs setting of a write data register.

In Step S320, the CCI-FS processing section 653 of the application processor 614 sets a command execution register to 1, and issues a write command.

In Step S321, the application processor 614 performs a Sequence A_Write (at a time of AP) process described later with reference to FIG. 53.

Figure 56:
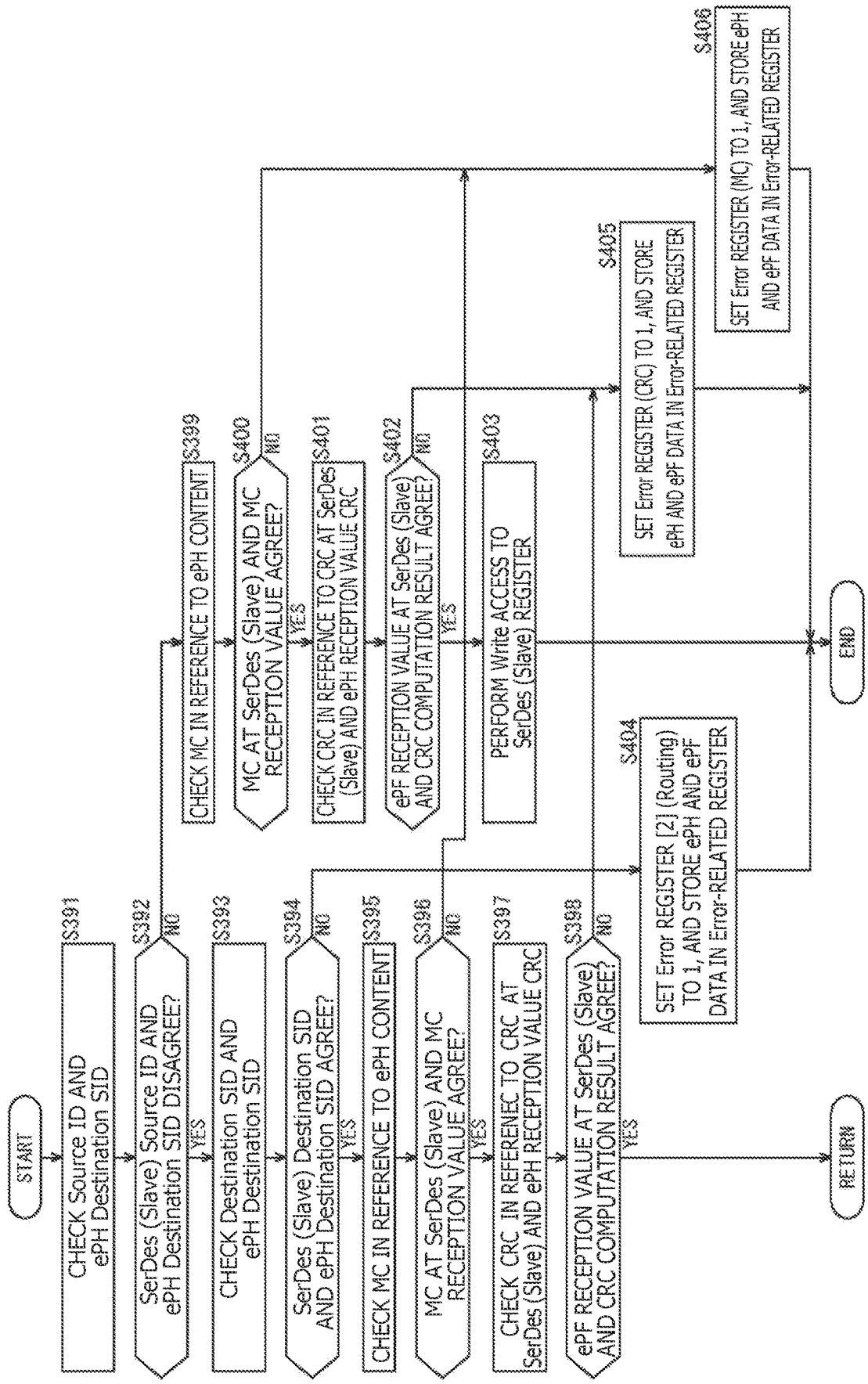
FIG. 56 is a flowchart for explaining a Sequence B (at a time of SerDes (Slave)) process.

In Step S322, the master-side SerDes apparatus 613 performs a Sequence B (at a time of SerDes (Master)) process described liter with reference to FIG. 56. Note that whereas FIG. 56 explains the Sequence B (at a time of SerDes (Slave)) process executed by the slave-side SerDes apparatus 612, a similar process can also be executed by each corresponding block in the master-side SerDes apparatus 613.

In Step S323, by using an extended DT in the extended packet header ePH of the master-side SerDes apparatus 613, the A-PHY processing section 641 appends an A-PHY header and an A-PHY footer, and A-PHY-transfers them through the CSI2-FS processing section 643 and the CSIA processing section 642.

In Step S324, the slave-side SerDes apparatus 612 performs a Sequence B (at a time of SerDes (Slave)) process described later with reference to FIG. 56.

In Step S325, the slave-side SerDes apparatus 612 performs a Sequence A_Write (at a time of SerDes (Slave)) process described later with reference to FIG. 53. Note that whereas FIG. 53 explains the Sequence A_Write (at a time of AP) process executed by the application processor 614, a similar process can also be executed by each corresponding block in the slave-side SerDes apparatus 612.

In Step S326, the image sensor 611 performs a Sequence B (at a time of Image Sensor) process described later with reference to FIG. 56. Note that whereas FIG. 56 explains the Sequence B (at a time of SerDes (Slave)) process executed by the slave-side SerDes apparatus 612, a similar process can also be executed by each corresponding block in the image sensor 611.

In Step S327, in the image sensor 611, the CCI-FS processing section 623 performs a write process of writing write data in an address of the register 624 in reference to the contents of the extended packet header ePH and the extended packet footer ePF. Thereafter, the process proceeds to Step S328.

Figure 52:
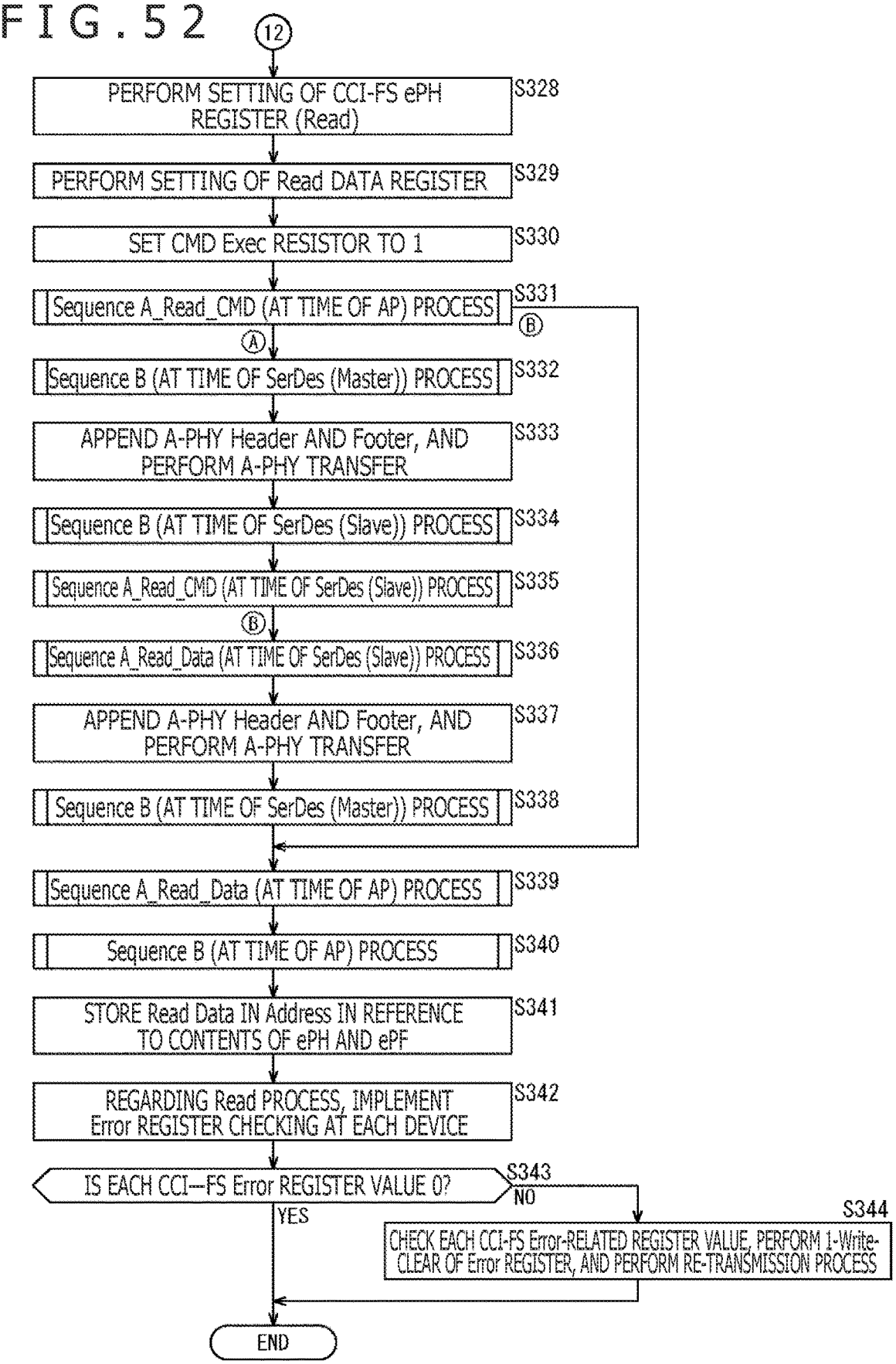
FIG. 52 is a flowchart for explaining a read operation using CCI-FS.

As depicted in FIG. 52, a read operation using CCI-FS is performed in Steps S328 to S344.

In Step S328, the CCI-FS processing section 653 of the application processor 614 performs setting of the ePH register such that a read operation is performed.

In Step S329, the CCI-FS processing section 653 of the application processor 614 performs setting of a read data register.

In Step S330, the CCI-FS processing section 653 of the application processor 614 sets a command execution register to 1, and issues a read command.

In Step S331, the application processor 614 performs a Sequence A_Read_CMD (at a time of AP) process described later with reference to FIG. 54. Here, in the Sequence A_Read_CMD (at a time of AP) process, two branched processes are performed in parallel; the process proceeds to Step S332 according to a branch A, and the process proceeds to Step S339 according to a branch B.

In Step S332, the master-side SerDes apparatus 613 performs a Sequence B (at a time of SerDes (Master)) process described later with reference to FIG. 56. Note that whereas FIG. 56 explains the Sequence B (at a time of SerDes (Slave)) process executed by the slave-side SerDes apparatus 612, a similar process can also be executed by each corresponding block in the master-side SerDes apparatus 613.

In Step S333, by using an extended DT in the extended packet header ePH of the master-side SerDes apparatus 613, the A-PHY processing section 641 appends an A-PHY header and an A-PHY footer, and A-PHY-transfers them through the CSI2-FS processing section 643 and the CSIA processing section 642.

In Step S334, the slave-side SerDes apparatus 612 performs a Sequence B (at a time of SerDes (Slave) process described later with reference to FIG. 56.

In Step S355, the slave-side SerDes apparatus 612 performs a Sequence A_Read_CMD (at a time of SerDes (Slave)) process described later with reference to FIG. 54. Note that whereas FIG. 54 explains the Sequence A_Read_CMD (at a time of AP) process executed in the application processor 614, a similar process can also be executed by each corresponding block in the slave-side SerDes apparatus 612. Here, in the Sequence A_Read_CMD (at a time of SerDes (Slave)) process, in the two branched processes, the process does not proceed to the branch A, but the process proceeds to Step S336 according to the branch B.

In Step S336, the slave-side SerDes apparatus 612 performs a Sequence A_Read_Data (at a time of SerDes (Slave)) process described later with reference to FIG. 57. Note that whereas FIG. 57 explains the Sequence A_Read_Data (at a time of AP) process executed in the application processor 614, a similar process can also be executed by each corresponding block in the slave-side SerDes apparatus 612.

In Step S337, by using an extended DT in the extended packet header ePH of the slave-side SerDes apparatus 612, the A-PHY processing section 631 appends an A-PHY header and an A-PHY footer, and A-PHY-transfers them through the CSI2-FS processing section 633 and the CSIA processing section 632.

In Step S338, the master-side SerDes apparatus 613 performs a Sequence B (at a time of SerDes (Master)) process described later with reference to FIG. 56. Note that whereas FIG. 56 explains the Sequence B (at a time of SerDes (Slave)) process executed at the slave-side SerDes apparatus 612, a similar process can also be executed by each corresponding block in the master-side SerDes apparatus 613.

In Step S339, the application processor 614 performs a Sequence A_Read_Data (at a time of AP) process described later with reference to FIG. 57.

In Step S340, the application processor 614 performs a Sequence B (at a time of AP) process described later with reference to FIG. 56. Note that whereas FIG. 56 explains the Sequence B (at a time of SerDes (Slave)) process executed at the slave-side SerDes apparatus 612, a similar process can also be executed by each corresponding block in the application processor 614.

In Step S341, in the application processor 614, the CCI-FS processing section 653 stores read data in an address of the register 654 in reference to the contents of the extended packet header ePH and the extended packet footer ePF.

In Step S342, regarding the read process described above, Error register checking is implemented at the image sensor 611, the slave-side SerDes apparatus 612, the master-side SerDes apparatus 613, and the application processor 614.

In Step S343, the image sensor 611 and each device (the slave-side SerDes apparatus 612, the master-side SerDes apparatus 613 and the application processor 614) determine whether or not register values of Error registers of their CCI-FS processing sections are 0.

In a case where it is determined in Step S343 that not all the register values of the CCI-FS processing sections are 0 (that there is a register value which is a value other than 0), the process proceeds to Step S344.

In Step S344, an Error-related register value of a CCI-FS processing section whose register value is not 0 is checked, a 1-write clear process is performed on the Error register, and a re-transmission process is performed.

On the other hand, in a case where it is determined in Step S343 that the register values of all the CCI-FS processing sections are 0 or after the process in Step S344, the process is ended.

Figure 53:
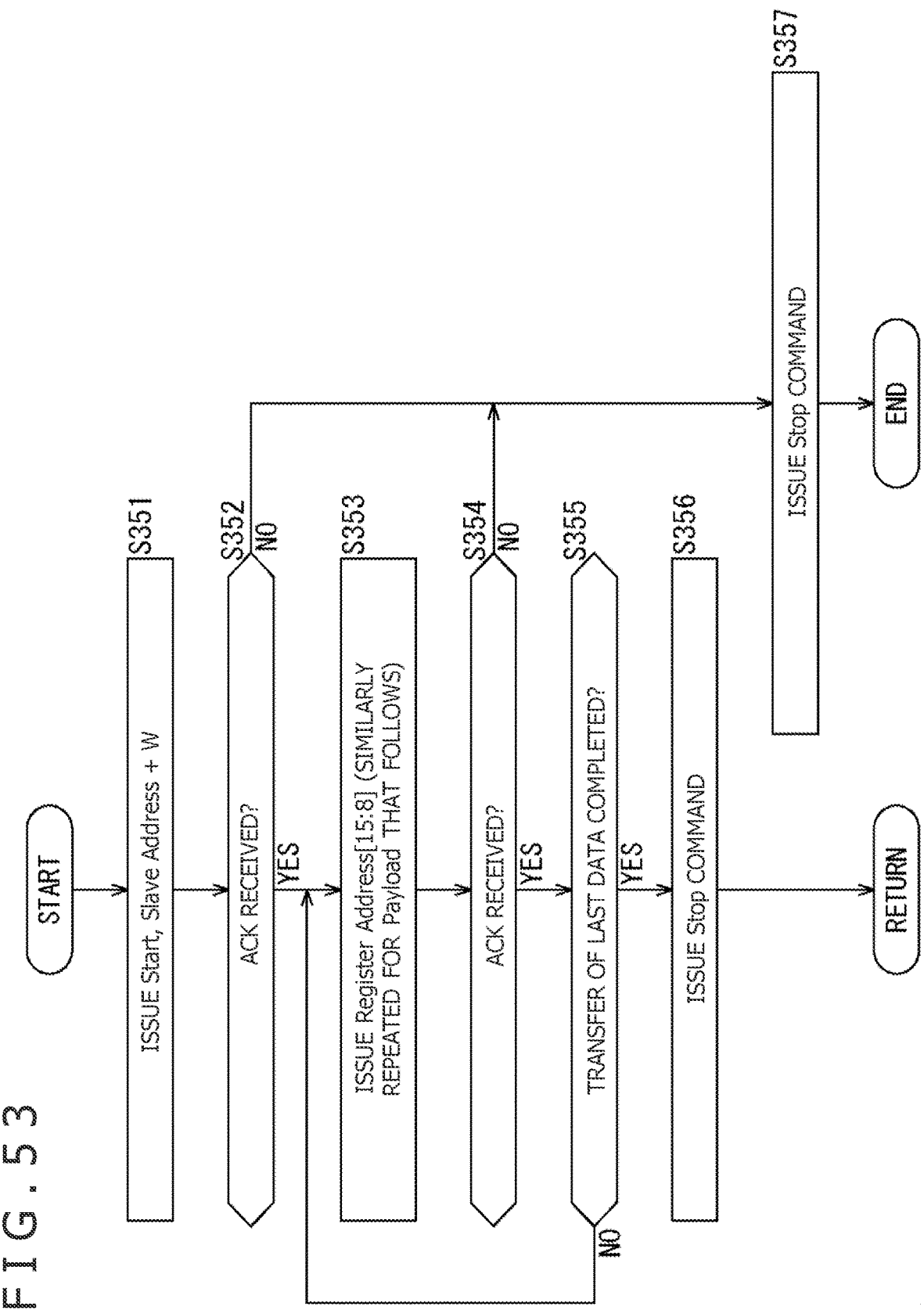
FIG. 53 is a flowchart for explaining a Sequence A_Write (at a time of AP) process.

FIG. 53 is a flowchart for explaining the Sequence A_Write (at a time of AP) process performed in Step S321 in FIG. 51. Note that whereas FIG. 53 explains, as an example, a process performed by the application processor 614, the Sequence A_Write (at a time of Ser Des (Slave)) process in Step S325 in FIG. 51 is also similarly performed.

In Step S351, in the application processor 614, the I2C/I3C master 651 issues a start command and a slave address (Slave Address+W 8-bit depicted in FIG. 42).

In Step S352, in the application processor 614, the I2C/I3C master 651 determines whether or not an ACK response from the I2C/I3C slave 644 of the master-side SerDes apparatus 613 is received. In a case where it is determined in Step S352 that an ACK response from the I2C/I3C slave 644 of the master-side SerDes apparatus 613 is received, the process proceeds to Step S353.

In Step S353, in the application processor 614, the I2C/I3C master 651 issues a register address (a Register Address [15:8] depicted in FIG. 42). Here, every time the process in Step S353 is performed repeatedly, as depicted in FIG. 42, a payload following the register address is transmitted.

In Step S354, in the application processor 614, the I2C/I3C master 651 determines whether or not an ACK response from the I2C/I3C slave 644 of the master-side SerDes apparatus 613 is received. In a case where it is determined in Step S354 that an ACK response from the I2C/I3C slave 644 of the master-side SerDes apparatus 613 is received, the process proceeds to Step S355.

In Step S355, in the application processor 614, the I2C/I3C master 651 determines whether or not transfer of the last data is completed. In a case where it is determined in Step S355 that transfer of the last data is not completed, the process returns to Step S353, and a similar process is performed repeatedly thereafter.

On the other hand, in a case where it is determined in Step S355 that transfer of the last data is completed, the process proceeds to Step S356. In Step S356, in the application processor 614, the I2C/I3C master 651 issues a stop command. As a result, the Sequence A_Write (at a time of AP) process ends, and the process returns to Step S322 in FIG. 51.

On the other hand, in a case where it is determined in Step S352 or S354 that an ACK response from the I2C/I3C slave 644 of the master-side SerDes apparatus 613 is not received, the process proceeds to Step S357. In Step S357, in the application processor 614, the I2C/I3C master 651 issues a stop command. In this case, the Sequence A_Write (at a time of AP) process ends, and also the communication process itself is ended.

FIG. 54 is a flowchart for explaining the Sequence A_Read_CMD (at a time of AP) process performed in Step S331 in FIG. 52. Note that whereas FIG. 54 explains, as an example, a process performed by the application processor 614, the Sequence A_Read_CMD (at a time of SerDes (Slave)) process in Step S335 in FIG. 52 is also similarly performed.

In Step S361, in the application processor 614, the I2C/I3C master 651 issues a start command and a slave address (Slave Address+W 8-bit depicted in FIG. 42), and activates a timer.

In Step S362, in the application processor 614, the I2C/I3C master 651 determines whether or not an ACK response from the I2C/I3C slave 644 of the master-side SerDes apparatus 613 is received. In a case where it is determined in Step S362 that an ACK response from the I2C/I3C slave 644 of the master-side SerDes apparatus 613 is received, the process proceeds to Step S363.

In Step S363, in the application processor 614, the I2C/I3C master 651 issues a register address (a Register Address [15:8] depicted in FIG. 42). Here, every time the process in Step S363 is performed repeatedly, as depicted in FIG. 42, transmission of a payload following the register address is transmitted.

In Step S364, in the application processor 614, the I2C/I3C master 651 determines whether or not an ACK response from the I2C/I3C slave 644 of the master-side SerDes apparatus 613 is received.

In a case where it is determined in Step S364 that an ACK response from the I2C/I3C slave 644 of the master-side SerDes apparatus 613 is received, the process proceeds to Step S365.

In Step S365, in the application processor 614, the I2C/I3C master 651 determines whether or not transfer of the last data is completed.

In a case where it is determined in Step S365 that transfer of the last data is completed, the process proceeds to Step S366.

In Step S366, in the application processor 614, the I2C/I3C master 651 issues a stop command. Thereafter, the process branches into two, and the process proceeds to Step S332 in FIG. 52 according to the branch A. On the other hand, according to the branch B, a Sequence C (at a time of AP) process (see FIG. 55 mentioned later) is performed in Step S367, and thereafter the process proceeds to Step S339 in FIG. 52.

On the other hand, in a case where it is determined in Step S365 that transfer of the last data is not completed, the process proceeds to Step S368.

In Step S368, in the application processor 614, the I2C/I3C master 651 determines whether or not the timer started in Step S361 has reached time out. In a case where it is determined in Step S368 that the timer has not reached time out, the process returns to Step S363, and a similar process is performed repeatedly thereafter.

On the other hand, in a case where it is determined in Step S368 that the timer has reached time out, the process proceeds to Step S369.

In Step S369, the application processor 614 sets the Error register (Timeout) to 1, and stores data of the extended packet header ePH and the extended packet footer ePF in the Error-related register.

After the process in Step S369 or in a case where it is determined in Step S362 or S364 that an ACK response from the I2C/I3C slave 644 of the master-side SerDes apparatus 613 is not received, the process proceeds to Step S370.

In Step S370, in the application processor 614, the I2C/I3C master 651 issues a stop command. In this case, the Sequence A_Read_CMD (at a time of AP) process ends, and also the communication process itself is ended.

FIG. 55 is a flowchart for explaining the Sequence C (at a time of AP) process performed in Step S367 in FIG. 54. Note that whereas FIG. 55 explains, as an example, a process performed by the application processor 614, a similar process can be performed also in the slave-side SerDes apparatus 612.

In Step S381, in the application processor 614, the I2C/I3C master 651 determines whether or not the timer started in Step S361 in FIG. 54 has reached time out, and pauses the process until it is determined that the timer has reached time out. If it is determined in Step S381 that the timer has reached time out, the process proceeds to Step S382, and, in the application processor 614, the I2C/I3C master 651 performs a polling operation.

In Step S383, in the application processor 614, the I2C/I3C master 651 determines whether or not the Status register value of the read command is 1.

In a case where it is determined in Step S383 that the Status register value of the read command is 1, the process proceeds to Step S384. In Step S384, the application processor 614 performs read access, and thereafter the process returns to Step S339 in FIG. 52.

On the other hand, in a case where it is determined in Step S383 that the Status register value of the read command is not 1 (a value other than 1), the process proceeds to Step S385. In Step S385, the application processor 614 sets the Error register (Timeout) to 1, and stores data of the extended packet header ePH and the extended packet footer ePF in the Error-related register.

In Step S386, in the application processor 614, the I2C/I3C master 651 issues a stop command. In this case, the Sequence C (at a time of AP) process ends, and also the communication process itself is ended.

FIG. 56 is a flowchart for explaining the Sequence B (at a time of SerDes (Slave)) process performed in Steps S324 and S334 in FIG. 51. Note that whereas FIG. 56 explains, as an example, a process performed by the slave-side SerDes apparatus 612, the Sequence B (at a time of SerDes (Master)) in Step S322 in FIG. 51, the Sequence B (at a time of Image Sensor) process in Step S326 in FIG. 51, and the Sequence B (at a time of SerDes (Master)) process in Step S332 in FIG. 52 are also similarly performed.

In Step S391, in the slave-side SerDes apparatus 612, the CCI-FS processing section 636 checks a Source ID of the slave-side SerDes apparatus 612 and a Destination SID of the extended packet header ePH.

In Step S392, in the slave-side SerDes apparatus 612, the CCI-FS processing section 636 determines whether or not the Source ID of the slave-side SerDes apparatus 612 and the Destination SID of the extended packet header ePH disagree.

In a case where it is determined in Step S392 that the Source ID of the slave-side SerDes apparatus 612 and the Destination SID of the extended packet header ePH disagree, the process proceeds to Step S393.

In Step S393, in the slave-side SerDes apparatus 612, the CCI-FS processing section 636 checks a Destination SID of the slave-side SerDes apparatus 612 and the Destination SID of the extended packet header ePH.

In Step S394, in the slave-side SerDes apparatus 612, the CCI-FS processing section 636 determines whether or not the Source ID of the slave-side SerDes apparatus 612 and the Destination SID of the extended packet header ePH agree.

In a case where it is determined in Step S394 that the Source ID of the slave-side SerDes apparatus 612 and the Destination SID of the extended packet header ePH agree, the process proceeds to Step S395.

In Step S395, in the slave-side SerDes apparatus 612, the CCI-FS processing section 636 checks the Message Counter in reference to the content of the extended packet header ePH.

In Step S396, in the slave-side SerDes apparatus 612, the CCI-FS processing section 636 determines whether or not a Message Counter at the slave-side SerDes apparatus 612 and a reception value of the Message Counter checked in reference to the content of the extended packet header ePH agree.

In a case where it is determined in Step S396 that the Message Counter at the slave-side SerDes apparatus 612 and the reception value of the Message Counter checked in reference to the content of the extended packet header ePH agree, the process proceeds to Step S397.

In Step S397, in the slave-side SerDes apparatus 612, the CCI-FS processing section 636 checks a CRC computation result computed from the extended packet header ePH at the slave-side SerDes apparatus 612 and a reception value (ePF0) of the extended packet footer ePF.

In Step S398, it is determined whether or not the reception value (ePF0) of the extended packet footer ePF and the CRC computation result agree, and in a case where it is determined in Step S398 that they agree, the process returns to Step S325 in FIG. 51.

On the other hand, in a case where it is determined in Step S392 that the Source ID of the slave-side SerDes apparatus 612 and the Destination SID of the extended packet header ePH do not disagree (they agree), the process proceeds to Step S399.

In Steps S399 to S402, processes similar to Steps S395 to S398 are performed.

In a case where it is determined in Step S402 that the reception value (ePF0) of the extended packet footer ePF and the CRC computation result agree, the process proceeds to Step S403. In Step S403, write access to the register 637 of the slave-side SerDes apparatus 612 is performed.

In a case where it is determined in Step S394 that the Source ID of the slave-side SerDes apparatus 612 and the Destination SID of the extended packet header ePH do not agree, the process proceeds to Step S404. In Step S404, in the slave-side SerDes apparatus 612, the CCI-FS processing section 636 sets the Error register [2] (Routing) to 1, and stores data of the extended packet header ePH and the extended packet footer ePF in the Error-related register.

In a case where it is determined in Step S398 or S402 that the reception value (ePF0) of the extended packet footer ePF and the CRC computation result do not agree, the process proceeds to Step S405. In Step S405, in the slave-side SerDes apparatus 612, the CCI-FS processing section 636 sets the Error register (CRC) to 1, and stores data of the extended packet header ePH and the extended packet footer ePF in the Error-related register.

In a case where it is determined in Step S396 or S400 that the Message Counter at the slave-side SerDes apparatus 612 and the reception value of the Message Counter checked in reference to the content of the extended packet header ePH do not agree, the process proceeds to Step S406. In Step S406, in the slave-side SerDes apparatus 612, the CCI-FS processing section 636 sets the Error register (MC) to 1, and stores data of the extended packet header ePH and the extended packet footer ePF in the Error-related register.

After the processes in Step S403 to S406, the Sequence B (at a time of SerDes (Slave)) process ends, and also the communication process itself is ended.

Note that, with respect to CRC computation, a combination of the CRC computation being implemented with only E2E Protection as a subject without any problem, the error detection being performed at each device, and packets being discarded/not discarded is assumed.

Figure 57:
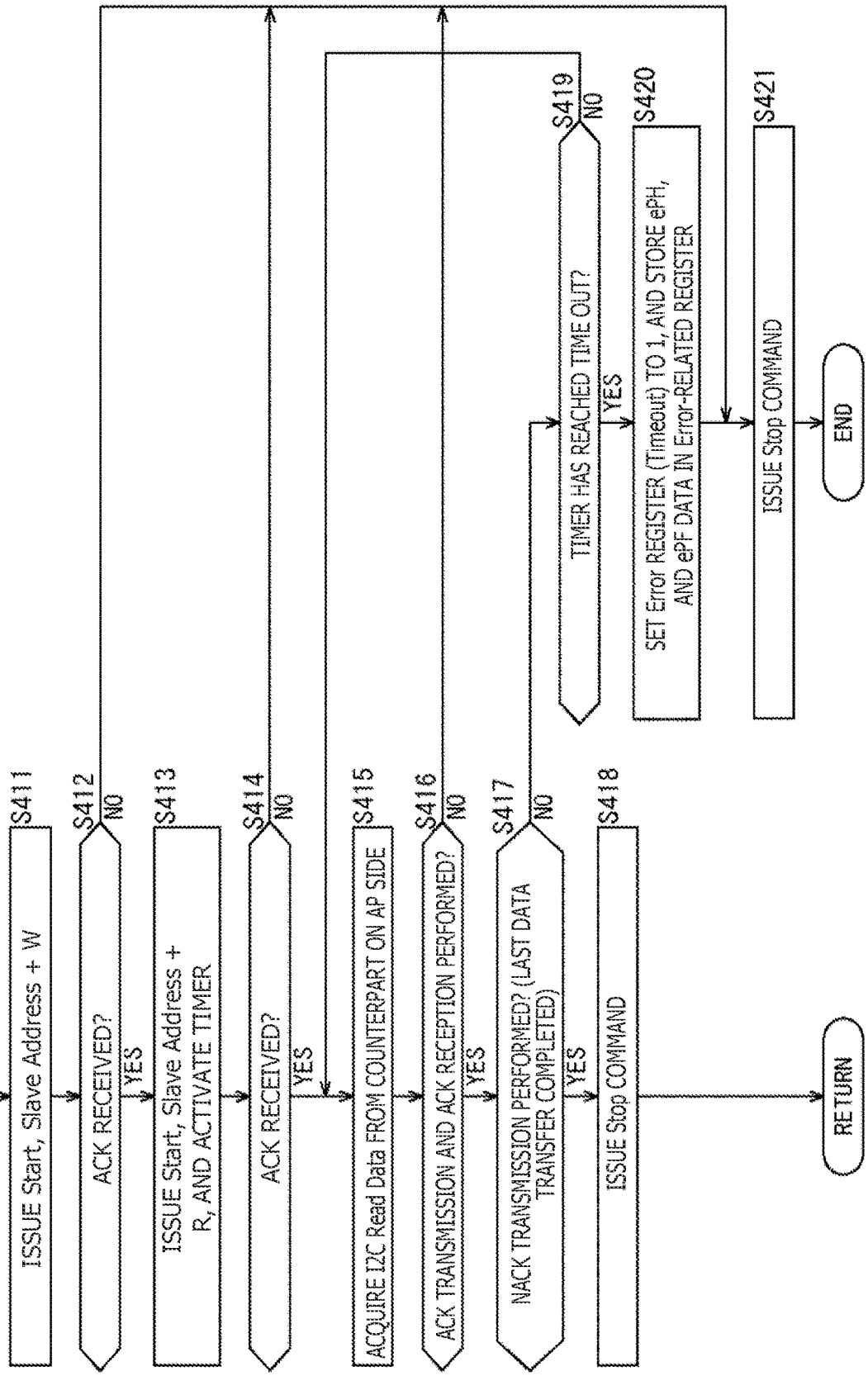
FIG. 57 is a flowchart for explaining a Sequence A_Read_Data (at a time of AP) process.

FIG. 57 is a flowchart for explaining the Sequence A_Read_Data (at a time at AP) process performed in Step S339 in FIG. 52. Note that whereas FIG. 57 explains, as an example, a process performed by the application processor 614, the Sequence A_Read_Data (at a time of SerDes (Slave)) process in Step S336 in FIG. 52 is also similarly performed.

In Step S411, in the application processor 614, the I2C/I3C master 651 issues a start command and a slave address (Slave Address+W 8-bit depicted in FIG. 48).

In Step S412, in the application processor 614, the I2C/I3C master 651 determines whether or not an ACK response from the I2C/I3C slave 644 of the master-side SerDes apparatus 613 is received. In a case where it is determined in Step 412 that an ACK response from the I2C/I3C slave 644 of the master-side SerDes apparatus 613 is received, the process proceeds to Step S413.

In Step S413, in the application processor 614, the I2C/I3C master 651 issues a start command and a slave address (Slave Address+R 8-bit depicted in FIG. 48), and activates a timer.

In Step S414, in the application processor 614, the I2C/I3C master 651 determines whether or not an ACK response from the I2C/I3C slave 644 of the master-side SerDes apparatus 613 is received. In a case where it is determined in Step S414 that an ACK response from the I2C/I3C slave 644 of the master-side SerDes apparatus 613 is received, the process proceeds to Step S415.

In Step S415, in the application processor 614, the I2C/I3C master 651 acquires read data from the counterpart I2C/I3C slave 644 on the application-processor-614 side.

In Step S416, it is determined whether or not the I2C/I3C master 651 of the application processor 614 has performed ACK transmission and ACK reception has been performed at the counterpart I2C/I3C slave 644 on the application-processor-614 side.

In a case where it is determined in Step S416 that the I2C/I3C master 651 of the application processor 614 has performed ACK transmission and ACK reception has been performed at the counterpart I2C/I3C slave 644 on the application-processor-614 side, the process proceeds to Step S417.

In Step S417, it is determined whether or not the I2C/I3C master 651 of the application processor 614 has performed NACK transmission following completion of transfer of the last data.

In a case where it is determined in Step S417 that NACK transmission has been performed, the process proceeds to Step S418. In Step S418, in the application processor 614, the I2C/I3C master 651 issues a stop command. As a result, the Sequence A_Read_Data (at a time of AP) process ends, and the process returns to Step S340 in FIG. 52.

On the other hand, in a case where it is determined in Step S417 that NACK transmission has not been performed, the process proceeds to Step S419.

In Step S419, in the application processor 614, the I2C/I3C master 651 determines whether or not the timer started in Step S413 has reached time out. In a case where it is determined in Step S419 that the timer has not reached time out, the process returns to Step S415, and a similar process is performed repeatedly thereafter.

On the other hand, in a case where it is determined in Step S419 that the timer has reached time out, the process proceeds to Step S420.

In Step S420, the application processor 614 sets the Error register (Timeout) to 1, and stores data of the extended packet header ePH and the extended packet footer ePF in the Error-related register.

After the process in Step S420 or in a case where it is determined in Step S414 that an ACK response from the I2C/I3C slave 644 of the master-side SerDes apparatus 613 is not received, the process proceeds to Step S421. Similarly in a case where it is determined in Step S416 that the I2C/I3C master 651 of the application processor 614 has not performed ACK transmission or ACK reception has not been performed at the counterpart I2C/I3C slave 644 on the application-processor-614 side, the process proceeds to Step S421.

In Step S421, in the application processor 614, the I2C/I3C master 651 issues a stop command. In this case, the Sequence A_Read_Data (at a time of AP) process ends, and also the communication process itself is ended.

Here, there are three combinations explained next with respect to the timing of access from the I2C/I3C master 634 to the I2C/I3C slave 621 when the I2C/I3C slave 621 performs output (see FIG. 46) and the timing of access from the I2C/I3C master 651 to the I2C/I3C slave 644 when the I2C/I3C slave 644 of the master-side SerDes apparatus 613 performs output (see FIG. 48).

As a first access timing, polling is performed until read data is acquired, and the I2C/I3C master starts a read process after preparations for reading out the read data are completed.

As a second access timing, the I2C/I3C master starts a read process after lapse of a predetermined length of time.

As a third access timing, the I2C/I3C master starts a read process after lapse of a predetermined length of time by using a Clock Stretch method (see FIG. 72 mentioned later), and at that time, there are a mode in which read data is sent in a batch and a mode in which read data is sent in pieces (a Clock Stretch Mode signal is asserted).

Configuration Example of Extended Packet Header ePH

FIG. 58 to FIG. 60 are figures depicting configuration examples of an extended packet header ePH.

FIG. 58 is a figure depicting detailed configuration examples of an extended packet header ePH0, an extended packet header ePH1, and an extended packet header ePH2. Regarding addition of an extended packet header ePH as the one depicted in the figure, the content of the extended packet header ePH is prescribed for CCI-FS by ePH structures for C-PHY and D-PHY being repurposed.

FIG. 59 depicts a detailed configuration example of an extended packet header ePH3. Regarding addition of an extended packet header ePH as the one depicted in the figure, the content of the extended packet header ePH is prescribed for CCI-FS.

FIG. 60 depicts a detailed configuration example of an extended DT of an extended packet header ePH. For example, in order to support CCI-FS, "0xC0: For I2C" and "0xC1: For I3C" are added as data types of an extended packet header ePH.

Circuit Configuration Example of I2C

FIG. 61 depicts a configuration example in conventional I2C hardware. For example, a configuration example of I2C in a case of connection configuration with a bus on the upper side at a time of hardware implementation is depicted, and the slave side may be configured to be capable of receiving ACK/NACK from the upper side. Of course, what is depicted is an example, and the configuration may not necessarily match the upper bus configuration.

Figure 62:
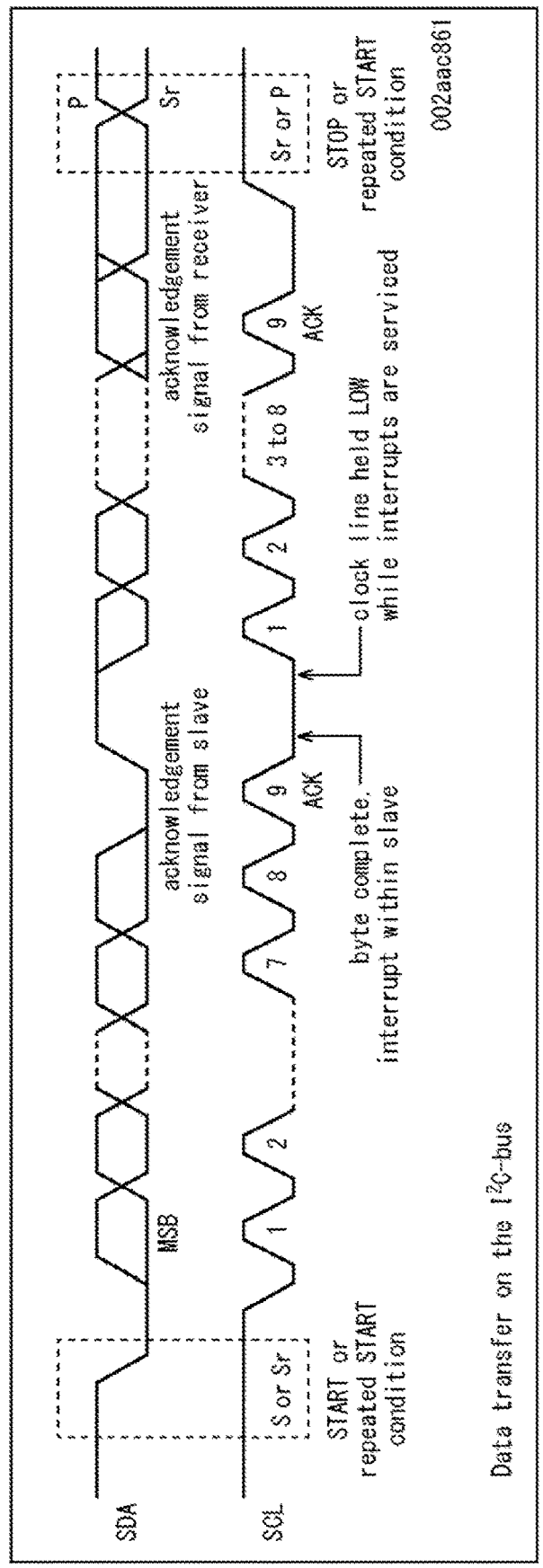
FIG. 62 is a figure depicting an example of waveforms at a time of data transfer on an I2C bus.

FIG. 62 depicts waveforms at a time of data transfer on an I2C bus. Note that it is supposed that the I2C bus standard and CCI (I2C) are the same standards.

FIG. 63 is a block diagram depicting a CCI-related configuration example of a communication system 701 with A-PHY direct-link configuration, as with the communication system 501 depicted in FIG. 27 mentioned above.

As depicted in FIG. 63, the communication system 701 includes an image sensor 711 and an application processor 712 that are connected directly by A-PHY.

The image sensor 711 includes an A-PHY processing section 721, a CSIA processing section 722, the CSI2 processing section 523, a CSI2-FS processing section 724, a CCI processing section 725, a CCI-FS processing section 726, a register 727, and selectors 728-1 and 728-2. As depicted in the figure, the selectors 728-1 and 728-2 are arranged such that the CCI-FS processing section 726 is interposed therebetween, and can perform switching to enable/disable the CCI-FS processing section 726 according to a CCI_FS_Enable signal of the register 727.

The application processor 712 includes an A-PHY processing section 731, a CSIA processing section 732, a CSI2 processing section 733, a CSI2-FS processing section 734, a CCI processing section 735, a CCI-FS processing section 736, a register 737, and selectors 738-1 and 738-2. As depicted in the figure, the selectors 738-1 and 738-2 are arranged such that the CCI-FS processing section 736 is interposed therebetween, and can perform switching to enable/disable the CCI-FS processing section 736 according to a CCI_FS_Enable signal of the register 737.

For example, in a case where the CCI_FS_Enable signal represents that CCI-FS is enabled (CCI_FS_Enable=1), as represented by a dash-dotted-line arrow, data is transmitted and received via the CCI-FS processing section 726 and the CCI-FS processing section 736. On the other hand, in a case where the CCI_FS_Enable signal represents that CCI-FS is disabled (CCI_FS_Enable=0), as represented by a long-dashed-double-short-dashed-line arrow, data is transmitted and received not via the CCI-FS processing section 726 and the CCI-FS processing section 736.

<Network Connection Form>

Figure 64:
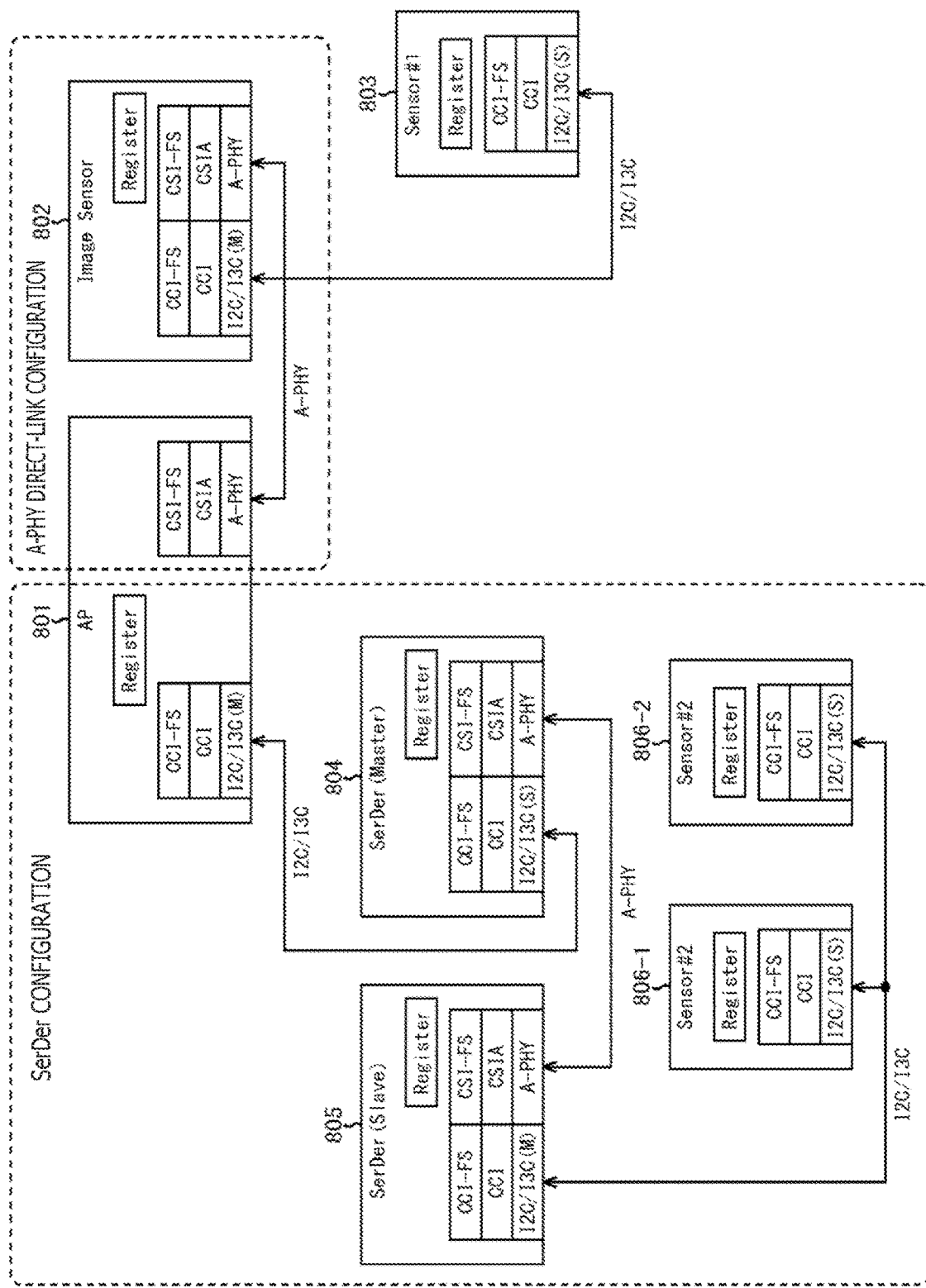
FIG. 64 is a figure depicting an example of a network connection form.

FIG. 64 depicts an example of a network connection form (topology) of A-PHY direct-link configuration and SerDes connection configuration.

A connection form can be configured such that an application processor 801 is directly connected to an image sensor 802 via A-PHY and the image sensor 802 is connected to a sensor 803 via I2C/I3C.

The application processor 801 is connected to a master-side SerDes apparatus 804 via I2C/I3C, and the master-side SerDes apparatus 804 and a slave-side SerDes apparatus 805 are connected via A-PHY. A connection form can be configured such that the slave-side SerDes apparatus 805 is connected to two sensors 806-1 and 806-2 via I2C/I3C.

<Circuit Configuration of CCI-FS Processing Section>

FIG. 65 is a block diagram depicting an example of a circuit configuration of a CCI-FS processing section. A CCI-FS processing section 901 and a register 902 depicted in FIG. 65 have a configuration common to a CCI-FS processing section and a register included in each device mentioned above.

As depicted in FIG. 65, the CCI-FS processing section 901 provided with a CCI-FS switch, a register, and the like on the upper layer, and is provided with a CCI processing section on the lower layer. The CCI-FS processing section 901 includes a CCI-FS transmitting section 911 and a CCI-FS receiving section 912. Various types of register setting value information are supplied from the register 902 to the CCI-FS processing section 901, and an Error notification is supplied from the CCI-FS processing section 901 to the register 902.

The CCI-FS transmitting section 911 includes an extended packet header ePH generating section 921, an extended packet footer ePF generating section 922, and a Destination Address checking section 923.

The extended packet header ePH generating section 921 has an MC generating section 941 that generates a Message Counter and a Packet Length computing section 942 that computes a packet length. The extended packet footer ePF generating section 922 has an extended packet footer ePF1 generating section 943 that generates an extended packet footer ePF1 and a CRC computing section 944 that computes a CRC to be stored in an extended packet footer ePF0.

The CCI-FS receiving section 912 includes an extended packet header ePH checking section 931, an extended packet footer ePF checking section 932, and a Destination Address checking section 933.

The extended packet header ePH checking section 931 has an MC checking section 951 that checks a Message Counter and a Packet Length computing/checking section 952 that computes and checks a packet length. The extended packet footer ePF checking section 932 has an extended packet footer ePF1 checking section 953 that checks an extended packet footer ePF1 and a CRC computing section 954 that computes a CRC to be stored in an extended packet footer ePF0.

By using the CCI-FS transmitting section 911, the CCI-FS processing section 901 can check a Destination Address of data from the upper layer, generate an extended packet header ePH and an extended packet footer ePF, append the extended packet header ePH and the extended packet footer ePF to the data, and supply the data to the lower layer. By using the CCI-FS receiving section 912, the CCI-FS processing section 901 can check a Destination Address of data from the lower layer, check an extended packet header ePH and an extended packet footer ePF, and supply the data to the upper layer.

Here, an operation of a CCI-FS processing section of each device included in the communication system 601 in the configuration example of the SerDes connection configuration depicted in FIG. 40 mentioned above is explained.

The application processor 614 has a Source ID representing itself in an extended packet header ePH at the application processor 614. Further, the CCI-FS processing section 653 appends the information described above and information having a Destination ID representing a target device to be accessed.

Source IDs of the slave-side SerDes apparatus 612 and the master-side SerDes apparatus 613 that represent themselves are set in advance, or the slave-side SerDes apparatus 612 and the master-side SerDes apparatus 613 have them as unique values. The CCI-FS processing section 636 and the CCI-FS processing section 646 perform prior setting for the information described above and information having Destination IDs representing a connection device and a target device.

In addition, the CCI-FS processing section 636 and the CCI-FS processing section 646 compare a Destination ID of a received extended packet header ePH and the IDs (Source IDs) of themselves, and assess whether it is access to themselves or a target device (Destination ID). For example, when a Destination ID of a received extended packet header ePH and the ID (Source ID) of itself agree, it is regarded as access to an intermediate device (SerDes apparatus), and register access to itself is performed. On the other hand, when a Destination ID of a received extended packet header ePH and the ID (Source ID) of itself do not agree, it is regarded as access to a downstream device, and data transfer toward a connected device (Destination ID) is performed.

As described above, data is transferred, and access toward a target device is performed in reference to a Source ID and a Destination ID embedded in an extended packet header ePH, a Source ID that is set in advance for or is a unique value of an intermediate device (SerDes apparatus) or a target device, and connection destination information set in advance.

When a Destination ID of a received extended packet header ePH and the ID (Source ID) of itself agree, the CSI2-FS processing section 623 of the image sensor 611 considers that it is access to the image sensor 611, and performs register access of itself.

In such a manner, as the Source ID of each device, a value unique to the device, a value set in advance, or a combination of them can be used.

FIG. 66 to FIG. 68 are figures depicting detailed configuration examples of the register 902.

FIG. 66 depicts details of an address 0x000 to an address 0x109 of the register 902. FIG. 67 depicts a configuration example at a time of Bridge configuration as details of an address 0x110 to an address 0x125 of the register 902.

FIG. 68 depicts an Error-related register as details of an address 0x200 of the register 902. FIG. 68 depicts an Error-related register (debug) as details of an address 0x300 and an address 0x400 of the register 902. FIG. 68 depicts an Error-Injection-related register (debug) as details of an address 0x800 of the register 902.

Modification Examples of Extended Packet Header ePH

Modification examples of an extended packet header ePH are explained with reference to FIG. 69 and FIG. 70.

Figure 69:
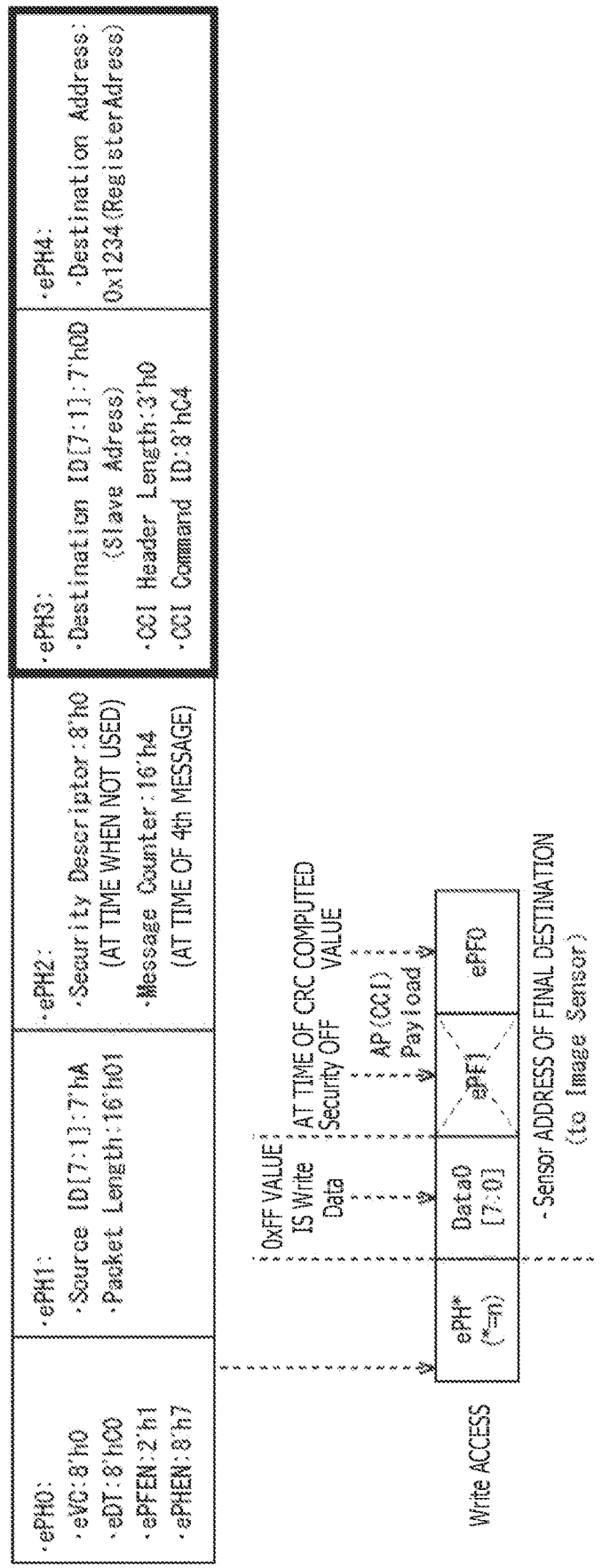
FIG. 69 is a figure depicting a modification example of an extended packet header ePH in a packet configuration of write data generated on an application-processor side.

FIG. 69 depicts a modification example of an extended packet header ePH in packet configuration of write data generated in the CCI-FS processing section 536 of the application processor 512 at a time of write access, as explained with reference to FIG. 33 mentioned above. The extended packet header ePH depicted in FIG. 69 is different from the configuration example depicted in FIG. 33 mentioned above in terms of the configuration of an extended packet header ePH3 and an extended packet header ePH4.

Figure 70:
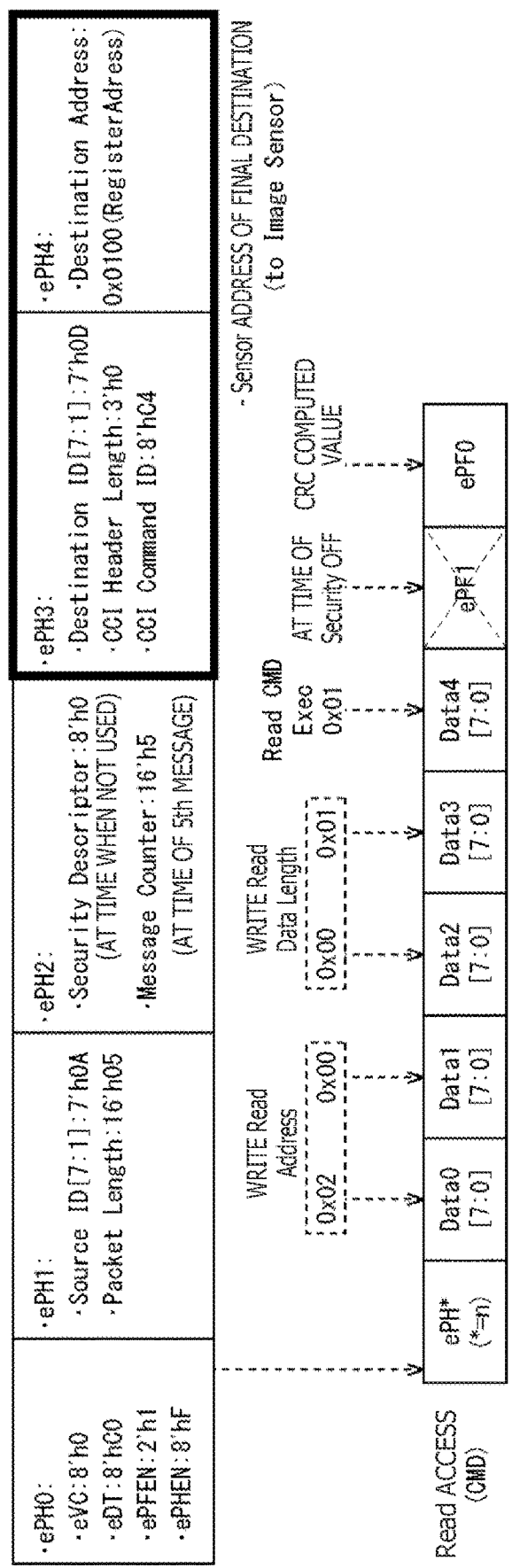
FIG. 70 is a figure depicting a modification example of an extended packet header ePH in packet configuration of a read command generated on an application-processor side.

FIG. 70 depicts a modification example of an extended packet header ePH in packet configuration of write data generated in the CCI-FS processing section 536 of the application processor 512 at a time of read access, as explained with reference to FIG. 28 mentioned above. The extended packet header ePH depicted in FIG. 70 is different from the configuration example depicted in FIG. 28 mentioned above in terms of the configuration of the extended packet header ePH3 and the extended packet header ePH4.

For example, in the extended packet headers ePH depicted in FIG. 69 and FIG. 70, combinations as the ones mentioned below are predicted depending on implementation.

Read address information may be stored in the extended packet header ePH or may be stored in an AP (CCU payload. Length information may be stored in an extended packet header ePH or may be stored in an AP (CCI) payload. CMD information may be stored in a CCI Command ID of an extended packet header ePH. By using the CCI Command ID, start, resumption, and end information of the command is referred to CCI information (e.g., a Slave Address, etc.) may be stored in an AP (CCI) payload with use of a CCI Header Length. The CCI Header Length is information representing the header length in the CCI protocol (I2C).

Figure 71:
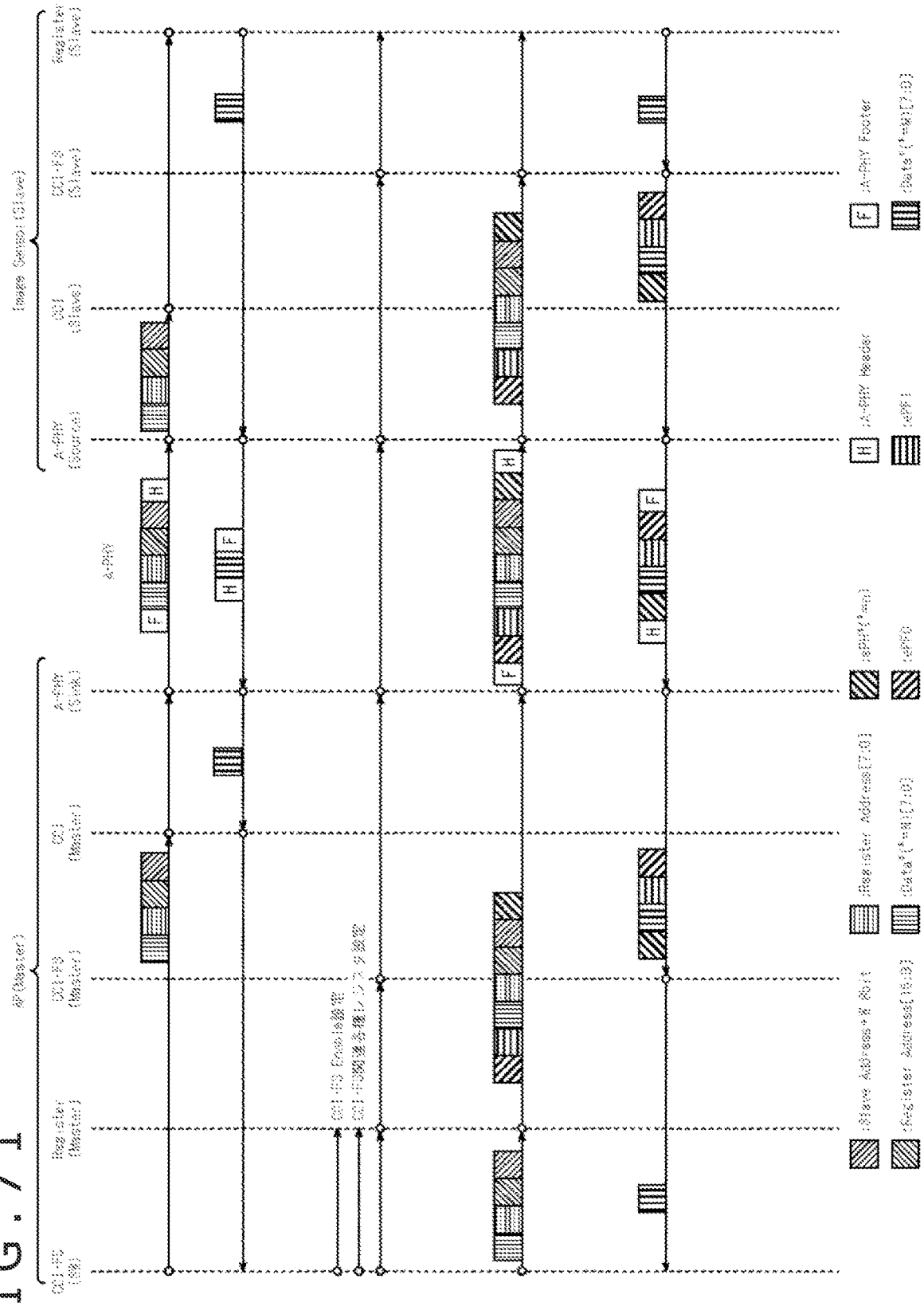
FIG. 71 is a figure for explaining a procedure between an application processor and an image sensor with A-PHY direct-link configuration.

FIG. 71 is a figure for explaining a procedure between the image sensor 511 and the application processor 512 in A-PHY direct-link configuration as the one depicted in FIG. 27.

In the application processor 512, the CCI-FS switch 538 issues a read command and a write command. The CCI-FS switch 538 supplies, to the CCI processing section 535, a slave address (Slave Address+W 8 bits), register addresses (a Register Address[15:8], a Register Address[7:0]), and data (Data* (*=n) [7:0]). The CCI processing section 535 converts them into an AP (CCI) payload, and supplies the AP (CCI) payload to the A-PHY processing section 531. The A-PHY processing section 531 appends an A-PHY header and an A-PHY footer to the AP (CCI) payload, and A-PHY-transfers them to the image sensor 511.

In the image sensor 511, the A-PHY processing section 521 removes the A-PHY header and the A-PHY footer, and supplies the AP (CCI) payload to the CCI processing section 525. The CCI processing section 525 performs conversion of the AP (CCI) payload, writes data in the register 527 according to the write command in reference to the content of the AP (CCI) payload, and reads out data from the register 527 according to the read command.

At this time, initial setting of CCI-FS Enable is performed by the CCI processing section 525, and bus conversion of a register interface, an AHB bus, and the like is performed. Further, checking of the CCI-FS Enable setting is performed through the CCI processing section 525 or the CCI-FS processing section 526.

The CCI processing section 525 converts read data (Data* (*=M) [7:0]) read out from the register 527 according to the read command into an AP (CCI) payload, and supplies the AP (CCI) payload to the A-PHY processing section 521. The A-PHY processing section 521 appends an A-PHY header and an A-PHY footer to the AP (CCI) payload, and A-PHY-transfers them to the application processor 512.

In the application processor 512, the A-PHY processing section 531 removes the A-PHY header and the A-PHY footer, and supplies the AP (CCI) payload to the CCI processing section 535. The CCI processing section 535 performs conversion of the AP (CCI) payload, and supplies read data (Data* (*=M) [7:0]) to the CCI-FS switch 538.

The CCI-FS switch 536 performs CCI-FS Enable setting and CCI-FS-related various register settings of the register 537. At this time, the register access depends on implementation. The CCI-FS switch 538 performs the CCI-FS-related various register setting of the register 527 via the register 537, the CCI-FS processing section 536, the A-PHY processing section 531, the A-PHY processing section 521, and the CCI-FS processing section 526.

In the application processor 512, the CCI-FS switch 538 issues a read command. The CCI-FS switch 538 supplies, to the register 537, a slave address (Slave Address+W 8 bits), register addresses (a Register Address[15:8], a Register Address[7:0]), and data (Data* (*=n) [7:0]). The CCI-FS processing section 536 converts them into an AP (CCI) payload, appends an extended packet header ePH* (*=n), an extended packet footer ePF1, and an extended packet footer ePF0, and supplies them to the A-PHY processing section 531. The A-PHY processing section 531 appends an A-PHY header and an A-PHY footer to them, and A-PHY-transfers them to the image sensor 511.

In the image sensor 511, the A-PHY processing section 521 removes the A-PHY header and the A-PHY footer, and supplies, to the CCI-FS processing section 526, the extended packet header ePH* (*=n), the AP (CCI) payload, the extended packet footer ePF1, and the extended packet footer ePF0. The CCI-FS processing section 526 performs conversion of the AP (CCI) payload, and reads out data from the register 527 according to the read command in reference to the content of the AP (CCI) payload. At this time, the register access depends on implementation, and bus conversion of a register interface, an AHB bus, a CCI interface, and the like is performed.

The CCI-FS processing section 526 converts the read data (Data* (*=M) [7:0]) read out from the register 527 according to the read command into an AP (CCI) payload, appends an extended packet header ePH* (*=n), an extended packet footer ePF1, and an extended packet footer ePF0, and supplies them to the A-PHY processing section 521. The A-PHY processing section 521 appends an A-PHY header and an A-PHY footer to them, and A-PHY-transfers them to the application processor 512.

In the application processor 512, the A-PHY processing section 531 removes the A-PHY header and the A-PHY footer, and supplies, to the CCI-FS processing section 536, the extended packet header ePH* (*=n), the AP (CCI) payload, the extended packet footer ePF1, and the extended packet footer ePF0. The CCI-FS processing section 536 performs conversion of the AP (CCI) payload, and supplies read data (Data* (*=M) [7:0]) to the CCI-FS switch 538.

Note that whereas I2C/I3C command generation at hardware has been explained as an example in the procedure mentioned above, there are other combinations as the ones described below.

In a case of software, as I2C/I3C generation by the software, a Slave Address, a Register address, a Payload, ACK response reception and transmission, and various types of control codes (S, Sr, ACK, NACK, P) are generated by the software (e.g., picturing GPIO control). As I2C/I3C command generation by the software, a Slave Address, a Register address, and a Payload are issued from a CPU in response to ACK reception in CPU bus setting.

In a case of hardware, as I2C/I3C generation by the hardware, transfer setting and data are set in an I2C/I3C HW IP. Various types of control codes are given as automatic responses by the hardware. As I2C/I3C command generation by the hardware, data is set in transfer setting in an I2C/I3C NW IP, and is transmitted in a command. Various types of control codes are given as automatic responses by the hardware.

Figure 72:
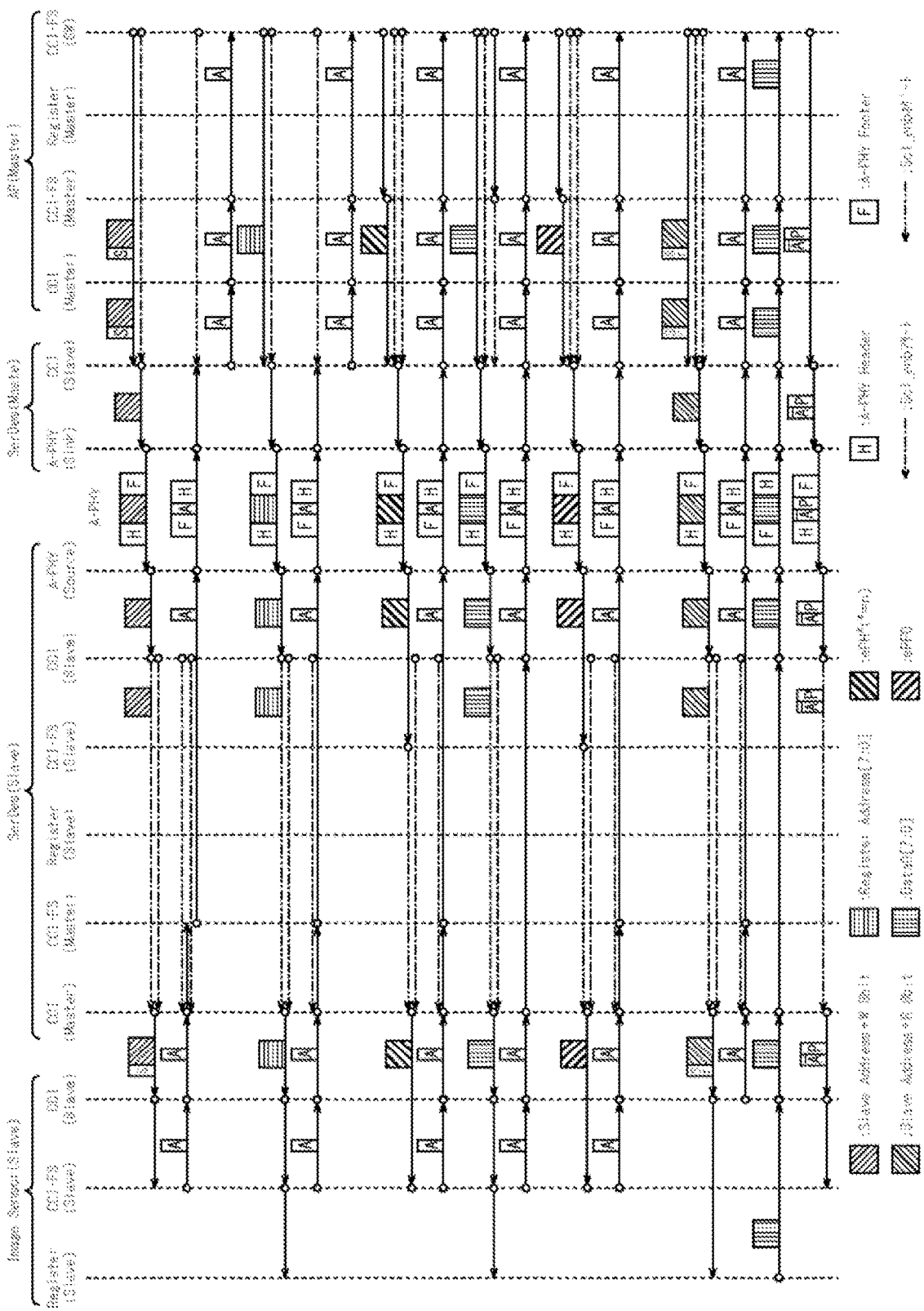
FIG. 72 is a figure for explaining a procedure using a Clock Stretch method.

FIG. 72 is a figure for explaining a procedure using a Clock Stretch method in Write access and Read access between the image sensor 611 and the application processor 614 in a SerDes connection configuration as the one depicted in FIG. 40.

The CCI-FS switch 655 of the application processor 614 supplies a start command and a write command (Slave Address+W 8 bits) to the CCI processing section 645 of the master-side SerDes apparatus 613, and asserts an Scl_enb signal. In the master-side SerDes apparatus 613, the CCI processing section 645 supplies the write command to the A-PHY processing section 641, and the A-PHY processing section 641 appends an A-PHY header and an A-PHY footer to the write command, and A-PHY-transfers them to the slave-side SerDes apparatus 612.

In the slave-side SerDes apparatus 612, the A-PHY processing section 631 removes the A-PHY header and the A-PHY footer, and supplies the write command to a CCI processing section 635 (Slave). The CCI processing section 635 (Slave) negates the Scl_enb signal, and also supplies the write command to a CCI processing section 635 (Master). Here, the CCI processing section 635 that performs communication with the master-side-SerDes-apparatus-613 side and functions as a slave is referred to as the CCI processing section 635 (Slave), and the CCI processing section 635 that performs communication with the image-sensor-611 side and functions as a master is referred to as the CCI processing section 635 (Master).

The CCI processing section 635 (Master) transmits the start command and the write command to the image sensor 611.

In the image sensor 611, the CCI processing section 622 receives the start command and the write command, and supplies them to the CSI2-FS processing section 623. The CSI2-FS processing section 623 supplies, to the CCI processing section 622, an ACK response representing that the commands have successfully been received, and the CCI processing section 622 transmits the ACK response to the slave-side SerDes apparatus 612.

In the slave-side SerDes apparatus 612, the CCI processing section 635 (Master) receives the ACK response, and, when the Scl_enb signal is negated by the CCI processing section 635 (Slave), supplies the ACK response to the CCI-FS processing section 636. Thereafter, the CCI processing section 635 (Slave) asserts the Scl_enb signal for the CCI processing section 635 (Master).

The CCI-FS processing section 636 supplies the ACK response to the A-PHY processing section 631. The A-PHY processing section 631 appends an A-PHY header and an A-PHY footer to the ACK response, and A-PHY-transfers them to the master-side SerDes apparatus 613.

In the master-side SerDes apparatus 613, the A-PHY processing section 641 removes the A-PHY header and the A-PHY footer, and supplies the ACK response to the CCI processing section 645. When the CCI-FS switch 655 of the application processor 614 negates the Scl_enb signal for the CCI processing section 645, the CCI processing section 645 transmits the ACK response to the application processor 614.

In the application processor 614, the CCI processing section 652 receives the ACK response, and supplies the ACK response to the CCI-FS switch 655 via the CCI-FS processing section 653.

The CCI-FS switch 655 of the application processor 614 supplies a register address (Register Address[7:0]) to the CCI processing section 645 of the master-side SerDes apparatus 613, and asserts the Scl_enb signal. In the master-side SerDes apparatus 613, the CCI processing section 645 supplies the register address to the A-PHY processing section 641, and the A-PHY processing section 641 appends an A-PHY header and an A-PHY footer to the register address, and A-PHY-transfers them to the slave-side SerDes apparatus 612.

In the slave-side SerDes apparatus 612, the A-PHY processing section 631 removes the A-PHY header and the A-PHY footer, and supplies the register address to the CCI processing section 635 (Slave). The CCI processing section 635 (Slave) negates the Scl_enb signal, and also supplies the register address to the CCI processing section 635 (Master). The CCI processing section 635 (Master) transmits the register address to the image sensor 611. Thereafter, the CCI processing section 635 (Slave) asserts the Scl_enb signal for the CCI processing section 635 (Master).

In the image sensor 611, the CCI processing section 622 receives the register address, and supplies the register address to the CSI2-FS processing section 623. The CSI2-FS processing section 623 supplies, to the CCI processing section 622, an ACK response representing that the register address has successfully been received, and the CCI processing section 622 transmits the ACK response to the slave-side SerDes apparatus 612.

Thereafter, as in the process described above, the ACK response is supplied to the CCI-FS switch 655.

In the application processor 614, the CCI-FS processing section 653 transmits an extended packet header ePH* (*=n) to the master-side SerDes apparatus 613, under the control by the CCI-FS switch 655.

In the master-side SerDes apparatus 613, the CCI processing section 645 receives the extended packet header ePH* (*=n), and, when the Scl_enb signal is asserted by the CCI-FS switch 655, supplies the extended packet header ePH* (*=n) to the A-PHY processing section 641. Thereafter, the CCI-FS switch 655 negates the Scl_enb signal for the CCI processing section 645. The A-PHY processing section 641 appends an A-PHY header and an A-PHY footer to the extended packet header ePH* (*=n), and A-PHY-transfers them to the slave-side SerDes apparatus 612.

In the slave-side SerDes apparatus 612, the A-PHY processing section 631 removes the A-PHY header and the A-PHY footer, and supplies the extended packet header ePH* (*=n) to the CCI-FS processing section 636. The CCI-FS processing section 636 negates the Scl_enb signal, and also supplies the extended packet header ePH* (*=n) to the CCI processing section 635 (Master). The CCI processing section 635 (Master) transmits the extended packet header ePH* (*=n) to the image sensor 611. Thereafter, the CCI processing section 635 (Slave) asserts the Scl_enb signal for the CCI processing section 635 (Master).

In the image sensor 611, the CSI2-FS processing section 623 receives the extended packet header ePH* (*=n). The CSI2-FS processing section 623 supplies, to the CCI processing section 622, an ACK response representing that the extended packet header ePH* (*=n) has successfully been received, and the CCI processing section 622 transmits the ACK response to the slave-side SerDes apparatus 612.

Thereafter, as in the process described above, the ACK response is supplied to the CCI-FS switch 655.

The CCI-FS switch 655 of the application processor 614 supplies write data (Data0[7:0]) to the CCI processing section 645 of the master-side SerDes apparatus 613, and asserts the Scl_enb signal. In the master-side SerDes apparatus 613, the CCI processing section 645 supplies the write data to the A-PHY processing section 641, and the A-PHY processing section 641 appends an A-PHY header and an A-PHY footer to the write data, and A-PHY-transfers them to the slave-side SerDes apparatus 612.

In the master-side SerDes apparatus 61:3, the CCI processing section 645 receives the write data, and, when the Scl_enb signal is asserted by the CCI-FS switch 655, supplies the write data to the A-PHY processing section 641. Thereafter, the CSI2-FS processing section 653 negates the Scl_enb signal for the CCI processing section 645 according to control by the CCI-FS switch 655. The A-PHY processing section 641 appends an A-PHY header and an A-PHY footer to the write data, and A-PHY-transfers them to the slave-side SerDes apparatus 612.

In the slave-side SerDes apparatus 612, the A-PHY processing section 631 removes the A-PHY header and the A-PHY footer, and supplies the write data to the CCI processing section 635. The CCI processing section 635 negates the Scl_enb signal, and also supplies the write data to the CCI processing section 635 (Master). The CCI processing section 635 (Master) transmits the write data to the image sensor 611. Thereafter, the CCI processing section 635 (Slave) asserts the Scl_enb signal for the CCI processing section 635 (Master).

In the image sensor 611, the CCI processing section 622 receives the write data, and supplies the write data to the CSI2-FS processing section 623, and the CSI2-FS processing section 623 writes the write data in the register 624. The CSI2-FS processing section 623 supplies, to the CCI processing section 622, an ACK response representing that the writing of the write data has succeeded, and the CCI processing section 622 transmits the ACK response to the slave-side SerDes apparatus 612.

Thereafter, as in the process described above, the ACK response is supplied to the CCI-FS switch 655.

In the application processor 614, the CCI-FS processing section 653 transmits an extended packet footer ePF0 to the master-side SerDes apparatus 613, under the control by the CCI-FS switch 655.

In the master-side SerDes apparatus 613, the CCI processing section 645 receives the extended packet footer ePF0, and, when the Scl_enb signal is asserted by the CCI-FS switch 655, supplies the extended packet footer ePF0 to the A-PHY processing section 641. Thereafter, the CCI-FS switch 655 negates the Scl_enb signal for the CCI processing section 645. The A-PHY processing section 641 appends an A-PHY header and an A-PHY footer to the extended packet footer ePF0, and A-PHY-transfers them to the slave-side SerDes apparatus 612.

In the slave-side SerDes apparatus 612, the A-PHY processing section 631 removes the A-PHY header and the A-PHY footer, and supplies the extended packet footer ePF0 to the CCI-FS processing section 636. The CCI-FS processing section 636 negates the Scl_enb signal, and also supplies the extended packet footer ePF0 to the CCI processing section 635 (Master). The CCI processing section 635 (Master) transmits the extended packet footer ePF0 to the image sensor 611. Thereafter, the CCI processing section 635 (Slave) asserts the Scl_enb signal for the CCI processing section 635 (Master).

In the image sensor 611, the CSI2-FS processing section 623 receives the extended packet footer ePF0. The CSI2-FS processing section 623 supplies, to the CCI processing section 622, an ACK response representing that the extended packet footer ePF0 has successfully been received, and the CCI processing section 622 transmits the ACK response to the slave-side SerDes apparatus 612.

Thereafter, as in the process described above, the ACK response is supplied to the CCI-FS switch 655.

The CCI-FS switch 655 of the application processor 614 supplies a repeat start command and a read command (Slave Address+R 8 bits) to the CCI processing section 645 of the master-side SerDes apparatus 613, and asserts the Scl_enb signal. In the master-side SerDes apparatus 613, the CCI processing section 645 supplies the read command to the A-PHY processing section 641, and the A-PHY processing section 641 appends an A-PHY header and an A-PHY footer to the read command, and A-PHY-transfers them to the slave-side SerDes apparatus 612.

In the slave-side SerDes apparatus 612, the A-PHY processing section 631 removes the A-PHY header and the A-PHY footer, and supplies the read command to the CCI processing section 635 (Slave). The CCI processing section 635 (Slave) negates the Scl_enb signal, and also supplies the read command to the CCI processing section 635 (Master). The CCI processing section 635 (Master) transmits the repeat start command and the read command to the image sensor 611.

In the image sensor 611, the CCI processing section 622 receives the repeat start command and the read command, and accesses the register 624. The CCI processing section 622 transmits, to the slave-side SerDes apparatus 612, an ACK response representing that the commands have successfully been received.

Thereafter, as in the process described above, the ACK response is supplied to the CCI-FS switch 655.

In the image sensor 611, the CCI processing section 622 reads out read data (Data0[7:0]) from the register 624, and transmits the read data (Data0[7:0]) to the slave-side SerDes apparatus 612.

In the slave-side SerDes apparatus 612, the CCI processing section 635 (Master) receives the read data, and supplies the read data to the CCI processing section 635 (Slave), and the CCI processing section 635 (Slave) supplies the read data to the A-PHY processing section 631. The A-PHY processing section 631 appends an A-PHY header and an A-PHY footer to the read data, and A-PHY-transfers them to the master-side SerDes apparatus 613.

In the master-side SerDes apparatus 613, the A-PHY processing section 641 removes the A-PHY header and the A-PHY footer, and supplies the read data to the CCI processing section 645, and the CCI processing section 645 transmits the read data to the application processor 614.

In the application processor 614, the CCI processing section 652 receives the read data, and supplies the read data to the CCI-FS switch 655 via the CCI-FS processing section 653.

The CCI-FS switch 655 transmits a NACK response and a stop command to the CCI processing section 645. The CCI processing section 645 supplies the NACK response and the stop command to the A-PHY processing section 641. The A-PHY processing section 641 appends an A-PHY header and an A-PHY footer to the NACK response and the stop command, and A-PHY-transfers them to the slave-side SerDes apparatus 612.

In the slave-side SerDes apparatus 612, the A-PHY processing section 631 removes the A-PHY header and the A-PHY footer, and supplies the NACK response and the stop command to the CCI processing section 635 (Slave). The CCI processing section 635 (Slave) supplies the NACK response and the stop command to the CCI processing section 635 (Master), and the CCI processing section 635 (Master) transmits the NACK response and the stop command to the image sensor 611.

In the image sensor 611, the CCI processing section 622 receives the NACK response and the stop command, and supplies the NACK response and the stop command to the CSI2-FS processing section 623.

Note that, in the procedure explained in FIG. 72, each I2C control command such as start, repeat start, ACK response, NACK response, or stop represents a code in which a Control Code Indicator of the extended packet header ePH0 is set to 1 and which is allocated to a 1-Byte Payload.

Detailed Configuration Examples of Image Sensor and Application Processor

Figure 73:
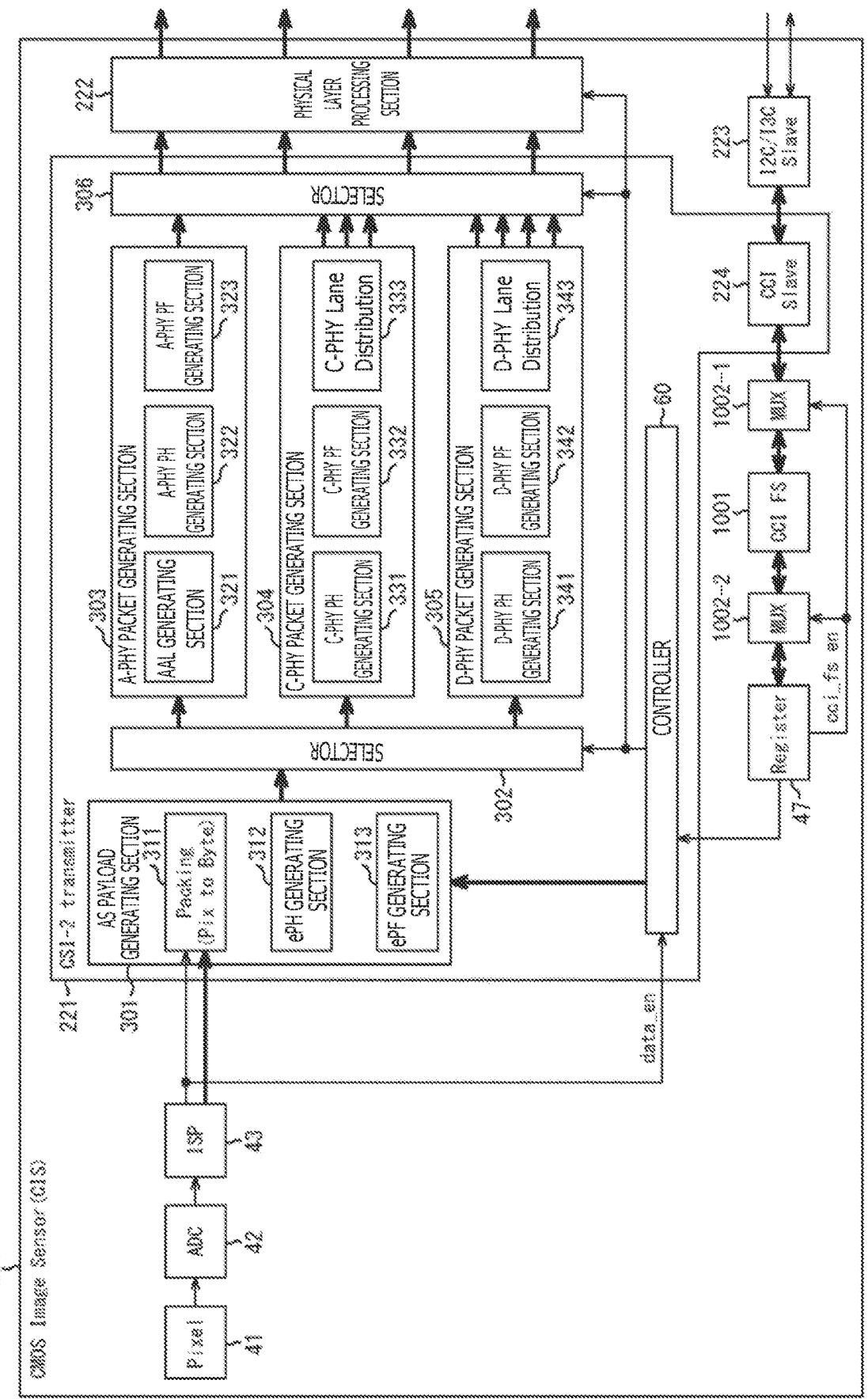
FIG. 73 is a block diagram depicting a detailed configuration example of an image sensor including a CCI-FS processing section.

FIG. 73 is a block diagram depicting a configuration example of a configuration in which the image sensor 211 depicted in FIG. 25 mentioned above includes a CCI-FS processing section 1001. Note that configurations in the image sensor 211 depicted in FIG. 73 that have counterparts in the image sensor 211 in FIG. 25 are given identical reference signs, and explanations thereof are omitted.

As depicted in FIG. 73, the CCI-FS processing section 1001 is arranged between the CCI slave 224 and the register 47, and MUX sections 1002-1 and 1002-2 are arranged such that the CCI-FS processing section 1001 is interposed therebetween. The MUX sections 1002-1 and 1002-2 transmit and receive data via the CCI-FS processing section 1001 in a case where the CCI-FS processing section 1001 is enabled according to a cci_fs_en signal supplied from the register 47. On the other hand, the MUX sections 1002-1 and 1002-2 transmit and receive data not via the CCI-FS processing section 1001 in a case where the CCI-FS processing section 1001 is disabled according to the cci_fs_en signal supplied from the register 47.

Figure 74:
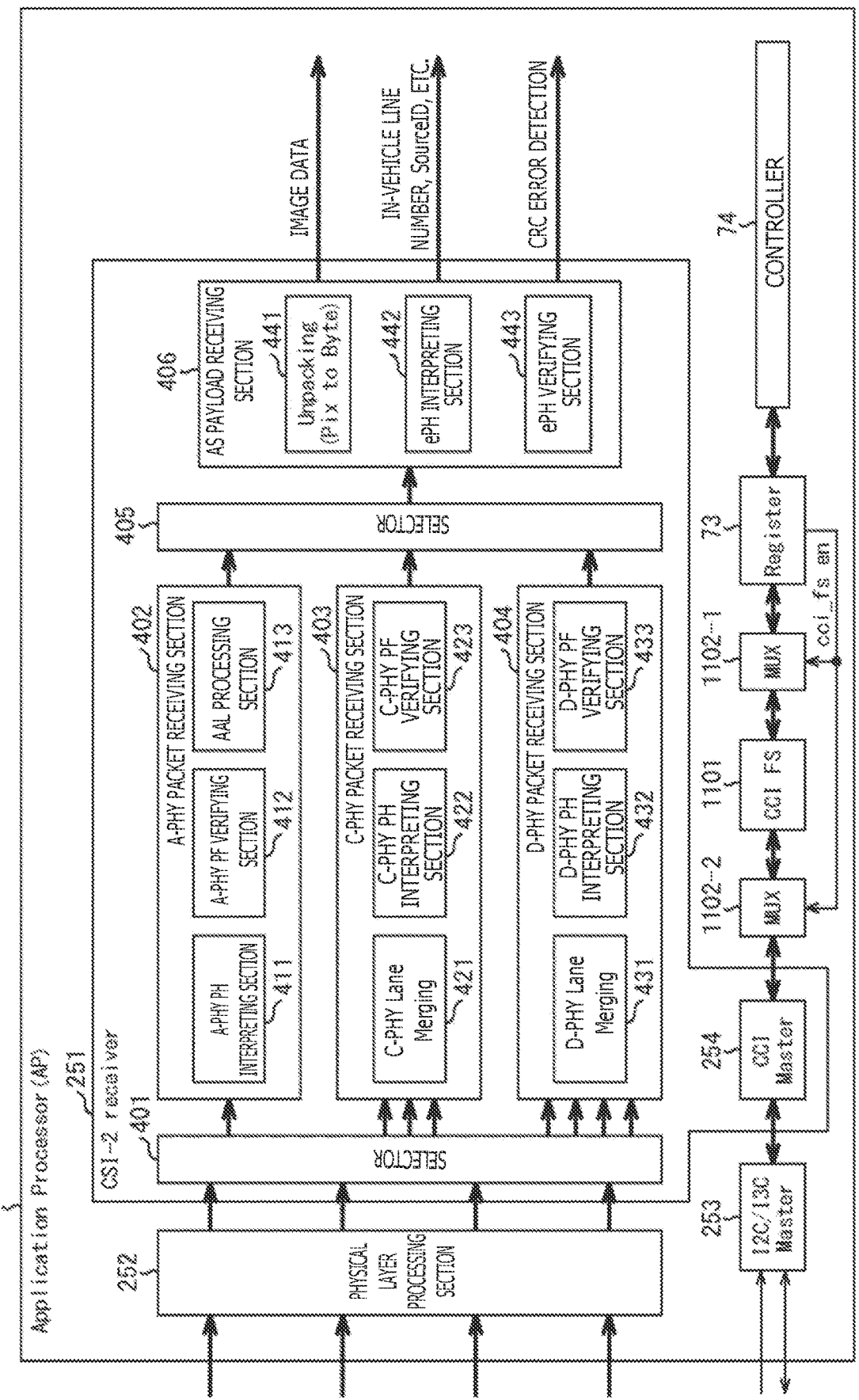
FIG. 74 is a block diagram depicting a detailed configuration example of an application processor including a CCI-FS processing section.

FIG. 74 is a block diagram depicting a configuration example of a configuration in which the application processor 214 depicted in FIG. 26 mentioned above includes a CCI-FS processing section 1101. Note that configurations in the application processor 214 depicted in FIG. 74 that have counterparts in the application processor 214 in FIG. 26 are given identical reference signs, and explanations thereof are omitted.

As depicted in FIG. 74, the CCI-FS processing section 1101 is arranged between the CCI master 254 and the register 73, and MUX sections 1102-1 and 1102-2 are arranged such that the CCI-FS processing section 1101 is interposed therebetween. The MUX sections 1102-1 and 1102-2 transmit and receive data via the CCI-FS processing section 1101 in a case where the CCI-FS processing section 1101 is enabled according to the cci_fs_en signal supplied from the register 73. On the other hand, the MUX sections 1102-1 and 1102-2 transmit and receive data not via the CCI-FS processing section 1101 in a case where the CCI-FS processing section 1101 is disabled according to the cci_fs_en signal supplied from the register 73.

Note that regarding an implementation method of each field in the configuration of an extended packet header ePH, such a configuration as the ones mentioned below may be adopted.

An extended VC is left unused in Safe CCI. (A similar configuration is adopted such that matters related to an extended header in MIPI and a Header field are consistent with each other.)

In an extended DT, command-related information of a bus from the upper side may be embedded, or implementation configuration of setting of a signal line from a register setting may be adopted.

Protocol is described in I2C, and a similar technique can be implemented in the I3C SDR mode.

Configuration Example of Communication System

A communication system according to a fourth embodiment to which the present technology is applied is explained with reference to FIG. 75 to FIG. 117.

Figure 75:
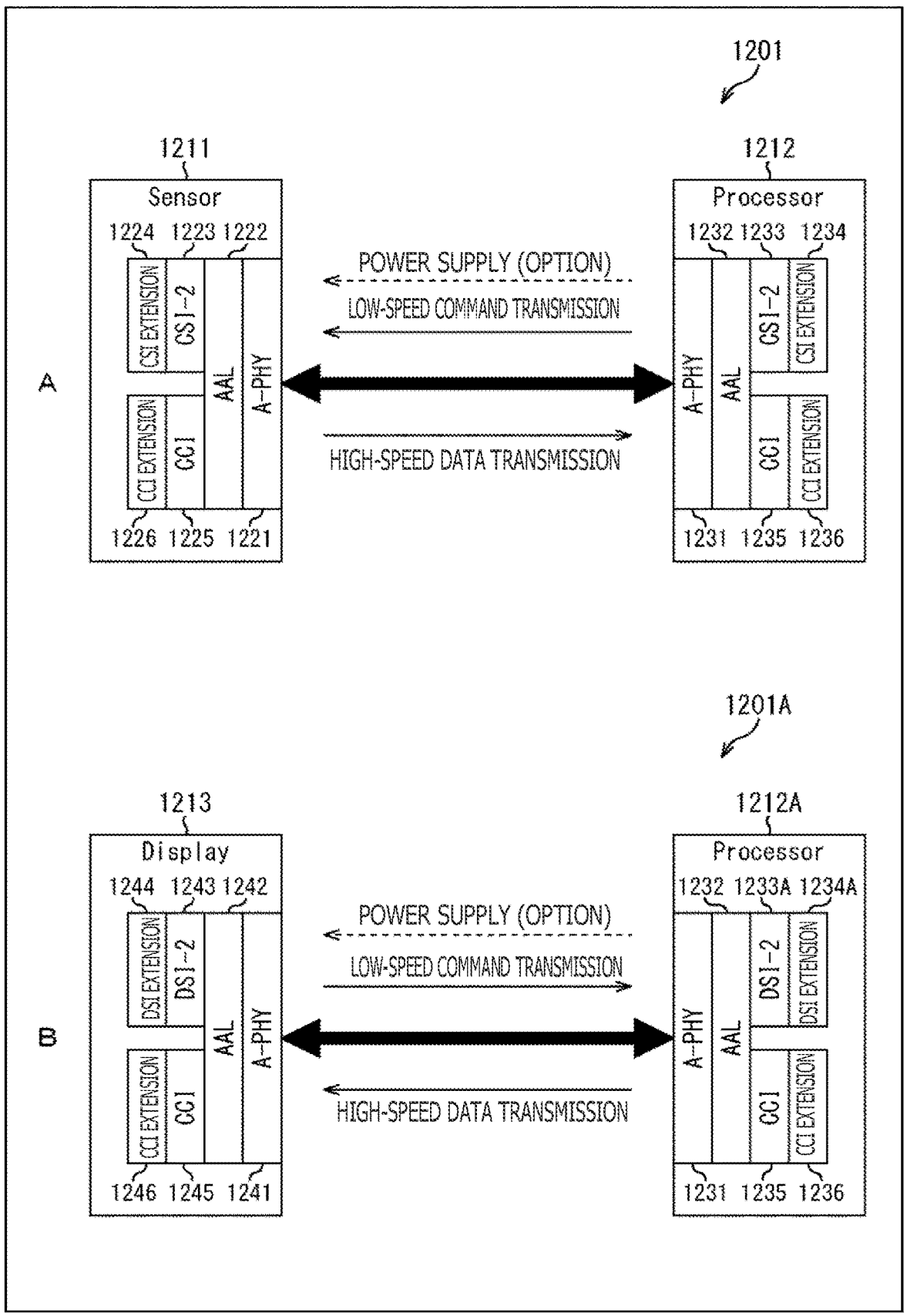
FIG. 75 depicts block diagrams depicting a configuration example of a communication system according to a fourth embodiment to which the present technology is applied.

FIG. 75 depicts block diagrams of a communication system according to the fourth embodiment. In FIG. 75, A depicts a communication system 1201 which is a first variation, and B of FIG. 75 depicts a communication system 1201A which is a second variation.

The communication system 1201 depicted in A of FIG. 75 includes an image sensor 1211 and an application processor 1212 that are connected directly with each other.

The image sensor 1211 has a configuration in which an All layer 1222 is arranged on an A-PHY layer 1221 and a CSI-2 transmitting section 1223 and a CSI extending section 1224 as well as a CCI slave 1225 and a CCI extending section 1226 are arranged thereon. Providing the CSI extending section 1224 to the CSI-2 transmitting section 1223 and providing the CCI extending section 1226 to the CCI slave 1225 make it possible for the image sensor 1211 to support respective extended standards.

The application processor 1212 has a configuration in which an All layer 1232 is arranged on an A-PHY layer 1231 and a CSI-2 receiving section 1233 and a CSI extending section 1234 as well as a CCI master 1235 and a CCI extending section 1236 are arranged thereon. Providing the CSI extending section 1234 to the CSI-2 receiving section 1233 and providing the CCI extending section 1236 to the CCI master 1235 make it possible for the application processor 1212 to support respective extended standards. Note that CSI extensions may be referred to as Camera Service Extensions (CSE).

The communication system 1201A depicted in B of FIG. 75 includes a display 1213 and an application processor 1212A connected with each other. Note that instead of the CSI-2 receiving section 1233 and CSI extending section 1234 of the application processor 1212 in A of FIG. 75, the application processor 1212A includes a DSI-2 transmitting section 1233A and a DSI extending section 1234A, and the other blocks are the same as those of the application processor 1212.

The display 1213 has a configuration in which an All layer 1242 is arranged on an A-PHY layer 1241 and a DSI-2 receiving section 1243 and a DSI extending section 1244 as well as a CCI slave 1245 and a CCI extending section 1246 are arranged thereon. Providing the DSI extending section 1244 to the DSI-2 receiving section 1243 and providing the CCI extending section 1246 to the CCI slave 1245 make it possible for the display 1213 to support respective extended standards. Note that DSI extensions may be referred to as Display Service Extensions (DSE).

The thus-configured communication systems 1201 and 1201A can perform at least high-speed data transmission of transmitting data with frames including image data in one direction and low-speed command transmission of transmitting commands related to high-speed data transmission in the opposite direction. For example, in low-speed command transmission, at least transmission of a high-speed data transmission start order requesting the start of high-speed data transmission is performed. In addition, high-speed data transmission is fast as compared with low-speed command transmission, and is started in response to reception of the high-speed data transmission start order.

It should be noted that the communication system 1201 having the application processor 1212 whose communication partner is the image sensor 1211 and the communication system 1201A having the application processor 1212A whose communication partner is the display 1213 have different directions of high-speed data transmission and low-speed command transmission. That is, in the communication system 1201, image data is transmitted from the image sensor 1211 to the application processor 1212, and in the communication system 1201A, image data is transmitted from the application processor 1212A to the display 1213.

In A-PHY of physical layer standards, high-speed data transmission and low-speed command transmission are performed via part or the whole of common communication paths. In addition, A-PHY supports an option that enables transfer, via common communication paths, of part or the whole of power supply from the application processor 1212 to the image sensor 1211 and power supply from the application processor 1212A to the display 1213.

Meanwhile, for example, low-speed command transmission is compliant with CCI in the CSI-2 standard, and the communication is performed according to the I2C or I3C standard. At this time, low-speed command transmission can transfer commands not only on an independent I2C or I3C physical layer, but also with part or the whole of physical layers of any of D-PHY, C-PHY, and A-PHY being repurposed. On the other hand, high-speed data transmission transfers data via part or the whole of physical layers of any of D-PHY, C-PHY, and A-PHY.

Note that, for example, in a case where low-speed command transmission is compliant with Unified Serial Link (USL) in the CSI-2 standard, low-speed command transmission can transfer commands via part or the whole of physical layers of any of D-PHY or C-PHY. That is, high-speed data transmission and low-speed command transmission are capable of transfer via part or the whole of physical layers of any of D-PHY, C-PHY, A-PHY, I2C, and I3C.

Note that whereas FIG. 75 explains the configuration example including the application processors 1212 and 1201A, the communication systems 1201 and 1201A may include electronic control units (ECU: Electronic Control Units), for example. That is, the application processor is not limited to the application processor 1212 as long as it is a processor that is capable of communication by direct connection or indirect connection with the image sensor 1211, the display 1213, or the like. In addition, configuration including various types of sensors other than the image sensor 1211 may be adopted.

The thus-configured communication systems 1201 and 1201A adopt nonce value transmission methods or initialization vector configuration including nonce values as the ones explained below.

Specifically, initialization vectors including nonce values are required in particular common key encryption algorithms (e.g., AES-GCM/GMAC). Because of this, it is required that initialization-vector and nonce-value setting rules be agreed upon in advance between the image sensor 1211 and the application processor 1212 or between the display 1213 and the application processor 1212A.

However, if erroneous recognition or tampering of a nonce value occurs inside the image sensor 1211, the application processor 1212 or 1201A, or the display 1213, decoding of encrypted image data, authentication of a message, or the like on the downstream side thereof fails undesirably. Accordingly, in order to avoid a malfunction that undesirably prevents normal transmission of image data, a countermeasure technology related to erroneous recognition and tampering of nonce values is necessary.

Meanwhile, as new security specifications for the MIPI Camera Serial Interface (CSI) standard or the MIPI Display Serial Interface (DSI) standard, it has been necessary to define initialization vectors suited for the CSI standard or the DSI standard. In view of this, the present technology discloses nonce-value transmission methods or an initialization vector configuration including nonce values suitable for an image capturing apparatus compliant with the CSI standard including the image sensor 1211 or a display apparatus compliant with the DSI standard including the display 1213.

Note that whereas processes performed between the image sensor 1211 and the application processor 1212 are explained below, similar processes can be performed also between the display 1213 and the application processor 1212A.

FIG. 76 is a block diagram depicting a detailed configuration example of the image sensor 1211.

The image sensor 1211 includes a pixel 1301, an AD converter 1302, an image processing section 1303, an extension-mode-supporting CSI-2 transmission circuit 1304, a physical layer processing section 1305, an I2C/I3C slave 1306, a storage section 1307, a message counter 1308, a nonce updating section 1309, and a security section 1310. Note that the pixel 1301, the AD converter 1302, the image processing section 1303, the extension-mode-supporting CSI-2 transmission circuit 1304, the physical layer processing section 1305, the I2C/I3C slave 1306 and the storage section 1307 are configured similarly to their corresponding blocks in other embodiments described above, and detailed explanations thereof are omitted.

Every time an extended packet satisfying a predetermined count condition is transmitted, the message counter 1308 updates the message count value in the image sensor 1211.

The security section 1310 derives a session key in the image sensor 1211, and uses the session key to generate first protected data (e.g., an integrity calculated value calculated for protecting the integrity, encryption data encrypted for protecting the confidentiality) of data to be transmitted by high-speed data transmission.

Every time the security section 1310 generates the first protected data, the nonce updating section 1309 updates the nonce (nonce; number used once) value in the image sensor 1211.

The thus-configured image sensor 1211 transfers part or the whole of the nonce value and part or the whole of the message count value by high-speed data transmission to the application processor 1212. For example, the part or the whole of the nonce value may be a count value or a random number. In addition, the part or the whole of the nonce value is stored outside an extended packet header and transmitted, and image data is stored in packet data and transmitted.

In the image sensor 1211, the message counter 1308 and the nonce updating section 1309 may be configured as separate blocks or may be configured as an integrated block. For example, in a case where the message counter 1308 and the nonce updating section 1309 are configured as separate blocks, the nonce value and the message count value can be updated asynchronously. This allows the degree of freedom of the nonce value and the message count value to be increased.

On the other hand, in a case where the message counter 1308 and the nonce updating section 1309 are configured as an integrated block, the nonce value and the message count value can be updated synchronously. In that case, if a count value is used as the nonce value, the message count value shares part or the whole of the nonce value, so that the bit width of the message counter 1308 can be saved. That is, the message counter 1308 may be part or the whole of the nonce updating section 1309, and part or the whole of the message counter 1308 can be part of the nonce updating section 1309.

Figure 77:
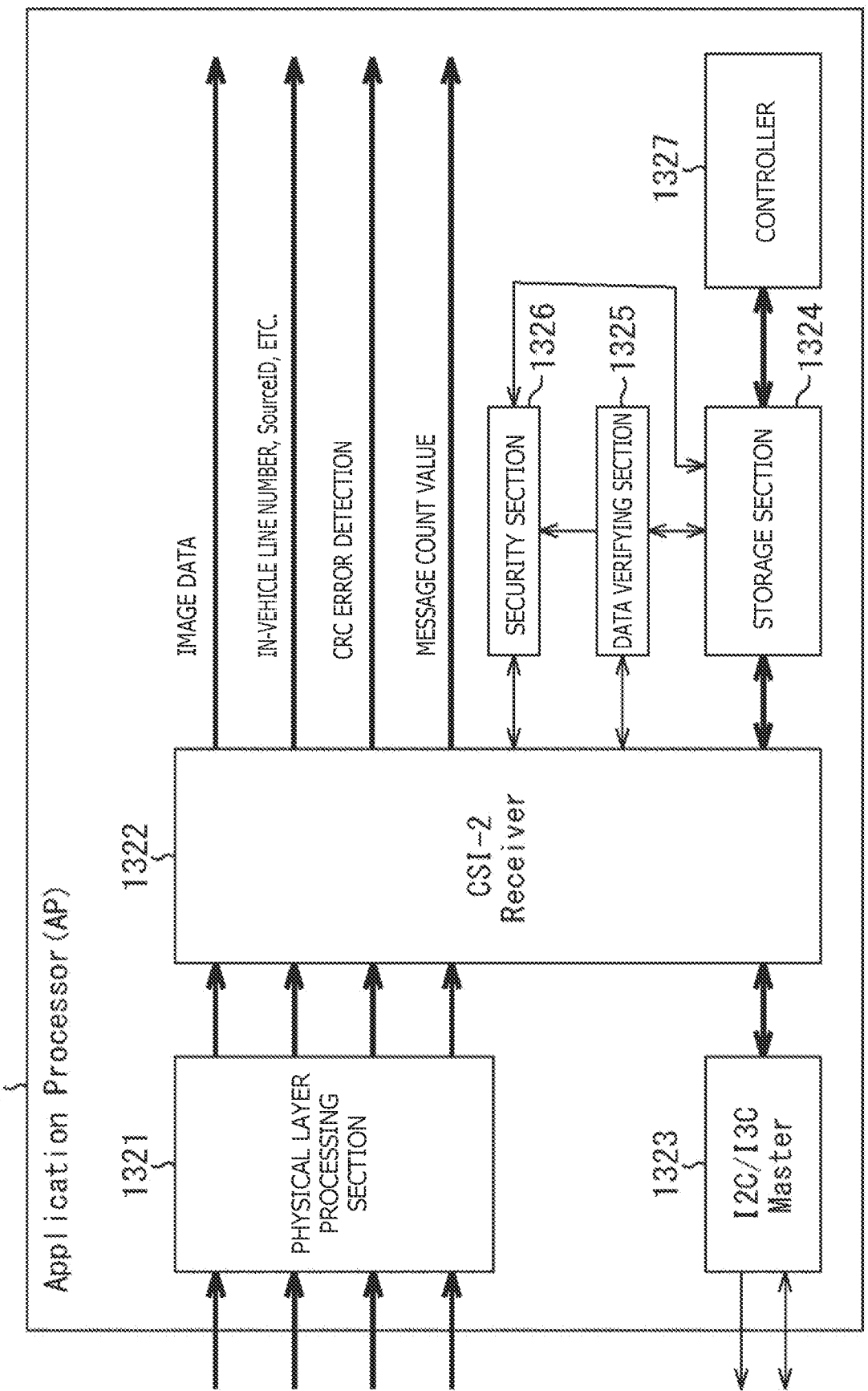
FIG. 77 is a block diagram depicting a detailed configuration example of an application processor.

FIG. 77 is a block diagram depicting a detailed configuration example of the application processor 1212.

The application processor 1212 includes a physical layer processing section 1321, an extension-mode-supporting CSI-2 reception circuit 1322, an I2C/I3C master 1323, a storage section 1324, a data verifying section 1325, a security section 1326, and a controller 1327. Note that the physical layer processing section 1321, the extension-mode-supporting CSI-2 reception circuit 1322, the I2C/I3C master 1323, and the storage section 1324 are configured similarly to corresponding blocks in other embodiments described above, and detailed explanations thereof are omitted.

The data verifying section 1325 verifies the validity of the nonce value or the message count value transmitted from the image sensor 1211 to the application processor 1212.

The security section 1326 derives a session key in the application processor 1212 corresponding to a session key in the image sensor 1211, and uses the session key in the application processor 1212 to verify first protected data of image data (verification of the integrity) or decode it.

In the thus-configured application processor 1212, the data verifying section 1325 can verify the continuity of the count value in a case where the data to be verified is the count value. In addition, the data verifying section 1325 may have a configuration including a counter, and perform comparison and verification by updating the count value similarly to the image sensor 1211. Note that, in a case where data to be verified is a random number, the data verifying section 1325 may verify its randomness. Note that the data verifying section 1325 may include the nonce updating section 1309 (or a message counter), and may use this to verify or decode the first protected data or may use this to verify the data to be verified.

The image sensor 1211 and the application processor 1212 can have a configuration to be mounted on a desired mobile apparatus. For example, the mobile apparatus may be a portable mobile apparatus, and, for example, may be any of a portable phone, a smartphone, a digital camera, a game machine, and the like. The mobile apparatus may be a propulsion apparatus, and, for example, may be any of a vehicle, a robot, a drone, and the like capable of propelling itself (capable of moving, travelling, walking, flying, and so on). The mobile apparatus may be any of an autonomous vehicle, an autonomous robot, an autonomous drone and the like that can autonomously propel itself by having an AI (Artificial Intelligence) functionality. The propulsion of the propulsion apparatus may be controlled by a user of the propulsion apparatus, and the propulsion apparatus may give instructions or warnings to the user as necessary. On the other hand, the propulsion apparatus may be configured to perform automatic control of the propulsion apparatus with respect to the propulsion of the propulsion apparatus.

For example, the security sections 1310 and 1326 may each include a security calculating section that executes calculation for protecting image data. Accordingly, by using the security calculating sections, the security sections 1310 and 1326 can process any of encryption calculation, decoding calculation, hash value calculation, message authentication code calculation, digital signature calculation, ID (identification) authentication, firmware measurement, encryption session key establishment, key exchange, key updating, and the like.

On the other hand, any of the security sections 1310 and 1326, the nonce updating section 1309, the message counter 1308, and the data verifying section 1325 can have a configuration electrically directly connected with a memory. The memory may be electrically directly connected with a register, and any of the security sections 1310 and 1326, the nonce updating section 1309, the message counter 1308, and the data verifying section 1325 may be electrically directly connected with the register. The memory may be a memory protected from any of leakage or tampering of information in the memory. Such a memory and a register are used as the storage sections 1307 and 1324, respectively.

The storage sections 1307 and 1324 may have stored thereon any of key information (e.g., a pre-shared key, a private key, a public key, or a session key), a certificate (e.g., a root certificate, an intermediate certificate, or a leaf certificate), encryption algorithm information, and the like. The storage sections 1307 and 1324 may have stored thereon any of functionality information regarding the image sensor 1211 or the application processor 1212, ID information (e.g., a source ID, a destination ID, a final destination ID, etc.) regarding the image sensor 1211 or the application processor 1212, firmware information regarding the image sensor 1211 or the application processor 1212, and the like. The storage sections 1307 and 1324 may have stored thereon any of session information mentioned later (e.g., a session ID), a calculated value (e.g., an initial value, an intermediate value, or a final value) of a security calculating section, an initialization vector, a nonce value, a message count value, a frame number (frame count value), and the like.

For example, by the image sensor 1211 or the application processor 1212 storing any of nonce values, count values, integrity calculated values, encryption information, and the like of multiple instances on the storage section 1307 or 1324, it becomes possible for any of the security sections 1310 and 1326, the nonce updating section 1309, the message counter 1308, and the data verifying section 1325 to determine whether or not there is a malfunction, and to also handle the malfunction (e.g., requesting data re-transmission of a malfunctioning portion, transmitting an abnormality message). In addition, in a case where any of nonce values, count values, integrity calculated values, encryption information and the like is/are stored regularly on the protected storage section 1307 or 1324, there is also an advantage that, if there is an accident of the mobile apparatus, it becomes easier to identify the cause of occurrence of the accident by analyzing the protected storage section 1307 or 1324.

<Sessions>

A requester and a responder, that is, the application processor 1212 and the image sensor 1211, can have one or more communication channels in a session. An explanation is given below in regard to a session using, as an example, a configuration in which the application processor 1212 is a requester and the image sensor 1211 is a responder. Of course, the application processor 1212 may be a responder, and the image sensor 1211 may be a requester.

In addition, a requester and a responder can construct a safe communication channel by using temporarily fixed encryption information. Specifically, a session provides encryption and/or message authentication. For example, a session includes three phases, i.e., a session handshake phase, an application phase, and a session termination phase.

For example, the session handshake phase is started by a key exchange request (either PSK_EXCHANGE or KEY_EXCHANGE) from a requester, and, in the session handshake phase, session keys such as a session secret or an encryption key are derived, to protect communication with use of the session keys. For example, the purpose of this phase is to make it possible to first construct trust between a responder and a requester before either side transmits application data (e.g., image data). Furthermore, a certain degree of integrity of a handshake and the synchronicity with a derived handshake secret may be guaranteed.

In a case where an error occurs at this phase, the session may end immediately, and proceed to a session end. If the handshake succeeds, for example, the phase is ended by a finish response (FINISH_RSP or PSK_FINISH_RSP) from the responder, and the application phase starts. If a handshake is completed once and all verifications are passed, the session reaches the application phase at which either the responder or the requester is allowed to transmit application data.

For example, the application phase ends in a case where an end request (END_SESSION) is issued from the requester or in a case where an error occurs. The next phase is the session termination phase.

For example, the session termination phase is merely an internal phase, and there is not an explicit message to be transmitted or received. Both the requester and the responder discard or clean up all derived session keys such as a session secret or an encryption key when the session ends. The requester and the responder may have other internal data associated with the session, and may be asked to also clean it up.

For example, the session secret used for deriving an encryption key and a salt used in the AEAD (Authenticated Encryption with Additional Data) function. When the encryption key is derived, HMAC may be used frequently as defined in RFC2104 and HKDF-Expand explained in RFC5869. The session secret may include a single secret or multiple types of secrets. The session key may include a single key or multiple types of keys.

Process Example of High-Speed Data Transmission and Low-Speed Command Transmission A communication process in which high-speed data transmission and low-speed command transmission are performed between the image sensor 1211 and the application processor 1212 is explained with reference to FIG. 78 to FIG. 80.

Figure 78:
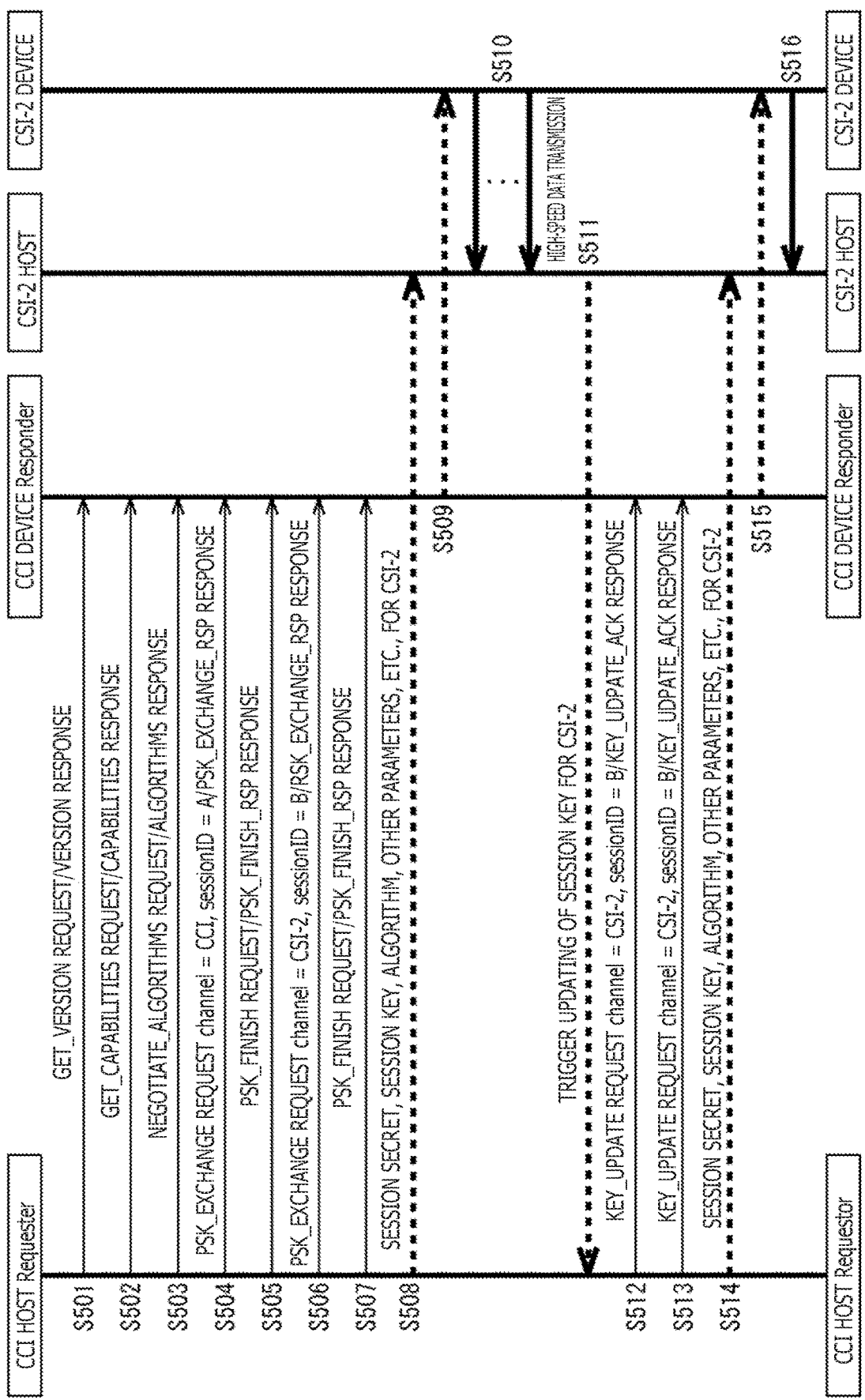
FIG. 78 is a flowchart for explaining a first processing example of a communication process.

FIG. 78 is a flowchart for explaining a first processing example of the communication process.

Here, the extension-mode-supporting CSI-2 reception circuit 1322 of the application processor 1212 has a functionality as a CCI host (requester) and a CSI-2 host. The extension-mode-supporting CSI-2 transmission circuit 1304 of the image sensor 1211 has a functionality as a CCI device (responder) and a CSI-2 device. The CCI host transmits a request message to the CCI device, and, in response to reception of the request message, the CCI device transmits a response message to the CCI host.

In Step S501, a GET_VERSION request and a VERSION response are made between the CCI host of the extension-mode-supporting CSI-2 reception circuit 1322 and the CCI device of the extension-mode-supporting CSI-2 transmission circuit 1304. As a result, the extension-mode-supporting CSI-2 reception circuit 1322 acquires an SPDM (Security Protocol and Data Model) version of an end point.

In Step S502, a GET_CAPABILITIES request and a CAPABILITIES response are made between the CCI host of the extension-mode-supporting CSI-2 reception circuit 1322 and the CCI device of the extension-mode-supporting CSI-2 transmission circuit 1304. As a result, the extension-mode-supporting CSI-2 reception circuit 1322 acquires the SPDM functionality of the end point.

In Step S503, a NEGOTIATE_ALGORITHMS request and an ALGORITHMS response are made between the CCI host of the extension-mode-supporting CSI-2 reception circuit 1322 and the CCI device of the extension-mode-supporting CSI-2 transmission circuit 1304. As a result, the extension-mode-supporting CSI-2 reception circuit 1322 negotiates an encryption algorithm with the extension-mode-supporting CSI-2 transmission circuit 1304.

In Step S504, a PSK_EXCHANGE request and a PSK_EXCHANGE_RSP response are made between the CCI host of the extension-mode-supporting CSI-2 reception circuit 1322 and the CCI device of the extension-mode-supporting CSI-2 transmission circuit 1304. As a result, the extension-mode-supporting CSI-2 reception circuit 1322 and the extension-mode-supporting CSI-2 transmission circuit 1304 derive session keys for CCI such as a session secret or an encryption key.

In Step S505, a PSK_FINISH request and a PSK_FINISH_RSP response are made between the CCI host of the extension-mode-supporting CSI-2 reception circuit 1322 and the CCI device of the extension-mode-supporting CSI-2 transmission circuit 1304. As a result, it is certified, to the responder, that the extension-mode-supporting CSI-2 reception circuit 1322 knows a PSK (PSK: Pre-shared key) and the session key for CCI derived in Step S504 is correct.

In Step S506, a PSK_EXCHANGE request and a PSK_EXCHANGE_RSP response are made between the CCI host of the extension-mode-supporting CSI-2 reception circuit 1322 and the CCI device of the extension-mode-supporting CSI-2 transmission circuit 1304. As a result, the extension-mode-supporting CSI-2 reception circuit 1322 and the extension-mode-supporting CSI-2 transmission circuit 1304 derive session keys for CSI-2 such as a session secret or an encryption key.

In Step S507, a PSK_FINISH request and a PSK_FINISH_RSP response are made between the CCI host of the extension-mode-supporting CSI-2 reception circuit 1322 and the CCI device of the extension-mode-supporting CSI-2 transmission circuit 1304. As a result, it is certified, to the responder, that the extension-mode-supporting CSI-2 reception circuit 1322 knows a PSK (PSK: Pre-shared key) and the session key for CSI-2 derived in Step S506 is correct.

Here, the certification of the session keys in Steps S505 and S507 is realized by a MAC value computed from a finished_key of the requester and a message of the session. Then, the subsequent CCI communication and CSI-2 communication are protected with use of the session keys derived in Steps S504 and S506.

In Step S508, in the extension-mode-supporting CSI-2 reception circuit 1322, the session secret, the session key, an algorithm, other parameters, and the like for CSI-2 are supplied from the CCI host to the CSI-2 host.

In Step S509, in the extension-mode-supporting CSI-2 transmission circuit 1304, the session secret, the session key, an algorithm, other parameters, and the like for CSI-2 are supplied from the CCI device to the CSI-2 device.

In Step S510, the CSI-2 device of the extension-mode-supporting CSI-2 transmission circuit 1304 performs transmission of image data by high speed data communication to the CSI-2 host of the extension-mode-supporting CSI-2 reception circuit 1322. For example, high speed data communication is performed continuously until a timing to update the session key for CSI-2.

In Step S511, in the extension-mode-supporting CSI-2 reception circuit 1322, a trigger to update the session key for CSI-2 is supplied from the CSI-2 host to the CCI host. It should be noted that a trigger may be supplied from the CSI-2 device or the CCI device to the CCI host, or a self-trigger may be supplied from the CCI host to the CCI host.

In Step S512, a KEY_UPDATE request and a KEY_UPDATE_ACK response are made between the CCI host of the extension-mode-supporting CSI-2 reception circuit 1322 and the CCI device of the extension-mode-supporting CSI-2 transmission circuit 1304. As a result, the session key is updated, and the old session key is partially discarded. Note that, in a case where the session key includes multiple types of keys (a request direction a response direction key, etc.), some or all of the multiple types of keys may be updated. In addition, the KEY_UPDATE request may be issued from the responder using a GET_ENCAPSULATED_REQUEST mechanism described later.

In Step S513, a process similar to Step S512 is performed, and a KEY_UPDATE request and a KEY_UPDATE_ACK response are each made twice. As a result, (all) remaining old session keys that have not been discarded simply by the process in Step S512 are discarded.

In Step S514, in the extension-mode-supporting CSI-2 reception circuit 1322, the session secret, the session key (after being updated), an algorithm, other parameters, and the like for CSI-2 are supplied from the CCI host to the CSI-2 host.

In Step S515, in the extension-mode-supporting CSI-2 transmission circuit 1304, the session secret, the session key (after being updated), an algorithm, other parameters, and the like for CSI-2 are supplied from the CCI device to the CSI-2 device.

As in Step S510, in Step S516, transmission of image data by high speed data communication is started, and thereafter processes similar to Steps S510 to S515 are performed repeatedly.

Note that, in the first processing example of the communication process, the session key for CCI and the session key for CSI-2 are different session keys, the session IDs for CCI and CSI-2 are different session IDs, and the session secrets for CCI and CSI-2 are different session secrets. These are not the sole examples. As in a second processing example of the communication process, the session key for CCI and the session key for CSI-2 may be the same session keys, the session IDs for CCI and CSI-2 may be the same session ID, and the session secrets for CCI and CSI-2 may be the same session secret.

Figure 79:
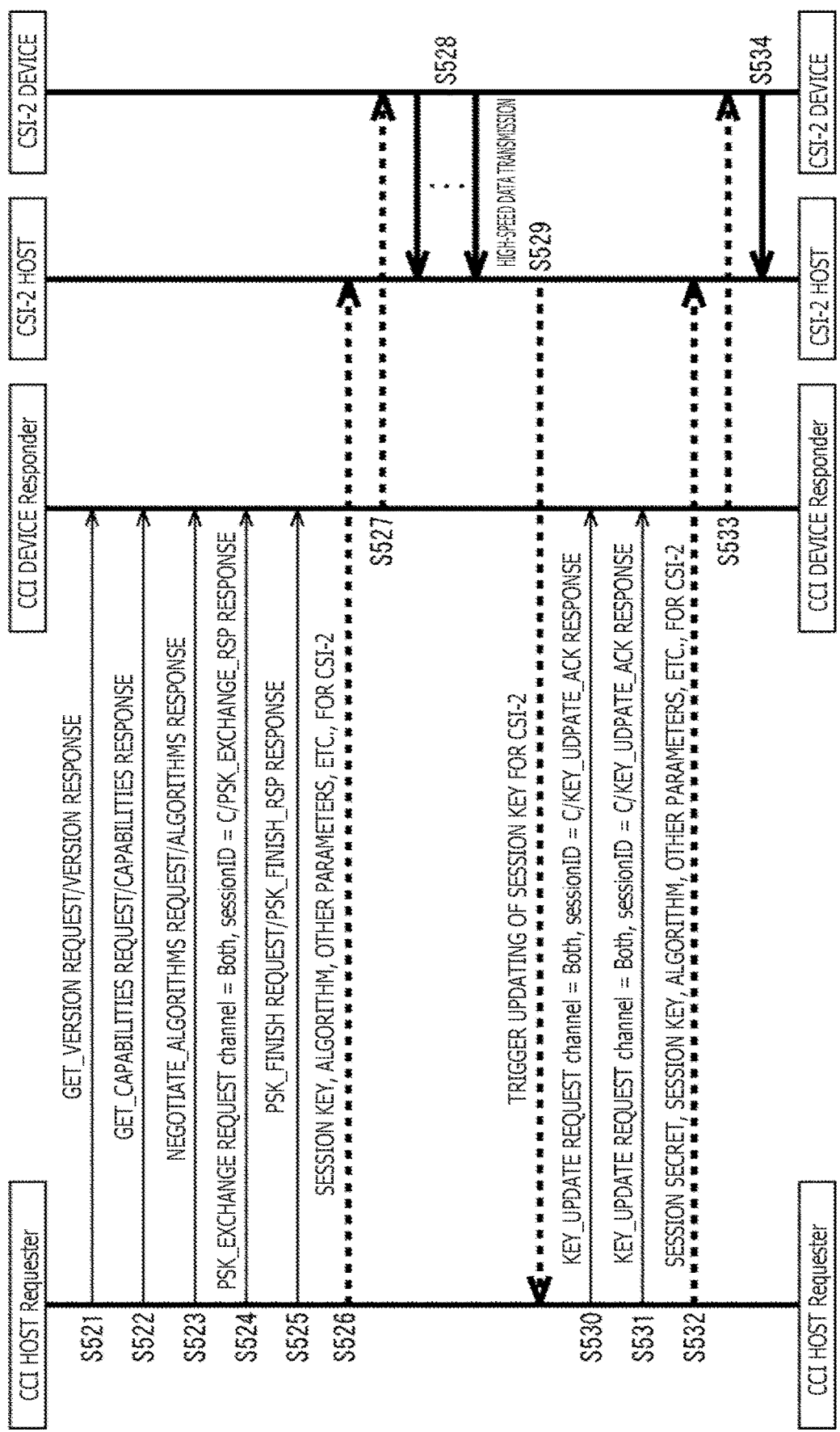
FIG. 79 is a flowchart for explaining the first processing example of the communication process.

FIG. 79 is a flowchart for explaining the second processing example of the communication process.

In Steps S521 to S523, processes similar to Steps S501 to S503 in FIG. 78 are performed.

In Step S524, a PSK_EXCHANGE request and a PSK_EXCHANGE_RSP response are made between the CCI host of the extension-mode-supporting CSI-2 reception circuit 1322 and the CCI device of the extension-mode-supporting CSI-2 transmission circuit 1304. Here, in the second processing example of the communication process, the same session secret is derived as the session secret for CCI and the session secret for CSI-2.

That is, the session key for CCI and the session key for CSI-2 can be derived from the same session secret. Alternatively, a session key for uplink and a session key for downlink (in the direction opposite to the uplink) may be derived from the same session secret. Alternatively, a common session key for CCI and CSI-2 may be derived from the same session secret. Note that, even in a case where the session for CCI and the session for CSI-2 are the same session, the session secrets, the session keys, and the like for CCI and CSI-2 may be different session secrets, session keys and the like.

Thereafter, in Steps S525 to S534, processes similar to Steps S507 to S516 in FIG. 78 are performed.

Here, a pre-shared key PSK key exchange scheme provides an option for the requester and the responder to execute mutual authentication and session key establishment by symmetric key cryptography. This option is particularly helpful at an end point that does not support asymmetric key cryptography or certificate processes. Even in a case where asymmetric key cryptography is supported, it is possible to make use of this option for speeding up session key establishment. This option requires the requester and the responder to know in advance a common PSK before a handshake.

Basically, a PSK functions as qualification information for mutual authentication and the basis of session key establishment. Accordingly, only two endpoints and a potentially trusted third party that performs provisioning of the PSK to the two endpoints may know the value of the PSK. The requester may be paired with multiple responders. Similarly, a responder may be paired with multiple requesters. One or more PSKs may be provisioned to a pair of a requester and a responder.

An end point may operate as a requester for one device, and simultaneously may operate as a responder for another device. The transport layer needs to identify peers (Peers) and establish communication between two endpoints before PSK-based session key exchange is started.

For example, a PSK may be provisioned in a trustable environment such as during a safe manufacturing process. A PSK may be agreed upon by two endpoints with use of a safe protocol in an untrustable environment. The size of the provisioned PSK is determined in accordance with requirements of the security level of an application, and should be equal to or greater than 128 bits and desirably equal to or greater than 256 bits. During PSK provisioning, an end point functionality and a supported algorithm may be communicated to a peer. Accordingly, during session key establishment using a PSK option, GET_CAPABILITIES and NEGOTIATE_ALGORITHMS of an SPDM command are not necessary.

For this option, two message pairs, i.e., PSK_EXCHANGE/PSK_EXCHANGE_RSP and PSK_FINISH/PSK_FINISH_RSP, are defined. The PSK_EXCHANGE message has three roles, i.e., a role for prompting a responder to acquire a particular PSK, a role for exchanging a context between a requester and a responder, and a role for certifying, to a requester, that a responder knows the correct PSK and the correct session key has been derived.

Figure 80:
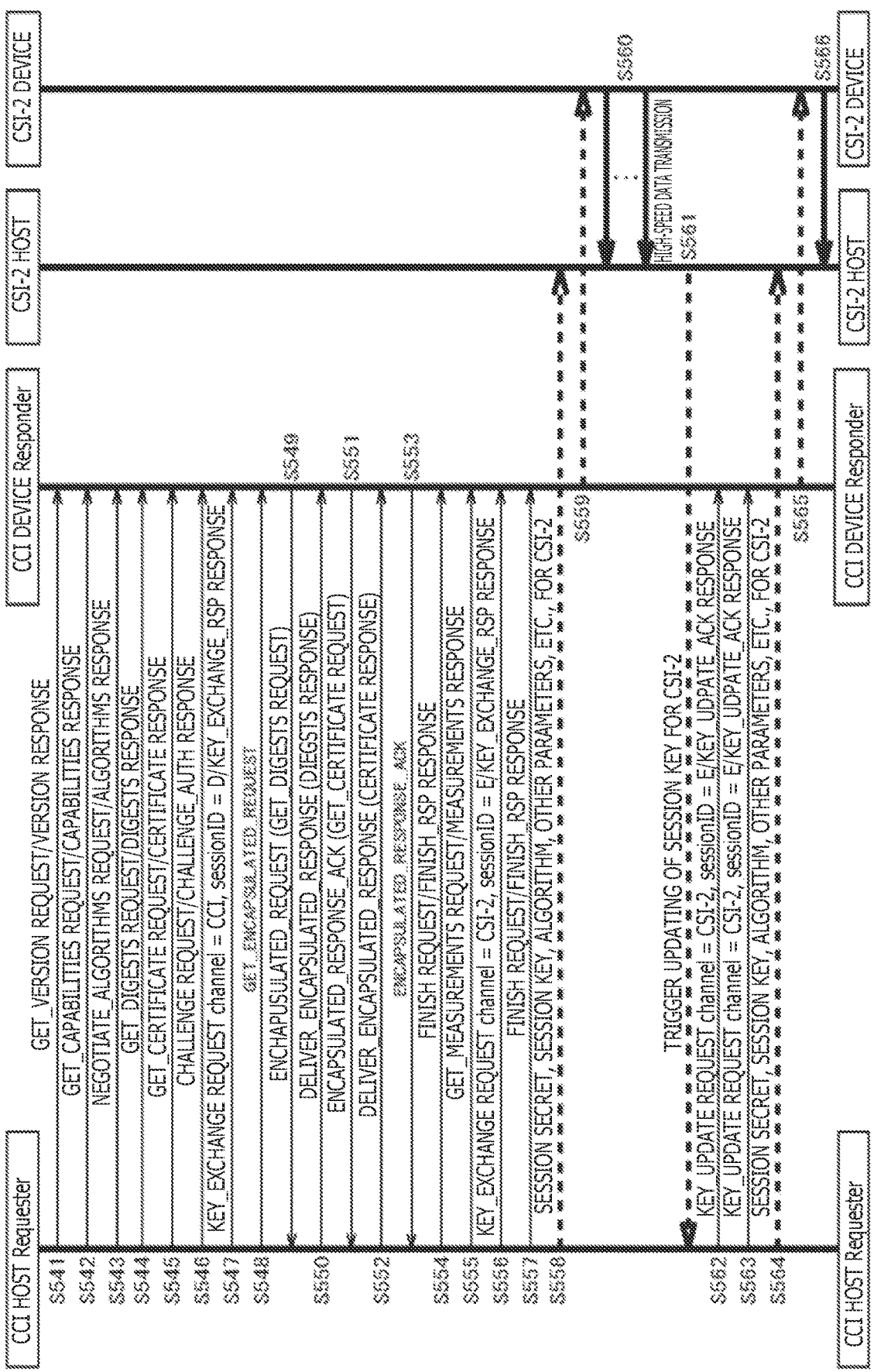
FIG. 80 is a flowchart for explaining the first processing example of the communication process.

FIG. 80 is a flowchart for explaining a third processing example of the communication process.

In Steps S541 to S543, processes similar to Steps S501 to S503 in FIG. 78 are performed.

In Step S544, a GET_DIGESTS request and a DIGESTS response are made between the CCI host of the extension-mode-supporting CSI-2 reception circuit 1322 and the CCI device of the extension-mode-supporting CSI-2 transmission circuit 1304. As a result, the extension-mode-supporting CSI-2 reception circuit 1322 acquires a certificate chain digest from the extension-mode-supporting CSI-2 transmission circuit 1304.

In Step S545, a GET_CERTIFICATE request and a CERTIFICATE response are made between the CCI host of the extension-mode-supporting CSI-2 reception circuit 1322 and the CCI device of the extension-mode-supporting CSI-2 transmission circuit 1304. As a result, the extension-mode-supporting CSI-2 reception circuit 1322 acquires a certificate chain from the extension-mode-supporting CSI-2 transmission circuit 1304. Note that the acquisition of the certificate chain may be executed multiple times.

In Step S546, a CHALLENGE request and a CHALLENGE_AUTH response are made between the CCI host of the extension-mode-supporting CSI-2 reception circuit 1322 and the CCI device of the extension-mode-supporting CSI-2 transmission circuit 1304. As a result, the extension-mode-supporting CSI-2 reception circuit 1322 can authenticate the extension-mode-supporting CSI-2 transmission circuit 1304 through a challenge-response protocol.

In Step S547, a KEY_EXCHANGE request (channel=CCI, sessionID=D) and a KEY_EXCHANGE_RSP response are made between the CCI host of the extension-mode-supporting CSI-2 reception circuit 1322 and the CCI device of the extension-mode-supporting CSI-2 transmission circuit 1304. Thereby, a handshake is started between the requester and the responder for the purpose of authentication of the responder (or both parties if desired). Then, in addition to the content negotiated at the last NEGOTIATE_ALGORITHMS/ALGORITHMS exchange, an encryption parameter is negotiated, and shared key information is established.

In Step S548, the CCI host of the extension-mode-supporting CSI-2 reception circuit 1322 transmits GET_ENCAPSULATED_REQUEST to the CCI device of the extension-mode-supporting CSI-2 transmission circuit 1304.

In Step S549, the CCI device of the extension-mode-supporting CSI-2 transmission circuit 1304 transmits ENCAPSULATED_REQUEST (the GET_DIGESTS request) to the CCI host of the extension-mode-supporting CSI-2 reception circuit 1322.

In Step S550, the CCI host of the extension-mode-supporting CSI-2 reception circuit 1322 transmits DELIVER_ENCAPSULATED_RESPONSE (the DIGESTS response) to the CCI device of the extension-mode-supporting CSI-2 transmission circuit 1304. As a result, the CCI device of the extension-mode-supporting CSI-2 transmission circuit 1304 acquires a certificate chain digest from the CCI host of the extension-mode-supporting CSI-2 reception circuit 1322.

In Step S551, the CCI device of the extension-mode-supporting CSI-2 transmission circuit 1304 transmits ENCAPSULATED_RESPONSE_ACK (the GET_CERTIFICATE request) to the CCI host of the extension-mode-supporting CSI-2 reception circuit 1322.

In Step S552, the CCI host of the extension-mode-supporting CSI-2 reception circuit 1322 transmits DELIVER_ENCAPSULATED_RESPONSE (the CERTIFICATE response) to the CCI device of the extension-mode-supporting CSI-2 transmission circuit 1304. Thereby, the CCI device (responder) may acquire a certificate chain from the CCI host (requester). Note that this process may be executed multiple times.

In Step S553, the CCI device of the extension-mode-supporting CSI-2 transmission circuit 1304 transmits ENCAPSULATED_RESPONSE_ACK to the CCI host of the extension-mode-supporting CSI-2 reception circuit 1322.

In Step S554, a FINISH request and a FINISH_RSP response are made between the CCI host of the extension-mode-supporting CSI-2 reception circuit 1322 and the CCI device of the extension-mode-supporting CSI-2 transmission circuit 1304. As a result, the handshake between the CCI host of the extension-mode-supporting CSI-2 reception circuit 1322 and the CCI device of the extension-mode-supporting CSI-2 transmission circuit 1304 started by the KEY_EXCHANGE request in Step S547 is completed.

In Step S555, a GET_MEASUREMENTS request and a MEASUREMENTS response are made between the CCI host of the extension-mode-supporting CSI-2 reception circuit 1322 and the CCI device of the extension-mode-supporting CSI-2 transmission circuit 1304. As a result, the CCI host of the extension-mode-supporting CSI-2 reception circuit 1322 acquires measurement data from the CCI device of the extension-mode-supporting CSI-2 transmission circuit 1304. Note that the GET_MEASUREMENTS request may be issued from the responder using the GET_ENCAPSULATED_REQUEST mechanism described above. Similarly, another request may also be issued from the responder using the GET_ENCAPSULATED_REQUEST mechanism described above.

Thereafter, as in Step S547, in Step S556, a KEY_EXCHANGE request (channel=CSI-2, sessionID=E) and a KEY_EXCHANGE_RSP response are made, and as in Step S554, in Step S557, a FINISH request and a FINISH_RSP response are made. Then, in Steps S558 to S566, processes similar to Steps S508 to S516 in FIG. 78 are performed.

<Data Verification Process>

A data verification process using a verification packet and a to-be-verified packet is explained with reference to FIG. 81 to FIG. 83.

Figure 81:
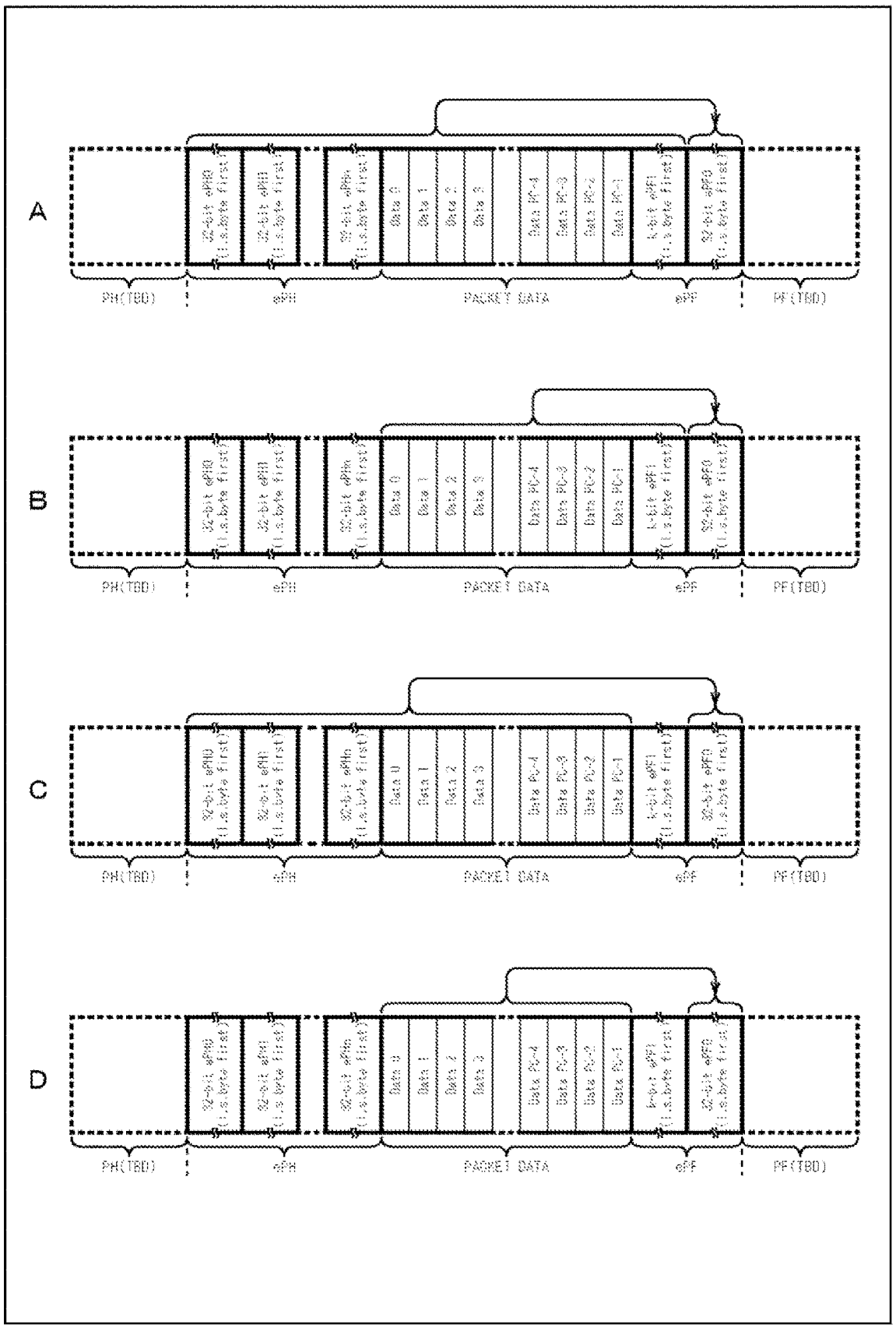
FIG. 81 depicts figures for explaining a verification packet and a to-be-verified packet.
Figure 82:
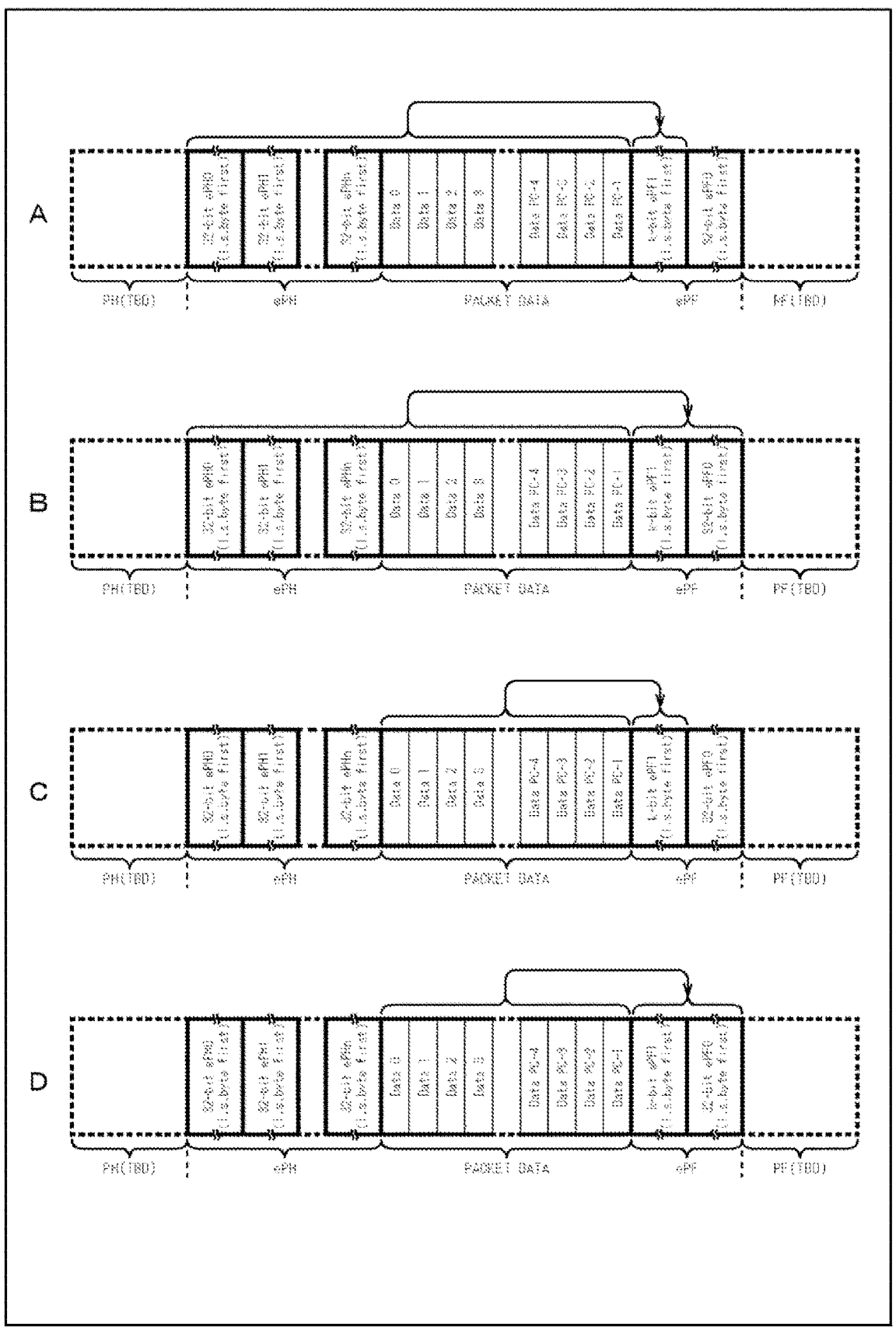
FIG. 82 depicts figures for explaining a verification packet and a to-be-verified packet.

As depicted in FIG. 81 and FIG. 82, an extended packet includes a packet header PH, an extended packet header ePH, packet data, an extended packet footer ePF, and a packet footer PF. With the thus-configured extended packet, a frame start, embedded data, image data, user-defined data, a frame end, a write order (CCI Write), a read order (CCI Read), and a read response (CCI Read return value) can be configured. Note that the packet header PH, the extended packet header ePH, the packet data, the extended packet footer ePF, and the packet footer PF may partially or entirely be omitted. That is, packet configuration including at least the extended packet header ePH and the packet data is defined as an extended packet.

Meanwhile, there is a possibility that any of the extended packet header ePH, the packet data, and the extended packet footer ePF is not received normally due to noise, interference, or attack (the message is lost). In view of this, it is desirable that a verification packet for verifying the integrity of the extended packet header ePH, the packet data, and the extended packet footer remaining part ePF1 be stored in an extended packet footer end ePF0. For example, the verification of the integrity uses CRC32 of cyclic redundancy checking which is one type of error detection code. In addition, for example, $X^{32}+X^{26}+X^{23}+X^{22}+X^{16}+X^{12}+X^{11}+X^{10}+X^8+X^7+X^5+X^4+X^2+X+1$ is used as a CRC32 generation polynomial.

The packet data can be used as the to-be-verified packet. Alternatively, the extended packet header and the packet data can be used as the to-be-verified packet. Alternatively, the packet data and the extended packet footer remaining part (ePF1) can be used as the to-be-verified packet. Alternatively, the extended packet header, the packet data, and the extended packet footer remaining part (ePF1) can be used as the to-be-verified packet. Such a to-be-verified packet protects at least the packet data.

That is, the image sensor 1211 includes a second protecting section (e.g., a CRC calculating section) that generates second protected data (e.g., a CRC calculation value) of the packet data without using a session key. For example, the second protected data is stored in an extended packet footer ePF of high-speed data transmission. That is, it is stored in any of a frame start, embedded data, image data, user-defined data, a frame end, a write order (CCI Write), a read order (CCI Read), a read response (CCI Read return value), and the like.

A security functionality (security feature) may be defined for extended packet footers ePF1 and ePF0. That is, the image sensor 1211 may include therein a security calculating section (e.g., an encryption calculating section, a decoding calculating section, a hash value calculating section, a message authentication code calculating section, a digital signature calculating section). Then, a result of a security calculation (e.g., a hash value, a message authentication code, a digital signature) may be stored in an extended packet footer ePF.

The result of the security calculation may be stored not in an extended packet footer ePF0, but only in an extended packet footer ePF1, and may be stored not in an extended packet footer, but outside the extended packet footer (e.g., in embedded data or in a read response). The security calculating section included in the image sensor 1211 is included in the security section 1310.

Any of GMAC (Galois MAC), CMAC (Cipher-based MAC), HMAC (Hash-based MAC), and the like may be used as a message authentication code (MAC: Message Authentication Code). For example, any of AES-GMAC, AES-CMAC, SHA2-HMAC, SHA3-HMAC, and the like to which AES (Advanced Encryption Standard) or SHA (Secure Hash Algorithm) is applied may be used. Note that the block length of AES is 128 bits, and the key length of AES is selected from any one of 128 bits, 192 bits, and 256 bits.

For example, treating the packet data as a to-be-verified packet or the extended packet header and the packet data as to-be-verified packets, security information which is any of a hash (particularly, cryptographic hash) value, a message authentication code, a digital signature, and the like may be stored in the extended packet footer. In that case, further tolerance can be achieved against malicious tampering by an attacker. Note that a CRC of cyclic redundancy checking, which is one type of error detection code, may be stored in an extended packet footer (s) "ePF1" or "ePF1 and ePF0."

That is, the image sensor 1211 may include an integrity calculating section (e.g., first protecting section=security calculating section, second protecting section=CRC calculating section), and an integrity calculated value (e.g., the first protected data, the second protected data) which is a result of calculation of the integrity may be stored in an extended packet footer. Note that a CRC can be used for functional safety, and its integrity can be used for preventing non-detection of a hardware failure. On the other hand, the integrity of a security functionality can be used for detecting an intentional interference or attack. That is, the security calculating section calculates an integrity calculated value based on encryption, and the CRC calculating section calculates an integrity calculated value not based on encryption.

For example, the application processor 1212 can verify the integrity of a to-be-verified packet by using a verification packet. For example, in a case where it is determined that there is an abnormality, any of a process of transmitting a request message requesting re-transmission of packets including the to-be-verified packet and the verification packet, a process of transmitting a request message to inquire, of the image sensor 1211, whether there is an abnormality in the image sensor 1211, a process of transmitting a request message requesting the image sensor 1211 to stop the functionality of the image sensor 1211 in whole or n part, a process of stopping propulsion of a propulsion apparatus, a process of changing propulsion control of a propulsion apparatus, a process of changing priority data used for propulsion control, and the like may be executed.

Note that, for example, an integrity calculated value may be stored in any of embedded data, image data (packet data), user-defined data, a write order, a read order, a read response and the like. In that case, the integrity calculated value may not be stored in an extended packet footer. For example, integrity calculated values may be stored not in units of lines of an image, but in units of frames of an image, and in that case, the integrity is calculated efficiently. In that case, for example, an integrity calculated value is stored in embedded data or a read response obtained after image data is transmitted.

An extended packet depicted in A of FIG. 81 represents a configuration example in which an extended packet header ePH, packet data, and an extended packet footer remaining part ePF1 are to-be-verified packets and an extended packet footer end ePF0 having stored therein a computed value obtained by a security calculation using the to-be-verified packets is a verification packet.

An extended packet depicted in B of FIG. 81 represents a configuration example in which packet data and an extended packet footer remaining part ePF1 are to-be-verified packets, and an extended packet footer end ePF0 having stored therein a computed value obtained by a security calculation using the to-be-verified packets is a verification packet.

An extended packet depicted in C of FIG. 81 represents a configuration example in which an extended packet header ePH and packet data are to-be-verified packets and an extended packet footer end ePF0 having stored therein a computed value obtained by a security calculation using the to-be-verified packets is a verification packet.

An extended packet depicted in D of FIG. 81 represents a configuration example in which packet data is a to-be-verified packet and an extended packet footer end ePF0 having stored therein a computed value obtained by a security calculation using the to-be-verified packet is a verification packet.

An extended packet depicted in A of FIG. 82 represents a configuration example in which an extended packet header ePH and packet data are to-be-verified packets and an extended packet footer remaining part ePF1 having stored therein a computed value obtained by a security calculation using the to-be-verified packets is a verification packet.

An extended packet depicted in B in FIG. 82 represents a configuration example in which an extended packet header ePH and packet data are to-be-verified packets and an extended packet footer remaining part ePF1 and an extended packet footer end ePF0 having stored therein computed values obtained by a security calculation using the to-be-verified packets are verification packets.

An extended packet depicted in C of FIG. 82 represents a configuration example in which packet data is a to-be-verified packet, and an extended packet footer remaining part ePF1 having stored therein a computed value determined by a security calculation using the to-be-verified packet is a verification packet.

An extended packet depicted in D of FIG. 82 represents a configuration example which packet data is a to-be-verified packet and an extended packet footer remaining part ePF1 and an extended packet footer end ePF0 having stored therein computed values determined by a security calculation using the to-be-verified packets are verification packets.

Figure 83:
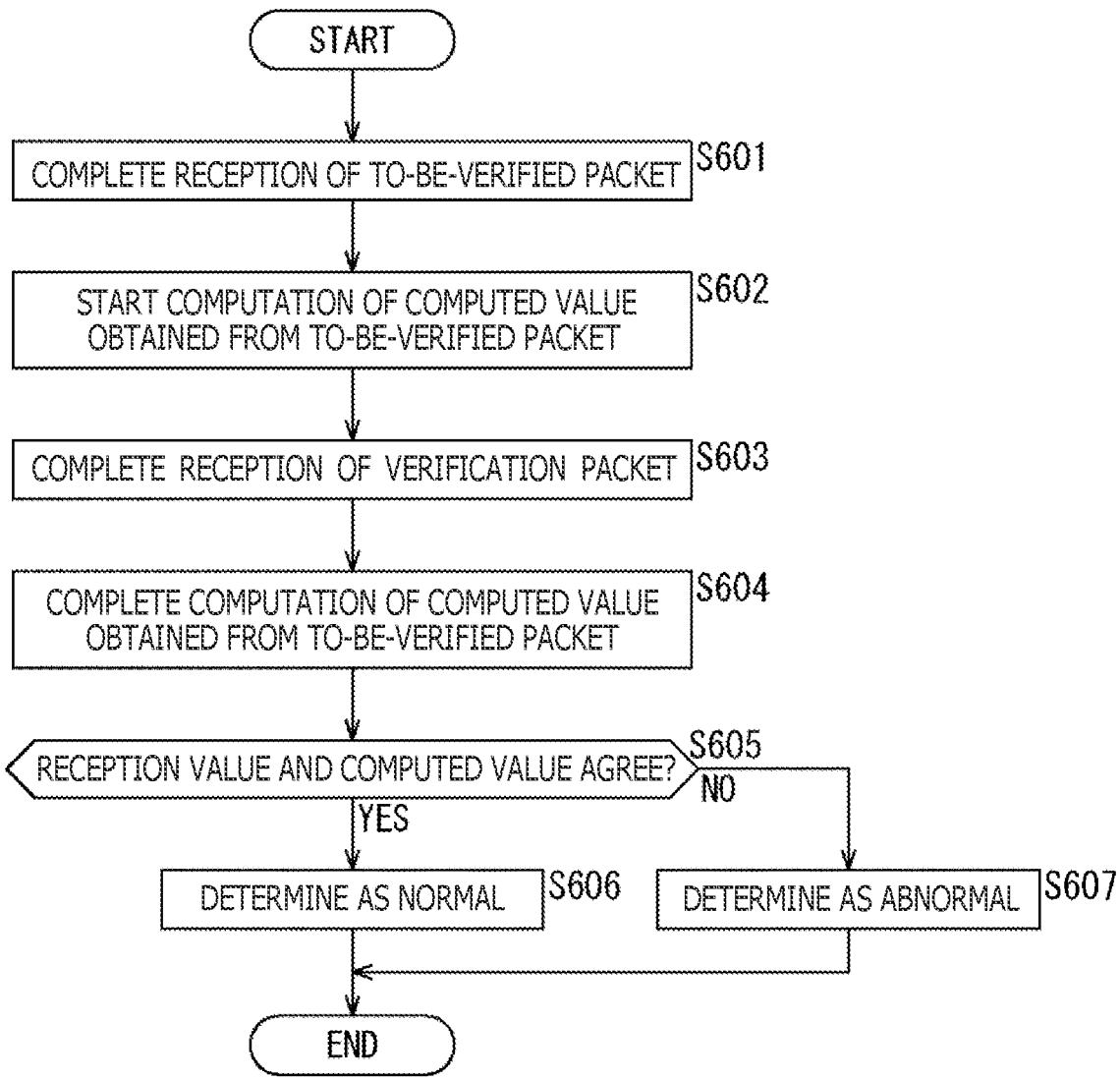
FIG. 83 is a flowchart for explaining a data verification process.

FIG. 83 is a flowchart for explaining a data verification process performed in the application processor 1212.

In Step S601, when an extended packet transmitted from the image sensor 1211 is received by the extension-mode-supporting CSI-2 reception circuit 1322, the security section 1326 receives to-be-verified packets of the extended packet. Then, when the security section 1326 completes the reception of the to-be-verified packets, the process proceeds to Step S602. Note that the process may proceed to Step S602 even if reception of not all the to-be-verified packets has been completed, as long as reception of at least part thereof (e.g., 128 bits) that allows computation of a security calculation to be started has been completed. In that case, reception of the remaining part of the to-be-verified packets is continued until reception of all the to-be-verified packets is completed.

In Step S602, the security section 1326 starts computation of a computed value obtained by a security calculation using at least part of the to-be-verified packets received in Step S601.

In Step S603, the security section 1326 receives a verification packet transmitted from the image sensor 1211, via the extension-mode-supporting CSI-2 reception circuit 1322. Then, when the security section 1326 completes the reception of the verification packet and acquires a reception value stored in the verification packet (the computed value computed at the image sensor 1211), the process proceeds to Step S604.

When, in Step S604, the security section 1326 completes the computation of the computed value obtained by the security calculation using the to-be-verified packets started in Step S602 (i.e., when all the to-be-verified packets are received and the computation using all of them is completed), the process proceeds to Step S605.

In Step S605, the security section 1326 determines whether or not the reception value received in Step S603 and the computed value obtained in Step S604 agree.

In a case where, in Step S605, the security section 1326 determines that the reception value and the computed value agree, the process proceeds to Step S606. In this case, in Step S606, the security section 1326 determines that the extended packet received by the extension-mode-supporting CSI-2 reception circuit 1322 is normal, and the process is ended.

On the other hand, in a case where, in Step S605, the security section 1326 determines that the reception value and the computed value do not agree, the process proceeds to Step S607. In this case, in Step S607, the security section 1326 determines that the extended packet received by the extension-mode-supporting CSI-2 reception circuit 1322 is abnormal, and the process is ended.

<Ensuring Functional Safety by Using Message Count Value>

In order to ensure the functional safety (e.g., to detect a message loss, and handle it appropriately), the image sensor 1211 can store a message count value counted by the message counter 1308 in an extended packet header or an extended packet footer. For example, the message counter 1308 included in the image sensor 1211 can store the message count value that is incremented or decremented every time a message is transmitted from the image sensor 1211. Note that the image sensor 1211 may have a configuration provided with an independent message counter 1308 for each virtual channel (virtual channel) or a configuration provided with a common message counter 1308 for virtual channels.

The message counter 1308 sets the message count value to an initial value (e.g., 0 or a maximum value) at the first packet including an extended packet header of a certain virtual channel, and increments or decrements the message count value every time data including an extended packet header of a certain virtual channel is transmitted. In addition, for example, in a case where data not including an extended packet header is transmitted, the message counter 1308 does not increment or decrement the message count value, but resumes counting when data including an extended packet header is next transmitted.

The message counter 1308 may continue the counting irrespective of a frame start or a frame end. Then, in a case where the message count value reaches a prescribed value (e.g., a maximum value or 0), the message count value of the message counter 1308 next returns to the initial value (e.g., 0 or the maximum value), and the message counter 1308 performs the counting. Note that part of a nonce value may be stored in part of an extended packet header.

Note that a receiver side (the image sensor 1211 or the application processor 1212) that receives the message count value can immediately detect a message loss in a case where there is such a message loss. For example, a DoS (Denial-of-service) attack or the like that damages the availability of the image sensor 1211 or the application processor 1212 by intentionally causing an enormous amount of messages to be mixed is also immediately detected on the receiver side. Because of this, it is desirable that the message count value be stored in an extended packet header. By making it possible to detect such a loss, an attack, or the like in a shorter period of time, the receiver side can start handling them in a short period of time, and, for example, this is particularly suitable for a propulsion apparatus that is capable of fast travelling or fast movement.

Note that a write order (CCI Write), a read order (CCI Read), or a read response (CCI Read return value) may also be configured to have stored therein a message count value or an integrity calculated value, and an element related to an extended packet may be applied to it. In that case, regarding the write order, the read order, or the read response as well, it becomes possible to support functional safety, protect the integrity, and so on.

FIG. 84 is a flowchart for explaining a message count value transmission process in which the image sensor 1211 transmits a message count value.

In Step S611, the message counter 1308 initializes the message count value and sets it to 0.

In Step S612, the extension-mode-supporting CSI-2 transmission circuit 1304 determines whether or not to transmit an extended packet header, and pauses the process until it is determined to transmit an extended packet header. Then, in a case where, in Step S612, the extension-mode-supporting CSI-2 transmission circuit 1304 determines to transmit an extended packet header, the process proceeds to Step S613.

In Step S613, the extension-mode-supporting CSI-2 transmission circuit 1304 acquires the message count value from the message counter 1308, and stores it in an extended packet header.

In Step S614, the extension-mode-supporting CSI-2 transmission circuit 1304 transmits the extended packet header having the message count value stored therein in Step S613.

In Step S615, the message counter 1308 determines whether or not the message count value has reached the maximum value. In a case where, in Step S615, the message counter 1308 determines that the message count value has not reached the maximum value, the process proceeds to Step S616.

In Step S616, the message counter 1308 increments the message count value. Thereafter, the process returns to Step S612, and a similar process is performed repeatedly thereafter.

On the other hand, in a case where, in Step S615, the message counter 1308 determines that the message count value has reached the maximum value, the process returns to Step S611, the message count value is initialized, and then a similar process is performed repeatedly thereafter.

Note that other than incrementing the message count value in such a manner, for example, the message count value may be initialized, set to the maximum value, and decremented.

<Regarding Embedded Data>

Embedded data is explained with reference to FIG. 85 to FIG. 88.

By using embedded data, the image sensor 1211 can include additional information such as device setting information in a data stream. The embedded data includes one or more lines (lines), and can include any of configuration data regarding the image sensor 1211, a register value according to a standard, a vendor-specific register value, an explanation of a frame format, statistics and the like.

Figure 85:
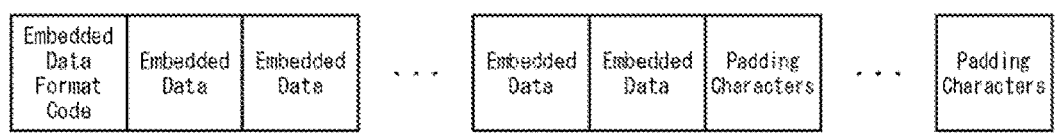
FIG. 85 depicts figures for explaining embedded data.

In FIG. 85, A depicts one line of embedded data with a configuration in which a desired amount of embedded data is arranged continuously subsequently to an embedded data format code and padding characters are arranged in the remaining part.

Embedded data includes information regarding image data or user-defined data. Because of this, the image data or the user-defined data may be compressed data, but it is desirable that the embedded data be data which is not compressed (uncompressed data). Accordingly, in a case where data compression is used, a frame of high-speed data transmission includes compressed data (image data or user-defined data) and uncompressed data (embedded data) that are mixedly present therein.

Embedded data can include multiple lines (line) of embedded data according to the number of register values added to the embedded data. In addition, the number of lines of the embedded data can be designated by part of an explanation in a frame format in the first embedded-data line in a frame. The line length of the embedded data may be shorter than the line length of image data or user-defined data, but preferably does not exceed the line length of the image data or the user-defined data, and it is desirable that the line length of the embedded data be the same as the line length of the image data or the user-defined data. The first pixel value of the embedded data may represent a format used for the embedded data.

Part or the whole of a nonce value may be stored in at least part of embedded data representing a vendor-specific code (Vendor specific) or a reserved code (Reserved for future use) like the ones depicted in B of FIG. 85, and transmitted. In a frame, the embedded data is stored between the frame start and the first image data or user-defined data or between the last image data or user-defined data and the frame end. It should be noted that the embedded data between the last image data or user-defined data and the frame end may be omitted.

Figure 86:
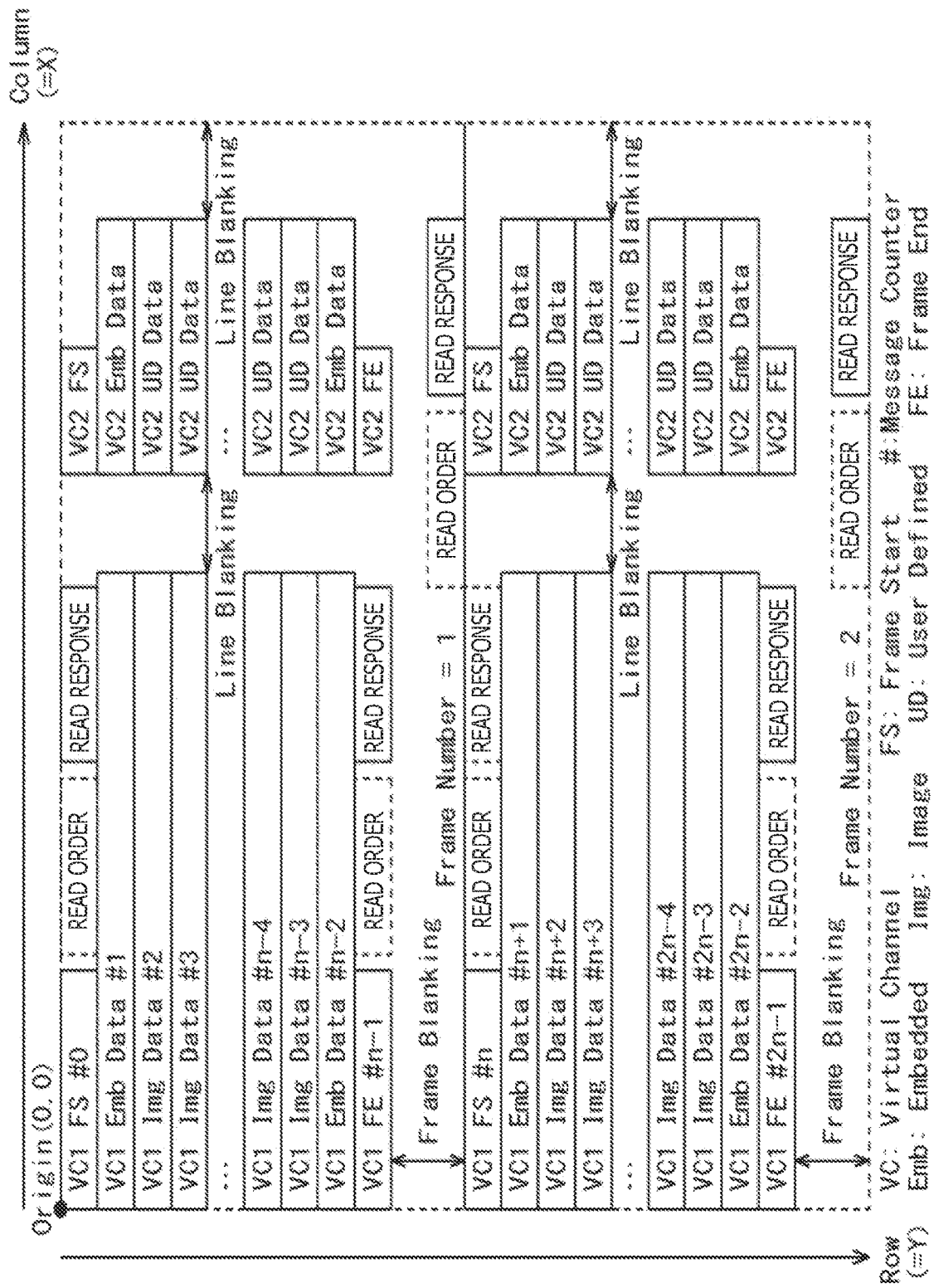
FIG. 86 is a figure depicting an example of a data structure of image data.

FIG. 86 depicts an example of a data structure of two frames of image data transmitted from the image sensor 1211.

As depicted in FIG. 86, after a frame start (VC1 FS) of a first virtual channel is transmitted, a frame start (VC2 FS) of a second virtual channel is transmitted subsequently to a read order and a read response. Next, first embedded data (VC1 Emb Data) of the first virtual channel and first embedded data (VC2 Emb Data) of the second virtual channel are transmitted. Then, one frame of image data (VC1 Img Data) of the first virtual channel and user-defined data (VC2 UD Data) of the second virtual channel is transmitted. When transmission of the one frame is completed, second embedded data (VC1 Emb Data) of the first virtual channel and second embedded data (VC2 Emb Data) of the second virtual channel are transmitted. Thereafter, after a frame end (VC1 FE) of the first virtual channel is transmitted, a frame end (VC2 FE) of the second virtual channel is transmitted subsequently to a read order and a read response.

FIG. 86 depicts an example in which a common message count value is used for the first virtual channel and the second virtual channel. At this time, a configuration in which independent sage counters are provided for the first virtual channel and the second virtual channel may be adopted. In addition, user-defined data may be image data or the like.

Here, for example, part or the whole of a nonce value is stored in a period from the frame start to the frame end or in a period from the frame end to the frame start (a frame blanking period). In addition, for example, in the period from the frame start to the frame end, the nonce value can be stored any of embedded data, image data, non-image data, or a line blanking period. Further, it may be stored in the second virtual channel.

Defining the frame start and the frame end, for example, makes it possible for the image sensor to notify the processor of the start and end of high-speed data transmission. In addition, it becomes possible for the image sensor to keep frame transmission intervals constant. Note that the embedded data is data in which attributes representing image data, information (metadata) related to image data, and the like are stored.

High-speed data transmission of a nonce value executed without inhibiting high-speed data transmission of image data in an example explained in the present embodiment. That is, high-speed data transmission of the image data and high-speed data transmission of the nonce value are executed not in parallel, but in series in the example explained. It should be noted however that in a case where high-speed data transmission of image data and transmission (high-speed data transmission or low-speed command transmission) of a nonce value use different communication paths, they may be executed in parallel.

Note that high-speed data transmission and low-speed command transmission allow frequency separation by filters, so that, if there are no problems in terms of electric power consumption, part or the whole of the transmission is allowed to overlap (is allowed to be executed in parallel). Part or the whole of a nonce value may be transmitted for each set of multiple frames, but it is desirable that part or the whole of a nonce value be transmitted for each frame for such reasons as a frame loss, for example. For example, the frame start (Frame Start; FS) packet includes a Frame Start Code (Data Type=0x00), and the frame end (Frame End; FE) packet includes a Frame End Code (Data Type=0x01).

Figure 87:
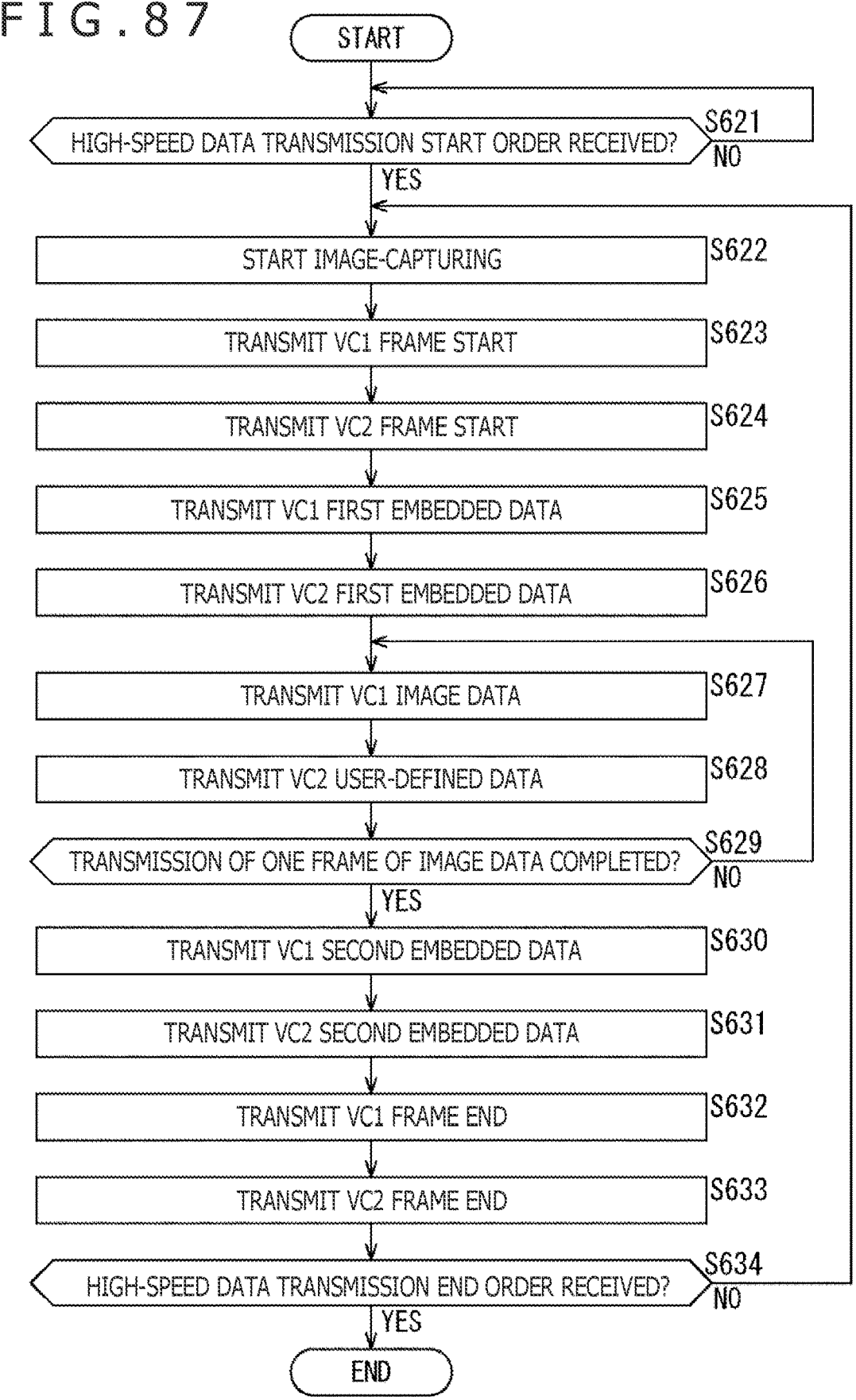
FIG. 87 is a flowchart for explaining an image data transmission process.

FIG. 87 is a flowchart for explaining an image data transmission process in which the image sensor 1211 transmits image data.

In Step S621, the extension-mode-supporting CSI-2 transmission circuit 1304 determines whether or not a high-speed data transmission start order is received, and pauses the process until it is determined that a high-speed data transmission start order is received. Then, a case where, in Step S621, the extension-mode-supporting CSI-2 transmission circuit 1304 determines that a high-speed data transmission start order is received, the process proceeds to Step S622.

In Step S622, the pixel 1301 starts image-capturing, and image data output from the pixel 1301 is supplied to the extension-mode-supporting CSI-2 transmission circuit 1304 via the AD converter 1302 and the image processing section 1303.

In Step S623, the extension-mode-supporting CSI-2 transmission circuit 1304 transmits a frame start of a first virtual channel.

In Step S624, the extension-mode-supporting CSI-2 transmission circuit 1304 transmits a frame start of a second virtual channel.

In Step S625, the extension-mode-supporting CSI-2 transmission circuit 1304 transmits first embedded data of the first virtual channel.

In Step S626, the extension-mode-supporting CSI-2 transmission circuit 1304 transmits first embedded data of the second virtual channel.

In Step S627, the extension-mode-supporting CSI-2 transmission circuit 1304 transmits image data of the first virtual channel.

In Step S628, the extension-mode-supporting CSI-2 transmission circuit 1304 transmits user-defined data of the second virtual channel.

In Step S629, the extension-mode-supporting CSI-2 transmission circuit 1304 determines whether or not transmission of one frame of image data has been completed.

In a case where, in Step S629, the extension-mode-supporting CSI-2 transmission circuit 1304 determines that the transmission of one frame of the image data has not been completed, the process returns to Step S627, and a similar process is performed repeatedly thereafter. On the other hand, in a case where, in Step S629, the extension-mode-supporting CSI-2 transmission circuit 1304 determines that the transmission of one frame of the image data has been completed, the process proceeds to Step S630.

In Step S630, the extension-mode-supporting CSI-2 transmission circuit 1304 transmits second embedded data of the first virtual channel.

In Step S631, the extension-mode-supporting CSI-2 transmission circuit 1304 transmits second embedded data of the second virtual channel.

In Step S632, the extension-mode-supporting CSI-2 transmission circuit 1304 transmits a frame end of the first virtual channel.

In Step S633, the extension-mode-supporting CSI-2 transmission circuit 1304 transmits a frame end of the second virtual channel.

In Step S634, the extension-mode-supporting CSI-2 transmission circuit 1304 determines whether or not a high-speed data transmission end order is received.

In a case where, in Step S634, the extension-mode-supporting CSI-2 transmission circuit 1304 determines that a high-speed data transmission end order is not received, the process returns to Step S622, and a similar process is performed repeatedly thereafter. On the other hand, in a case where, in Step S634, the extension-mode-supporting CSI-2 transmission circuit 1304 determines that a high-speed data transmission end order is received, the process is ended.

The start of image-capturing may be executed continuously until a high-speed data transmission end order is received or may be executed every time a high-speed data transmission start order is received.

Figure 88:
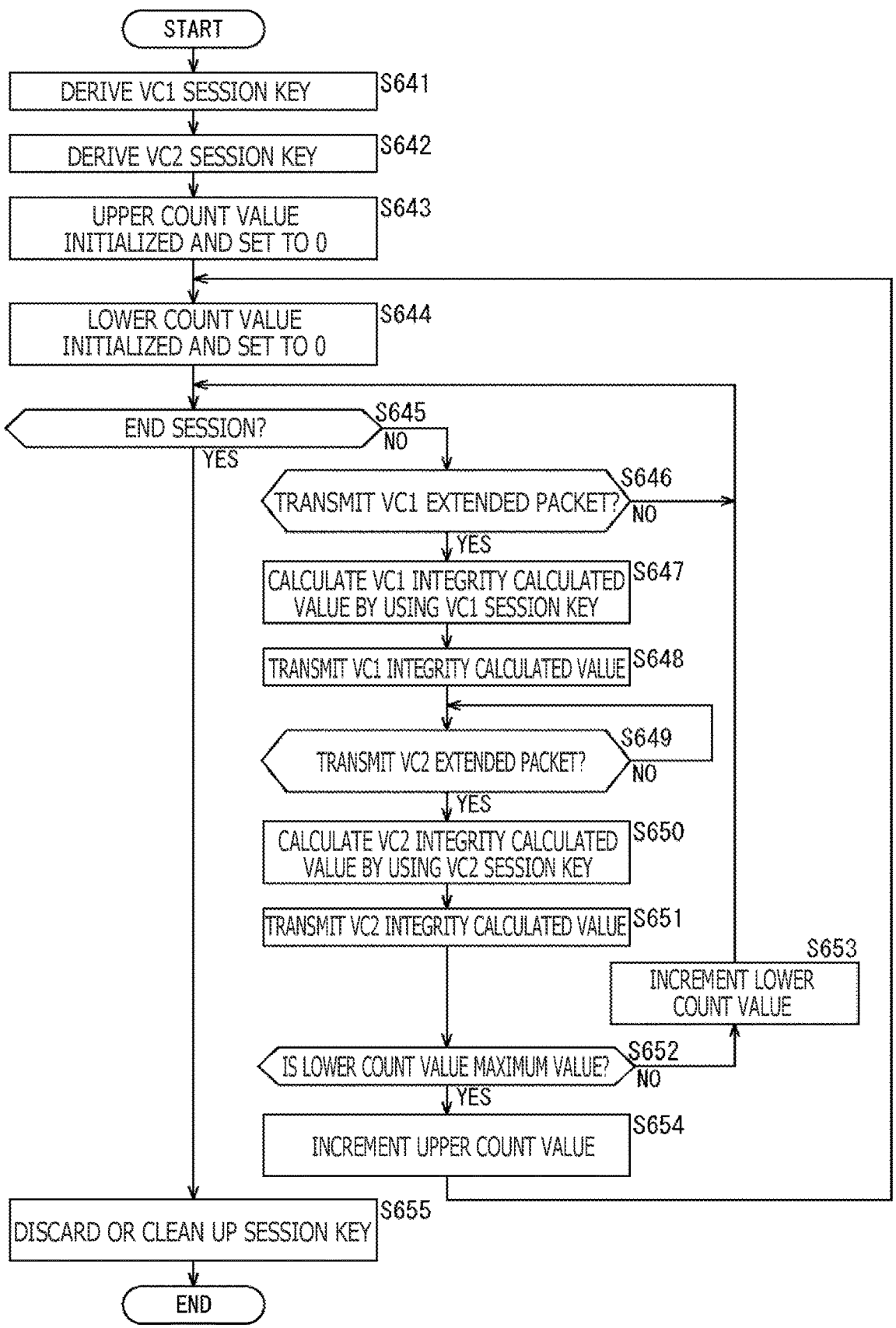
FIG. 88 is a flowchart for explaining an integrity calculated value transmission process.

FIG. 88 is a flowchart for explaining an integrity calculated value transmission process in which the image sensor 1211 transmits an integrity calculated value.

In Step S641, the security section 1310 derives a session key of a first virtual channel.

In Step S642, the security section 1310 derives a session key of a second virtual channel.

In Step S643, the message counter 1308 initializes an upper count value of a message count value and sets it to 0.

In Step S644, the message counter 1308 initializes a lower count value of the message count value and sets it to 0.

In Step S645, the extension-mode-supporting CSI-2 transmission circuit 1304 determines whether or not to end the session, and in a case where it is determined not to end the session, the process proceeds to Step S646.

In Step S646, the extension-mode-supporting CSI-2 transmission circuit 1304 determines whether or not to transmit an extended packet of the first virtual channel.

In a case where, in Step S646, the extension-mode-supporting CSI-2 transmission circuit 1304 determines not to transmit an extended packet of the first virtual channel, the process returns to Step S645, and a similar process is performed repeatedly thereafter. On the other hand, in a case where, in Step S646, the extension-mode-supporting CSI-2 transmission circuit 1304 determines to transmit an extended packet of the first virtual channel, the process proceeds to Step S647.

In Step S647, the security section 1310 calculates an integrity calculated value of the first virtual channel by using the session key of the first virtual channel derived in Step S641.

In Step S648, the extension-mode-supporting CSI-2 transmission circuit 1304 arranges, in an extended packet of the first virtual channel, the integrity calculated value computed in Step S647, and transmits the extended packet of the first virtual channel.

In Step S649, the extension-mode-supporting CSI-2 transmission circuit 1304 determines whether or not to transmit an extended packet of the second virtual channel, and pauses the process until it is determined to transmit an extended packet of the second virtual channel. Then, in a case where, in Step S649, the extension-mode-supporting CSI-2 transmission circuit 1304 determines to transmit an extended packet of the second virtual channel, the process proceeds to Step S650.

In Step S650, the security section 1310 calculates an integrity calculated value of the second virtual channel by using the session key of the second virtual channel derived in Step S642.

In Step S651, the extension-mode-supporting CSI-2 transmission circuit 1304 arranges, in an extended packet of the second virtual channel, the integrity calculated value computed in Step S650, and transmits the extended packet of the second virtual channel.

In Step S652, the message counter 1308 determines whether or not the lower count value of the message count value has reached the maximum value.

In a case where, in Step S652, the message counter 1308 determines that the lower count value of the message count value has not reached the maximum value, the process proceeds to Step S653. After the message counter 1308 increments the lower count value of the message count value in Step S653, the process returns to Step S645, and a similar process is performed repeatedly thereafter.

On the other hand, in a case where, in Step S652, the message counter 1308 determines that the lower count value of the message count value has reached the maximum value, the process proceeds to Step S654. After the message counter 1308 increments the upper count value of the message count value in Step S654, the process returns to Step S644, and a similar process is performed repeatedly thereafter.

Then, in a case where, in Step S645, the extension-mode-supporting CSI-2 transmission circuit 1304 determines to end the session, the process proceeds to Step S655.

In Step S655, the security section 1310 discards or cleans up the session key of the first virtual channel and the session key of the second virtual channel, and thereafter the process is ended.

Modification Examples of Data Structure of Image Data

Data structures of image data are explained with reference to FIG. 89 to FIG. 91.

Figure 89:
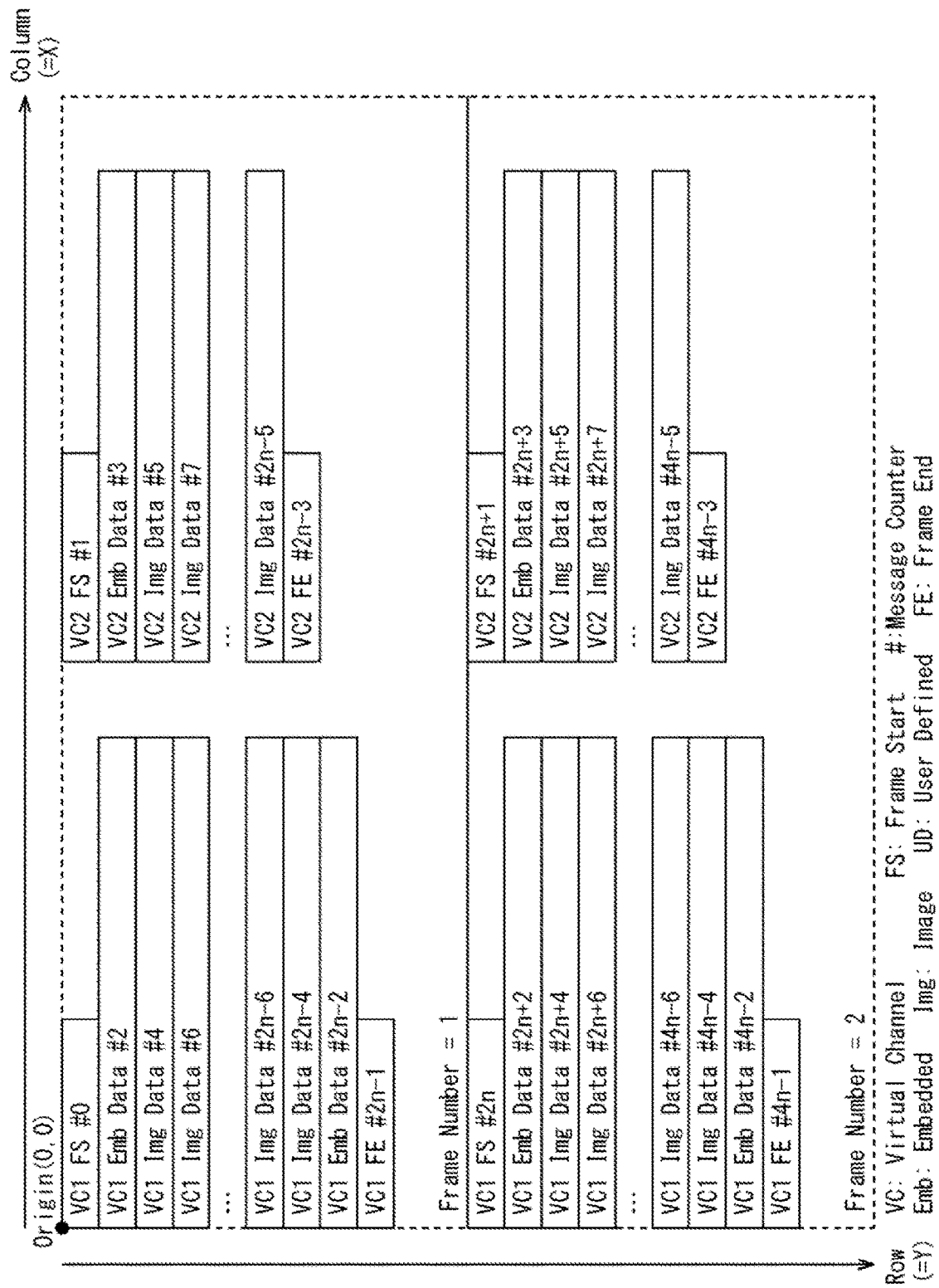
FIG. 89 is a figure depicting a data structure of image data according to a first modification example.

FIG. 89 depicts a first modification example of a data structure of image data.

In the data structure of the image data depicted in FIG. 89, a common message count value is used for a first virtual channel and a second virtual channel.

It should be noted that a common session key or message counter may be used for the first virtual channel and the second virtual channel. In addition, image data or embedded data may be replaced with other data. For example, embedded data may be replaced with image data. On the other hand, a common message, counter may be used by performance of counting across virtual channels (VC).

Figure 90:
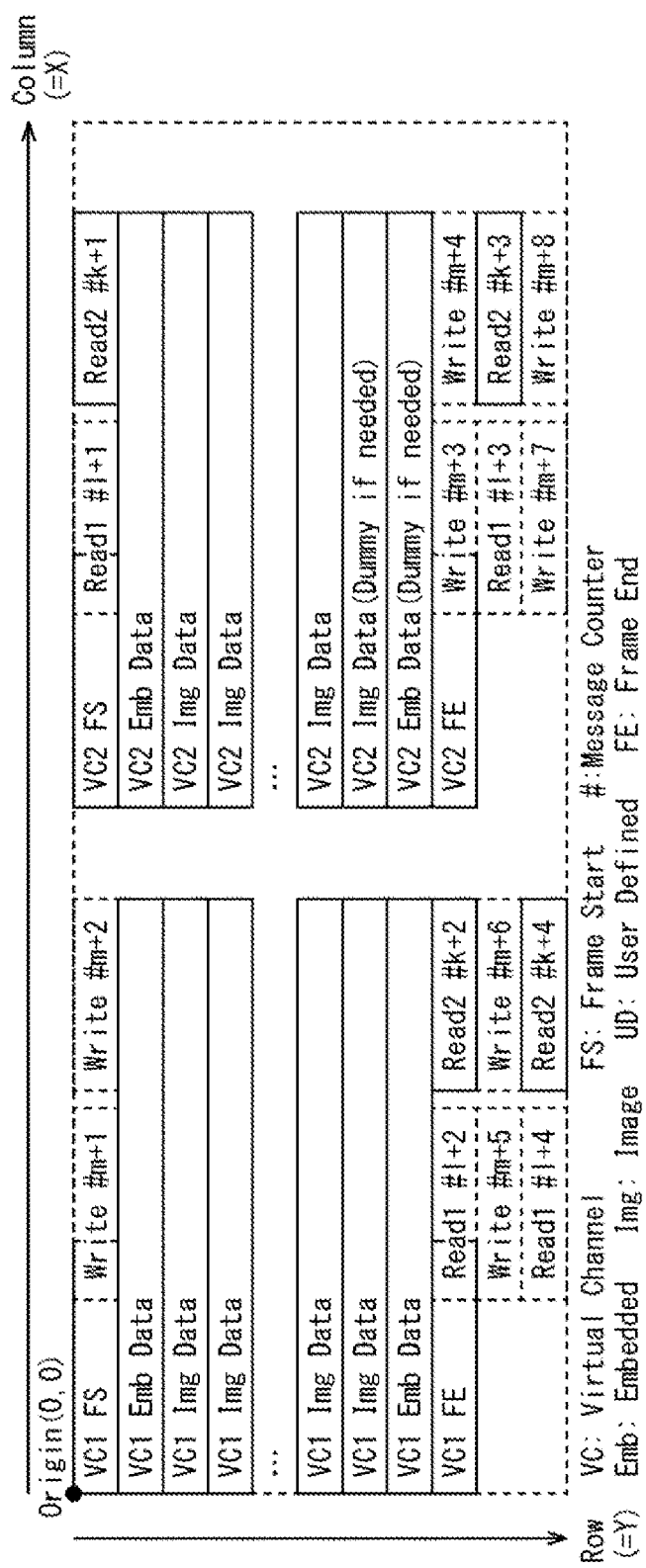
FIG. 90 is a figure depicting a data structure of image data according to a second modification example.

FIG. 90 depicts a second modification example of a data structure of image data.

In the data structure of the image data depicted in FIG. 90, independent message count values are used for a Write (a CCI write order), a Read1 (a CCI read order), and a Read2 (a CCI read response).

Figure 91:
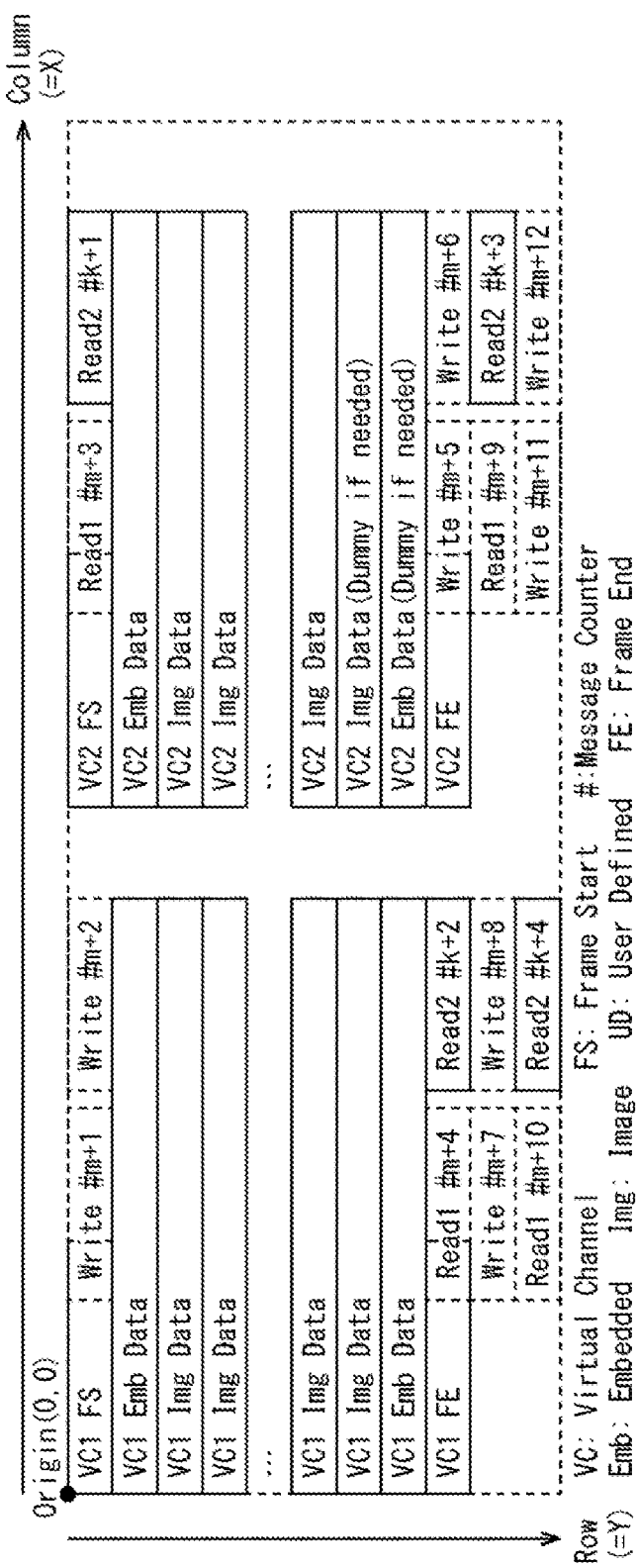
FIG. 91 is a figure depicting a data structure of image data according to a third modification example.

FIG. 91 depicts a third modification example of a data structure of image data.

In the data structure of the image data depicted in FIG. 91, independent message count values are provided for a CCI uplink (Write and Read1) and a CCI downlink (Read2). That is, a common message count value may be used for a Write (a CCI write order) and a Read1 (a CCI read order).

<Regarding Nonce Value>

For example, a nonce value is a number used once for the same session key, and is hence used as part or the whole of an initialization vector (initialization vector) of an encryption calculation or decoding calculation using the session key. Accordingly, by a nonce used by the image sensor 1211 for an encryption calculation being transmitted from the image sensor 1211 and received at the application processor 1212, the application processor 1212 can acquire the nonce value necessary for a decoding calculation.

That is, it is desirable that the image sensor 1211 transmit a nonce value before transmitting image data. Specifically, part or the whole of nonce value corresponding to image data in a certain frame is stored in any of a read response, user-defined data, embedded data (immediately after the image data), a frame end, a frame start, embedded data (immediately before the image data), and the like between transmission completion of the last image data in the previous frame and transmission start of the first image data in the certain frame.

For example, the application processor 1212 which is the master of low-speed command transmission may transmit, by low-speed command transmission, a read order requesting reading out of a nonce value in the image sensor 1211 to the application processor 1212 in response to a reception start or a reception completion of any of a frame start, embedded data, image data, user-defined data, a frame end and the like that are transmitted by high-speed data transmission from the image sensor 1211 which is the slave of low-speed command transmission.

The image sensor 1211 receives a read order transmitted from the application processor 1212, and transmits, by high-speed data transmission, a nonce value according to the read order. Then, by the application processor 1212 receiving a read response, the nonce value can be notified from the image sensor 1211 to the application processor 1212.

The nonce value notified from the image sensor 1211 is used in the application processor 1212, and it is hence desirable that part or the whole of the nonce value be transmitted in a period of a frame blanking in which image data is not transmitted between a frame end and the next frame start. It should be noted that it is sufficient if, for the first frame (Frame Number=1), the first nonce value (initial value) is agreed upon in advance between the image sensor 1211 and the application processor 1212, or part or the whole of the first nonce value is received by the application processor 1212 before the transmission start of image data.

For example, this read order corresponds to Read in a Read/Write in the I2C or I3C standard. On the other hand, the read response corresponds to a Read return value. Note that, in order to adjust the timing of the read response, a timer that is used for pausing for a predetermined length of time from reception of high-speed data transmission by the application processor 1212 to transmission of the read order may be provided.

<Regarding I2C and I3C>

An inter-integrated-circuit serial bus which is called an I2C bus or I²C bus in some cases is a serial single-ended computer bus intended to be used when a low-speed peripheral apparatus is connected to the application processor 1212. An I2C bus is a multi-master bus that allows each device to function as a master and a slave for various messages transmitted on the I2C bus.

An I2C bus can transmit data by using only two bidirectional open drain connectors including a serial data line (SDA) and a serial clock line (SCL). Typically, these connectors include signal lines that are terminated by pull-up resistors. Protocols that manage I2C bus operations stipulate basic types of messages, and these messages start by START, and end by STOP. An I2C bus uses 7-bit addressing, and stipulates two types of nodes.

A master node is a node that generates a clock, and starts communication with a slave node. A slave node is a node that receives a clock, and responds when addressed by a master. An I2C bus is a multi-master bus, and this means that there can be any number of master nodes. Moreover, the roles of a master and a slave are changed between messages (i.e., after STOP is sent) in some cases. In the present embodiment which is camera-implementation, an image may be taken in from a sensor, and unidirectional transmission may be used for transmission of such image data to a memory in a baseband processor; on the other hand, a baseband processor may exchange control data with a sensor and another peripheral device.

In an example, for such control data between a baseband processor and an image sensor (or one or more slave nodes), a camera control interface (CCI) protocol is used in some cases. In an example, a CCI protocol may be implemented via an I2C serial bus between an image sensor and a baseband processor. Conventional I2C systems, that is, camera-control-interface-based camera systems, use a separate interrupt (IRQ) line for each slave device in order to make it possible for a slave node to notify a master node that the slave node desires to use a bus.

On the other hand, the I3C communication standard is a standard for communication via two signal lines, i.e., an FDA line that transfers data and an SCL line that transfers clock signals. In this standard, devices (processors, etc.) are classified into devices that operate as masters or slaves and devices that operate only as slaves. For example, a processor operates as a master or a slave, and a sensor operates only as a slave.

Here, a master is a device that controls a slave, and a slave is a device that operates under the control by a master. In addition, in I3C, multiple slaves can be connected to one master. In addition, multiple masters can transmit signals to one slave, and this communication is referred to as "multi-master communication" below. Moreover, communication can be performed between slaves not via a master, and this communication is called "peer-to-peer communication." In addition, a slave can perform communication interrupting communication through an SDA line while another device is performing the latter communication through the SDA line (busy), and this interruption is called "in-band interrupt (In-Band Interrupt)."

In the multi-master communication, in-band interrupt, and peer-to-peer communication described above, there is a risk of a collision between signals on an SDA line that are transmitted simultaneously by multiple devices. For example, if a certain slave performs in-band interrupt and transmits a signal to a master while the master is transmitting a signal to another slave, the signal from the master collides with the signal from the certain slave undesirably. Because of this, I3C devices have a functionality of detecting a collision and coordinating devices.

Synchronization with the application processor 1212 can be realized easily with use of the interrupt functionality described above, so that nonce related information is transmitted according to a timing determined by the image sensor 1211, by execution of interruption at a timing determined by the image sensor 1211. It should be noted that the image sensor 1211 may trigger a read order by in-band interrupt, and transmit read response in response to the read order, or may omit a read order by in-band interrupt and transmit a read response.

<Integrity Calculated Value Process>

An integrity calculated value process is explained with reference to FIG. 92 to FIG. 95.

Figure 92:
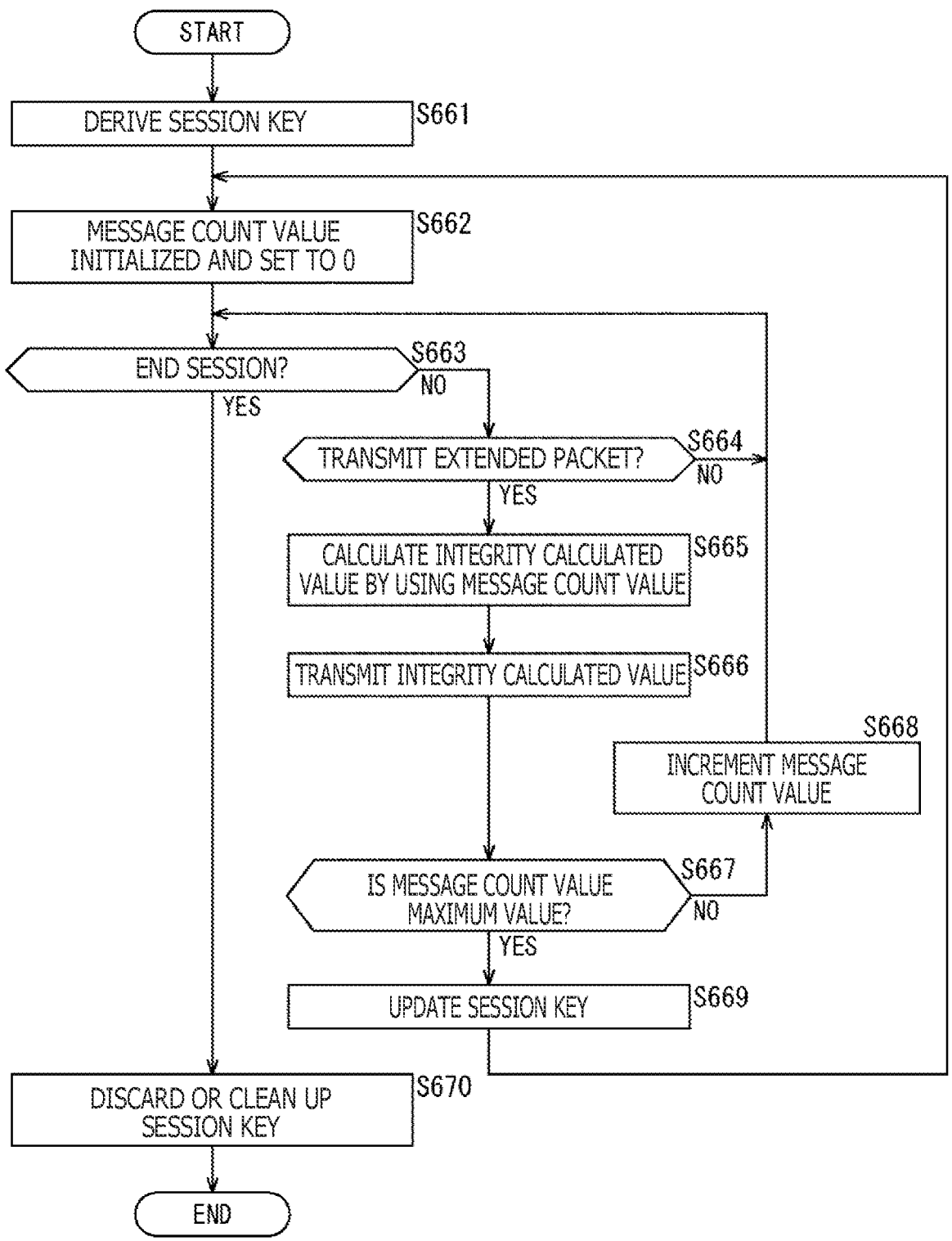
FIG. 92 is a flowchart for explaining a first processing example of an integrity calculated value process.

FIG. 92 is a flowchart for explaining a first processing example of the integrity calculated value process in which the image sensor 1211 transmits an integrity calculated value.

In Step S661, the security section 1310 derives a session key.

In Step S662, the message counter 1308 initializes a message count value and sets it to 0.

In Step S663, the extension-mode-supporting CSI-2 transmission circuit 1304 determines whether or not to end the session, and in a case where it is determined not to end the session, the process proceeds to Step S664.

In Step S664, the extension-mode-supporting CSI-2 transmission circuit 1304 determines whether or not to transmit an extended packet.

In a case where, in Step S664, the extension-mode-supporting CSI-2 transmission circuit 1304 determines not to transmit an extended packet, the process returns to Step S663, and a similar process is performed repeatedly thereafter. On the other hand, in a case where, in Step S664, the extension-mode-supporting CSI-2 transmission circuit 1304 determines to transmit an extended packet, the process proceeds to Step S665.

In Step S665, the security section 1310 calculates an integrity calculated value by using the message count value.

In Step S666, the extension-mode-supporting CSI-2 transmission circuit 1304 arranges, in an extended packet, the integrity calculated value computed in Step S665, and transmits the extended packet.

In Step S667, the message counter 1308 determines whether or not the message count value has reached the maximum value. In a case where, in Step S667, the message counter 1308 determines that the message count value has not reached the maximum value, the process proceeds to Step S668.

In Step S668, the message counter 1308 increments the message count value. Thereafter, the process returns to Step S662, and a similar process is performed repeatedly thereafter.

On the other hand, in a case where, in Step S667, the message counter 1308 determines that the message count value has reached the maximum value, the process proceeds to Step S669. After the security section 1310 updates the session key in Step S669, the process returns to Step S663, and a similar process is performed repeatedly thereafter.

Further, in a case where, in Step S663, the extension-mode-supporting CSI-2 transmission circuit 1304 determines to end the session, the process proceeds to Step S670.

In Step S670, the security section 1310 discards or cleans up the session key, and thereafter the process is ended.

In a case where an MAC value for each image line is calculated and stored in an extended packet footer and transmitted in such a manner, the message count value is incremented by one every time an extended packet is transmitted, so the message count value makes one round when it reaches $2^{16}$. For example, in a case where 4K data with a pixel count 4096×2160 (in the horizontal direction and vertical direction) is transmitted at a frame rate of 60 fps, the message count value makes one round in $(2^{16})/(60\times 2163)\approx 0.5$ seconds supposing that extended packets of 2163 lines obtained by adding three lines for a frame start, embedded data, and a frame end are transmitted in one frame.

For example, in a case where the image sensor 1211 calculates an MAC value such as a Galois Message Authentication Code (CMAC) value of a message by using the same initialization vector value for the same session key and transmits the message and the MAC value, an attacker can easily acquire the session key by performing a computation according to a simultaneous equation of the message and the MAC value. In that case, it becomes possible for the attacker to freely tamper the MAC value, so that attacks on the message such as identity fraud, tampering, or replay become possible. Accordingly, in a case where a message count value is used as a variable portion of an initialization vector, that is, as a nonce value, the session key needs to be updated before the message count value makes one round. For example, it is sufficient if the session key is updated before the nonce value makes one round (rolls over), by making use of a frame blanking or line blanking period.

Figure 93:
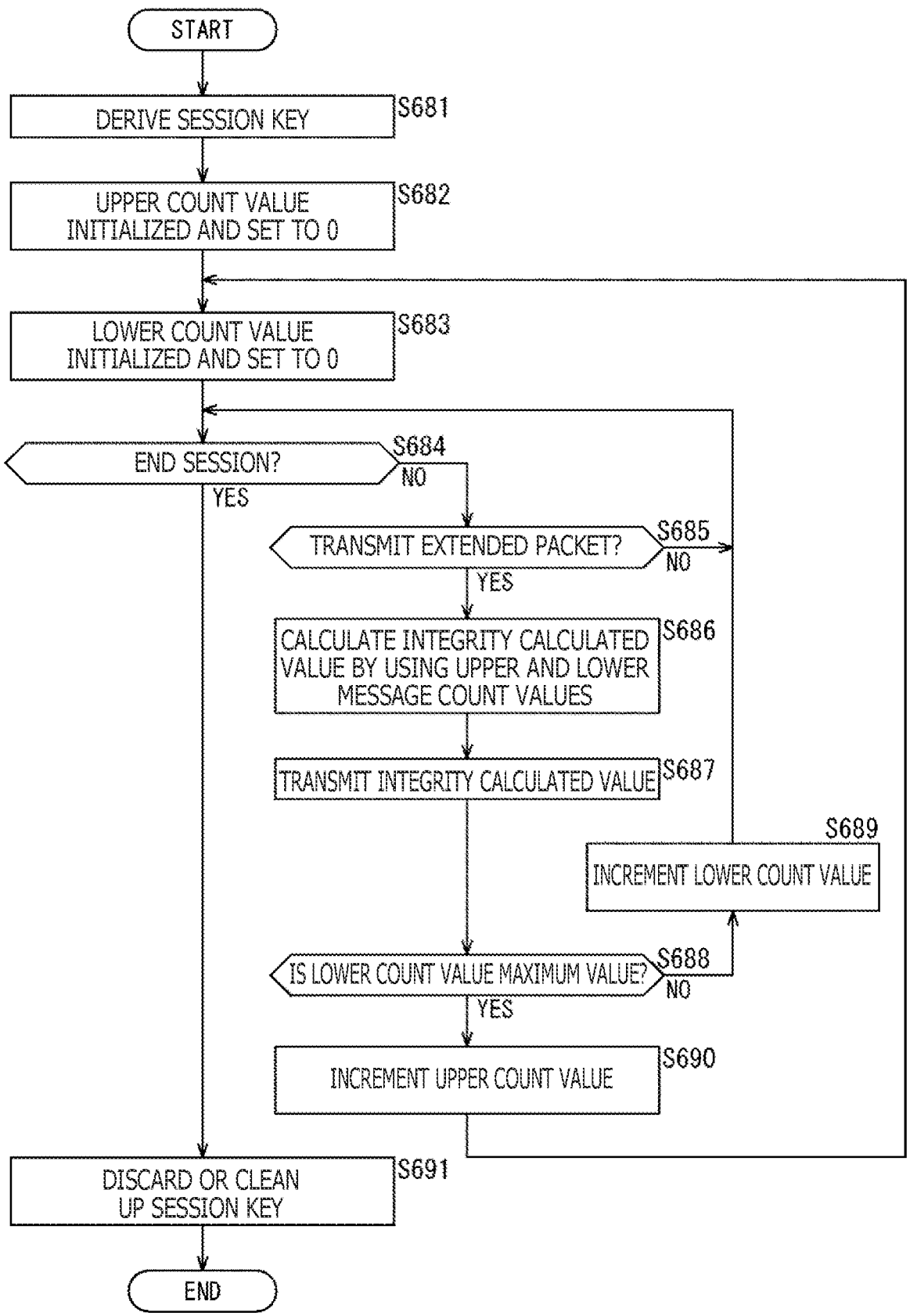
FIG. 93 is a flowchart for explaining a second processing example of the integrity calculated value process.

FIG. 93 is a flowchart for explaining a second processing example of the integrity calculated value process in which the image sensor 1211 transmits an integrity calculated value.

In Step S681, the security section 1310 derives a session key.

In Step S682, the message counter 1308 initializes an upper count value of the message count value and sets it to 0.

In Step S683, the message counter 1308 initializes a lower count value of the message count value and sets it to 0.

In Step S684, the extension-mode-supporting CSI-2 transmission circuit 1304 determines whether or not to end the session, and in a case where it is determined not to end the session, the process proceeds to Step S685.

In Step S685, the extension-mode-supporting CSI-2 transmission circuit 1304 determines whether or not to transmit an extended packet.

In a case where, in Step S685, the extension-mode-supporting CSI-2 transmission circuit 1304 determines not to transmit an extended packet, the process returns to Step S684, and a similar process is performed repeatedly thereafter. On the other hand, in a case where, in Step S685, the extension-mode-supporting CSI-2 transmission circuit 1304 determines to transmit an extended packet, the process proceeds to Step S686.

In Step S686, the security section 1310 calculates an integrity calculated value by using the upper count value and the lower count value of the message count value.

In Step S687, the extension-mode-supporting CSI-2 transmission circuit 1304 arranges, in an extended packet, the integrity calculated value computed in Step S686, and transmits the extended packet.

In Step S688, the message counter 1308 determines whether or not the lower count value of the message count value has reached the maximum value. In a case where, in Step S688, the message counter 1308 determines that the lower count value of the message count value has not reached the maximum value, the process proceeds to Step S689.

In Step S689, the message counter 1308 increments the lower count value of the message count value. Thereafter, the process returns to Step S684, and a similar process is performed repeatedly thereafter.

On the other hand, in a case where, in Step S688, the message counter 1308 determines that the lower count value of the message count value has reached the maximum value, the process proceeds to Step S690. After the message counter 1308 increments the upper count value of the message count value in Step S690, the process returns to Step S683, and a similar process is performed repeatedly thereafter.

Further, in a case where, in Step S684, the extension-mode-supporting CSI-2 transmission circuit 1304 determines to end the session, the process proceeds to Step S691.

In Step S691, the security section 1310 discards or cleans up the session key, and thereafter the process is ended.

In a case where a message count value is used as part of an initialization vector, that is, part (e.g., the lower count value) of a nonce value, in such a manner, it is possible to make updating of a session key unnecessary or to reduce the update frequency of a session key by using a remaining part (e.g., the upper count value) of the nonce value in combination.

For example, in a case where 4K data with a pixel count 4096×2160 (in the horizontal direction and vertical direction) is transmitted at a frame rate of 60 fps, the nonce value makes one round after $2^{32} \div 60 \div 2163 \approx$ nine hours if a 16-bit-wide upper count value is used in combination $2^{36} \div 60 \div 2163 \approx$ six days if a 20-bit-wide upper count value is used in combination $2^{40} \div 60 \div 2163 \approx 98$ days if a 24-bit-wide upper count value is used in combination $2^{44} \div 60 \div 2163 \approx$ four years if a 28-bit-wide upper count value is used in combination $2^{48} \div 60 \div 2163 \approx 69$ years if a 32-bit-wide upper count value is used in combination Here, in a case where the power supply of the image sensor 1211 or the application processor 1212 is re-activated (ON after OFF), key exchange is necessary before protected image data is transmitted again, so that the session key is updated accordingly. For example, in typical uses for in-vehicle equipment, the possibility of not re-activating a power supply for six days or longer is low, and the possibility of not re-activating a power supply for four years or longer is extremely low. Accordingly, it is sufficient that if the upper count value is 20- to 28-bit wide. Of course, this is not the sole example, and a greater bit width may be used.

For example, for a gas-filling type vehicle, it is sufficient if the power supply is turned off at a time of refueling, and even for a gas-filling type or rechargeable vehicle, if the power supply is turned off at a time of vehicle inspection, key exchange is necessary before protected image data is transmitted again, so that the session key is updated accordingly. For example, in a case where a use of an image sensor for IoT (Internet of Things or Intelligence of Things) is assumed, the power supply being not re-activated is assumed, so that it is sufficient if the upper count value is 32-bit wide. Of course, this is not the sole example, and a greater bit width may be used.

Figure 94:
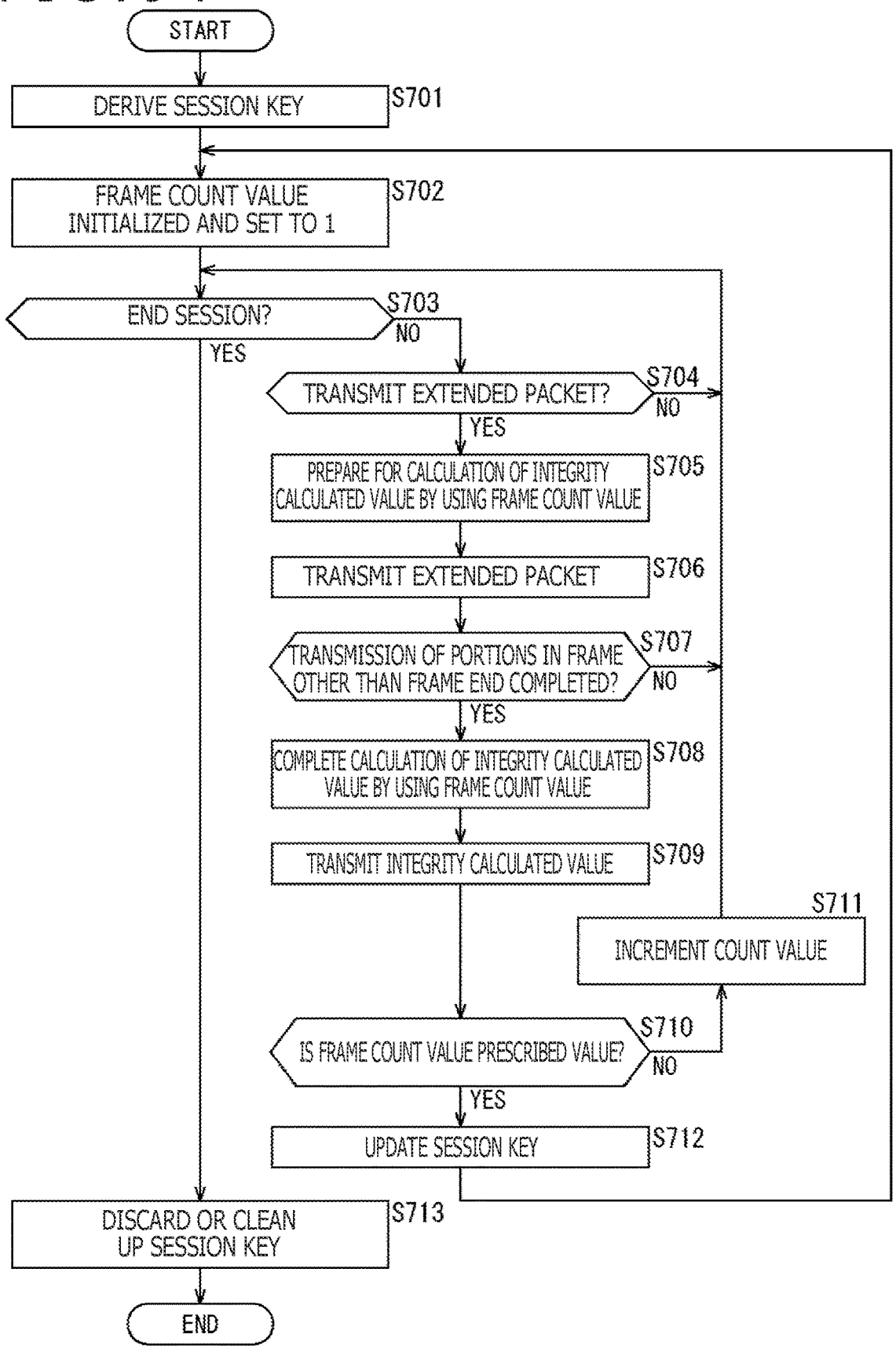
FIG. 94 is a flowchart for explaining a third processing example of the integrity calculated value process.

FIG. 94 is a flowchart for explaining a third processing example of the integrity calculated value process in which the image sensor 1211 transmits an integrity calculated value.

In Step S701, the security section 1310 derives a session key.

In Step S702, the message counter 1308 initializes a frame count value and sets it to 1.

In Step S703, the extension-mode-supporting CSI-2 transmission circuit 1304 determines whether or not to end the session, and in a case where it is determined not to end the session, the process proceeds to Step S704.

In Step S704, the extension-mode-supporting CSI-2 transmission circuit 1304 determines whether or not to transmit an extended packet.

In a case where, in Step S704, the extension-mode-supporting CSI-2 transmission circuit 1304 determines not to transmit an extended packet, the process returns to Step S703, and a similar process is performed repeatedly thereafter. On the other hand, in a case where, in Step S704, the extension-mode-supporting CSI-2 transmission circuit 1304 determines to transmit an extended packet, the process proceeds to Step S705.

In Step S705, the security section 1310 prepares for calculation of an integrity calculated value to be performed with use of the frame count value.

In Step S706, the extension-mode-supporting CSI-2 transmission circuit 1304 transmits an extended packet.

In Step S707, the extension-mode-supporting CSI-2 transmission circuit 1304 determines whether or not transmission of portions in the frame other than the frame end has been completed. In a case where, in Step S707, the extension-mode-supporting CSI-2 transmission circuit 1304 determines that the transmission of the portions in the frame other than the frame end has not been completed, the process returns to Step S703, and a similar process is performed repeatedly thereafter. On the other hand, in a case where, in Step S707, the extension-mode-supporting CSI-2 transmission circuit 1304 determines that the transmission of the portions in the frame other than the frame end has been completed, the process proceeds to Step S708.

In Step S708, the security section 1310 completes the calculation of the integrity calculated value performed with use of the frame count value.

In Step S709, the extension-mode-supporting CSI-2 transmission circuit 1304 transmits the integrity calculated value along with the frame end.

In Step S710, the message counter 1308 determines whether or not the frame count value has reached a prescribed value. In a case where, in Step S710, the message counter 1308 determines that the frame count value has not reached the prescribed value, the process proceeds to Step S711.

In Step S711, the message counter 1308 increments the frame count value. Thereafter, the process returns to Step S703, and a similar process is performed repeatedly thereafter.

On the other hand, in a case where, in Step S710, the message counter 1308 determines that the frame count value has reached the prescribed value, the process proceeds to Step S712. After the security section 1310 updates the session key in Step S712, the process returns to Step S702, and a similar process is performed repeatedly thereafter.

Further, in a case where, in Step S703, the extension-mode-supporting CSI-2 transmission circuit 1304 determines to end the session, the process proceeds to Step S713.

In Step S713, the security section 1310 discards or cleans up the session key, and thereafter the process is ended.

In such a manner, the image sensor 1211 may calculate an integrity calculated value of each image frame, and transmit them in a batch. The integrity calculated values in that case are stored in embedded data, user-defined data, or a read response after image data, and transmitted.

The frame start or the frame end may include a 16-bit frame number, for example. The same frame number may be used for a frame start and a frame end corresponding to a predetermined frame. In a case where a 16-bit frame number is used, it is desirable that the frame number be non-zero in order to make a distinction from a use case where the frame number is not functioning and remains set to zero, but this is not the sole example.

The frame number is incremented by one or two for each frame start packet having the same virtual channel, and is reset to one regularly. For example, in a case where an image frame is masked due to damage (i.e., not transmitted), the frame number may be increased by two.

In order to cope with such a case, as necessary, increments by one and two may be mixedly present freely in a frame-number sequence. That is, the frame number makes one round after $(2^{16}-1)$ times in a case where it is incremented by one at a time. In addition, the frame number makes one round in $(2^{16}-1)\div 60 \approx 18$ minutes in a case where the frame rate is 60 fps.

For example, in a case where the image sensor 1211 calculates an MAC value such as a Galois Message Authentication Code (GMAC) value of a message by using the same initialization vector value for the same session key and transmits the message and the MAC value, an attacker can easily acquire the session key by performing a computation according to a simultaneous equation of the message and the MAC value. In that case, it becomes possible for the attacker to freely tamper the MAC value, so that attacks on the message such as identity fraud, tampering, or replay become possible.

Accordingly, in a case where a frame number is used as an initialization vector, that is, as a nonce value, a session key needs to be updated before the frame number makes one round. For example, it is sufficient if the session key is updated before the nonce value makes one round (rolls over) by making use of a frame blanking or line blanking period.

Figure 95:
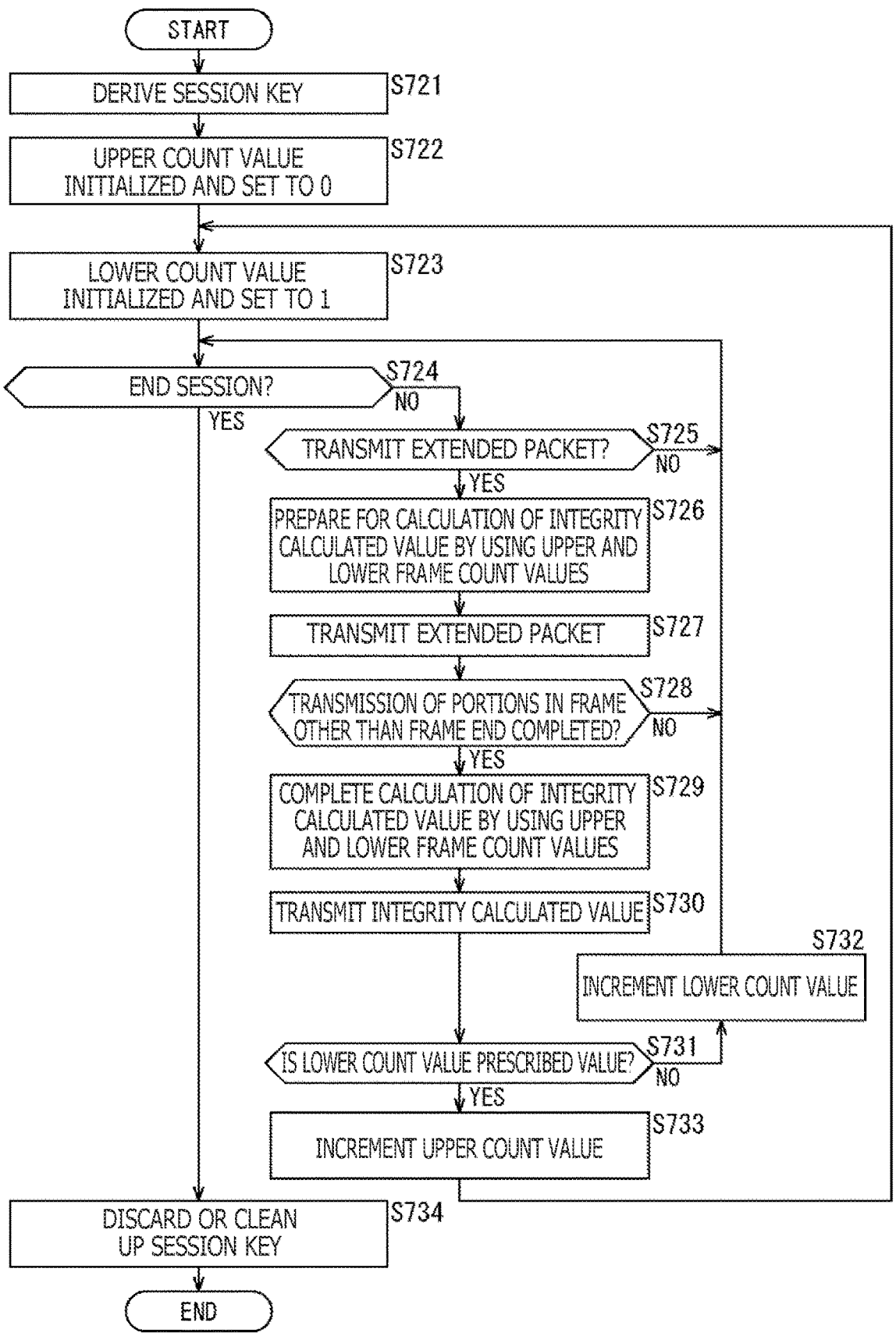
FIG. 95 is a flowchart for explaining a fourth processing example of the integrity calculated value process.

FIG. 95 is a flowchart for explaining a fourth processing example of the integrity calculated value process in which the image sensor 1211 transmits an integrity calculated value.

In Step S721, the security section 1310 derives a session key.

In Step S722, the message counter 1308 initializes an upper count value of the frame count value and sets it to 0.

In Step S723, the message counter 1308 initializes a lower count value of the frame count value and sets it to 1.

In Step S724, the extension-mode-supporting CSI-2 transmission circuit 1304 determines whether or not to end the session, and in a case where it is determined not to end the session, the process proceeds to Step S725.

In Step S725, the extension-mode-supporting CSI-2 transmission circuit 1304 determines whether or not to transmit an extended packet.

In a case where, in Step S725, the extension-mode-supporting CSI-2 transmission circuit 1304 determines not to transmit an extended packet, the process returns to Step S724, and a similar process is performed repeatedly thereafter. On the other hand, in a case where, in Step S725, the extension-mode-supporting CSI-2 transmission circuit 1304 determines to transmit an extended packet, the process proceeds to Step S726.

In Step S726, the security section 1310 prepares for calculation of an integrity calculated value to be performed with use of an upper count value and a lower count value of the frame count value.

In Step S727, the extension-mode-supporting CSI-2 transmission circuit 1304 transmits an extended packet.

In Step S728, the extension-mode-supporting CSI-2 transmission circuit 1304 determines whether or not transmission of portions in the frame other than the frame end has been completed. In a case where, in Step S728, the extension-mode-supporting CSI-2 transmission circuit 1304 determines that the transmission of the portions in the frame other than the frame end has not been completed, the process returns to Step S724, and a similar process is performed repeatedly thereafter. On the other hand, in a case where, in Step S728, the extension-mode-supporting CSI-2 transmission circuit 1304 determines that the transmission of the portions in the frame other than the frame end has been completed, the process proceeds to Step S729.

In Step S729, the security section 1310 completes the calculation of the integrity calculated value performed with use of the upper count value and the lower count value of the frame count value.

In Step S730, the extension-mode-supporting CSI-2 transmission circuit 1304 transmits the integrity calculated value along with the frame end.

In Step S731, the message counter 1308 determines whether or not the lower count value of the frame count value has reached a prescribed value. In a case where, in Step S731, the message counter 1308 determines that the lower count value of the frame count value has not reached the prescribed value, the process proceeds to Step S732.

In Step S732, the message counter 1308 increments the lower count value of the frame count value. Thereafter, the process returns to Step S724, and a similar process is performed repeatedly thereafter.

On the other hand, in a case where, in Step S731, the message counter 1308 determines that the lower count value of the frame count value has reached the prescribed value, the process proceeds to Step S733. After the security section 1310 increments the upper count value of the frame count value in Step S733, the process returns to Step S723, and a similar process is performed repeatedly thereafter.

Further, in a case where, in Step S724, the extension-mode-supporting CSI-2 transmission circuit 1304 determines to end the session, the process proceeds to Step S734.

In Step S734, the security section 1310 discards or cleans up the session key, and thereafter the process is ended.

In a case where a frame number is used as part of an initialization vector, that is, part (e.g., the lower count value) of a nonce value, in such a manner, it is possible to make updating of a session key unnecessary or to reduce the update frequency of a session key by using a remaining part (e.g., the upper count value) of the nonce value in combination.

For example, in a case where the nonce value is incremented by one at a time and the frame rate is 60 fps, the nonce value makes one round after $(2^{20}-1)\div 60 \approx$ five hours if a 4-bit-wide upper count value is used in combination $(2^{24}-1)\div 60 \approx 78$ hours if an 8-bit-wide upper count value is used in combination $(2^{28}-1)\div 60 \approx 52$ days if a 12-bit-wide upper count value is used in combination $(2^{32}-1)\div 60 \approx 828$ days if a 16-bit-wide upper count, value is used in combination $(2^{36}-1)\div 60 \approx 36$ years if a 20-bit-wide upper count value is used in combination $(2^{40}-1)\div 60 \approx 581$ years if a 24-bit-wide upper count value is used in combination Here, in a case where the power supply of the image sensor 1211 or the application processor 1212 is re-activated (ON after OFF), key exchange is necessary before protected image data is transmitted again, so that the session key is updated accordingly. For example, in typical uses for in-vehicle equipment, the possibility of not re-activating a power supply for three days or longer is low, and the possibility of not re-activating a power supply for two years or longer is extremely low. Accordingly, it is sufficient that if the upper count value is 8- to 16-bit wide. Certainly, this is not the sole example, and a greater bit width may be used.

For example, for a gas-filling type vehicle, it is sufficient if the power supply is turned off at a time of refueling, and even for a gas-filling type or rechargeable vehicle, if the power supply is turned off at a time of vehicle inspection, key exchange is necessary before protected image data is transmitted again, so that the session key is updated accordingly. For example, in a case where a use of an image sensor for IoT (Internet of Things or Intelligence of Things) is assumed, the power supply not being re-activated is assumed, so that it is sufficient if the upper count value is 20- to 24-bit wide. Of course, this is not the sole example, and a greater bit width may be used.

<Encryption and Decoding>

Encryption and decoding are explained with reference to FIG. 96 to FIG. 100.

Figure 96:
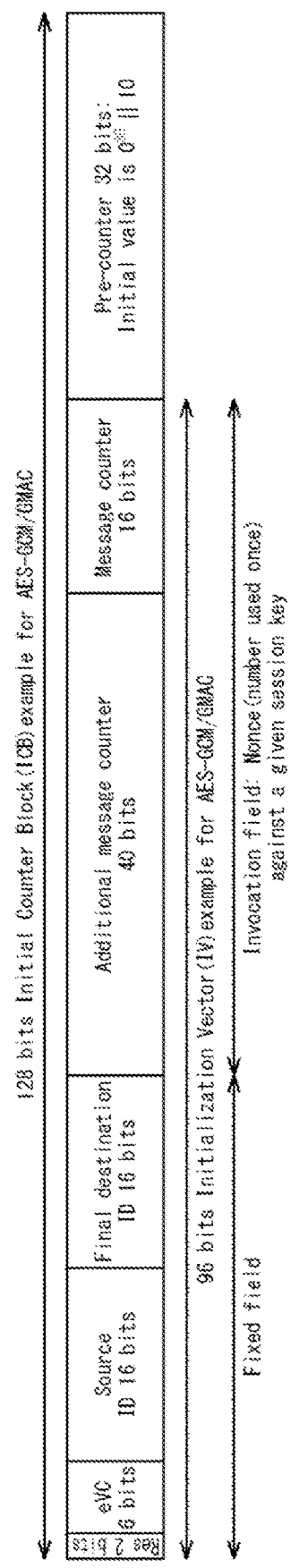
FIG. 96 is a figure depicting an example of an initial counter block in which an initialization vector is stored.

FIG. 96 depicts an example of an initial counter block in which an initialization vector is stored.

As depicted in FIG. 96, using different values between virtual channels while using a common initialization vector structure makes it possible to enable easier implementation. In addition, a common session key or count value is used for CSI-2 virtual channels.

A 128-bit initial counter block is used for encryption or message authentication according to AES (Advanced Encryption Standard)-GCM (Galois/Counter Mode) or AES-GMAC (Galois Message Authentication Code).

Figure 97:
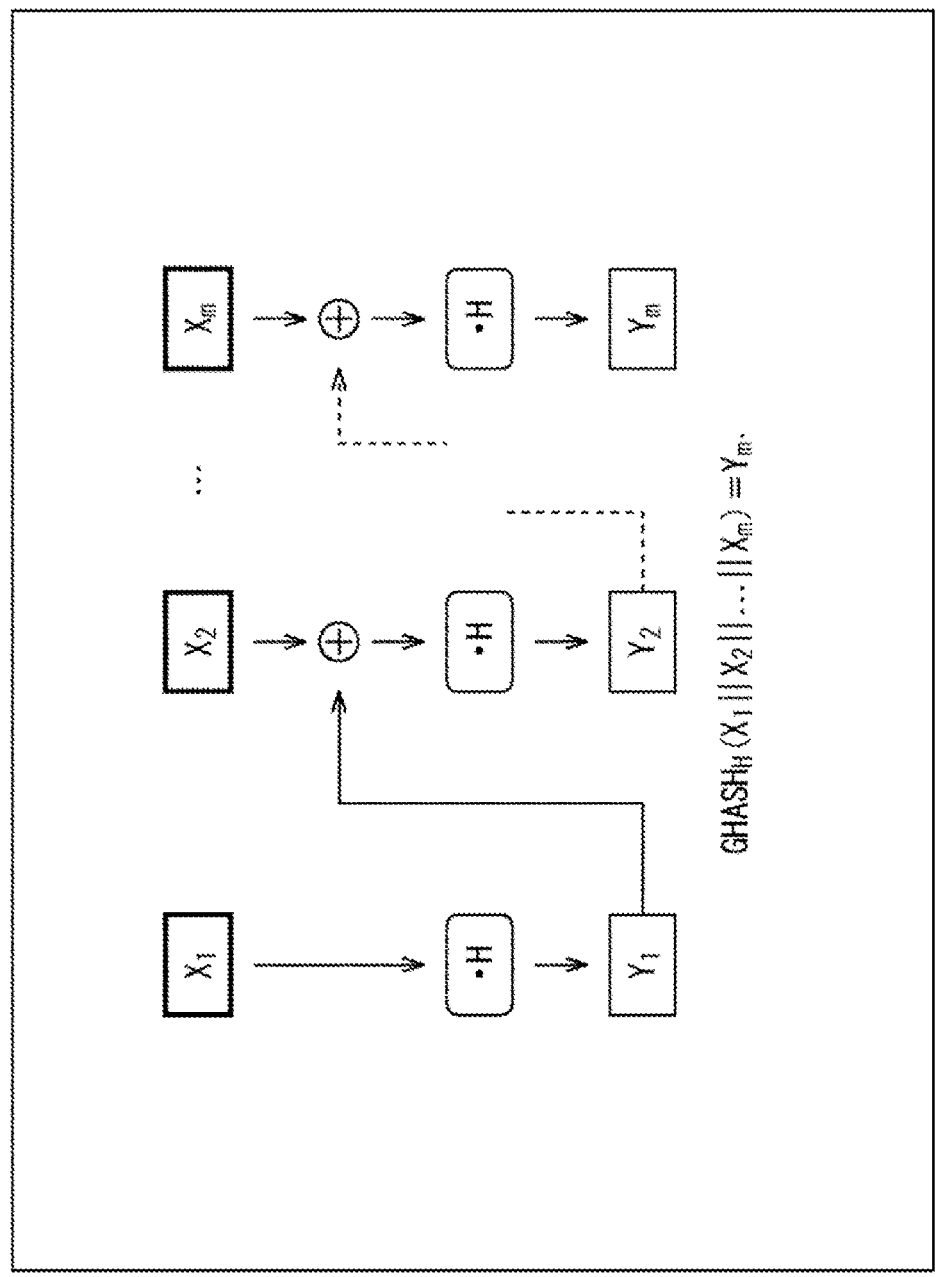
FIG. 97 is a figure depicting the GHASH function.
Figure 98:
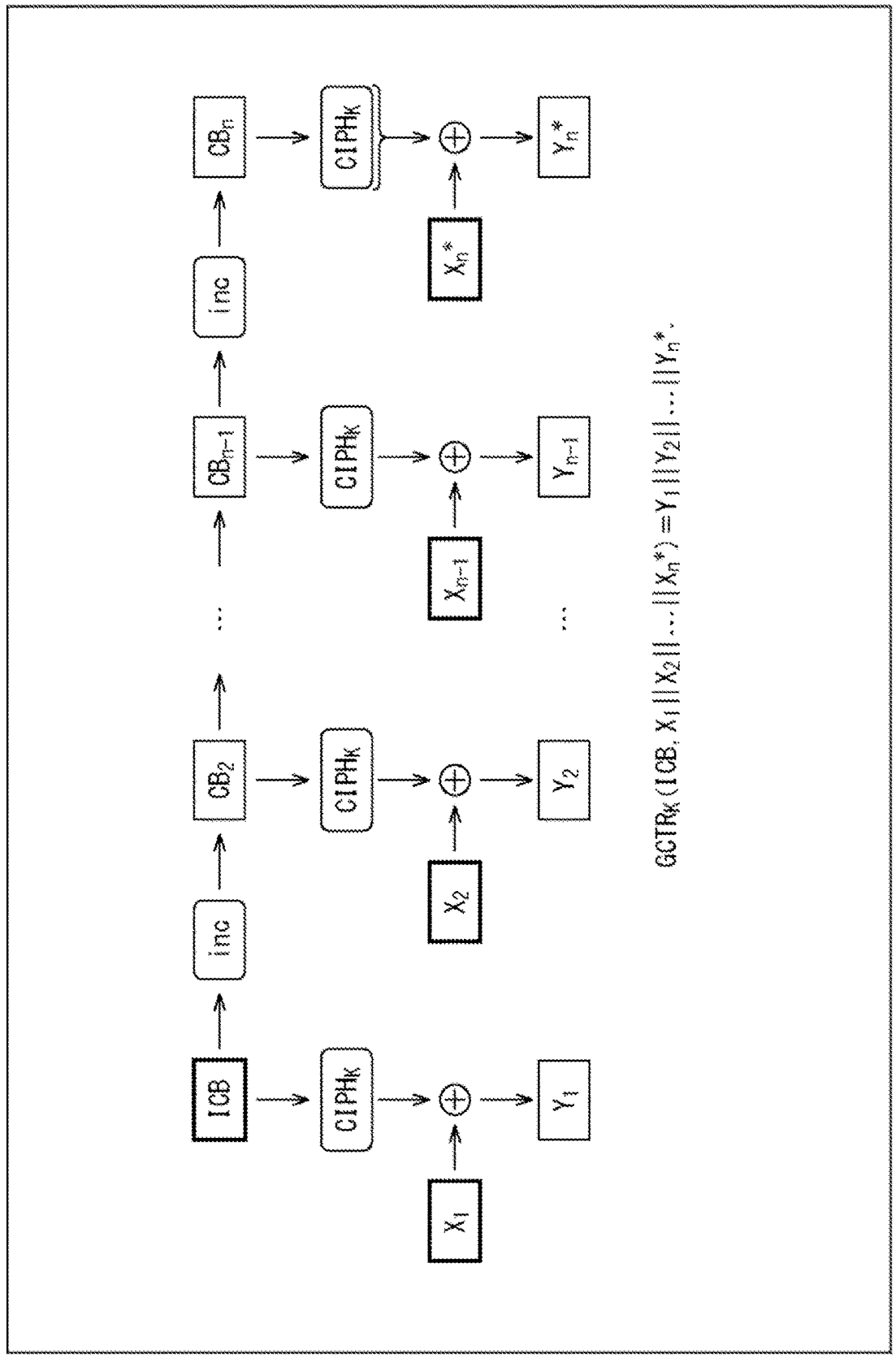
FIG. 98 is a figure depicting the GCTR function.

For example, the GHASH function as the one depicted in FIG. 97, the GCTR function as the one depicted in FIG. 96, and the like can be used for encryption of an initial counter block.

Figure 99:
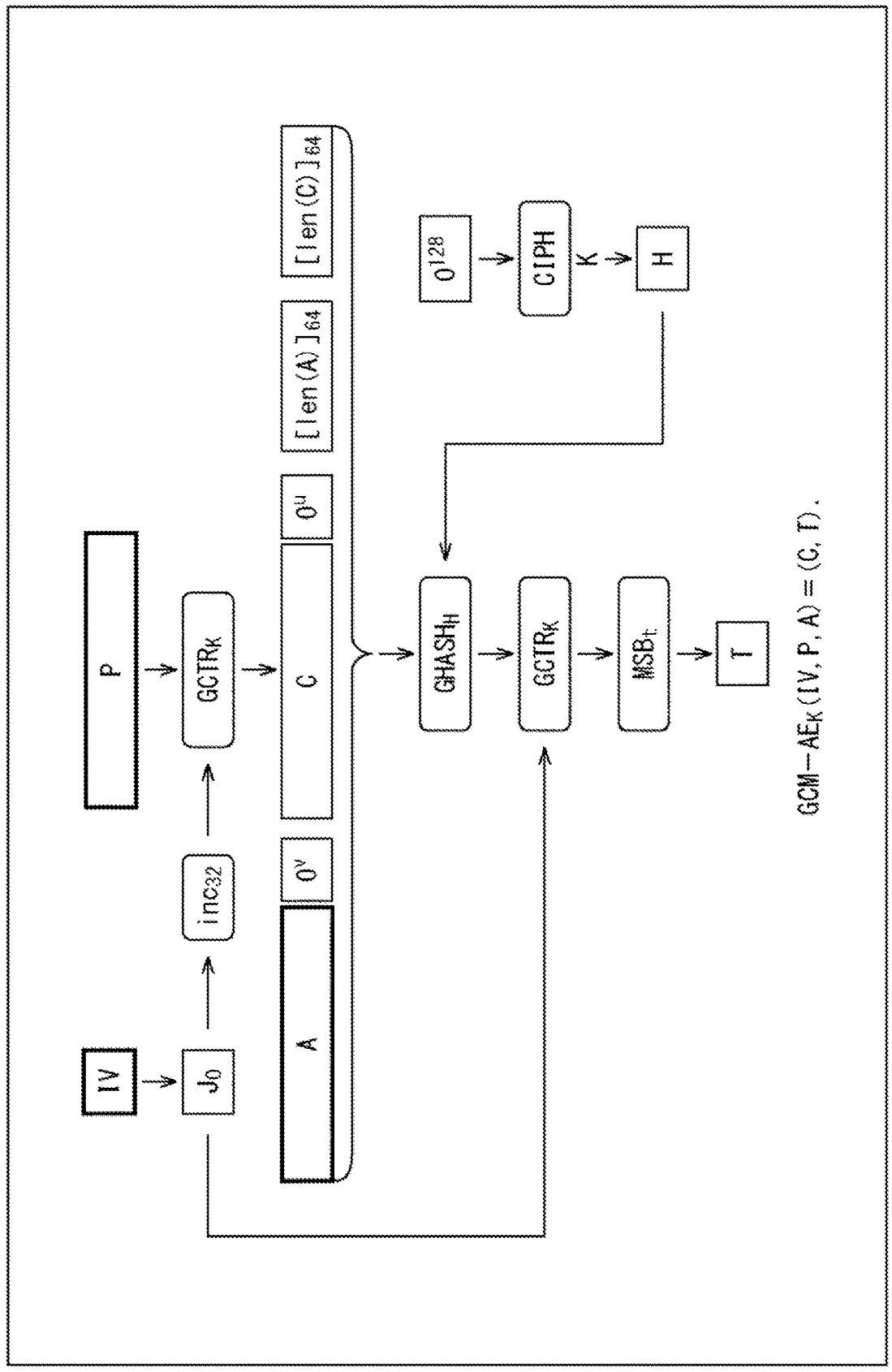
FIG. 99 is a figure depicting the GCM-AE function.
Figure 100:
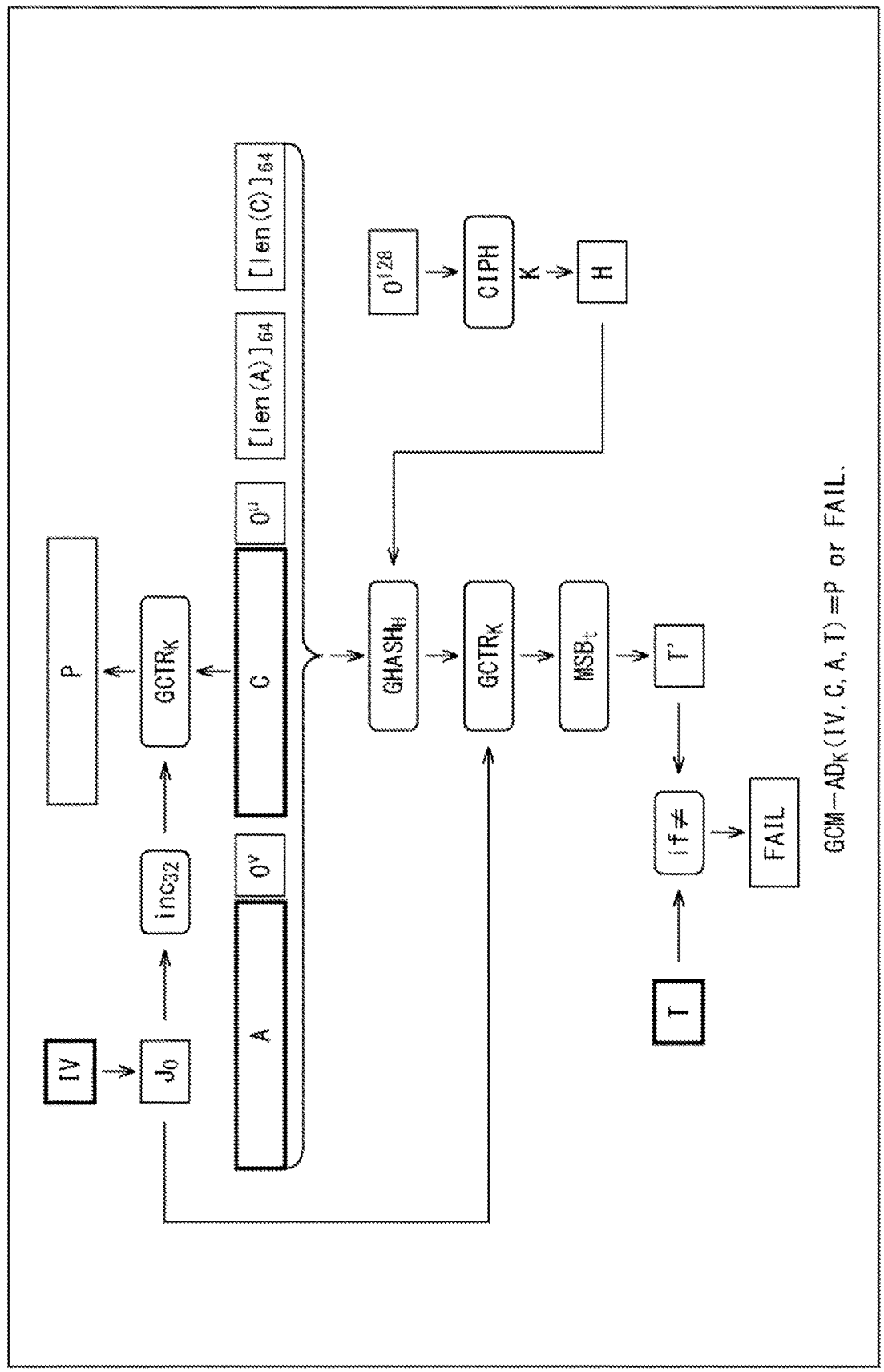
FIG. 100 is a figure depicting the GCM-AD function.

An initialization vector is used for encryption using the GCM-AE (Authenticated Encryption) function having an authenticated encryption functionality as the one depicted in FIG. 99 and decoding using the GCM-AD (Authenticated Decryption) function having an authenticated decoding functionality as the one depicted in FIG. 100. It should be noted that its use may be limited to either functionality of encrypting (decoding) or message authentication.

For example, when an initialization vector IV, a plaintext P, and additional authentication data A are input to the GCM-AE function, encryption of the plaintext P is performed; as a result, an encrypted text C and an authentication tag T are output.

On the other hand, when the initialization vector IV, the encrypted text C, the additional authentication data A, and the authentication tag T are input to the GCM-AD function, decoding of the encrypted text C is performed, and the plaintext P is output. In a case where the authentication tag T and an authentication tag T' do not agree, a result (FAIL) representing that the authentication has failed is output.

<First Transmission Method of Integrity Calculated Value>

A first transmission method of an integrity calculated value MAC is explained with reference to FIG. 101 to FIG. 105.

Figure 101:
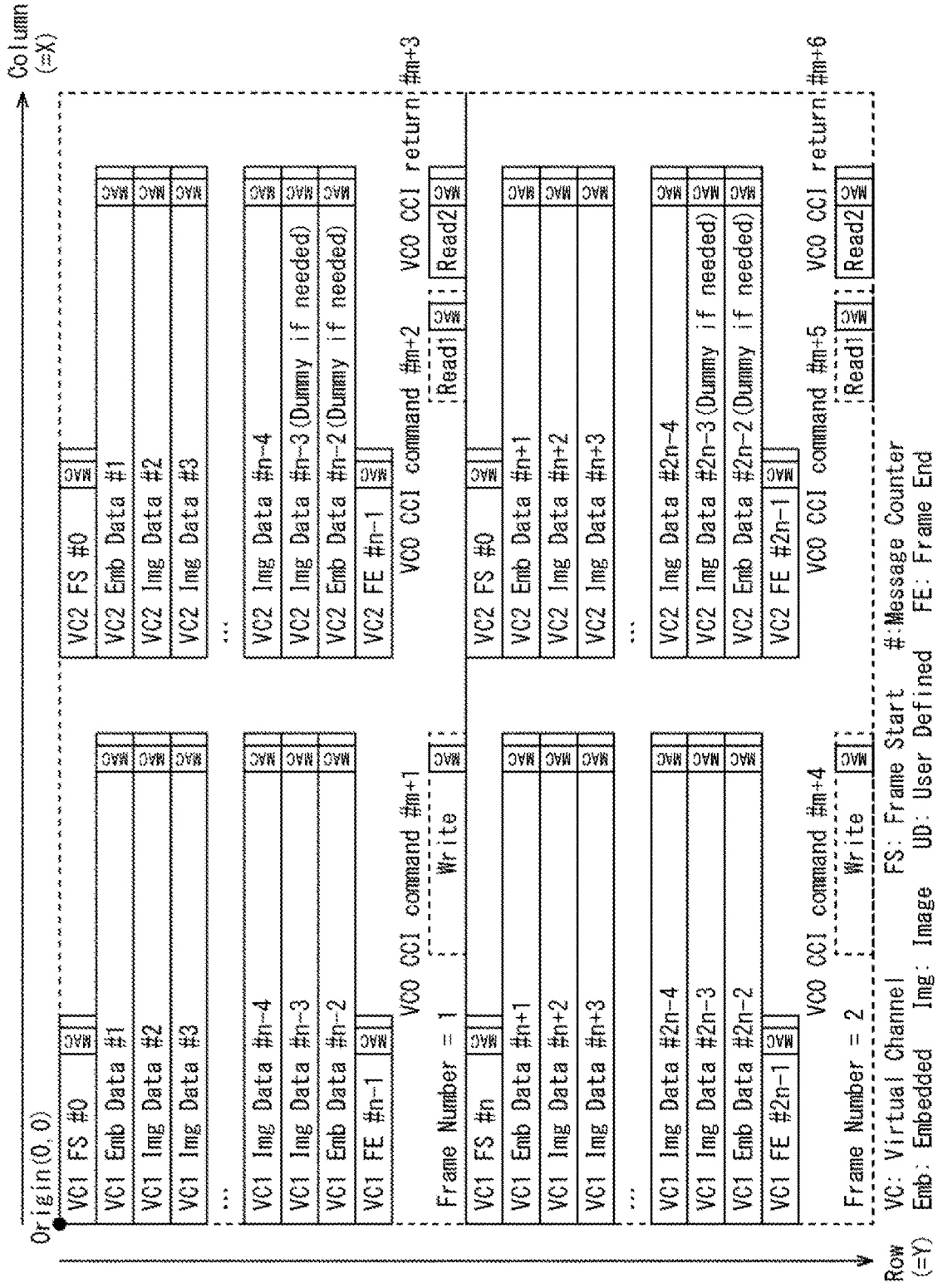
FIG. 101 is a figure depicting an example of a data structure of image data for transmitting an integrity calculated value MAC for each line.

FIG. 101 depicts a data structure of image data for transmitting an integrity calculated value MAC for each line. A transmission method in which an integrity calculated value MAC is transmitted for each line in such a manner is referred to as a line MAC method as appropriate below.

As depicted in the figure, an integrity calculated value MAC is transmitted for each CSI-2 line, each CCI command, or each CCI return. In a case where the same value is used for initialization vectors thereamong in such a manner, a larger number of session keys is necessary.

For example, if the same initialization vector and the same session key are used, this is assumed to be the cause of tampering of an integrity calculated value MAC.

In view of this, according to one proposal, for the same initialization vector, four session keys in total are used for each VC0 command, VC0 return, VC1, and VC2.

On the other hand, according to another proposal, for different initialization vectors, three session keys or less are used.

In the first case, a first session key for uplink is used in a VC0 command, and a second session key for downlink is used in a VC0 return, VC1, and VC2. In the second case, a first session key for CCI is used in VC0, and a second session key for CSI-2 is used in VC1 and VC2. In the third case, one session key for all is used in VC0, VC1, and VC2.

In addition, two message count values in total are used. A common message count value in CSI-2 is used for VC1 and VC2, and an independent message count value in CCI is used for VC0.

Note that whereas a common message counter is used for CSI-2 virtual channels in the example depicted, independent message counters may be used for CSI-2 virtual channels. In that case, it is sufficient if part of the flowchart is removed. In addition, in that case, the message counters may be synchronized between the CSI-2 virtual channels, or they may be asynchronous. For example, in terms of implementation efficiency, a common message counter is desirable in some cases, and in terms of safety, independent message counters are desirable in some cases.

Figure 102:
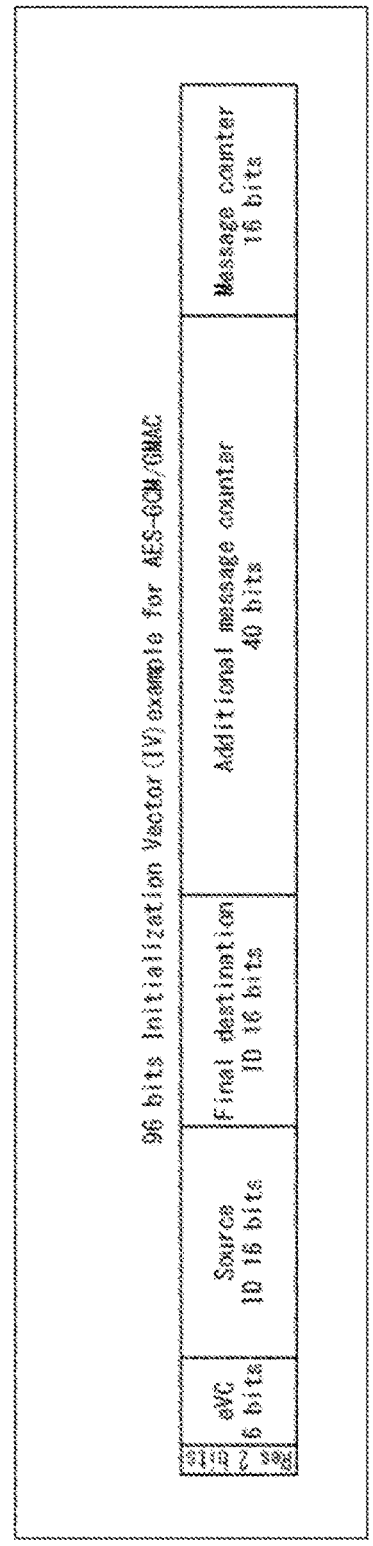
FIG. 102 is a figure depicting an example of an initialization vector.
Figure 103:
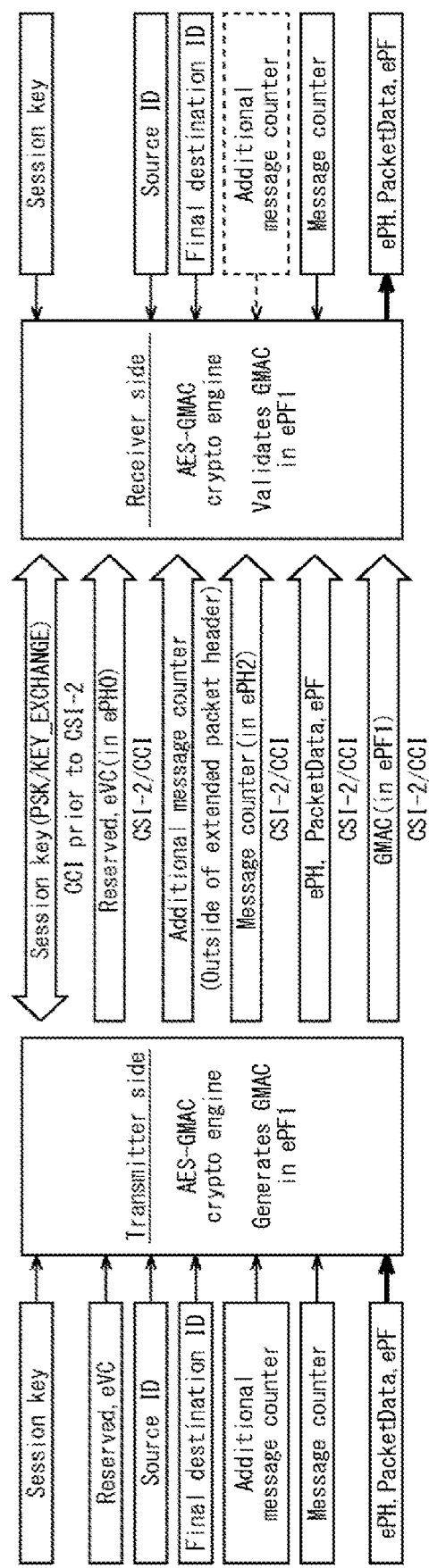
FIG. 103 is a figure depicting an example of transmission of an initialization vector from a transmitter side to a receiver side.

For example, a common initialization vector with a structure depicted in FIG. 102 is used for all virtual channels (CSI-2 and CCI). Further, part or the whole of the initialization vector is transmitted from a transmitter side to a receiver side as depicted in FIG. 103. Note that as Reserved (Res) two bits, a prescribed value (e.g., $0^2$, $1^2$) may be used. In addition, a value that is exchanged in advance may be used as a Source ID or a Final Destination ID. Moreover, as part or the whole of an initialization vector, the receiver side may use not a value transmitted from the transmitter side to the receiver side, but a value that the receiver side knows. Further, although it is desirable that part or the whole of an initialization vector be transmitted in an un-encrypted state (as a plaintext) in a case where the part or the whole of the initialization vector is transmitted from the transmitter side to the receiver side, this is not the sole example.

Whereas an additional message count value is stored outside an extended packet header and transmitted in the example depicted in FIG. 103, an additional message count value and a message count value may be stored outside an extended packet header and transmitted. In that case, the message count value may be stored also in the extended packet header and transmitted. Note that only part of the additional message count value may be used. For example, in a case where an additional message count value in an initialization vector is a 40-bit value, the actual additional message count value may be a 16-bit counter, the count value may be stored in part (e.g., LSB-side 16 bits) of the additional message count value in the initialization vector, and a prescribed value (e.g., $0^{24}$, $1^{24}$) may be stored in the remaining part (e.g., MSB-side 24 bits) of the additional message count value in the initialization vector. In addition, a prescribed value (e.g., $0^{40}$, $1^{40}$) may be stored in the entire additional message count value in the initialization vector.

In addition, part or the whole of an initialization vector that is set by being transmitted from the image sensor 1211 to the application processor 1212 may be configured not to be transmitted from the image sensor 1211 to the application processor 1212, and may be set according to a prior agreement, a register setting, or the like.

Figure 104:
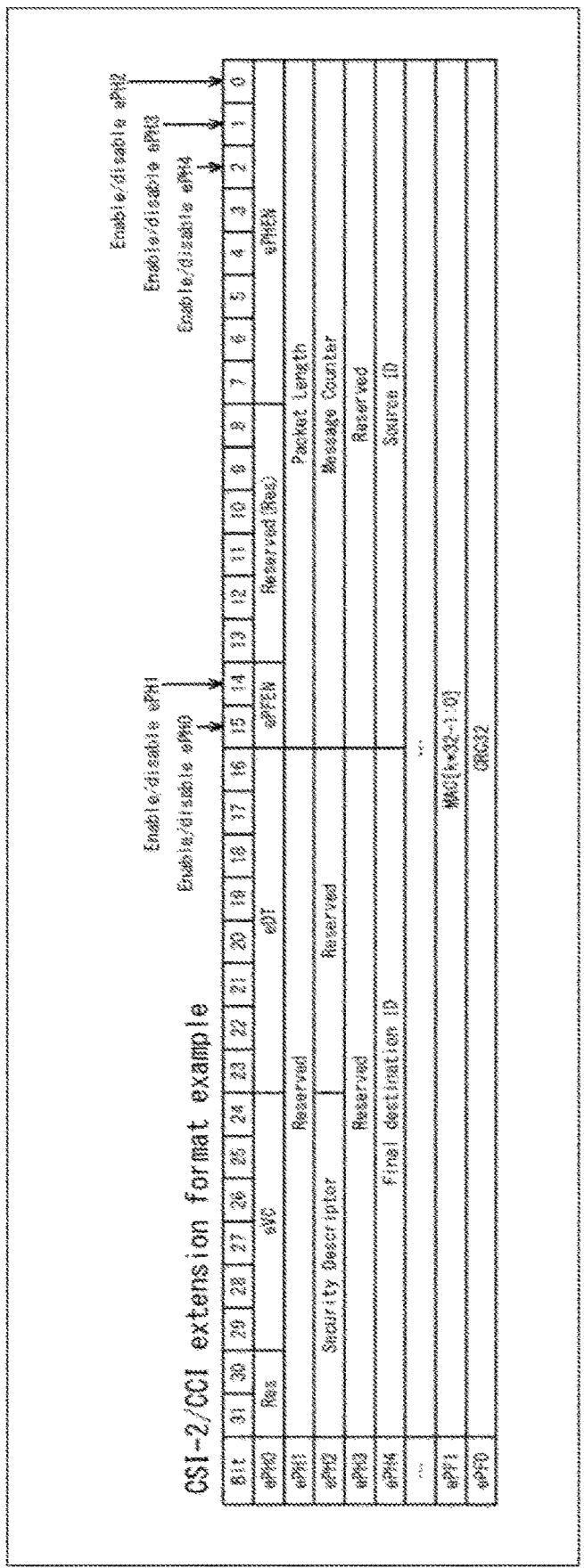
FIG. 104 is a figure depicting an example of a CSI-2 or CCI extended format.

FIG. 104 depicts an example of a CSI-2 or CCI extended format.

For example, a beginning bit (Reserved and eVC) or a semi-beginning bit (eVC) of an essential extended packet header ePH0 is used as an initialization vector. Further, immediately after receiving the bit, the application processor 1212 can start computation of the GCTR function depicted in FIG. 98 mentioned above. That is, the transmitter side and the receiver side may be configured to be able to fix values of initialization vector constituent elements other than eVC before transmitting or receiving the eVC value.

A transmission process by the line MAC method in which the image sensor 1211 transmits an integrity calculated value MAC for each line is explained with reference to a flowchart depicted in FIG. 105.

In Step S741, the security section 1310 derives a common session key.

In Step S742, the message counter 1308 initializes an upper count value of the message count value and sets it to 0.

In Step S743, the message counter 1308 initializes a lower count value of the message count value and sets it to 0.

In Step S744, the extension-mode-supporting CSI-2 transmission circuit 1304 determines whether or not to end the session, and in a case where it is determined not to end the session, the process proceeds to Step S745.

In Step S745, the extension-mode-supporting CSI-2 transmission circuit 1304 determines whether or not to transmit an extended packet of the first virtual channel.

In a case where, in Step S745, the extension-mode-supporting CSI-2 transmission circuit 1304 determines not to transmit an extended packet of the first virtual channel, the process returns to Step S744, and a similar process is performed repeatedly thereafter. On the other hand, in a case where, in Step S745, the extension-mode-supporting CSI-2 transmission circuit 1304 determines to transmit an extended packet of the first virtual channel, the process proceeds to Step S746.

In Step S746, the security section 1310 calculates an integrity calculated value of the first virtual channel by using the common session key derived in Step S741.

In Step S747, the extension-mode-supporting CSI-2 transmission circuit 1304 arranges, in an extended packet of the first virtual channel, the integrity calculated value computed in Step S746, and transmits the extended packet of the first virtual channel.

In Step S748, the extension-mode-supporting CSI-2 transmission circuit 1304 determines whether or not to transmit an extended packet of the second virtual channel, and pauses the process until it is determined to transmit an extended packet of the second virtual channel. Then, in a case where, in Step S748, the extension-mode-supporting CSI-2 transmission circuit 1304 determines to transmit an extended packet of the second virtual channel, the process proceeds to Step S749.

In Step S749, the security section 1310 calculates an integrity calculated value of the second virtual channel by using the common session key derived in Step S741.

In Step S750, the extension-mode-supporting CSI-2 transmission circuit 1304 arranges, in an extended packet of the second virtual channel, the integrity calculated value computed in Step S749, and transmits the extended packet of the second virtual channel.

In Step S751, the message counter 1308 determines whether or not the lower count value of the message count value has reached the maximum value.

In a case where, in Step S751, the message counter 1308 determines that the lower count value of the message count value has not reached the maximum value, the process proceeds to Step S752. After the message counter 1308 increments the lower count value of the message count value in Step S752, the process returns to Step S744, and a similar process is performed repeatedly thereafter.

On the other hand, in a case where, in Step S751, the message counter 1308 determines that the lower count value of the message count value has reached the maximum value, the process proceeds to Step S753. After the message counter 1308 increments the upper count value of the message count value in Step S753, the process returns to Step S743, and a similar process is performed repeatedly thereafter.

Further, in a case where, in Step S744, the extension-mode-supporting CSI-2 transmission circuit 1304 determines to end the session, the process proceeds to Step S754.

In Step S754, the security section 1310 discards or cleans up the common session key, and thereafter the process is ended.

If the initialization vector configuration includes an extended virtual channel eVC or a virtual channel VC in such a manner, it becomes possible to use a common session key or message counter for multiple types of CSI-2 virtual channels. In addition, it becomes possible to use a common session key for CSI-2 and CCI. Note that, is a case where the substantial numbers of lines of CSI-2 virtual channels are different, for example, dummy data may be used to make the numbers of lines the same, thereby making it possible to use a common message counter.

Figure 105:
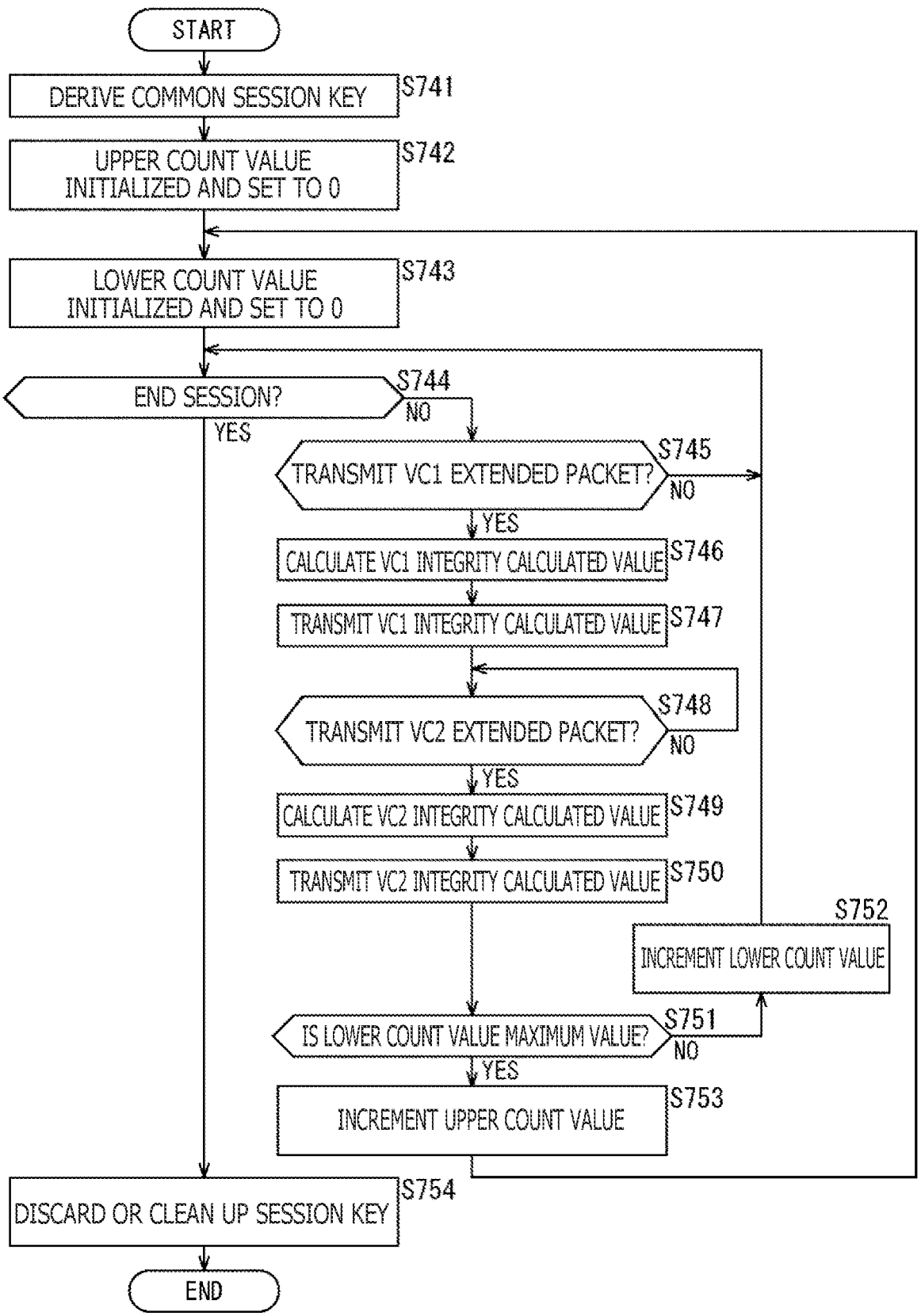
FIG. 105 is a flowchart for explaining a transmission process in a line MAC method.

The process explained in FIG. 105 is an example in which a message count value is a lower count value and an additional message count value is an upper count value, and is an example of a case that there are two types of CSI-2 virtual channels.

On the other hand, the initialization vector configuration may include an extended data type eDT or a data type DT. Similarly, in that case, it becomes possible to use a common session key or message counter for multiple types of data types.

Note that Reserved, an extended virtual channel eVC, and an extended data type eDT are stored as beginning bits of the CSI-2/CCI extension format example, so a processor can start calculation of part ($CIPH_K$) of GCTR calculation immediately upon reception of part or the whole of these. In addition, in a case where a frame configuration is agreed upon in advance between the image sensor 1211 and the application processor 1212, the application processor 1212 can omit reception of these, and start calculation of part ($CIPH_K$) of the GCTR calculation. That is, these types of initialization vector configurations are advantageous in terms of calculation time.

Note that by an additional message count value being transmitted from the image sensor 1211 to the application processor 1212, the application processor 1212 can use this value for an initialization vector. Hence, the application processor 1212 may be configured not to provide an additional message counter in terms of implementation efficiency, or may be configured to provide an additional message counter in terms of safety. In addition, in a case where the application processor 1212 is configured to provide an additional message counter, the image sensor 1211 may be configured not to transmit an additional message count value. That is, in a case where an initialization vector includes an extended virtual channel eVC, transmission of an additional message count value is not an essential requirement.

Second Arrangement Example of Integrity Calculated Value

A second arrangement example of an integrity calculated value MAC is explained with reference to FIG. 106 to FIG. 109.

Figure 106:
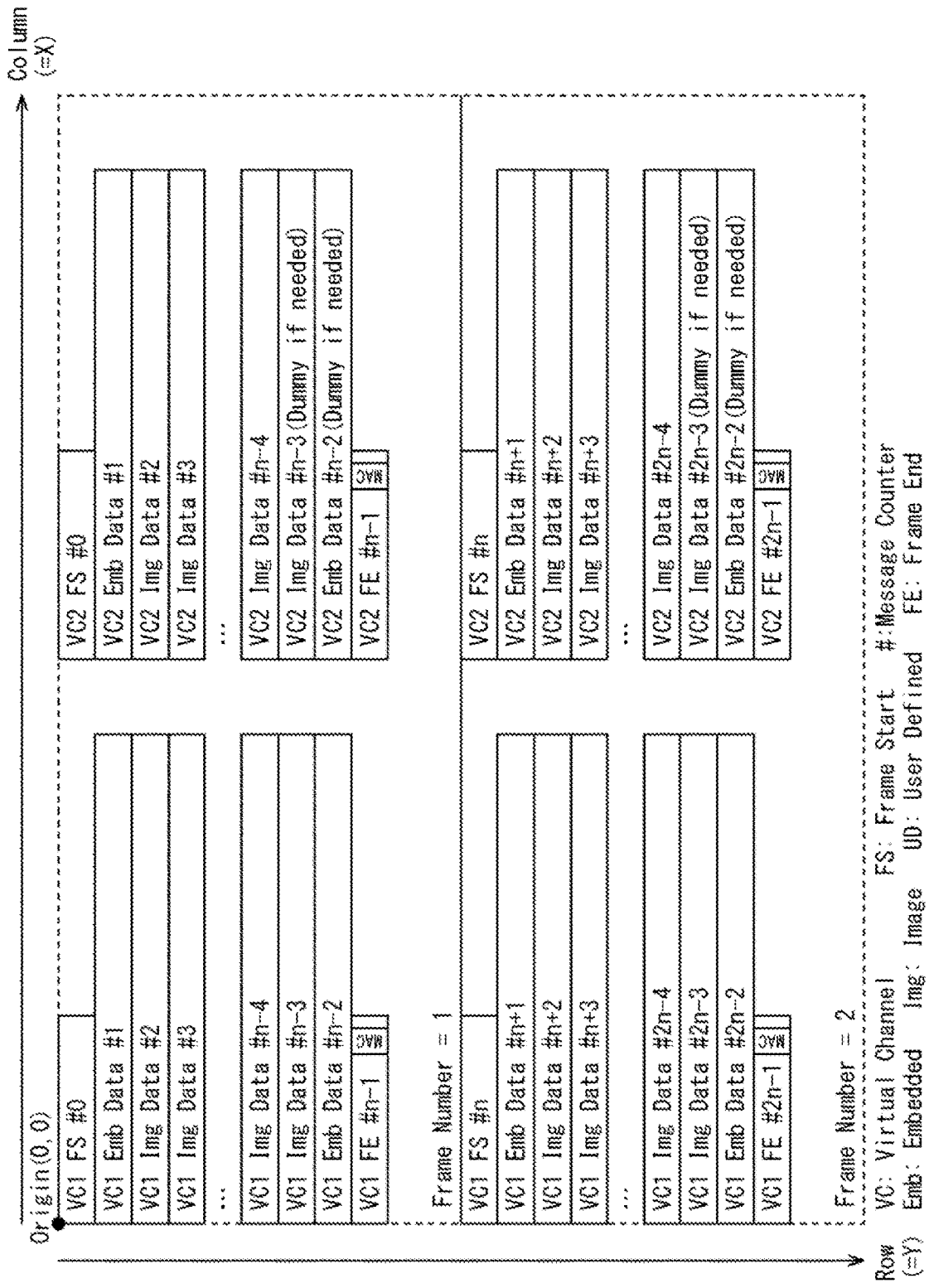
FIG. 106 is a figure depicting an example of a data structure of image data in which an integrity calculated value MAC is arranged for each frame.

FIG. 106 depicts a data structure of image data in which an integrity calculated value MAC is arranged for each frame. A transmission method in which an integrity calculated value MAC is transmitted for each frame in such a manner is referred to as a frame MAC method as appropriate below.

As depicted in the figure, only an integrity calculated value MAC arranged in an extended packet footer remaining part ePF1 of a frame end is valid, and other integrity calculated values MAC are invalid in addition, an integrity calculated value MAC is derived from an extended packet header ePH, packet data, and an extended packet footer ePF of each line excluding the last extended packet footer ePF of a frame.

For example, a common initialization vector with a structure depicted in FIG. 107 is used for line MAC and frame MAC (only CSI-2). Further, this initialization vector is transmitted from a transmitter side to a receiver side as depicted FIG. 108.

Figure 108:
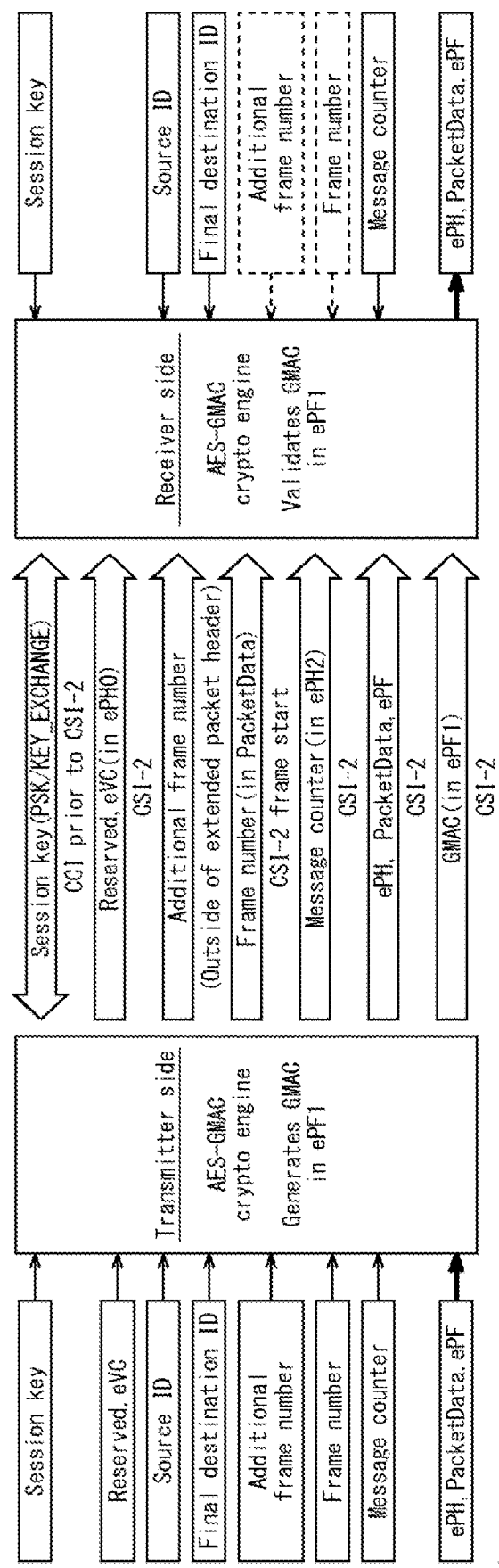
FIG. 108 is a figure depicting an example of transmission of an initialization vector from a transmitter side to a receiver side.

FIG. 108 depicts an example in which an additional frame number is stored outside an extended packet header and transmitted. Other than this, an additional frame number and a frame number may be stored outside an extended packet header and transmitted. In that case, the frame number may be stored also in a frame start and transmitted. Note that only part of an additional frame number may be used. For example, in a case where an additional frame number in an initialization vector is a 24-bit value, the actual additional frame number may be a 16-bit counter, the count value may be stored in part (e.g., LSB-side 16 bits) of the additional frame number in the initialization vector, and a prescribed value (e.g., $0^8$, $1^8$) may be stored in the remaining part (e.g., MSB-side 8 bits) of the additional frame number in the initialization vector. In addition, a prescribed value (e.g., $0^{24}$, $1^{24}$) may be stored in the entire additional frame number in the initialization vector.

In addition, part or the whole of an initialization vector that is set by being transmitted from the image sensor 1211 to the application processor 1212 may be configured not to be transmitted from the image sensor 1211 to the application processor 1212, but may be set according to a prior agreement, a register setting, or the like.

Figure 109:
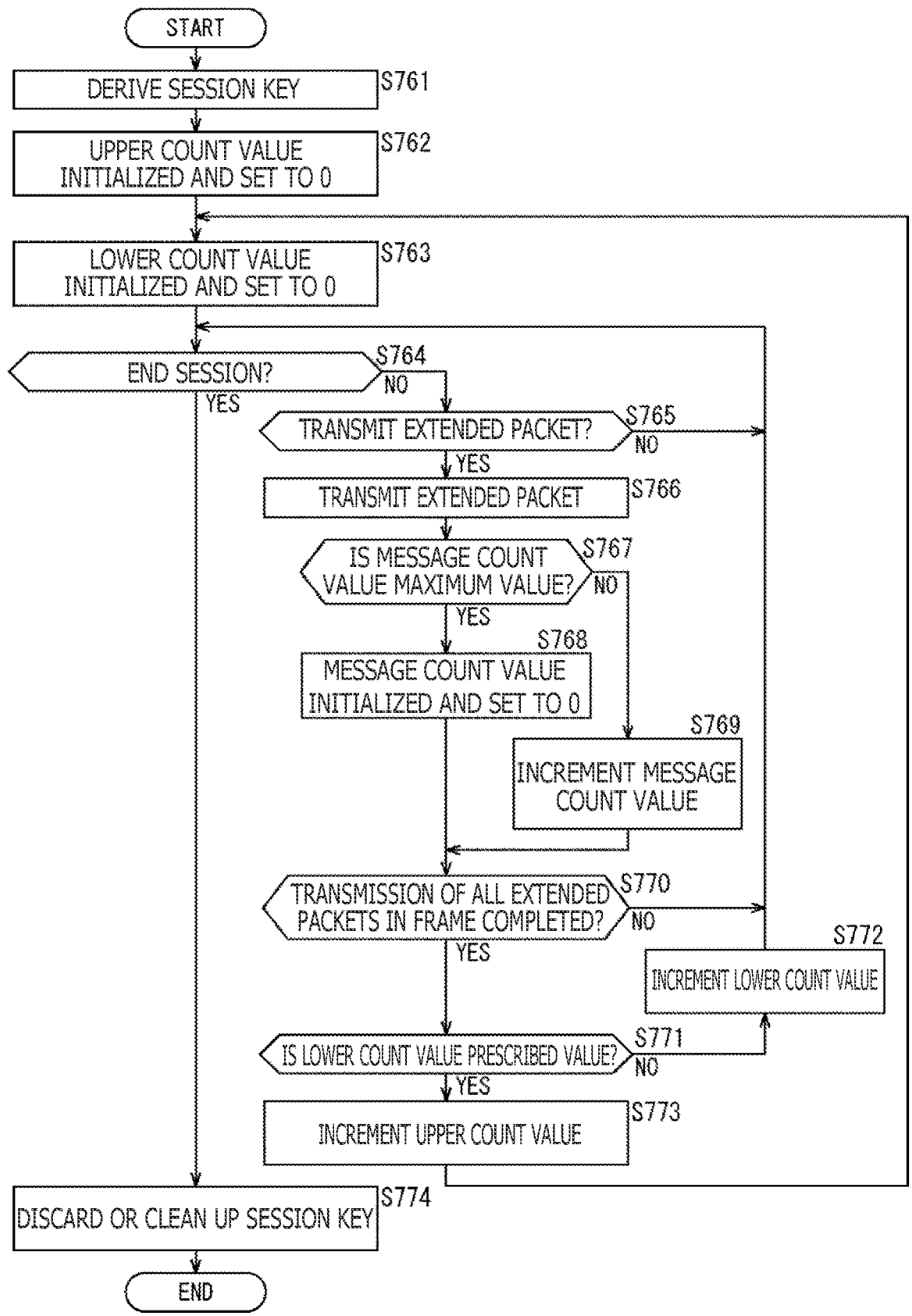
FIG. 109 is a flowchart for explaining a transmission process in a frame MAC method.

A transmission process by the frame MAC method in which the image sensor 1211 transmits an integrity calculated value MAC for each frame is explained with reference to a flowchart depicted in FIG. 109.

In Step S761, the security section 1310 derives a session key.

In Step S762, the message counter 1308 initializes an upper count value for which an additional frame number is used and sets it to 0.

In Step S763, the message counter 1308 initializes a lower count value for which a frame number is used and sets it to 1.

In Step S764, the extension-mode-supporting CSI-2 transmission circuit 1304 determines whether or not to end the session, and in a case where it is determined not to end the session, the process proceeds to Step S765.

In Step S765, the extension-mode-supporting CSI-2 transmission circuit 1304 determines whether or not to transmit an extended packet.

In a case where, in Step S765, the extension-mode-supporting CSI-2 transmission circuit 1304 determines not to transmit an extended packet, the process returns to Step S764, and a similar process is performed repeatedly thereafter. On the other hand, in a case where, in Step S765, the extension-mode-supporting CSI-2 transmission circuit 1304 determines to transmit an extended packet, the process proceeds to Step S766.

In Step S766, the extension-mode-supporting CSI-2 transmission circuit 1304 transmits an extended packet.

In Step S767, the message counter 1308 determines whether or not the message count value has reached the maximum value.

In a case where, in Step S767, the message counter 1308 determines that the message count value has reached the maximum value, the process proceeds to Step S768. In Step S768, the message counter 1308 initializes the message count value and sets it to 0.

On the other hand, in a case where, in Step S767, the message counter 1308 determines that the message count value has not reached the maximum value, the process proceeds to Step S769. In Step S769, the message counter 1308 increments the message count value.

After the processes in Step S768 and Step S769, the process proceeds to Step S770, and the extension-mode-supporting CSI-2 transmission circuit 1304 determines whether or not transmission of the entire extended packet in a frame has been completed.

In a case where, in Step S770, the extension-mode-supporting CSI-2 transmission circuit 1304 determines that the transmission of the entire extended packet in the frame has not been completed, the process returns to Step S764, and a similar process is performed repeatedly thereafter.

On the other hand, in a case where, in Step S770, the extension-mode-supporting CSI-2 transmission circuit 1304 determines that the transmission of the entire extended packet in the frame has been completed, the process proceeds to Step S771.

In Step S771, the message counter 1308 determines whether or not the lower count value has reached a prescribed value.

In a case where, in Step S771, the message counter 1308 determines that the lower count value has not reached the prescribed value, the process proceeds to Step S772. After the message counter 1308 increments the lower count value in Step S772, the process returns to Step S764, and a similar process is performed repeatedly thereafter.

On the other hand, in a case where, in Step S771, the message counter 1308 determines that the lower count value has reached the prescribed value, the process proceeds to Step S773. After the message counter 1308 increments the upper count value is Step S773, the process returns to Step S763, and a similar process is performed repeatedly thereafter.

Further, in a case where, in Step S764, the extension-mode-supporting CSI-2 transmission circuit 1304 determines to end the session, the process proceeds to Step S774.

In Step S774, the security section 1310 discards or cleans up the common session key, and thereafter the process is ended.

As described above, the process explained in FIG. 109 is as example in which a frame number is a lower count value and an additional frame number is an upper count value. It should be noted that although calculation and transmission of an integrity calculated value, virtual channels, updating of session keys, and the like are omitted, these may be combined with part or the whole of any of flowcharts mentioned above. The same applies also to other flowcharts.

Note that there is a possibility that there are mixedly-present increments of a frame number by one or two, so that it is desirable that the upper count value be incremented in a case where the lower count value is equal to a prescribed value (e.g., a maximum value or a maximum value minus one). It should however be noted that if there are only increments of a frame number by one, it is sufficient if the upper count value is incremented in a case where the lower count value is equal to a maximum value.

Note that by a frame number being transmitted from the image sensor 1211 to the application processor 1212, the application processor 1212 can use this value for an initialization vector. Accordingly, the application processor 121 may be configured not to provide a frame counter in terms of implementation efficiency, or may be configured to provide a frame counter in terms of safety. In addition, in a case where the application processor 1212 is configured to provide a frame counter, the image sensor 1211 may be configured not to transmit a frame number. That is, in a case where an initialization vector includes an extended virtual channel eVC, transmission of a frame number is not an essential requirement.

In addition, by an additional frame number being transmitted from the image sensor 1211 to the application processor 1212, the application processor 1212 can use this value for an initialization vector. Accordingly, the application processor 1212 may be configured not to provide an additional frame counter in terms of implementation efficiency, or may be configured to provide an additional frame counter in terms of safety. In addition, in a case where the application processor 1212 is configured to provide an additional frame counter, the image sensor 1211 may be configured not to transmit an additional frame number.

In a case of the frame MAC method, in a message count value in an initialization vector, a prescribed value (e.g., $0^{16}$, $1^{16}$) may be stored, and a message count value of a particular extended packet (e.g., a frame start or a frame end) may be stored. On the other hand, in a case of the line MAC method, a message count value is stored in a message count value in an initialization vector.

<Selection of Integrity-Calculated-Value-MAC Transmission Method>

Selection of an integrity-calculated-value-MAC transmission method is explained with reference to FIG. 110 and FIG. 111.

Figure 110:
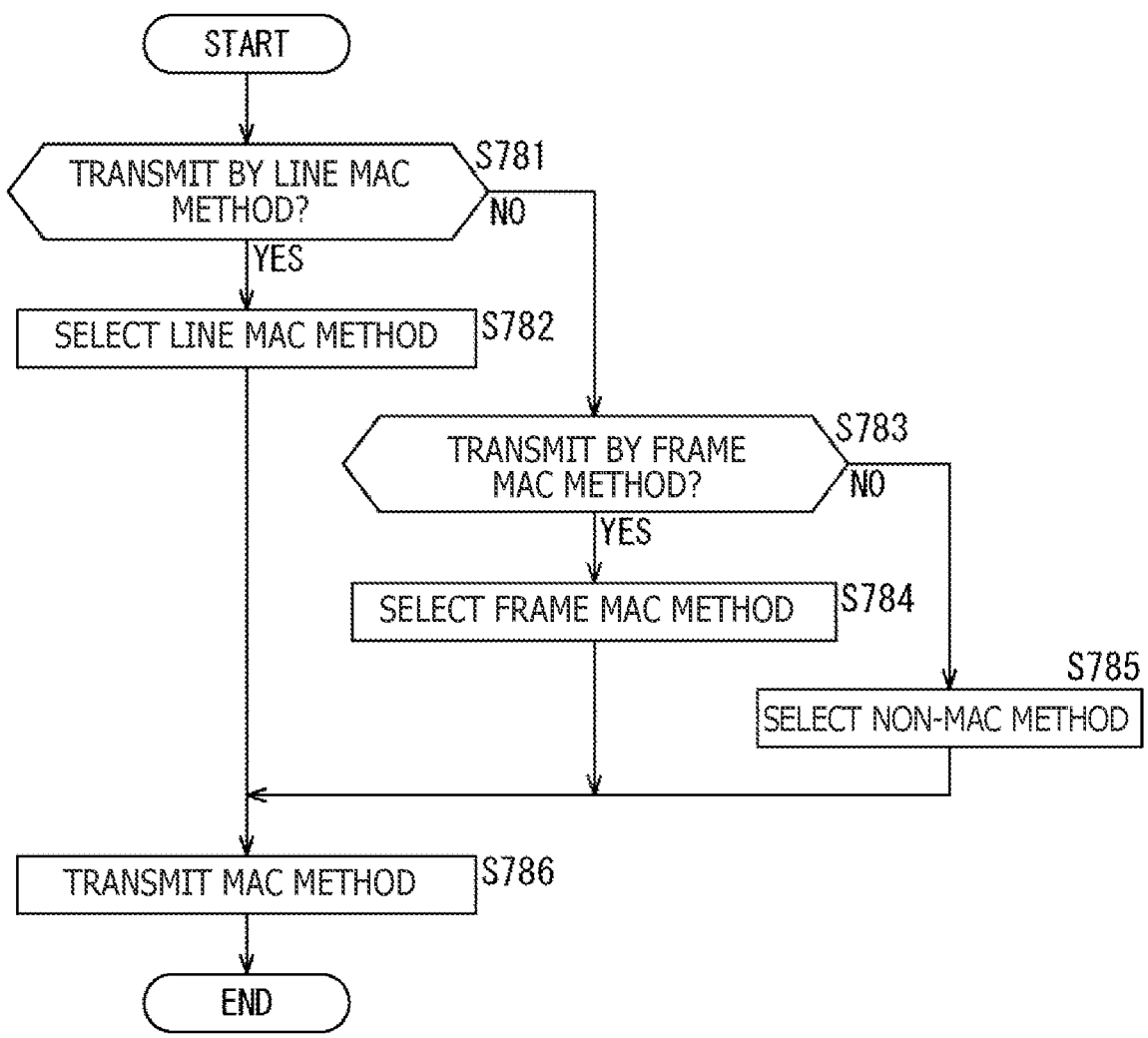
FIG. 110 is a flowchart for explaining a selection process.

FIG. 110 is a flowchart for explaining a selection process in which the image sensor 1211 selects an integrity-calculated-value-MAC transmission method.

In Step S781, the extension-mode-supporting CSI-2 transmission circuit 1304 determines whether or not to transmit an integrity calculated value MAC by the line MAC method.

In a case where, in Step S781, the extension-mode-supporting CSI-2 transmission circuit 1304 determines to transmit an integrity calculated value MAC by the line MAC method, the process proceeds to Step S782. In Step S762, the extension-mode-supporting CSI-2 transmission circuit 1304 selects the line MAC method.

On the other hand, in a case where, in Step S781, the extension-mode-supporting CSI-2 transmission circuit 1304 determines not to transmit an integrity calculated value MAC by the line MAC method, the process proceeds to Step S783.

In Step S783, the extension-mode-supporting CSI-2 transmission circuit 1304 determines whether or not to transmit an integrity calculated value MAC by the frame MAC method.

In a case where, in Step S783, the extension-mode-supporting CSI-2 transmission circuit 1304 determines to transmit an integrity calculated value MAC by the frame MAC method, the process proceeds to Step S784. In Step S784, the extension-mode-supporting CSI-2 transmission circuit 1304 selects the frame MAC method.

On the other hand, in a case where, in Step S783, the extension-mode-supporting CSI-2 transmission circuit 1304 determines not to transmit an integrity calculated value MAC by the frame MAC method, the process proceeds to Step S785. In Step S785, the extension-mode-supporting CSI-2 transmission circuit 1304 selects a non-MAC method in which an integrity calculated value MAC is not transmitted.

After the process in Step S782, Step S784, or Step S785, the process proceeds to Step S786. After the extension-mode-supporting CSI-2 transmission circuit 1304 transmits security MAC information (see FIG. 111) representing the line MAC method, the frame MAC method, or the non-MAC method in Step S786, the process is ended. It should be noted that whereas FIG. 111 depicts 2-bit-allocated security MAC information, a different bit count (e.g., one bit, eight bits) may be allocated. In addition, Reserved area data (Reserved for future use) may be allocated with non-transmission of a MAC value (e.g., No MAC).

As described above, the image sensor 1211 can freely choose whether to transmit a MAC value by the line MAC method (select the line MAC method), to transmit a MAC value by the frame MAC method (select the frame MAC method), or not to transmit a MAC value (select the non-MAC method). Alternatively, the image sensor 1211 may select any one of them by reaching a prior agreement with the application processor 1212. For example, the image sensor 1211 may first select the line MAC method, and switch to another method (e.g., the frame MAC method) in a case where a predetermined condition is satisfied. For example, the image sensor 1211 may first select the frame MAC method, and switch to another method (e.g., the line MAC method) in a case where a predetermined condition is satisfied. For example, the image sensor 1211 may first select the non-MAC method, and switch to another method (e.g., the frame MAC method) in a case where a predetermined condition is satisfied.

Further, for example, an indication as to whether the line MAC method is selected, the frame MAC method is selected, or the non-MAC method is selected is stored in a Security Descriptor, embedded data, user-defined data, a read response, or the like in an extended packet header (e.g., ePH2), and transmitted from the image sensor 1211. In response to reception of the indication, the application processor 1212 can perform an operation for switching the integrity-calculated-value-MAC transmission methods.

Note that in order to avoid confusion over initialization vectors, when switching among the integrity-calculated-value-MAC transmission methods is performed, it is desirable that an indication of a post-switching transmission method be transmitted from the image sensor after the start of frame end transmission but before the completion of frame start transmission, but this is not the sole example.

Note that security MAC information that can identify whether the line MAC method is selected or the frame MAC method is selected may be included in an initialization vector. In that case, initialization vectors do not surely overlap between the line MAC method and the frame MAC method, so that switching among the integrity-calculated-value-MAC transmission methods can be performed smoothly. If there is no security MAC information, for example, designation of a value to be stored in the message counter 1308 can be necessary in some cases in order to avoid an overlap of initialization vectors, depending on a timing of switching among the integrity-calculated-value-MAC transmission methods.

<Regarding Message Count Value and Frame Count Value>

A message count value and a frame count value are explained with reference to FIG. 112 to FIG. 115.

FIG. 112 depicts an example of intervals at which a message count value and a frame count value roll over.

As depicted in A of FIG. 112, in a case of 60 fps and pixel 2160 lines, a message count value rolls over in approximately nine hours with the upper count value of 16 bits and the lower count value of 16 bits. Similarly, with the upper count value of 20 bits and the lower count value of 16 bits, a message count value rolls over in approximately six days; with the upper count value of 24 bits and the lower count value of 16 bits, a message count value rolls over in approximately 96 days; with the upper count value of 28 bits and the lower count value of 16 bits, a message count value rolls over in approximately four years; and with the upper count value of 32 bits and the lower count value of 16 bits, a message count value rolls over in approximately 69 years.

As depicted in B of FIG. 112, in a case of 60 fps and increments by one, a frame count value rolls over in approximately five hours with the upper count value of four bits and the lower count value of 16 bits. Similarly, with the upper count value of 8 bits and the lower count value of 16 bits, a frame count value rolls over in approximately 78 hours; with the upper count value of 12 bits and the lower count value of 16 bits, a frame count value rolls over in approximately 52 days; with the upper count value of 16 bits and the lower count value of 16 bits, a frame count value rolls over in approximately 828 days; with the upper count value of 20 bits and the lower count value of 16 bits, a frame count value rolls over in approximately 36 years; and with the upper count value of 24 bits and the lower count value of 16 bits, a frame count value rolls over in approximately 581 years.

As depicted in A of FIG. 113, an initialization vector configuration may have a configuration including a salt including a random number. It should however be noted that, for example, in a case where a random number is not generated, the salt may be a prescribed value (e.g., $0^{32}$, $1^{32}$).

As depicted in B of FIG. 113, an initialization vector configuration may not include a message count value (may include a frame count value). In addition, an initialization vector configuration may include a Source ID or a Final destination ID. Note that an initialization vector configuration may include an additional frame number, a frame number, an additional message count value, and a message count value.

As depicted in C of FIG. 113, an initialization vector configuration may include an SPDM session ID. On the other hand, an initialization vector configuration may include a result of an XOR of a Source ID and a Final destination ID, which enables saving of a bit width.

As depicted in D of FIG. 113, an SPDM session ID may include a ReqSessionID and a RspSessionID mentioned later.

As depicted in E of FIG. 113, the initialization vector configuration may include security protocol information (e.g., SPDM/HDCP), an extended data type, or a data type.

Note that each element depicted in FIG. 133 may be arranged in different orders. The MSB side (upper count value) and the LSB side (lower count value) may be replaced with each other. Some elements may be replaced with other elements (e.g., part or the whole of a salt, parameters in ePH, initialization vector constituent elements mentioned above, and the like).

Figure 114:
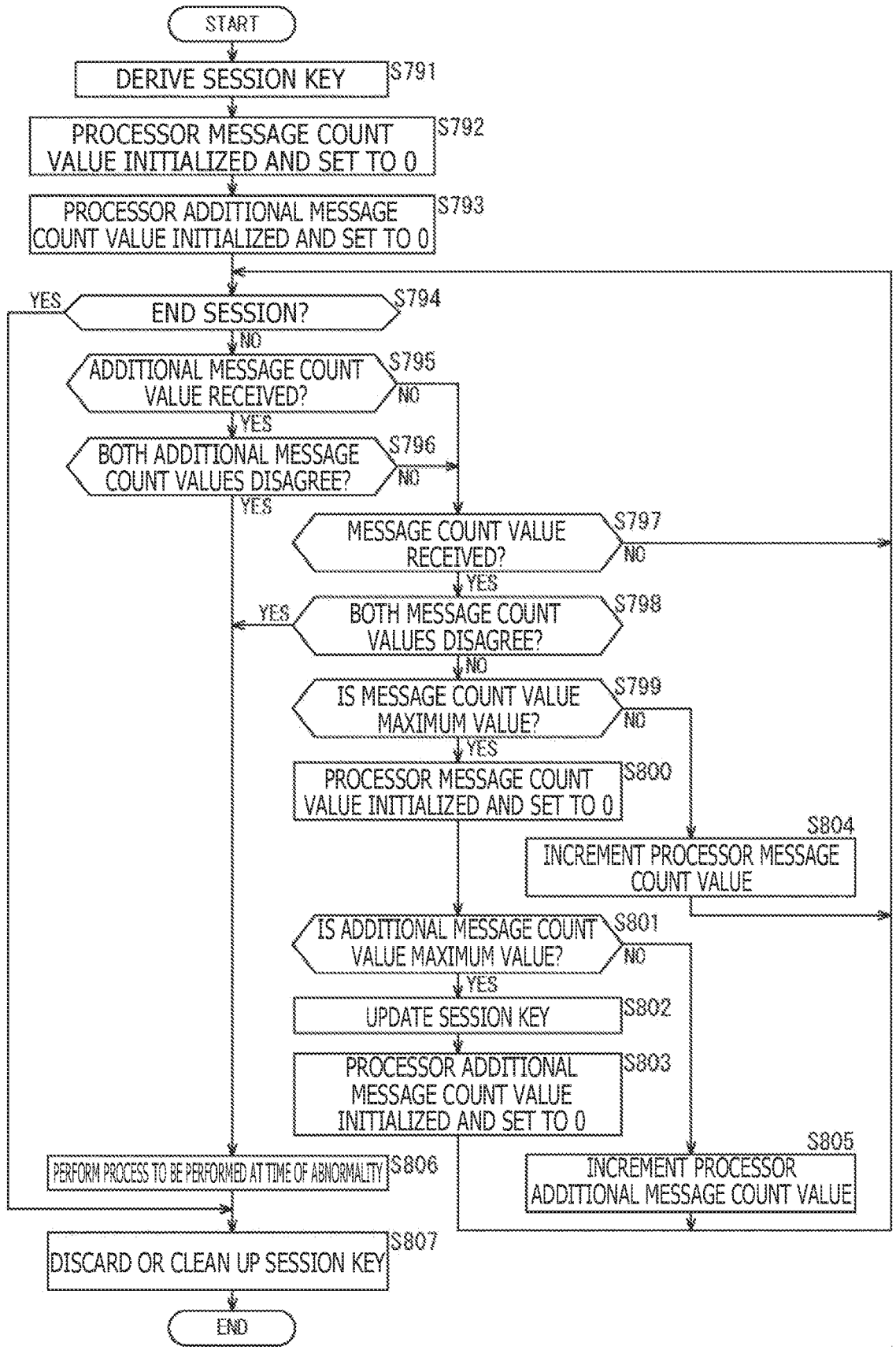
FIG. 114 is a flowchart for explaining a data verification process.

FIG. 114 is a flowchart for explaining a data verification process in which the application processor 1212 performs data verification by using a message count value.

In Step S791, the security section 1326 derives a session key.

In Step S792, the data verifying section 1325 initializes a processor message count value and sets it to 0.

In Step S793, the data verifying section 1325 initializes a processor additional message count value and sets it to 0.

In Step S794, the extension-mode-supporting CSI-2 reception circuit 1322 determines whether or not to end the session, and in a case where it is determined not to end the session, the process proceeds to Step S795.

In Step S795, the data verifying section 1325 determines whether or not an additional message count value is received from the image sensor 1211. In a case where, in Step S795, the data verifying section 1325 determines that an additional message count value is received from the image sensor 1211, the process proceeds to Step S796.

In Step S796, the data verifying section 1325 determines whether or not the processor additional message count value and the additional message count value of the image sensor 1211 disagree.

In a case where, in Step S796, the data verifying section 1325 determines that the processor additional message count value and the additional message count value of the image sensor 1211 do not disagree (they agree), the process proceeds to Step S797. On the other hand, also in a case where, in Step S795, the data verifying section 1325 determines that the additional message count value is not received from the image sensor 1211, the process proceeds to Step S797.

In Step S797, the data verifying section 1325 determines whether or not a message count value is received from the image sensor 1211. In a case where, in Step S797, the data verifying section 1325 determines that a message count value is received from the image sensor 1211, the process proceeds to Step S798.

In Step S798, the data verifying section 1325 determines whether or not the processor message count value and the message count value of the image sensor 1211 disagree.

In a case where, in Step S798, the data verifying section 1325 determines that the processor message count value and the message count value of the image sensor 1211 do not disagree (they agree), the process proceeds to Step S799.

In Step S799, the data ng section 1325 determines whether or not the processor message count value has reached the maximum value. In a case where, Step S799, the data verifying section 1325 determines that the processor message count value has reached the maximum value, the process proceeds to Step S800.

In Step S800, the data verifying section 1325 initializes the processor message count value and sets it to 0.

In Step S801, the data verifying section 1325 determines whether or not the processor additional message count value has reached the maximum value. In a case where, in Step S801, the data verifying section 1325 determines that the processor additional message count value has reached the maximum value, the process proceeds to Step S802.

In Step S802, the security section 1326 updates the session key.

In Step S803, the data verifying section 1325 initializes the processor additional message count value and sets it to 0. Thereafter, the process returns to Step S794, and a similar process is performed repeatedly thereafter.

On the other hand, in a case where, in Step S797, the data verifying section 1325 determines that the message count value is not received from the image sensor 1211, the process returns to Step S794, and a similar process is performed repeatedly thereafter.

On the other hand, in a case where, in Step S799, the data verifying section 1325 determines that the processor message count value has not reached the maximum value, the process proceeds to Step S804. In Step S804, the data verifying section 1325 increments the processor message count value, thereafter the process returns to Step S794, and a similar process is performed repeatedly thereafter.

On the other hand, in a case where, in Step S801, the data verifying section 1325 determines that the processor additional message count value has not reached the maximum value, the process proceeds to Step S805. In Step S805, the data verifying section 1325 increments the processor additional message count value, thereafter the process returns to Step S794, and a similar process is performed repeatedly thereafter.

On the other hand, in a case where, in Step S796, the data verifying section 1325 determines that the processor additional message count value and the additional message count value of the image sensor 1211 disagree, the process proceeds to Step S806. In addition, also in a case where, in Step S798, the data verifying section 1325 determines that the processor message count value and the message count value of the image sensor 1211 disagree, the process proceeds to Step S806.

In Step S806, the data verifying section 1325 determines that there is an abnormality and performs a process that is performed at a time of an abnormality, and the process proceeds to Step S807. In addition, also in a case where, in Step S794, the extension-mode-supporting CSI-2 reception circuit 1322 determines to end the session, the process proceeds to Step S807.

In Step S807, the security section 1326 discards or cleans up the session key, and thereafter the process is ended.

Figure 115:
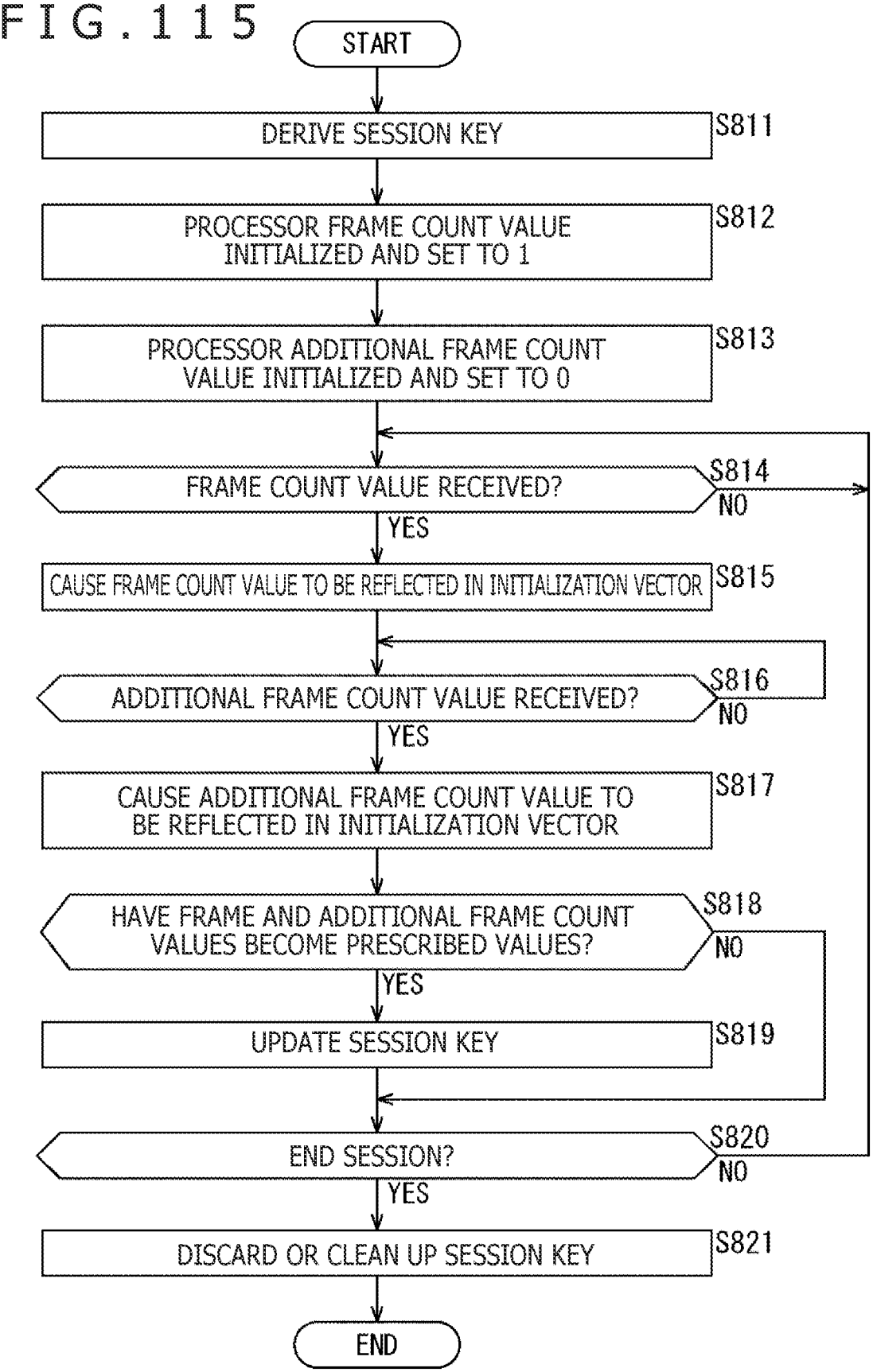
FIG. 115 is a figure for explaining a reflection process.

FIG. 115 is a figure for explaining a reflection process in which the application processor 1212 causes a frame count value and an additional frame count value to be reflected in an initialization vector.

In Step S811, the security section 1326 derives a session key.

In Step S812, the data verifying section 1325 initializes a processor frame count value and sets it to 1.

In Step S813, the data verifying section 1325 initializes a processor additional frame count value and sets it to 0.

In Step S814, the data verifying section 1325 determines whether or not a frame count value is received from the image sensor 1211, and pauses the process until it is determined that a frame count value is received from the image sensor 1211. Then, in a case where, in Step S814, the data verifying section 1325 determines that a frame count value is received from the image sensor 1211, the process proceeds to Step S815.

In Step S815, the security section 1326 causes the frame count value to be reflected in an initialization vector.

In Step S816, the data verifying section 1325 determines whether or not an additional frame count value is received from the image sensor 1211, and pauses the process until it is determined that an additional frame count value is received from the image sensor 1211.

Then, in a case where, in Step S816, the data verifying section 1325 determines that a frame additional count value is received from the image sensor 1211, the process proceeds to Step S817.

In Step S817, the security section 1326 causes the additional frame count value to be reflected in the initialization vector.

In Step S818, the data verifying section 1325 determines whether or not the frame count value and the additional frame count value have reached prescribed values. In a case where, in Step S818, the data verifying section 1325 determines that the frame count value and the additional frame count value have reached the prescribed values, the process proceeds to Step S819.

In Step S819, the security section 1326 updates the session key.

After the process in Step S819 or in a case where, in Step S818, the data verifying section 1325 determines that the frame count value and the additional frame count value have not reached the prescribed values, the process proceeds to Step S620.

In Step S820, the extension-mode-supporting CSI-2 reception circuit 1322 determines whether or not to end the session, and in a case where it is determined not to end the session, the process returns to Step S814, and a similar process is performed repeatedly thereafter.

On the other hand, in a case where, in Step S820, the extension-mode-supporting CSI-2 reception circuit 1322 determines to end the session, the process proceeds to Step S821.

In Step S821, the security section 1326 discards or cleans up the session key, and thereafter the process is ended.

Note that although a message count value is incremented by one at a time, there is a possibility that there are increments by one or two that are freely mixedly present in a frame count value (frame number) sequence. Accordingly, it is desirable that, regarding a frame count value and an additional frame count value, use of values transmitted from the image sensor be prioritized.

On the other hand, regarding a message count value and an additional message count value, decoding calculations are started promptly, so that use of values obtained by counting by the application processor 1212 may be prioritized over use of values transmitted from the image sensor 1211. Note that the processes explained with reference to the flowcharts in FIG. 114 and FIG. 115 may be configured not to update session keys.

The following are definitions of abbreviations. eP: extended Packet; eVC: extended Virtual Channel; and eDT: extended Data Type. Whereas examples of initialization vectors for AES-GCM/GMAC have been illustrated, the present technology may be applied after adjustments are made in terms of constituent elements, sort orders, numerical values, and the like as necessary for block encryption other than AES (e.g., DES: Data Encryption Standard, triple DES); algorithms other than GCM/GMAC (e.g., CCM: Counter with Cipher block chaining-MAC); different key lengths (e.g., other than 128 bits); or different IV lengths (e.g., other than 96 bits).

As a salt, part or the whole of RandomData or OpaqueData in a KEY_EXCHANGE request message, RandomData in a Successful KEY_EXCHANGE_RSP response message, RequesterContext or OpaquePSKData in a PSK_EXCHANGE request message, or ResponderContext in a PSK_EXCHANGE_RSP message in the SPDM specifications by publicly disclosed DMTF (Distributed Management Task Force) may be used.

On the other hand, for example, a session ID is stored in one Byte in Param2 in a PSK_EXCHANGE_RSP message or a KEY_EXCHANGE_RSP response message, and transmitted from an SPDM responder (e.g., the image sensor) to an SPDM requester. Note that a PSK_EXCHANGE_REP message and a KEY_EXCHANGE_RSP response message are SPDM options, but in order to derive an SPDM session key, a PSK_EXCHANGE_RSP message corresponding to a common key encryption method or a KEY_EXCHANGE_RSP response message corresponding to a public key encryption method is substantially essential, and the session ID may be included in an initialization vector. It should be noted that it is desirable that the session ID be different from those in five preceding sessions or an active session with the same end point.

In addition, a PSK_EXCHANGE request message or a KEY_EXCHANGE request message may include a ReqSessionID (e.g., two bytes) as a requester-side session ID, a PSK_EXCHANGE_RSP response message or a Successful KEY_EXCHANGE_RSP response message may include a RspSessionID (e.g., two bytes) as a responder-side session ID, and session ID=Concatenate (ReqSessionID, RspSessionID) (e.g., four bytes) formed by concatenating these two may be used as a unique session ID between a requester and a responder. In that case, it becomes possible to use a common session key or message counter for multiple types of sessions.

On the other hand, for a display use (e.g., DSI-2), not SPDM but HDCP (High-bandwidth Digital Content Protection) may be used as a security protocol, so that security protocol information (see FIG. 116) that can identify whether the security protocol is SPDM or HDCP may be included in an initialization vector. It should however be noted that whereas FIG. 116 depicts 2-bit-allocated security protocol information, a different bit count (e.g., one bit, eight bits) may be allocated. In addition, an indication that a security protocol is not supported (e.g., No security protocol) may be allocated to reserved area data (Reserved for future use).

For example, a bit dedicated for SPDM or dedicated for HDCP may be allocated to and defined for any of a new format, an ePH format (e.g., Reserved, eVC, eDT, Security Descriptor), a session ID, and the and the bit may be included in an initialization vector. In that case, it becomes possible to use a common session key or message counter for multiple types of security protocols. Similarly, part of an extended packet header may be included in an initialization vector, and, for example, a Security Descriptor (e.g., may be referred to as a Service Descriptor) may be included in an initialization vector. In that case, it becomes possible to use a common session key or message counter for different Security Descriptors.

Figure 117:
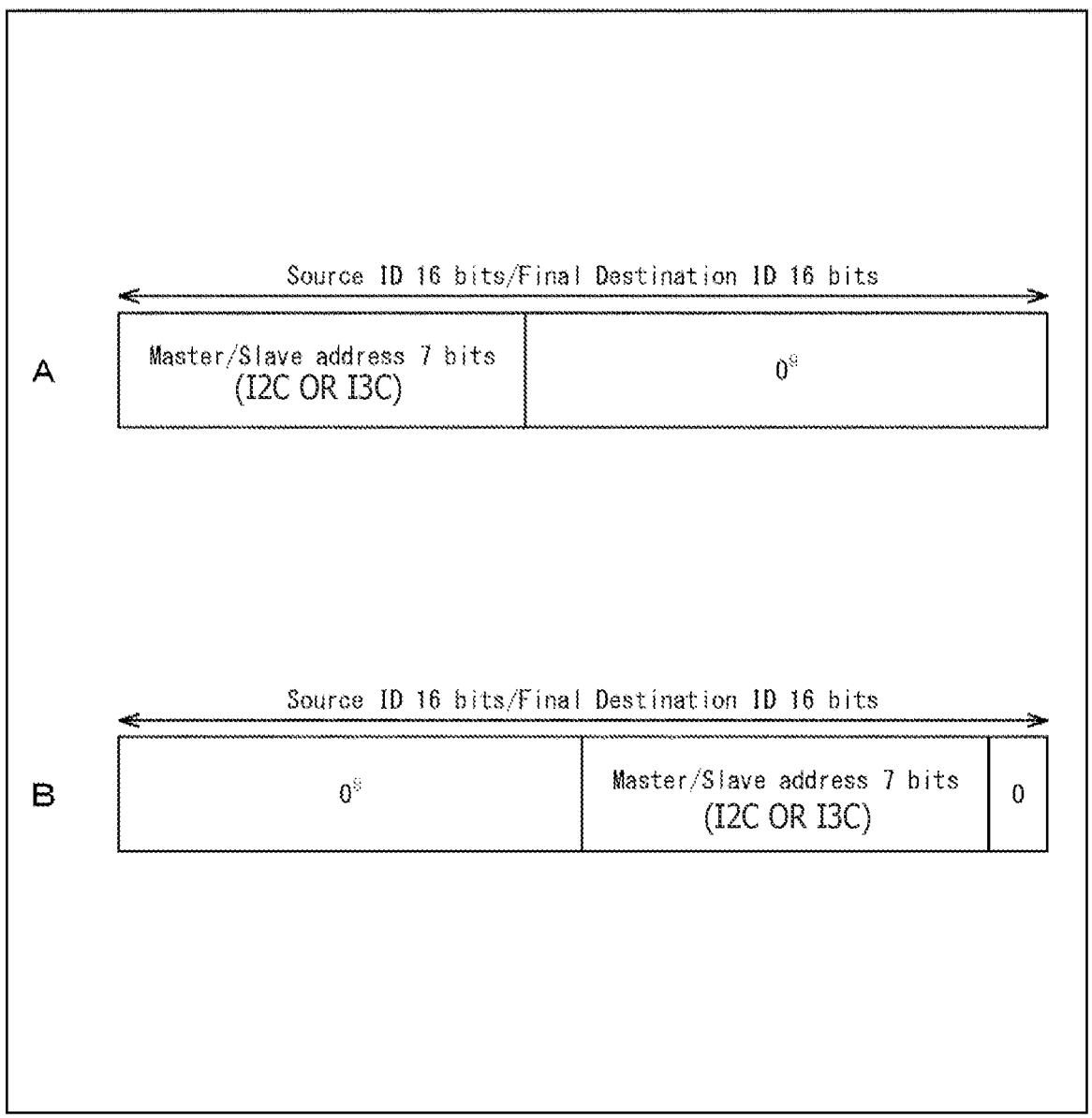
FIG. 117 illustrates figures depicting an example of a Source ID or a Final Destination ID.

As a Source ID or a Final Destination ID as the one depicted in FIG. 117, the image sensor 1211 or the application processor 1212 may use a value stored and received in an extended packet header (e.g., ePH4), instead of one that is exchanged in advance.

Note that as a connection form for linkage and communication among three or more pieces of equipment (e.g., multiple cameras and multiple displays) through cables, there is a daisy chain method by which one piece of equipment is coupled with the next piece of equipment "in series in a row," and, if a Source ID (source ID) and a Final Destination ID (final destination ID) are included in an initialization vector, it becomes possible to use a common session key or message counter for multiple pieces of equipment.

It should however be noted that a Source ID and a Final Destination ID are switched depending on what is transmitted is a command to the image sensor or data from the image sensor, for example. In order to avoid this, a Source ID and a Final Destination ID in an initialization vector may be defined as a Host ID and a Device ID, for example. It should be noted that, for example, the image sensor can be a host and a device (non-host), so that it is desirable that they be defined as a Source ID and a Final Destination ID in scone cases.

Accordingly, for example, an ID formed by a logical calculation (e.g., NOR) of a Source ID and a Final destination ID may be used. In that case, there is also an advantage that the bit width defined in an initialization vector is saved. Note that in a case of I2C or I3C, a Master address or a Slave address may be stored in a Source ID or a Final Destination ID as depicted in FIG. 117 mentioned above.

Note that, for example, in a case where image data is transmitted from the image sensor 1211 to the application processor 1212 with a data structure depicted in FIG. 86 mentioned above, in order to realize E2E protection, a device ID of the image sensor 1211 and a device ID of the application processor 1212 are stored as a Source ID and a Final Destination ID, respectively.

On the other hand, for example, in a case where a command order is transmitted from the application processor 1212 to the image sensor 1211 with the data structure depicted in FIG. 86 mentioned above, in order to realize E2E protection, a device ID of the application processor 1212 and a device ID of the image sensor 1211 are stored as a Source ID and a Final Destination ID, respectively. In that case, a device ID of the SerDes apparatus 25 or the SerDes apparatus 26 as the one depicted in FIG. 2 is an intermediate Destination ID, and it is desirable that a distinction be made from a Final Destination ID in some cases. It should however be noted that a Final Destination ID in an IV format may be replaced with a Destination ID in some cases. In addition, eVC may be replaced with VC, and eDT may be replaced with DT.

In addition, eVC or VC may be an ID (Stream ID) of any of a Video stream, an Audio stream, a Camera stream, a Display Stream, and the like. In addition, an Audio stream may be used as a stream instead of a Video stream, so that stream information that can identify whether the stream is a Video stream or an Audio stream may be included in an initialization vector. In that case, it becomes possible to use a common session key or message counter for a Video stream and an Audio stream.

Part or the whole of a nonce value may be stored in data (e.g., a frame start, embedded data, image data, a frame end) of a different virtual channel, and transmitted. This is effective in a case where there is no room for storing part or the whole of the nonce value in data of a particular virtual channel, for example.

On the other hand, part or the whole of a nonce value may be stored in at least part of packet data (Generic Short Packet Data Types, Generic Long Packet Data Types), user-defined data (User Defined Byte-based Data) or reserved area data (Reserved for future use) of a virtual channel other than a virtual channel of image data transmission, and transmitted. That is, they may be stored in non-image data.

Note that, in the explanation above, the start of image-capturing is clearly stated, but the end of image-capturing is not clearly stated. This is because there is a difference in this regard between, for example, a case where the image-capturing method is a global shutter method and a case where the image-capturing method is a rolling shutter method. For example, if the image-capturing method is a global shutter method, images can be captured with all pixels at once, so that the image-capturing may be ended before the next process, or the image-capturing may be ended before the first image data in the frame is transmitted. On the other hand, if the image-capturing method is a rolling shutter method, execution of at least part of image-capturing executed by each line of pixels and part of high-speed data transmission may overlap (parallel execution), so that it is sufficient if the image-capturing is ended before the last image data in the frame is transmitted. In addition, the position of the start of image-capturing is an example, and execution thereof may be delayed to a position prior to transmission of the first image data in the frame.

Configuration Example of Computer

Figure 118:
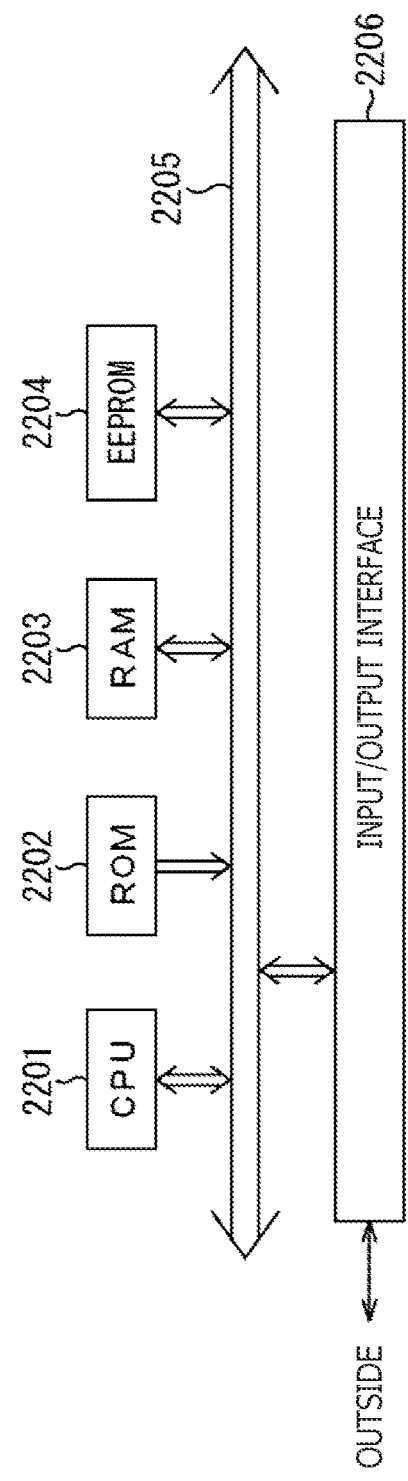
FIG. 118 is a block diagram depicting a configuration example of a computer according to an embodiment to which the present technology is applied.

FIG. 118 is a block diagram depicting a configuration example of hardware of a computer that executes a series of processing mentioned above by using a program.

In the computer, a CPU (Central Processing Unit) 2201, a ROM (Read Only Memory) 2202, a RAM (Random Access Memory) 2203, and an EEPROM (Electronically Erasable and Programmable Read Only Memory) 2204 are interconnected by a bus 2205. The bus 2205 is further connected with an input/output interface 2206, and the input/output interface 2206 is connected to the outside of the computer.

In the thus-configured computer, for example, the CPU 2201 loads, onto the RAM 2203 via the bus 2205, a program stored on the ROM 2202 and the EPPROM 2204, and executes the program to thereby perform the series of processing mentioned above. In addition, other than being written onto the ROM 2202 in advance, the program to be executed by the computer (CPU 2201) can be installed to the EPPROM 2204 from an external section via the input/output interface 2206 and can be updated, for example.

Here, in the present specification, processes performed by the computer in accordance with the program need not necessarily be performed in a temporal sequence along the orders described in the flowcharts. That is, processes performed by the computer in accordance with the program also include processes (e.g., parallel processes, or processes by objects) executed in parallel or individually.

In addition, the program may be one that is processed by a single computer (processor), or may be one that is processed in a distributed manner by multiple computers. Moreover, the program may be one that is transferred to a remote computer, and executed thereon.

Further, in the present specification, a system means a set of multiple constituent elements (apparatuses, modules (components), etc.), and it does not matter whether or not all the constituent elements are located in a single housing. Accordingly, multiple apparatuses housed in separate housings and connected via a network and one apparatus with one housing having housed therein multiple modules are both systems.

In addition, for example, a configuration explained as one apparatus (or processing section) may be divided, and configured as multiple apparatuses (or processing sections). On the other hand, configurations explained as multiple apparatuses (or processing sections) above may be integrated, and configured as one apparatus (or processing section). In addition, configurations other than those mentioned above may certainly be added to the configuration of each apparatus (or each processing section). Further, as long as configurations and operations as the whole system are substantially the same, part of the configuration of an apparatus (or processing section) may be included in the configuration of another apparatus (or another processing section).

In addition, for example, the present technology can have a configuration of cloud computing in which one functionality is shared among multiple apparatuses via a network, and is processed in cooperation with each other.

In addition, for example, the program mentioned above can be executed in a certain apparatus. In that case, it is sufficient if the apparatus has necessary functionalities (functional blocks, etc.), and can obtain necessary information.

In addition, for example, other than being executed on one apparatus, each step explained in a flowchart mentioned above can be shared by multiple apparatuses, and executed thereon. Moreover, in a case where one step includes multiple processes, other than being executed on one apparatus, the multiple processes included in the one step can be shared among multiple apparatuses, and executed thereon. In other words, the multiple processes included in the one step can also be executed as processes of multiple steps. On the other hand, processes explained as multiple steps can also be executed collectively as one step.

Note that regarding the program executed by the computer, processes of steps describing the program may be executed in a temporal sequence along an order explained in the present specification, may be executed in parallel, or may be executed individually at such necessary timings as timings when those processes are called. That is, as long as contradictions do not occur, the processes of the steps may be executed in an order different from the order mentioned above. Furthermore, the processes of the steps describing the program may be executed in parallel with processes of other programs, and may be executed in combination with processes of other programs.

Note that multiple aspects of the present technology that are explained in the present specification can each be implemented independently and singly as long as contradictions do not occur. Of course, any of multiple aspects of the present technology can also be implemented in combination. For example, part or the whole of the present technology explained in any of the embodiments can also be implemented in combination with part or the whole of the present technology explained in another embodiment. In addition, any part or the whole of the present technology mentioned above can also be implemented in combination with another technology not mentioned above.

Combination Examples of Configuration

Note that the present technology can also have a configuration as the one mentioned below.

(1)

An information processing apparatus including:
  a communication section that performs communication with a different information processing apparatus, and, when performing high-speed data transmission of data of a frame including image data, transmits an extended packet including an extended packet header and packet data to the different information processing apparatus;

a first protecting section that derives a session key and generates first protected data of the packet data by using the session key; and a nonce updating section that updates a nonce value for the session key every time the first protected data is generated, in which the image data is stored in the packet data, the high-speed data transmission includes transmission of part or a whole of the nonce value, and the part or the whole of the nonce value is stored outside the extended packet header and transmitted.

(2)

The information processing apparatus according to (1) described above, in which the communication section receives a high-speed data transmission start order requesting start of the high-speed data transmission, in low-speed command transmission in which a command related to the high-speed data transmission is transmitted from the different information processing apparatus, the high-speed data transmission is performed at a high speed as compared with the low-speed command transmission, is started in response to reception of the high-speed data transmission start order, and includes at least transmission of a frame start representing that the frame is started, and transmission of a frame end representing that the frame is ended, and the frame is capable of being transmitted continuously and cyclically in plural number, and frame blanking in which the image data is not transmitted is included between the frame end and the next frame start.

(3)

The information processing apparatus according to (2) described above, in which the low-speed command transmission includes transmission of a read order requesting reading out of information in the information processing apparatus to the processor, and as a read response according to the read order, the part or the whole of the nonce value is transmitted in a period of the frame blanking.

(4)

The information processing apparatus according to (2) or (3) described above, in which the frame includes embedded data that is transmitted by the high-speed data transmission in a period between the frame start and the frame end, the embedded data includes metadata related to the image data, and the part or the whole of the nonce value is stored in the embedded data and transmitted.

(5)

The information processing apparatus according to any one of (2) to (4) described above, in which the low-speed command transmission includes transmission of a read order requesting reading out of information in the information processing apparatus to the processor, the frame includes, between the frame start and the frame end, line blanking in which the image data is not transmitted, and as a read response according to the read order, the part or the whole of the nonce value is transmitted in a period of the line blanking.

(6)

The information processing apparatus according to any one of (1) to (5) described above, in which the frame includes second-virtual-channel data other than the image data which is first-virtual-channel data, and the part or the whole of the nonce value is stored in the second-virtual-channel data, and transmitted.

(7)

The information processing apparatus according to any one of (1) to (6) described above, in which part or a whole of the remaining part of the nonce value is stored in the extended packet header and transmitted.

(8)

The information processing apparatus according to any one of (1) to (7) described above, in which the high-speed data transmission includes transmission of a frame start representing that the frame is started and transmission of a frame end representing that the frame is ended, and the part or the whole of the nonce value is stored in the frame start or the frame end and transmitted.

(9)

The information processing apparatus according to any one of (1) to (8) described above, in which the part or the whole of the nonce value is used as part of an initialization vector used when the first protected data is calculated, and the initialization vector includes information regarding an extended virtual channel of the communication.

(10)

The information processing apparatus according to any one of (1) to (9) described above, in which the part or the whole of the nonce value is used as part of an initialization vector used when the first protected data is calculated, and the initialization vector includes information regarding an extended data type of the communication.

(11)

The information processing apparatus according to any one of (1) to (10) described above, in which the part or the whole of the nonce value is used as part of an initialization vector used when the first protected data is calculated, and the initialization vector includes information regarding an SPDM (Security Protocol and Data Model) session ID of the communication.

(12)

The information processing apparatus according to any one of (1) to (11) described above, in which the part or the whole of the nonce value is used as part of an initialization vector used when the first protected data is calculated, and the initialization vector includes information that identifies SPDM or HDCP (High-bandwidth Digital Content Protection).

(13)

The information processing apparatus according to any one of (1) to (12) described above, in which the part or the whole of the nonce value is used as part of an initialization vector used when the first protected data is calculated, and the initialization vector includes information regarding a source ID of the communication.

(14)

The information processing apparatus according to any one of (1) to (13) described above, in which the part or the whole of the nonce value is used as part of an initialization vector used when the first protected data is calculated, and the initialization vector includes information regarding a final destination ID of the communication.

(15)

The information processing apparatus according to any one of (1) to (14) described above, further including:
a message counter that updates a message count value every time an extended packet satisfying a predetermined count condition is transmitted, in which
the message count value is stored in the extended packet header, and
the nonce value and the message count value are updated synchronously.

(16)

The information processing apparatus according to any one of (1) to (15) described above, further including:
the message counter that updates the message count value every time the extended packet satisfying a predetermined count condition is transmitted, in which
the message count value is stored in the extended packet header, and
the nonce updating section and the message counter are separate blocks, and the nonce value and the message count value are updated asynchronously.

(17)

The information processing apparatus according to any one of (1) to (16) described above, in which
the extended packet includes an extended packet footer, and the first protecting section generates an integrity calculated value by using the session key, and
the integrity calculated value protects at least the packet data, and is stored in the extended packet footer.

(18)

The information processing apparatus according to any one of (1) to (17) described above, in which
the first protecting section generates an integrity calculated value by using the session key, and
the integrity calculated value protects at least the image data, and is stored in packet data other than the image data.

(19)

A mobile apparatus including:
an information processing apparatus including
a pixel that outputs image data,
a communication section that performs communication with a different information processing apparatus, and, when performing high-speed data transmission of data of a frame including the image data, transmits an extended packet including an extended packet header and packet data to the different processing apparatus,
a first protecting section that derives a session key and generates first protected data of the packet data by using the session key, and
a nonce updating section that updates a nonce value for the session key every time the first protected data is generated, in which
the image data is stored in the packet data,
the high-speed data transmission includes transmission of part or a whole of the nonce value, and
the part or the whole of the nonce value is stored outside the extended packet header and transmitted.

(20)

A communication system including:
an information processing apparatus including
a communication section that performs communication with a different information processing apparatus, and, when performing high-speed data transmission of data of a frame including image data, transmits an extended packet including an extended packet header and packet data to the different information processing apparatus,
a first protecting section that derives a session key and generates first protected data of the packet data by using the session key, and
a nonce updating section that updates a nonce value for the session key every time the first protected data is generated, in which
the image data is stored in the packet data,
the high-speed data transmission includes transmission of part or a whole of the nonce value, and
the part or the whole of the nonce value is stored outside the extended packet header and transmitted.

Note that the present embodiments are not limited to embodiments mentioned above, and can be changed in various manners within the scope not deviating from the gist of the present disclosure. In addition, advantages described in the present specification are illustrated merely as examples, and are not the sole examples, and there may be other advantages.

REFERENCE SIGNS LIST

1201: Communication system
1211: Image sensor
1212: Application processor
1213: Display
1301: Pixel
1302: AD converter
1303: Image processing section
1304: Extension-mode-supporting CSI-2 transmission circuit
1305: Physical layer processing section
1306: I2C/I3C slave
1307: Storage section
1308: Message counter
1309: Nonce updating section
1310: Security section
1321: Physical layer processing section
1322: Extension-mode-supporting CSI-2 reception circuit
1323: I2C/I3C master
1324: Storage section
1325: Data verifying section
1326: Security section
1327: Controller

The invention claimed is:

1. An information processing apparatus comprising:
a memory storing instructions, and
at least one processor configured to execute the instructions to perform operations comprising:
performing communication with a different information processing apparatus, and, when performing data communication of data of a frame including image data, transmits a packet including a packet header and packet data to the different information processing apparatus or receives the packet from the different information processing apparatus;
performing a protection process that generates, verifies, or decodes protected data of the packet data by using a session key; and
updating a nonce value for the session key every time the protected data is generated, verified, or decoded, wherein
the image data is stored in the packet data, the data communication includes transmission or reception of part or a whole of the nonce value, the part or the whole of the nonce value is stored outside the packet header and transmitted or received, the packet is an extended packet, the packet header is an extended packet header, the nonce value includes a message count value that is updated every time the extended packet satisfying a predetermined count condition is transmitted or received, and the message count value is stored in the extended packet header.

2. The information processing apparatus according to claim 1, wherein at least any one of performing communication, performing the protection process, and updating the nonce value selects one mode from at least two modes in a first Message Authentication Code (MAC) mode, a second MAC mode, and a non-MAC mode.

3. The information processing apparatus according to claim 1, wherein the operations further comprise:

performing command communication of transmitting a command related to the data communication to the different information processing apparatus or receiving the command from the different information processing apparatus, wherein the command communication includes transmission or reception of a read order requesting reading out of information in the information processing apparatus or information in the different information processing apparatus, the data communication includes transmission or reception of a frame start representing that the frame is started and transmission or reception of a frame end representing that the frame is ended, the frame can be transmitted or received cyclically, and as a read response according to the read order, the part or the whole of the nonce value is transmitted or received in a period between the frame end and a next frame start.

4. The information processing apparatus according to claim 1, wherein the frame includes embedded data stored in the packet data, the embedded data includes an attribute representing the image data or information regarding the image data, and the part or the whole of the nonce value is stored in the embedded data and transmitted or received.

5. The information processing apparatus according to claim 1, wherein the operations further comprise:

performing command communication of transmitting a command related to the data communication to the different information processing apparatus or receiving the command from the different information processing apparatus, wherein the command communication includes transmission or reception of a read order requesting reading out of information in the information processing apparatus or information in the different information processing apparatus, the data communication includes transmission or reception of a frame start representing that the frame is started and transmission or reception of a frame end representing that the frame is ended, and as a read response according to the read order, the part or the whole of the nonce value is transmitted or received in a period between the frame start and the frame end.

6. The information processing apparatus according to claim 1, wherein the frame includes non-image data stored in the packet data, and the part or the whole of the nonce value is stored in the non-image data and transmitted or received.

7. The information processing apparatus according to claim 1, wherein the packet is an extended packet, the packet header is an extended packet header, and part or a whole of a remaining part of the nonce value is stored in the extended packet header and transmitted or received.

8. The information processing apparatus according to claim 1, wherein the data communication includes transmission or reception of a frame start representing that the frame is started and transmission or reception of a frame end representing that the frame is ended, and as part or a whole of the packet data, the part or the whole of the nonce value is stored in the frame start or the frame end and transmitted or received.

9. The information processing apparatus according to claim 4, wherein the part or the whole of the nonce value is used as part of an initialization vector used when the protected data is calculated, and the initialization vector includes information regarding an extended virtual channel and a source ID of the communication.

10. The information processing apparatus according to claim 1, wherein the part or the whole of the nonce value is used as part of an initialization vector used when the protected data is calculated, and the initialization vector includes information about a virtual channel, a data type, an extended data type, a session ID, or a final destination ID of the communication.

11. The information processing apparatus according to claim 1, wherein the part or the whole of the nonce value includes a frame number and an additional frame number.

12. The information processing apparatus according to claim 1, wherein the part or the whole of the nonce value is used as part of an initialization vector used when the protected data is calculated, and the initialization vector includes information that identifies a Video stream or an Audio stream.

13. The information processing apparatus according to claim 1, wherein the frame includes embedded data that is stored in the packet data and that represents a vendor-specific code, and the part or the whole of the nonce value is stored in the embedded data that represents the vendor-specific code and transmitted or received.

14. The information processing apparatus according to claim 1, wherein the frame includes second image data or user-defined data of a second virtual channel other than the image data of a first virtual channel, and the numbers of lines of the image data and the second image data or the user-defined data are made the same.

15. The information processing apparatus according to claim 1, wherein the nonce value and the message count value are updated in separate blocks.

16. The information processing apparatus according to claim 1, wherein
the protection process generates, verifies, or decodes an integrity calculated value by using the session key, and
the integrity calculated value protects at least the packet data and is stored in part or a whole of the extended packet footer.

17. The information processing apparatus according to claim 1, wherein
performing the protection process generates, verifies, or decodes an integrity calculated value by using the session key, and
the integrity calculated value protects at least the image data and is stored in packet data other than the image data.

18. A mobile apparatus comprising:
an information processing apparatus including
a pixel circuit that outputs image data;
a memory that stores instructions; and
at least one processor configured to execute the instructions to perform operations comprising:
performing communication with a different information processing apparatus, and, when performing data communication of data of a frame including the image data, transmits a packet including a packet header and packet data to the different information processing apparatus or receives the packet from the different information processing apparatus,
performing a protection process that generates, verifies, or decodes protected data of the packet data by using a session key, and
updating a nonce value for the session key every time the protected data is generated, verified, or decoded, wherein
the image data is stored in the packet data,
the data communication includes transmission or reception of part or a whole of the nonce value,
the part or the whole of the nonce value is stored outside the packet header and transmitted or received,
the packet is an extended packet,
the packet header is an extended packet header,
the nonce value includes a message count value that is updated every time the extended packet satisfying a predetermined count condition is transmitted or received, and
the message count value is stored in the extended packet header.

19. A communication system comprising:
an information processing apparatus including
a memory storing instructions; and
at least one processor configured to execute the instructions to perform operations comprising:
performing communication with a different information processing apparatus, and, when performing data communication of data of a frame including image data, transmits a packet including a packet header and packet data to the different information processing apparatus or receives the packet from the different information processing apparatus,
performing a protection process that generates, verifies, or decodes protected data of the packet data by using a session key, and
updating a nonce value for the session key every time the protected data is generated, verified, or decoded, wherein
the image data is stored in the packet data,
the data communication includes transmission or reception of part or a whole of the nonce value,
the part or the whole of the nonce value is stored outside the packet header and transmitted or received,
the packet is an extended packet,
the packet header is an extended packet header,
the nonce value includes a message count value that is updated every time the extended packet satisfying a predetermined count condition is transmitted or received, and
the message count value is stored in the extended packet header.

* * * * *